(12) United States Patent
Nakagawa

(10) Patent No.: US 6,374,200 B1
(45) Date of Patent: *Apr. 16, 2002

(54) LAYOUT APPARATUS FOR LAYING OUT OBJECTS IN SPACE AND METHOD THEREOF

(75) Inventor: Toru Nakagawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,095

(22) Filed: Aug. 12, 1997

(30) Foreign Application Priority Data

Feb. 3, 1997 (JP) .............................................. 9-020642

(51) Int. Cl.[7] .............................. G06G 7/48; G06G 7/50
(52) U.S. Cl. .................................. 703/8; 703/9; 703/10
(58) Field of Search ........................ 395/500.09, 500.1, 395/500.11; 703/8–10

(56) References Cited

U.S. PATENT DOCUMENTS

| 4,495,559 A | * | 1/1985 | Gelatt et al. | ................... | 700/28 |
| 4,554,625 A | * | 11/1985 | Otten | ........................ | 700/171 |
| 5,086,477 A | * | 2/1992 | Yu et al. | ...................... | 382/145 |
| 5,309,371 A | * | 5/1994 | Shikata et al. | ......... | 395/500.11 |
| 5,535,134 A | * | 7/1996 | Cohn et al. | ............. | 395/500.09 |
| 5,559,718 A | * | 9/1996 | Baisuck et al. | ......... | 395/500.06 |
| 5,815,398 A | * | 9/1998 | Dighe et al. | ................. | 700/217 |
| 5,825,660 A | * | 10/1998 | Cagan et al. | ........... | 395/500.23 |
| 5,870,313 A | * | 2/1999 | Boyle et al. | ........... | 395/500.11 |

OTHER PUBLICATIONS

Nakatake et al.; "Module placement on BSG–structure and IC layout applications"; 1996 IEEE/ACM ICCAD–96; pp. 484–491, Nov. 1996.*
Murata et al.; "VLSI module placement based on rectangule–packing by the sequence–pair" IEEE Trans. Computer–aided design of IC and System; pp. 1518–1524, Dec. 1996.*
Marques et al.; "A system for the compaction of two–dimensional irregular shapes based on simulated annealing"; IEEE Proc. IECON '91; pp. 1911–1916, Oct. 1991.*

* cited by examiner

Primary Examiner—Kevin J. Teska
Assistant Examiner—Hugh Jones
(74) Attorney, Agent, or Firm—Staas & Halsey LLP

(57) ABSTRACT

A layout system manages a designated layout space with a set of inscribed rectangles. Whenever an object is input, the layout system determines a layout position of the object in the layout space according to a designated priority rule. The layout system simulates the layout process for various conditions so as to optimize the layout of objects.

10 Claims, 118 Drawing Sheets

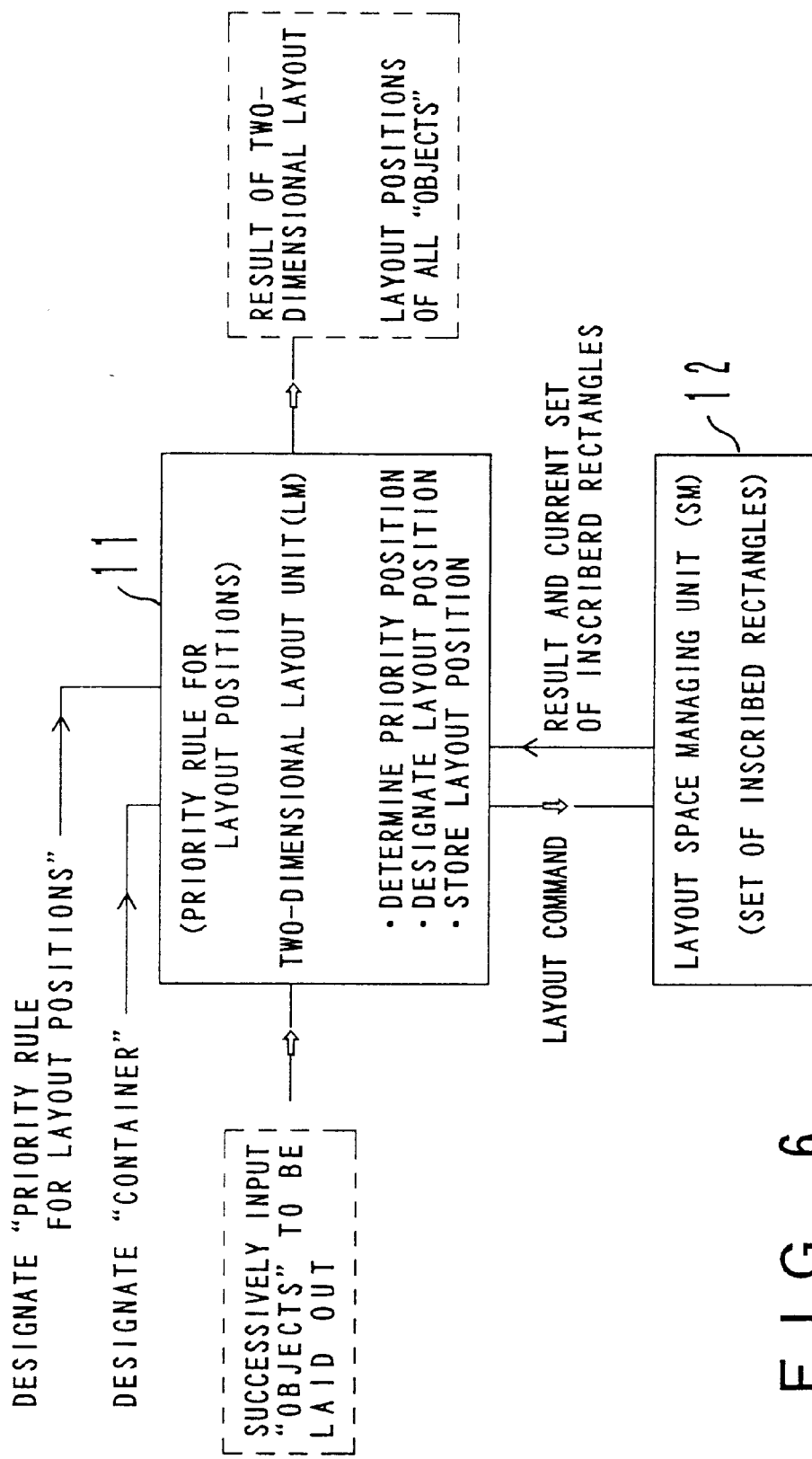
F I G. 6

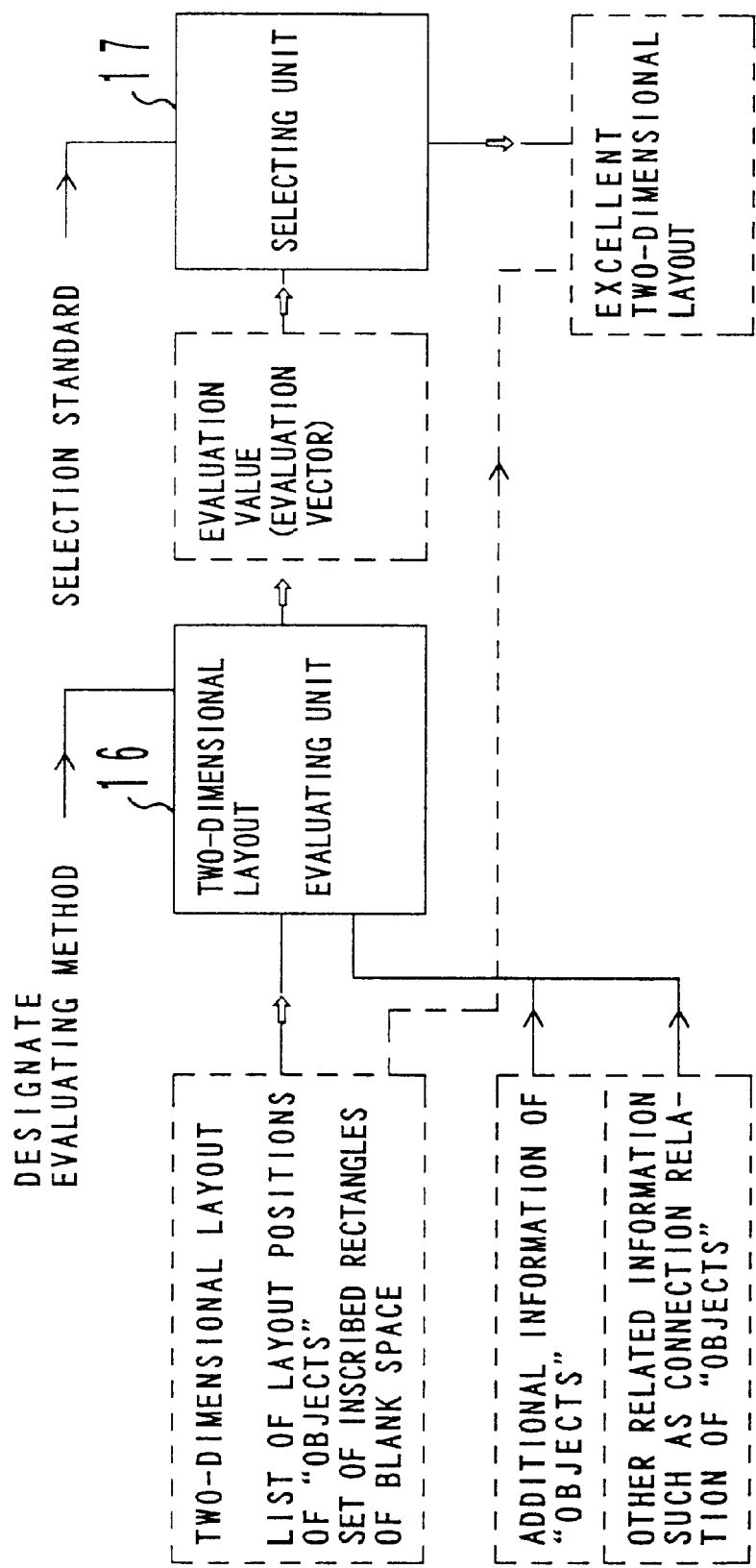
F I G. 14

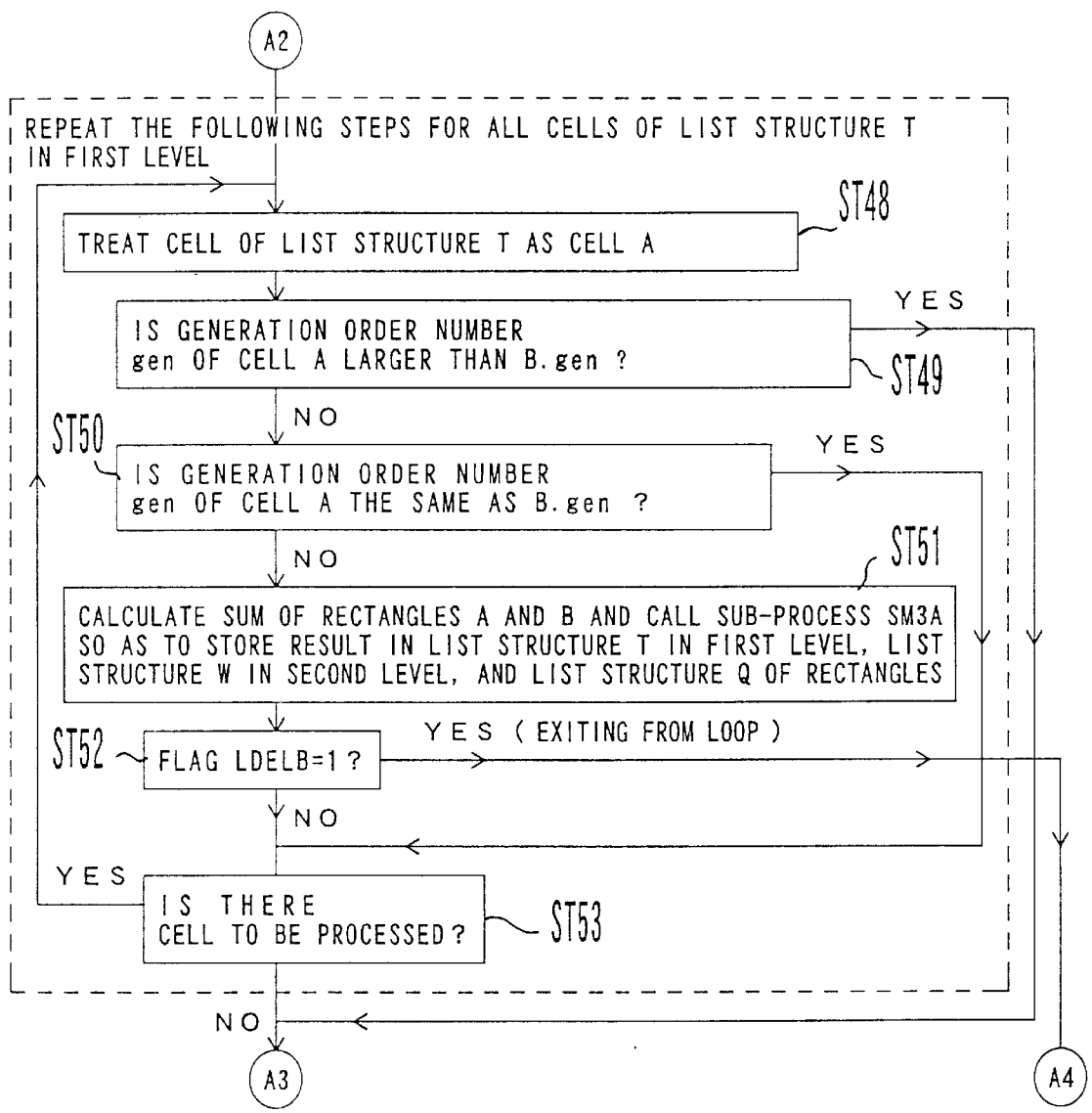
F I G. 6 8

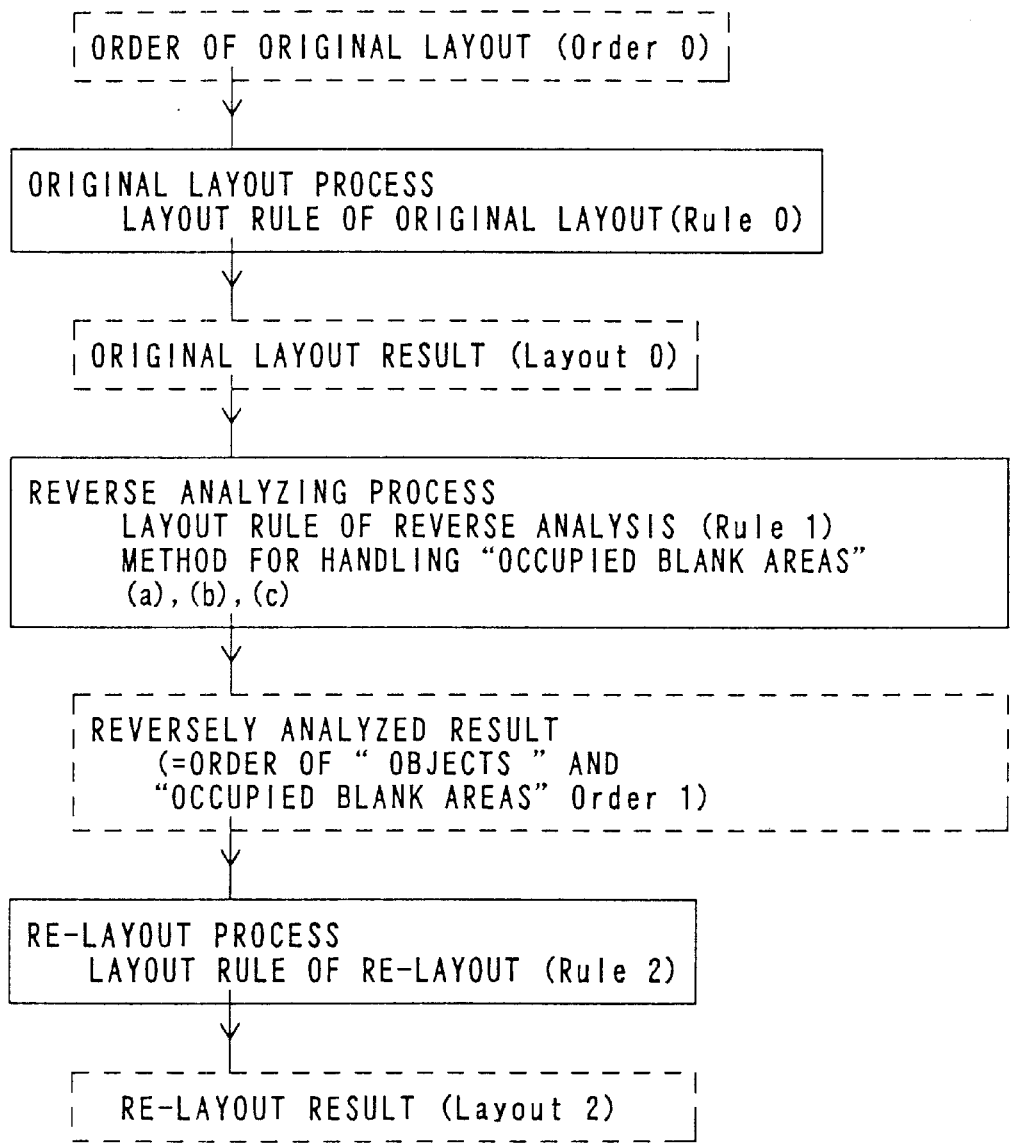
F I G. 1 1 7

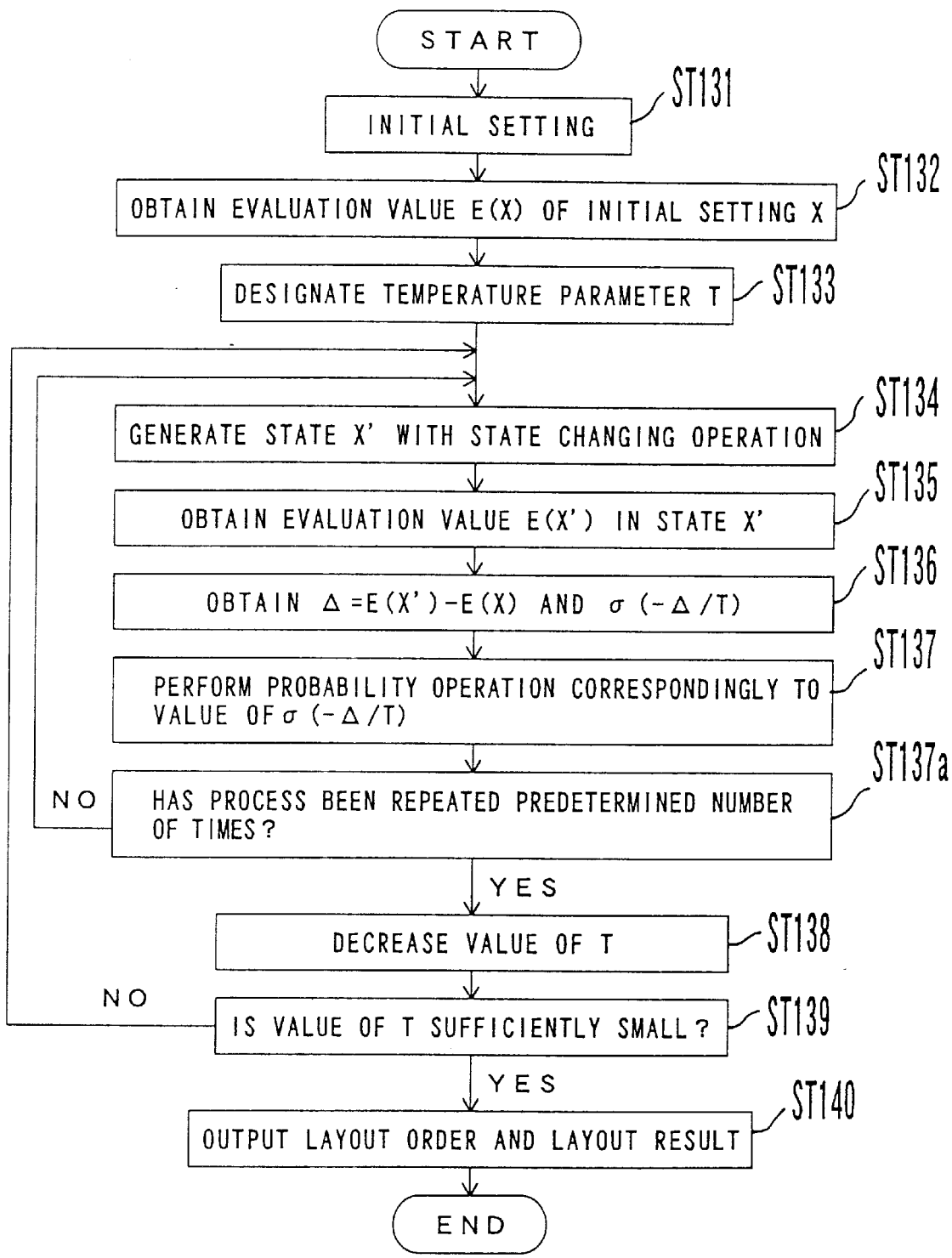
F I G. 1 1 8

LAYOUT APPARATUS FOR LAYING OUT OBJECTS IN SPACE AND METHOD THEREOF

BACKGROUND OF THE INVENTION

1. Field of the Invention

The present invention relates to a two dimensional object layout apparatus for automatically designing a two-dimensional layout of many objects such as commodities in a warehouse, parts on a printed circuit board, or cells on a VLSI (Very Large Scale Integration) circuit, and a method thereof.

2. Description of the Related Art

In designing a printed circuit and a VLSI, a very large number of circuit parts, transistors, and so forth should be laid out on a two-dimensional board (or a chip). To do that, computer aided design (CAD) systems have been used.

Such CAD systems roughly operate in two phases. The first phase is a logical phase where logic circuits are formed, a process is simulated, and test data is generated. The second phase is a physical phase where cells (parts) are laid out and lines (leads) thereof are connected.

In the second phase, based on a design drawing of a logic circuit received from the first phase, a large number of circuit elements or semiconductor devices are optimally laid out on a two-dimensional plane (of multiple layers) and lines thereof are optimally connected corresponding to a predetermined design rule for each device and therebetween in such a manner that the total area of the structure becomes compact and the line lengths become short.

In the process for laying out cells, it is not effective to directly handle cells in the order of the 0.1 million cells or 1 million cells of an VLSI. Thus, conventionally, the physical design work is hierarchically performed and thereby several tens of cells to several hundreds of cells (module parts) are handled at a time. Each cell has the size and shape necessary for the internal logic and the input/output terminals. These cells should be connected with lines corresponding to the logical design. However, unless the layout of the cells is designated, wiring is not determined.

A fundamental problem for laying out cells is to optimally obtain a two-dimensional layout of cells of various sizes (mainly, rectangular cells) free from two-dimensionally overlapping in consideration of the line connections among them. The optimization of this layout is a problem in which the degree of freedom of the search space is very large. Thus, a highly heuristic solution is required.

The method that has been widely used for easily designing a layout is the standard cell method (gate array method). In this method, the lengths of individual cells are regulated and many cells are laid out breadthwise. Input/output terminals of the cells are laid out lengthwise only. When the lengths of the cells are restricted and the layout positions thereof are restricted, the degree of freedom of the two dimensional layout problem is reduced.

When cells are two-dimensionally laid out without restricting the sizes and shapes thereof, a problem for laying out many rectangles in a two-dimensional container (for example, a circuit base board or a chip) as compactly as possible needs to be solved. Thus, this problem is referred to as "a problem for optimizing a two-dimensional layout of rectangles."

As one method for optimizing a two-dimensional layout of rectangles, Otten et al. has proposed the "Slicing floorplan" method (R. H. J. M Otten, "Automatic Floorplan Design, in Proc. 19th ACM/IEEE Design Automation Conf., pp. 261–267, 1982). In this method, one rectangular base board is sliced lengthwise or breadthwise into two portions at a suitable position. Each of the sliced portions is further sliced into two portions. This process is repeated.

A two-branched tree that represents such division is formed as a data structure. By laying out individual cells to branches, the required area is obtained. By varying the dividing method (a combination of lengthwise and breadth wise slicing), the minimum area is obtained. A drawback of this method is in that rectangles cannot be laid out in a chained pattern.

In addition, Nakatake et al. has proposed the BSG (Bounded Slicing Grid) method for optimizing a two-dimensional layout of rectangles (S. Nakatake, K. Fujiyoshi, H. Murata, Y. Kajitani, "Module Placement on BSG-Structure and IC Layout Applications," Int. Conf. on Computer Aided Design, 1996). In this method, cells are laid out on grids with a special structure termed a BSG. The cells are mapped to a physical space corresponding to the rules of BSG method.

The BSG method represents a restriction in which cells are laid out lengthwise and breadth wise adjacent to the positions of the BSG grids. Since this restriction is strict, blanks are inserted at suitable positions on the grids to obtain a more compact layout. To optimize the layout of the cells, trial and error is repeated in laying out cells in the BSG and an optimum result is selected.

In the aforementioned standard cell method, slicing floorplan method, and BSG method, as a common process, various layouts are simulated and an optimum result is obtained. When this trial and error process is manually performed, huge amounts of work are required.

To solve this problem, with a proper evaluation function, the simulation is performed as effectively and systematically as possible. To do that, a conventional optimizing method can be used. As such a conventional method, the simulated annealing (SA) method has become popular.

In the SA method, the optimizing search space is represented with parameters. By a converting operation with parameters including a probability element, a desired solution is searched for by trial and error. In the SA method, it is important to consider how search parameters are structured for the problem they are to be applied to, (in this case a problem of a two-dimensional layout of rectangles), and when a particular parameter is given, how the given parameter is converted into a particular space (namely, laid out two-dimensionally) and how the obtained result is evaluated.

These points should be considered for individual problems and solutions. In reality, the optimization by the SA method has been attempted with the standard cell method, slicing floorplan method, and BSG method.

However, the aforementioned conventional solving methods have the following drawbacks.

In the standard cell method, so as to simplify a given problem, the lengths of cells and the two-dimensional layout thereof are restricted. According to this method, although the problem is simplified, it is not assured that wiring among the cells are optimum. It is logically clear that when such restrictions are not applied, better layout results can be obtained.

In the slicing floorplan method, since the slicing in two process is repeated, special layouts such as a four-rectangle-chained shape cannot be represented. Although a modification method for representing such a shape has been studied, complicated calculations are required.

In the BSG method, the structure of the grids is special and complicated. In addition, the restrictions are strict. In other words, unless many blanks are inserted on the grids, cells cannot be freely laid out. Thus, the BSG method is used for automatically optimizing a layout of cells corresponding to the SA method, rather than creating a BSG that represents a two-dimensional layout by a designer. Although good results from calculations in the SA method have been obtained at the laboratory level, they should be further improved for practical use.

As described above, although many CAD tools for two-dimensional layouts have been developed and used, with respect to calculation time and quality thereof, there are still many problems to be solved.

In the designing phase of a cell layout for a VLSI that requires high performance, it is stated that a manual layout performed by an experienced designer is superior to an automatic layout. In addition, as the structure and scale of the VLSI have become complicated and large and the required design period has become short, a new approach for solving the problem of a two-dimensional layout has been strongly desired.

SUMMARY OF THE INVENTION

An object of the present invention is to provide a two-dimensional layout apparatus for accurately and promptly solving such a two-dimensional layout problem and a method thereof.

A first aspect of the present invention is a two-dimensional layout system having a storing unit and a layout unit for designing a layout of a plurality of objects. The objects are any physical resources that have shapes and sizes.

The storing unit stores a priority rule for layout positions. The layout unit determines the layout positions of the objects in a layout space according to the priority rule for the layout positions. The priority rule for the layout positions represents a predetermined rule for determining priority layout positions of objects in the current layout space.

A second aspect of the present invention is a two-dimensional layout system having a space representing unit and a managing unit. The space representing unit represents a two-dimensional space composed of at least one closed figure surrounded by lengthwise sides and breadthwise sides with a set of inscribed rectangles, a part of each side of which is included in a side of the closed figure. The managing unit manages the two-dimensional space with the set of inscribed rectangles.

A third aspect of the present invention is a reverse analyzing apparatus having a storing unit and an analyzing unit. The storing unit stores a priority rule for layout positions. The analyzing unit analyzes a layout result of a plurality of objects, and obtains a layout order for objects to restore the layout result by laying out the objects according to the priority rule for the layout positions.

A fourth aspect of the present invention is a layout evaluating apparatus having a layout unit and an evaluating unit for designing a layout of a plurality of objects. Whenever an object is received, the layout unit determines the layout position of the received object in a layout space according to the priority rule for the layout positions. The evaluating unit evaluates the layout result obtained by the layout unit.

A fifth aspect of the present invention is a layout optimizing apparatus having a storing unit, a layout unit, and an evaluating unit for designing a layout of a plurality of objects. The storing unit stores a priority rule for layout positions. Whenever an object is received, the layout unit determines the layout position of the received object in a layout space, which is defined by excluding other objects that have been laid out from an initial space, according to the priority rule for the layout positions. The evaluating unit evaluates a plurality of layout results obtained by varying at least one of the object layout order, the priority rule for the layout positions, and the initial space, and selects an excellent layout result.

A sixth aspect of the present invention is a layout optimizing apparatus having a storing unit, a layout unit, an evaluating unit, and a searching unit based on the simulated annealing method for designing a layout of a plurality of objects.

The storing unit stores at least one priority rule for layout positions. Whenever an object is received, the layout unit determines the layout position of the received object in a layout space according to the priority rule for the layout positions. The evaluating unit evaluates the layout result obtained by the layout unit. The searching unit represents the object layout order as a parameter of the search space. While varying the parameter according to the simulated annealing method, the searching unit searches the search space and automatically obtains an excellent layout result.

A seventh aspect of the present invention is a layout optimizing apparatus having a storing unit, a layout unit, an evaluating unit, and a searching unit based on a genetic algorithm for designing a layout of a plurality of objects.

The storing unit stores at least one priority rule for layout positions. Whenever an object is received, the layout unit determines the layout position of the received object in a layout space according to the priority rule for the layout positions. The evaluating unit evaluates the layout result obtained by the layout unit. The searching unit represents the object layout order as gene data, performs a genetic operation for a gene group including at least one gene data according to the genetic algorithm, and automatically obtains an excellent layout result.

BRIEF DESCRIPTION OF THE DRAWINGS

FIG. 6 is a schematic diagram showing the structure of a two-dimensional layout system;

FIG. 14 is a schematic diagram showing an evaluating unit and a selecting unit;

FIG. 68 is a flowchart (No. 2) showing a rearranging process;

FIG. 117 is a schematic diagram showing a reverse analyzing process;

FIG. 118 is a flowchart showing simulated annealing process; and

DESCRIPTION OF PREFERRED EMBODIMENTS

Figure 1:
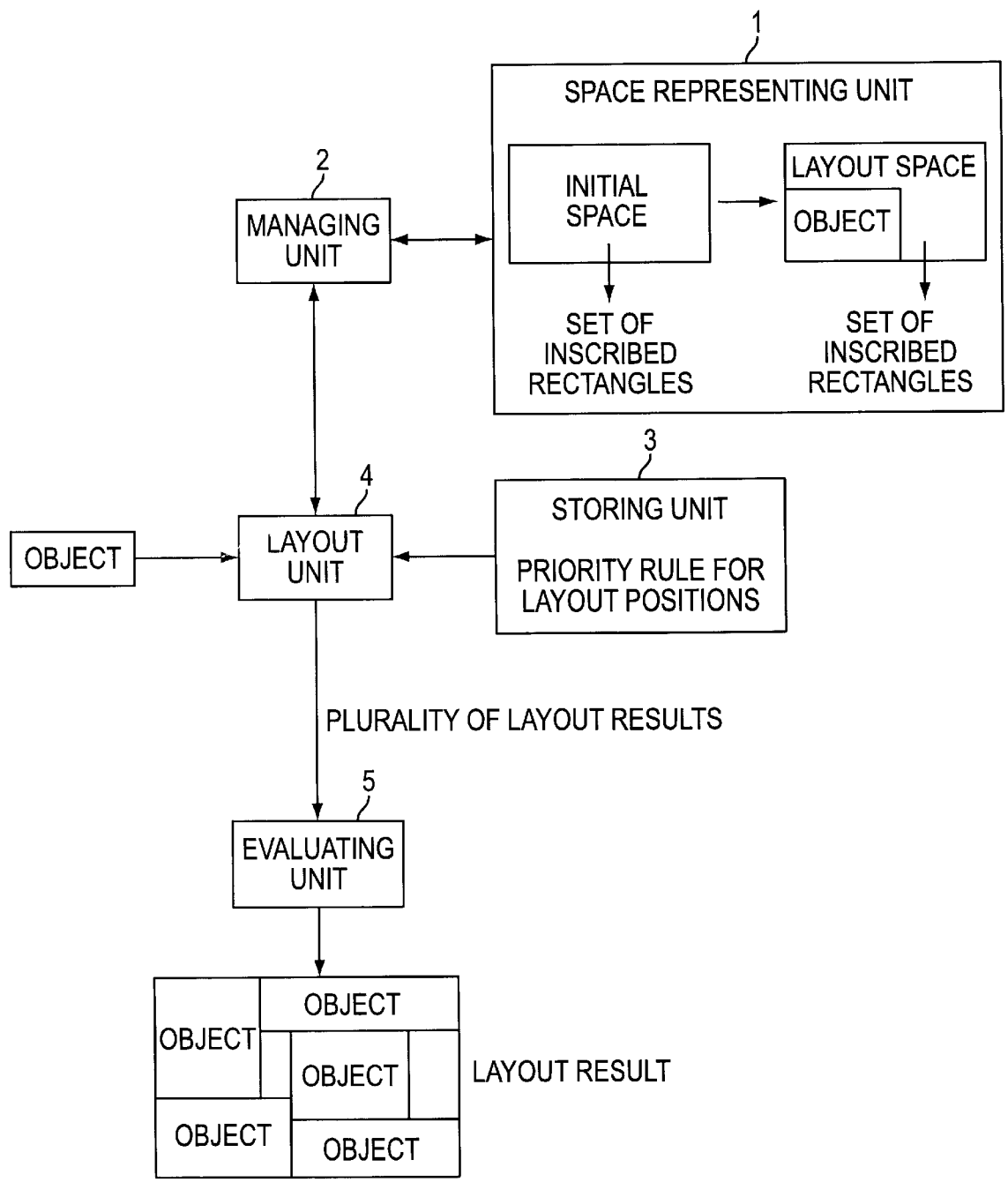
FIG. 1 is a schematic diagram showing the principle of a two-dimensional layout system according to the present invention.

FIG. 1 is a schematic diagram showing the principle of a two-dimensional layout system according to the present invention. The two-dimensional layout system shown in FIG. 1 comprises a space representing unit 1, a managing unit 2, a storing unit 3, a layout unit 4, and an evaluating unit 5. The two-dimensional layout system designs a layout of a plurality of objects. In this case, the objects represent any physical resources that have shapes and sizes, not limited to circuit parts or semiconductor cells of a VLSI.

The storing unit 3 stores a priority rule for layout positions. Whenever an object is received, the layout unit 4 determines the layout position of the received object in a layout space according to the priority rule for the layout positions.

The priority rule for the layout positions is a predetermined rule for determining priority layout positions for objects in the current layout space. For example, the priority direction in the layout space is designated beforehand. Objects are laid out in the designated direction.

When objects are successively received and laid out in the layout space, the layout unit 4 lays out the received objects in the layout space without moving other objects that have been laid out and overlapping therewith according to the priority rule for the layout positions.

Thus, when the priority rule for the layout positions is designated beforehand, the layout positions of objects can be automatically determined. In other words, objects are successively laid out in the received order. Consequently, any layout problem can be effectively solved without empirical knowledge of a skilled engineer.

The space representing unit 1 represents a two-dimensional space composed of at least one closed figure (referred to hereinafter as figure S) surrounded by lengthwise sides and breadthwise sides with a set of inscribed rectangles, a part of or all of each side of which is included in a side of the closed figure. The managing unit 2 manages the space with the set of inscribed rectangles.

The closed figures represent the initial space, each of which can be divided into several rectangles. Objects to be laid out, having any shapes and sizes, are represented as rectangles. The layout space during the process is equal to an area which is obtained by removing the spaces of other objects that have been laid out from the initial space. Thus, after the process is started, the layout space is composed of at least one closed figure surrounded by lengthwise sides and breadthwise sides. An inscribed rectangle of a particular closed figure S is defined as a rectangle, a part of or all of each side of which is included in a side of the figure S and which is inside the figure S. A set of inscribed rectangles of the figure S is defined as a set of all possible inscribed rectangles of the figure S. At this point, the area of the figure S is represented with the sum of the inscribed rectangles thereof.

Whenever an object is laid out, the managing unit 2 communicates with the layout unit 4 and inputs as a new layout space to the space representing unit 1 an area which is obtained by excluding the rectangle thereof from the layout space. The space representing unit 1 represents the layout space received from the managing unit 2 as a set of inscribed rectangles thereof.

The set of inscribed rectangles can uniquely represent any closed figure represented with lengthwise sides and breadthwise sides. In addition, the remaining space can be represented with a set of inscribed rectangles. Thus, the layout space of any two-dimensional layout problem can be managed. A closed figure of a layout space may have concaved (recessed) portions or holes.

The evaluating unit 5 evaluates a plurality of layout results obtained by varying at least one of the object layout order, the priority rule for the layout positions, and the initial space, and selects an excellent layout result.

The object layout order represents the order of a plurality of objects supplied to the layout unit 4.

When the object layout order is varied, the layout results are varied. Likewise, when the priority rule for the layout positions or the shape/size of the initial space is varied, the layout results are varied. Thus, with various combinations of such conditions, various layout results can be obtained.

The evaluating unit 5 evaluates the layout results with a proper evaluation function and outputs a relatively good layout result as an excellent layout result. When such conditions are varied, since the layout results can be uniquely obtained, the excellent layout result can be automatically and effectively determined. In addition, by repeating such a process for many layouts, an excellent result can be selected therefrom. Thus, since the objects are optimally laid out, a desired layout result can be obtained.

For example, the space representing unit 1 and the managing unit 2 shown in FIG. 1 accord with a layout space managing unit 12 shown in FIG. 6. The storing unit 3 and the layout unit 4 shown in FIG. 1 accord with a two-dimensional layout unit 11 shown in FIG. 6. The evaluating unit 5 shown in FIG. 1 accords with a two-dimensional layout evaluating unit 16 shown in FIG. 14.

According to the present invention, in designing a printed circuit and a VLSI, parts and cells are laid out in the second phase. However, the present invention is not limited to such problems. Instead, the present invention can be applied for a general two-dimensional layout problem. For example, a general two-dimensional layout problem is defined as follows.

There are many "objects" to be laid out. These objects are two-dimensionally laid out in a "container" that is a designated (appropriately selectable) area in such a manner that they do not overlap. The external shapes of the "objects" are basically rectangular. The objects have individual sizes and shapes (length-breadth ratios).

The objects should be laid out as compactly as possible. In addition, the layout results are evaluated with other data such as the positions of the "objects," the mutual relation thereof, and wiring among them. To obtain the best evaluated result, the objects should be laid out optimally or semi-optimally.

Such a two-dimensional layout problem should be solved in a more general method with a better evaluated result (for example a compact layout result) in a shorter calculation time.

A fundamental feature of the present invention is that when "objects" to be laid out have been designated and a priority rule for layout positions thereof has been designated, the "objects" are successively laid out without moving the other "objects" that have been laid out. Thus, the "objects" are laid out two-dimensionally. The layout results are evaluated with a proper evaluation function so as to select a desired layout result.

To obtain the desired layout result, the priority rule for the layout positions should be designated beforehand. Corresponding to the priority rule, the input order of the "objects" should be designated. Thus, various layout orders are simulated using the layout processing unit (layout simulator) that has at least one priority rule of layout positions and then a layout with the highest evaluated result is selected.

To simulate the priority rule for layout positions and the layout order and automatically select the optimum (or semi-optimum) solution, the genetic algorithm (GA) or simulated annealing (SA) method can be used.

In this example, it is assumed that "objects" to be laid out have arbitrary rectangular shapes and sizes. When "objects" with complicated shapes are laid out, their overall shapes can be treated using appropriate rectangles as an approximation.

On the other hand, a "container" in which "objects" are laid out may be formed in a shape composed of a plurality of rectangles with their lengthwise and breadthwise directions arranged in order. The "container" may have concaved portions, holes, or obstacles. In addition, the "container" may be separated into a plurality of areas. The "obstacle" represents a portion on which an "object" cannot be laid out. For example, the "obstacle" represents a hole or another object.

A fundamental feature of present invention that accomplishes the above described two-dimensional layout optimizing method is a layout space managing unit that represents and manages a space in which objects can be laid out using a set of inscribed rectangles. The shape of the space managed by the apparatus is defined in the same manner as the shape of the "container."

In other words, the shape of the space is defined as the closed figure S composed of one or a plurality of inscribed rectangles with arbitrary sizes. The rectangles are composed of lengthwise and breadthwise sides with the lengthwise and breadthwise orientations arranged in order. For example, a side lies in one of vertical and horizontal directions. The closed figure S may have concaved portions, holes, or obstacles. The closed figure S may be separated into a plurality of areas.

Next, an example of the figure S and an example of a set of inscribed rectangles will be described. In these examples, figures are denoted as follows.

Rectangle of width w×height h: 11 (w, h)

Rectangle with four vertices $(x_0, y_0), (x_1, y_0), (x_1, y_1), (x_0, y_1)$: $\Box ((x_0, x_1), (y_0, y_1))$ "Object" is denoted by ■ instead of □, when it should be clearly distinguished from blank areas.

Figure 2:
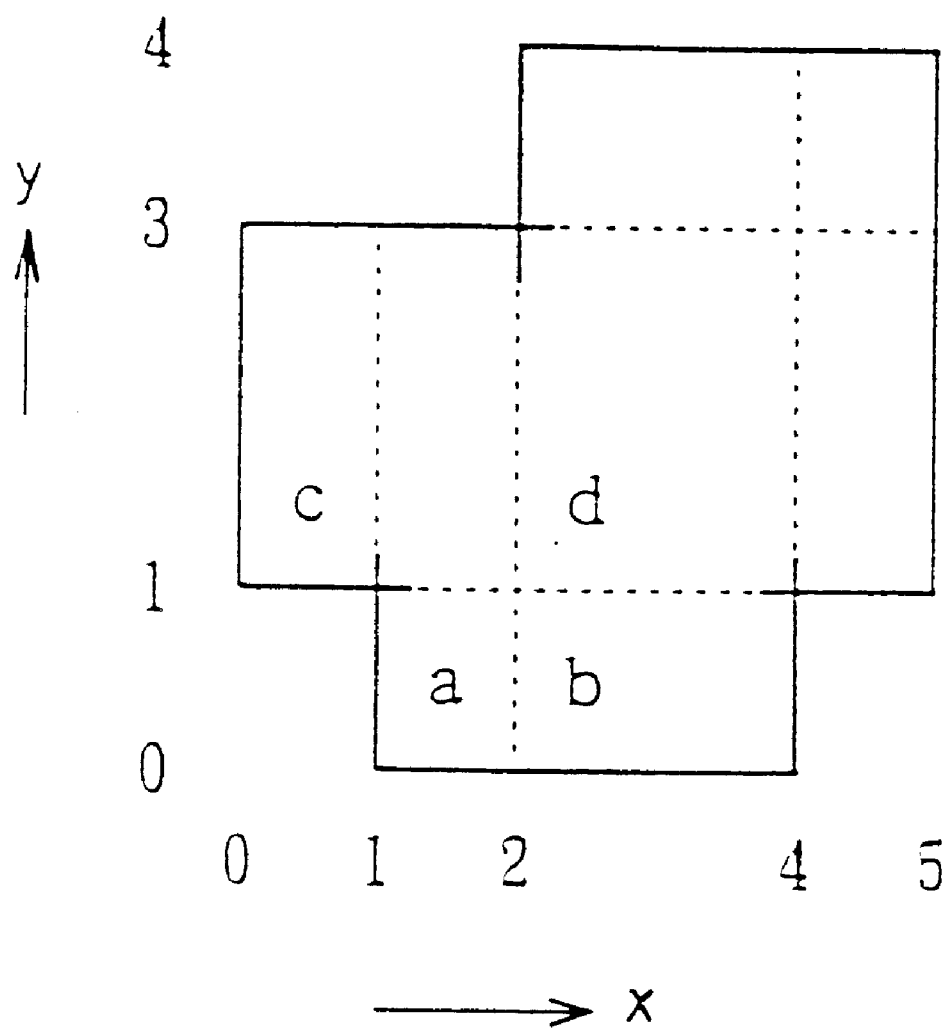
FIG. 2 is a schematic diagram showing a set of inscribed rectangles of a figure.

The figure S (denoted by thick lines) shown in FIG. 2, for example, has four inscribed rectangles.

$a=\Box((1, 4), (0, 3))$ $b=\Box((2, 4), (0, 4))$ $c=\Box((0, 5), (1, 3))$ $d=\Box((2, 5), (1, 4))$

The set of the inscribed rectangles of the figure S:

Set of inscribed rectangles of S={a, b, c, d}

The area of the figure S is denoted by the inscribed rectangles as follows.

$S = a \cup b \cup c \cup d$

But the following rectangles are not inscribed rectangles.

$g=\Box((2, 4), (0, 3))$ $h=\Box((0, 4), (1, 3))$

Figure 3:
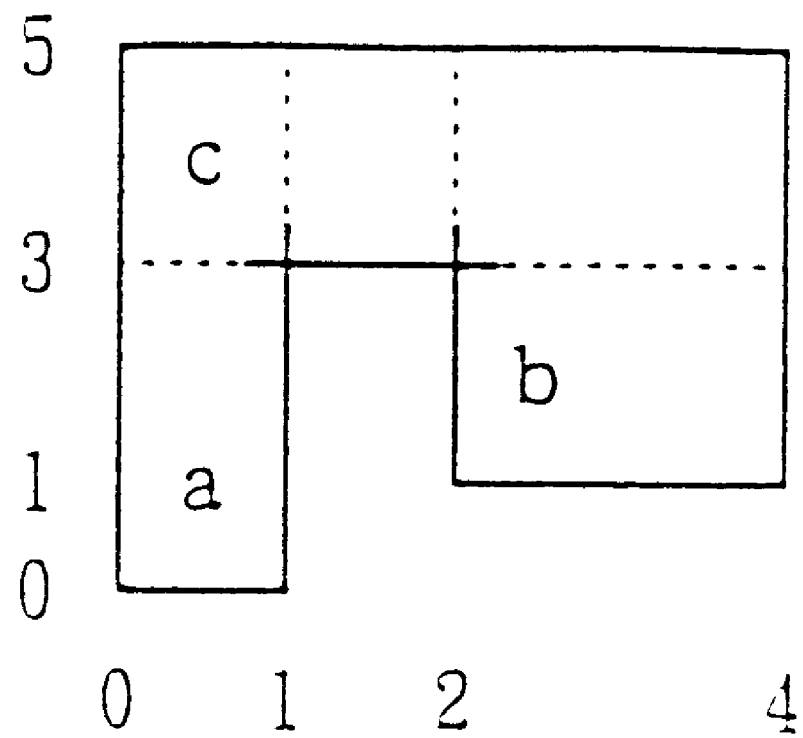
FIG. 3 is a schematic diagram showing a set of inscribed rectangles of a figure having a concaved portion.

In the case of a figure S having a concaved portion, as shown in FIG. 3, inscribed rectangles of the figure S, a set of the inscribed rectangles, and an area of the figure S are denoted as follows.

$a=\Box((0, 1), (0, 5))$ $b=D((2, 4), (1, 5))$ $c=D((0, 4), (3, 5))$

Set of inscribed rectangles of S={a, b, c}

$S = a \cup b \cup c \cup d \cup.$

In this case, the following rectangles are not inscribed rectangles.

$g=D((0, 1), (0, 3))$ $h=D((0, 4), (1, 5))$

Figure 4:
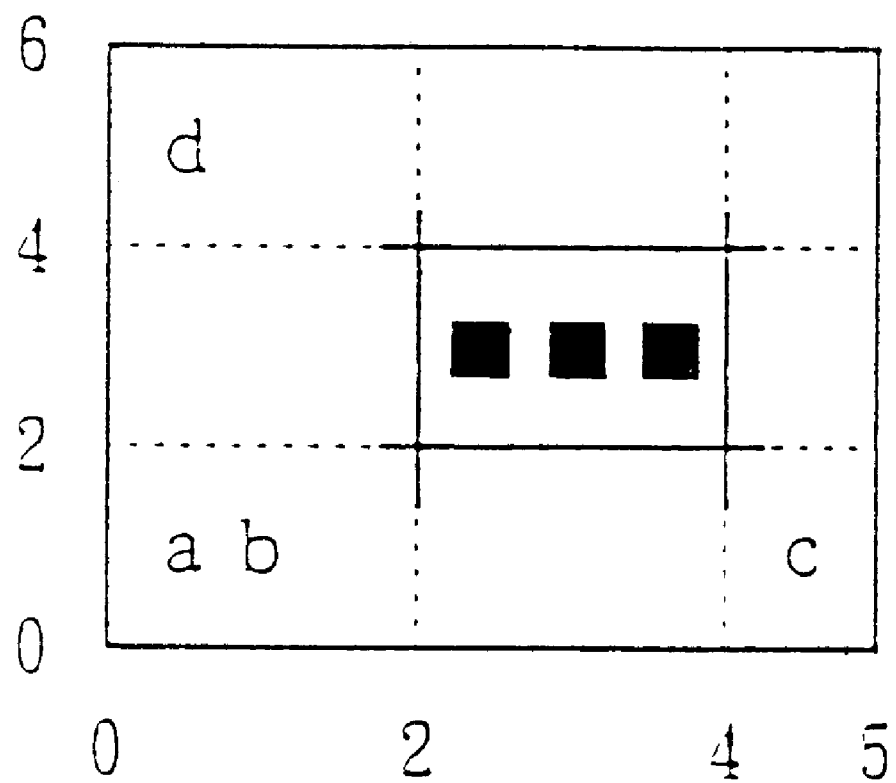
FIG. 4 is a schematic diagram showing a set of inscribed rectangles of a figure having an opening therein.

In the case of a figure S having a hole, as shown in FIG. 4, inscribed rectangles of the figure S, a set of the inscribed rectangles, and an area of the figure S are denoted as follows.

$a=\Box((0, 5), (0, 2))$ $b=\Box((0, 2), (0, 6))$ $c=\Box((4, 5), (0, 6))$ $d=\Box((0, 5), (4, 6))$

Set of inscribed rectangles of S=(a, b, c, d)

$S = a \cup b \cup c \cup d$

In FIG. 4, ■ ((2, 4), (2, 4)) represents an area (that is, "hole" or "obstacle") which is not included in the figure S.

Figure 5:
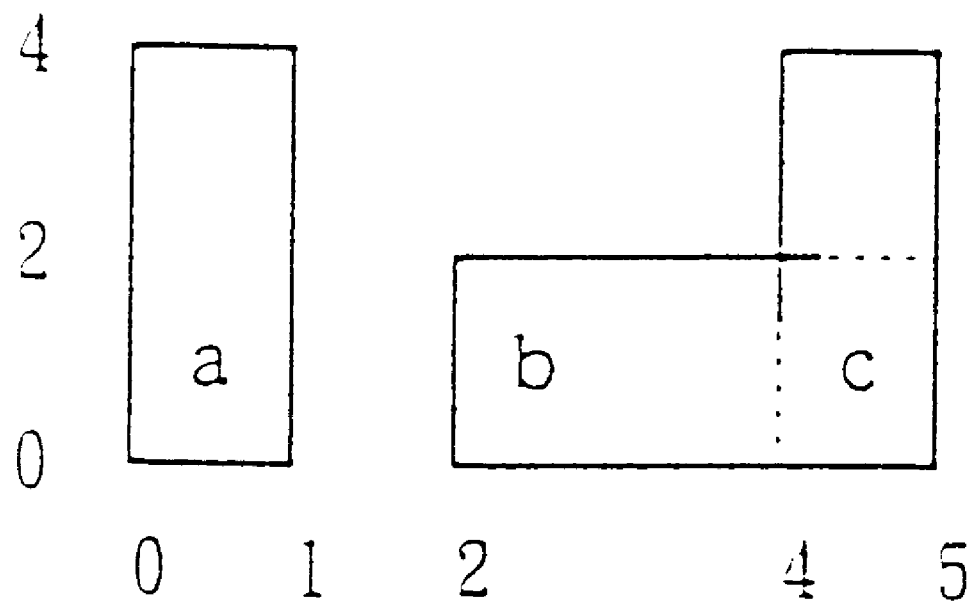
FIG. 5 is a schematic diagram showing a set of inscribed rectangles of separated figures.

In the case of a figure S composed of separated areas, as shown in FIG. 5, inscribed rectangles of the figure S, a set of the inscribed rectangles, and an area of the figure S are represented as follows.

$a=\Box((0, 1), (0, 4))$ $b=\Box((2, 5), (0, 2))$ $c=\Box((4, 5), (0, 4))$

Set of inscribed rectangles of S=(a, b, c)

$S = a \cup b \cup c$

As one method for obtaining a set of inscribed rectangles of each of various figures, the set is represented with a combination of appropriate rectangles. As the basis for such a method, an area which is the "sum" or "difference" of two rectangles is represented with a set of inscribed rectangles.

The layout space managing unit manages the layout space with any shape as a set of inscribed rectangles. When one "object" (rectangle) is commanded to be laid out at a particular position, the unit lays out the object, represents the remaining layout space as inscribed rectangles again, and manages them. When a commanded "object" cannot be laid out at the designated position, the unit informs a user of the result.

To do this, the layout space managing unit performs the following two types of basic calculations as internal functions.

(a) Calculation for "sum" of rectangles: The sum of areas of two rectangles (having any positional relation) is represented with a set of inscribed rectangles.

(b) Calculation for "difference" of rectangles: A rectangle is subtracted from another rectangle (having any positional relation therewith) and the remaining space is represented with a set of inscribed rectangles.

The layout space managing process is executed by a combination of such calculations. The two dimensional layout system having such a layout space managing unit has the fundamental structure as shown in FIG. 6.

In the two-dimensional layout system shown in FIG. 6, an appropriate priority rule for layout positions has been supplied to a two-dimensional layout unit (LM) 11. As a layout space in the initial state (initial space), a "container" is designated. The two-dimensional layout unit 11 supplies the "container" to a layout space managing unit (SM) 12. The layout space managing unit 12 stores the "container" as a set of inscribed rectangles. In this example, the two-dimensional layout unit 11 and the layout space managing unit 12 are disposed as separate units. However, it should be noted that the layout space managing unit 12 may be built into the two-dimensional layout unit 11.

"Objects" (rectangles) are successively input to the two-dimensional layout unit 11. Each "object" is designated with a width w and a height h. If necessary, each "object" has additional information such as the name, type, orientation, and front/rear. The two-dimensional layout unit 11 communicates with the layout space managing unit 12 and two-dimensionally lays out the designated "objects" in succession. In this case, the following three conditions should be satisfied.

(a) "Objects" should be laid out only within the "container."

(b) "Objects" that have been laid out should not be moved.

(c) "Objects" to be newly laid out should not overlap with "objects" that have been laid out.

When one "object" is input to the two-dimensional layout unit 11, it performs the following process. The two-dimensional layout unit 11 receives information of a blank space as a set of inscribed rectangles from the layout space managing unit 12. The two-dimensional layout unit 11 can select an inscribed rectangle with the first priority (for example, an inscribed rectangle at the furthest lower left position) according to the priority rule for layout positions.

Thereafter, the two-dimensional layout unit 11 orders the layout space managing unit 12 to lay out the "object" to the designated position (for example, the lower left corner) according to the priority rule for the layout positions. When the layout space managing unit 12 replies with a message that represents that the "object" cannot be laid out at the designated position, the two-dimensional layout unit 11 orders the layout space managing unit 12 to lay out the "object" at the inscribed rectangle with the second priority position, the third priority position, and so forth. After the layout space managing unit 12 has laid out the "object," it receives the next "object."

After all "objects" have been input and laid out, the two-dimensional layout unit 11 outputs the layout positions of the "objects" and the additional information thereof as the result. When one "object" is input and it cannot be successfully laid out in any of the set of inscribed rectangles, the layout of that "object" is unsuccessful.

In this case, the layout of the "objects" in this specific order was unsuccessful. The two-dimensional layout unit 11 outputs a message that represents that the layout was unsuccessful and completes the process. However, depending on a problem to be resolved, an "object" that has not been laid out may be skipped and the next "object" may be laid out.

Figure 7:
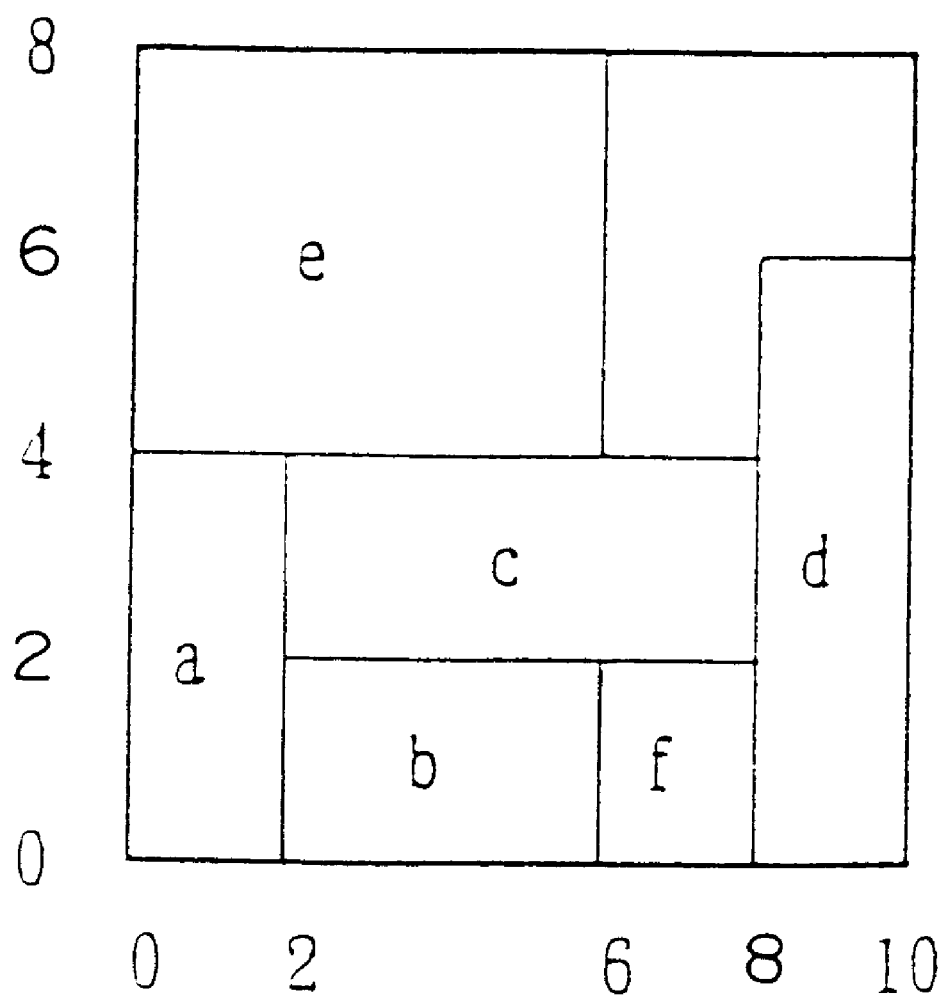
FIG. 7 is a schematic diagram showing the first layout example.

For clarifying the present method, the process of the two-dimensional layout system will be described with a simple example. FIG. 7 shows an example of the process of which "objects" a, b, c, d, e, and f have been successively laid out in a rectangular "container" with a width of 10 and a height of 8. The layout process is performed in the following order.

[0] Initial Setting

Figure 8:
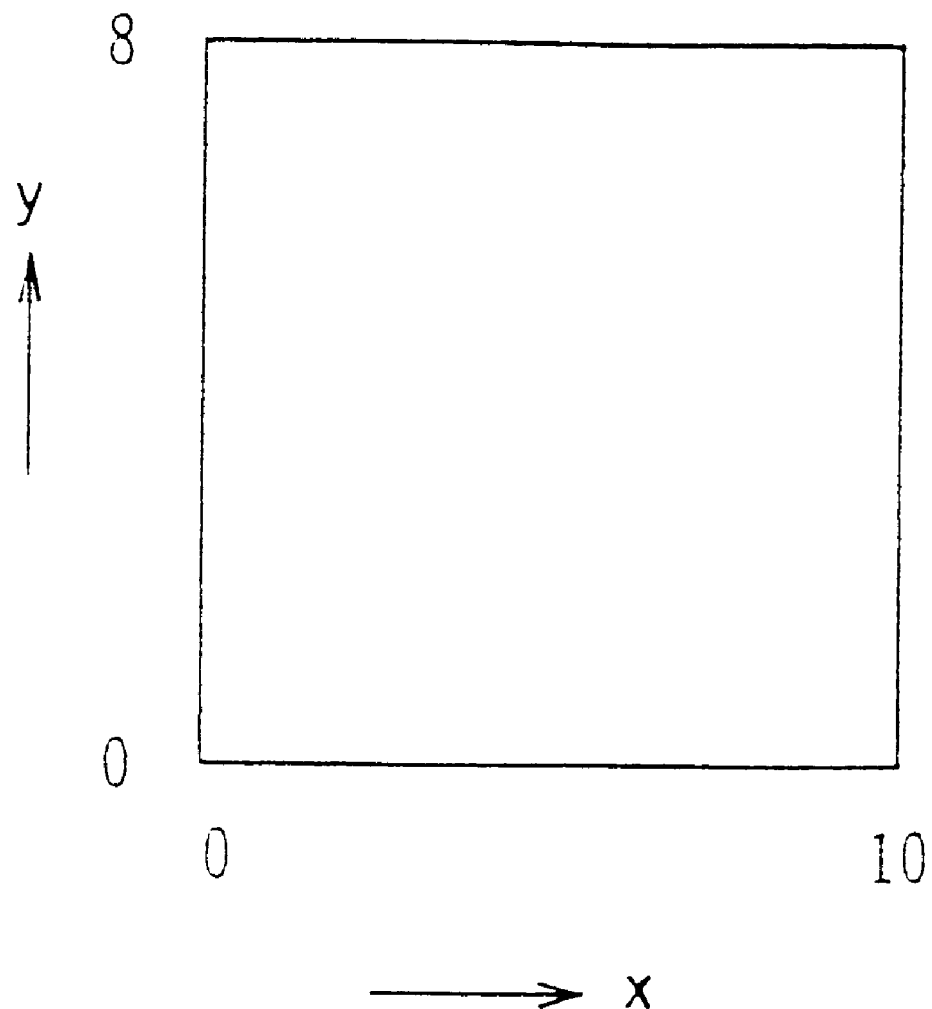
FIG. 8 is a schematic diagram showing an initial setting.

In this example, a layout priority rule provides that an "object" is laid out from the lowermost position and from the leftmost position on a specific horizontal line is used. In addition, as a "container," a rectangle ☐ (10, 8) shown in FIG. 8 is designated. At the initial stage in this case, a blank space in which an "object" can be laid out is represented by ☐ (10, 8).

Figure 9:
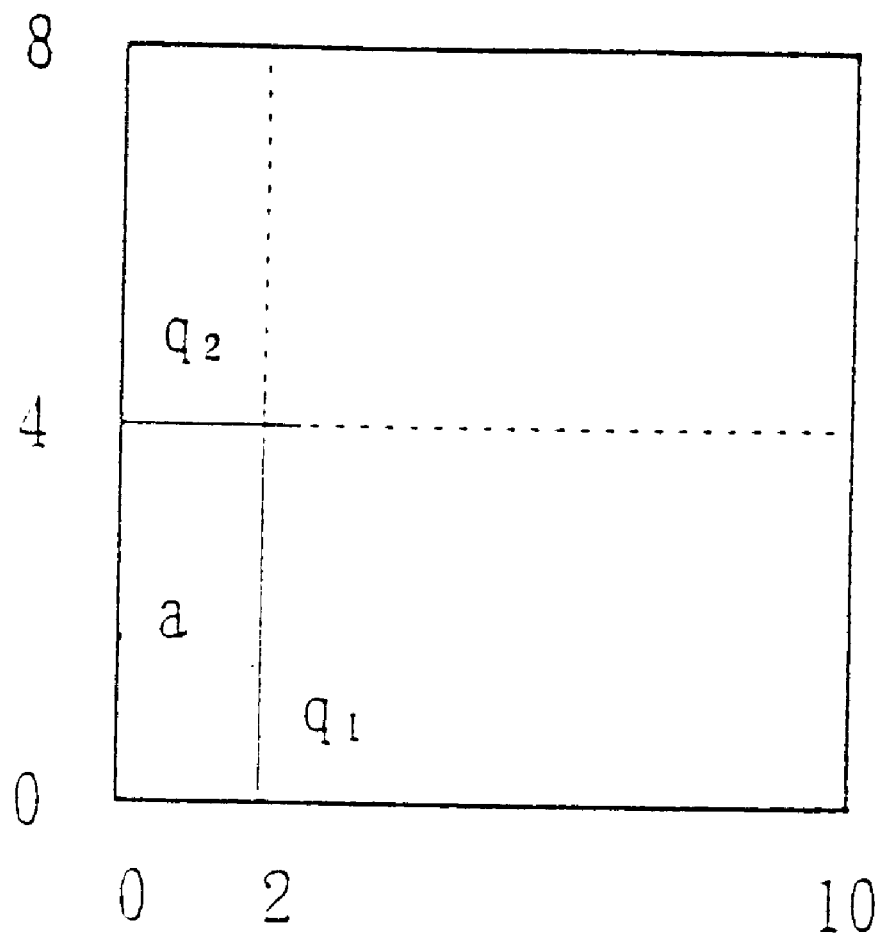
FIG. 9 is a schematic diagram showing the layout of the first object.

[1] A first "object" a■ (2, 4) is input. The first-priority candidate position for the layout is the lower left corner of the rectangle of the blank space. Thus, as shown in FIG. 9, the "object" a■ (2, 4) can be laid out at the lower left corner of the rectangle of the blank space. Thus, the first "object" a■ (2, 4) is laid out at the following position.

$$a\blacksquare((0,2), (0,4))$$

As a result, the set of inscribed rectangles of the remaining blank space are as follows in the priority order of the layout.

$$q_1 = \square\ ((2, 10), (0, 8))$$

$$q_2 = \square\ ((0, 10), (4, 8))$$

Figure 10:
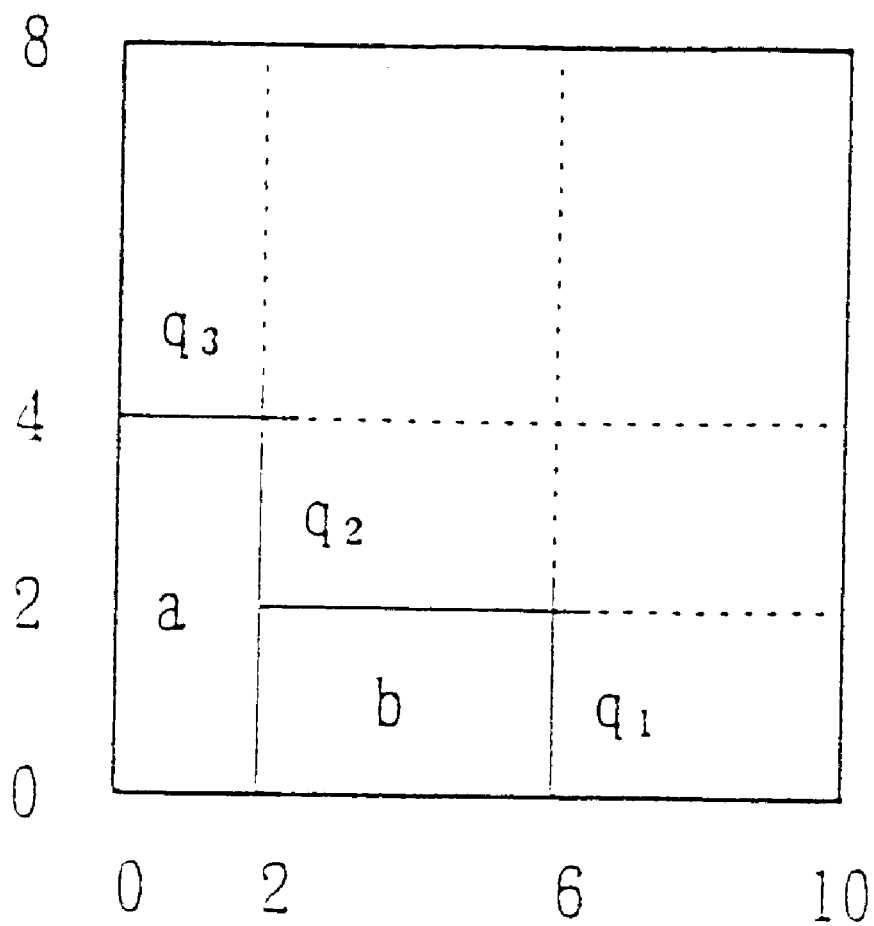
FIG. 10 is a schematic diagram showing the layout of the second object.

[2] A second "object" b■ (4, 2) is input. The lower left corner of the inscribed rectangle $q_1$ with the first priority is designated as the first-priority candidate position. As shown in FIG. 10, it is clear that the "object" b■ (4, 2) can be laid out at this position. Thus, the second "object" b■ (4, 2) is laid out at the following position.

$$b\blacksquare((2, 6), (0, 2))$$

As a result, the set of inscribed rectangles of the remaining blank space are as follows in the priority order of the layout.

$$q_1 = \square\ ((6, 10), (0, 8))$$

$$q_2 = \square\ ((2, 10), (2, 8))$$

$$q_3 = \square\ ((0, 10), (4, 8))$$

Figure 11:
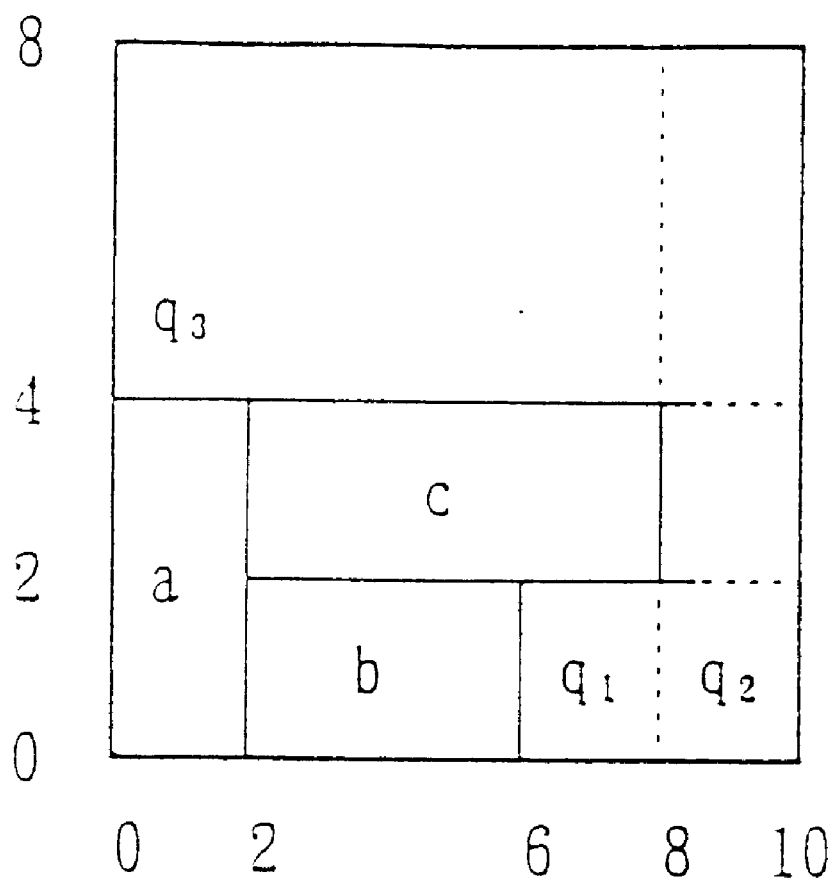
FIG. 11 is a schematic diagram showing the layout of the third object.

[3] A third "object" c■ (6, 2) is input. The lower left corner of the inscribed rectangle $q_1$ with the first priority is designed as the first-priority candidate position. However, the third "object" c■ (6, 2) cannot be laid out at the lower left corner of the inscribed rectangle $q_1$. Thus, the lower left corner of the inscribed rectangle $q_2$ with the second priority is designated as the next-priority candidate position. As shown in FIG. 11, it is clear that the third "object" c■ (6, 2) can be laid out at the lower left corner of the inscribed rectangle $q_2$ with the second priority. Thus, the third "object" c■ (6, 2) is laid out at the following position.

$$c\blacksquare((2, 8), (2, 4))$$

As a result, the set of inscribed rectangles of the remaining blank space are as follows in the priority order of the layout.

$$q_1 = \square\ ((6, 10), (0, 2))$$

$$q_2 = \square\ ((8, 10), (0, 8))$$

$$q_3 = \square\ ((0, 10), (4, 8))$$

Although the following steps of the layout process are not shown in figures, they can be performed in the same manner as the above-described steps.

[4] A fourth "object" d■ (2, 6) is input. The lower left corner of the inscribed rectangle $q_1$ with the first priority is designated as the first-priority candidate position. However, the fourth "object" d■ (2, 6) cannot be laid out at the lower left corner of $q_1$. Thus, the lower left corner of the inscribed rectangle $q_2$ with the second priority is designated as the next-priority candidate position. Thus, it is clear that the fourth "object" d■ (2, 6) can be laid out at the lower left corner of the inscribed rectangle $q_2$ with the second priority. Thus, the fourth "object" d■ (2, 6) is laid out at the following position.

$$d\blacksquare((8, 10), (0, 6))$$

As a result, the set of inscribed rectangles of the remaining blank space are as follows in the priority order of the layout.

$$q_1 = \square\ ((6, 8), (0, 2))$$

$$q_2 = \square\ ((0, 8), (4, 8))$$

$$q_3 = \square\ ((0, 10), (6, 8))$$

[5] A fifth "object" e■ (6, 4) is input. The lower left corner of the inscribed rectangle $q_1$ with the first priority is designated as the first-priority candidate position. However, the fifth "object" e■ (6, 4) cannot be laid out at the lower left corner of the inscribed rectangle $q_1$ with the first priority. Thus, the lower left corner of the inscribed rectangle $q_2$ with the second priority is designated as the next-priority candidate position. It is clear that the fifth "object" e■ (6, 4) can be laid out at the lower left corner of the inscribed rectangle $q_2$ with the second priority. Thus, the fifth "object" e■ (6, 4) is laid out at the following position.

$$e■((0, 6), (4, 8))$$

As a result, the set of inscribed rectangles of the blank space are as follows in the priority order of the layout.

$$q_1=□ ((6, 8), (0, 2))$$

$$q_2=□ ((6, 8), (4, 8))$$

$$q_3=□ ((6, 10), (6, 8))$$

[6] A sixth "object" f■ (2, 2) is input. The lower left corner of the inscribed rectangle $q_1$ with the first priority is designated as the first-priority candidate position. It is clear that the sixth "object" f■ (2, 2) can be laid out at the lower left corner of the inscribed rectangle $q_1$ with the first priority. Thus, the sixth "object" f■ (2, 2) is laid out at the following position.

$$f□ ((6, 8), (0, 2))$$

As a result, the set of inscribed rectangles of the remaining blank space are as follows in the priority order of the layout.

$$q_1=□ ((6, 8), (4, 8))$$

$$q_2=□ ((6, 10), (6, 8))$$

[7] After all the "objects" have been input, an ending process is performed. As a result, the following list of objects is output.

$$a■((0, 2), (0, 4)), b■((2, 6), (0, 2)),$$

$$c■((2, 8), (2, 4)), d■((8, 10), (0, 6)),$$

$$e■((0, 6), (4, 8)), f■((6, 8), (0, 2))$$

The set of the inscribed rectangles of the blank space becomes as follows.

$$\{□ ((6, 8), (4, 8)), □ ((6, 10), (6, 8))\}$$

In this example, it should be noted that the "object" f is laid out at the lower side position of the "container." In this case, it is assumed as a sub-rule of the layout rule that a new "object" can be laid out in a blank area even if it is surrounded with other "objects".

As described above, the layout space managing unit 12 can represent and manage a complicated shape with a combination of simple rectangles. Thus, with a command, the user can order the two-dimensional layout system to accomplish the following functions.

(a) With a plurality of rectangles having appropriate sizes and positions, a figure in a complicated shape represented by a combination of rectangles can be formed. The formed figure may be designated as a "container."

(b) A particular position of the "container" may be designated for a particular (at least one) "object" (rectangle). The "object" is laid out at the designated position with the highest priority. The remaining blank space is treated as the normal "container." The other "objects" are laid out in the blank space according to the normal priority rule.

The basic rule of the two-dimensional layout according to the embodiment is in that "objects" should be laid out as compactly as possible. Thus, it is necessary to lay out the "objects" in such a manner that there is no unnecessary blanks in the two-dimensional layout. However, depending on a problem, a blank area may be actively formed at a desired position. In this case, the following two methods are effective.

(a) An "occupied blank area" represented by a rectangle is treated as one "object." The "occupied blank area" is inserted into a suitable position in the object sequence and input to the two-dimensional layout unit 11.

Figure 12:
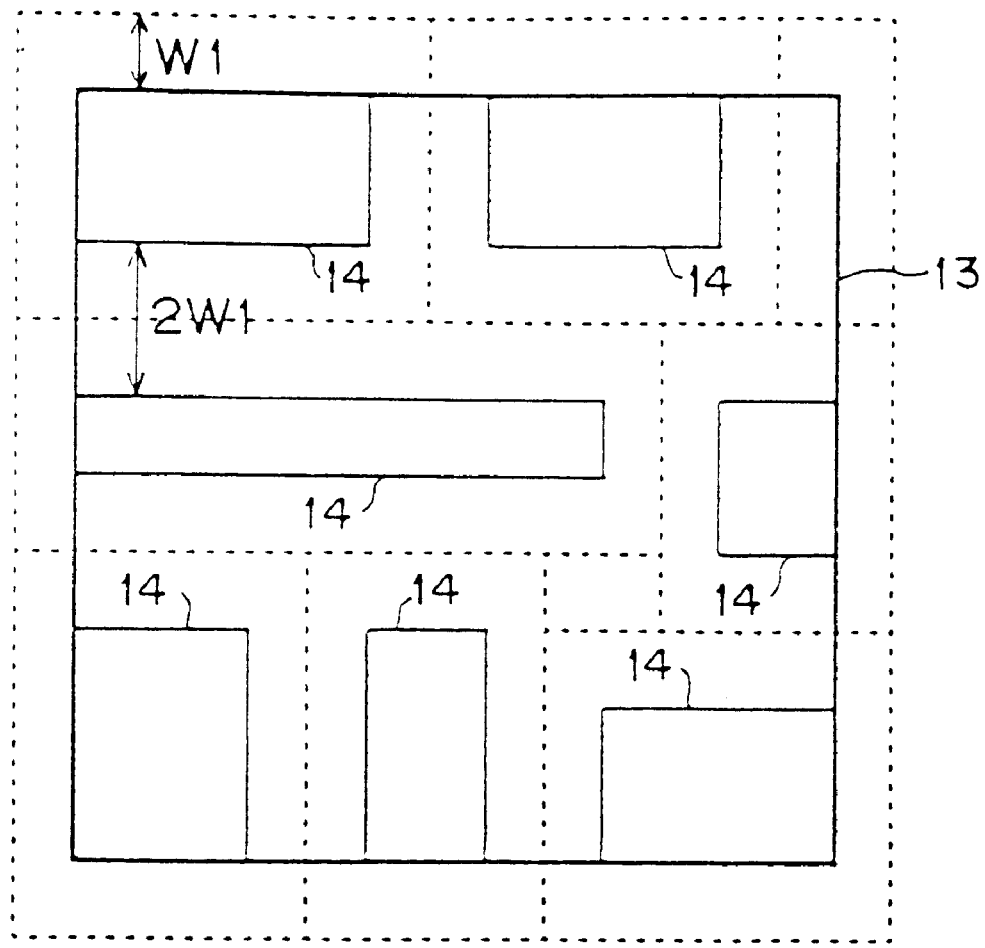
FIG. 12 is a schematic diagram showing an example of the layout in which an occupied blank area is laid out around objects.

(b) An occupied blank area with an appropriate width w1 is attached around a rectangle of an "object." The rectangle with the occupied blank area is input to the two-dimensional layout unit 11 or the layout space managing unit 12. In this case, as shown in FIG. 12, when an area with a width w1 is attached around a "container" 13, "objects" 14 are laid out properly in contact with the "container" 13. On the other hand, the "objects" 14 can be spaced with a blank area with a width of double w1. In the case of a layout problem of a printed circuit board and a VLSI, the occupied blank area can be used as a wiring area.

As a basic method for designating a priority rule for layout positions, a coordinate system of a two-dimensional layout is designated. Thereafter, "main direction" and "sub direction" that represent the directions of the priority of the layout on the coordinate system are designated as two directional vectors. Thus, "objects" are laid out according to the following rules.

(a) "Objects" are successively laid out at the position farthest in the direction that the "main direction" vector represents in the blank space.

(b) When there are a plurality of positions with the same priority order in the "main direction," they are successively laid out at the position farthest in the direction that the "sub direction" vector represents.

The "main direction" and the "sub direction" may be placed in parallel with the coordinate axes or angled thereto. In the following description, "main direction" and "sub direction" are represented as a pair in a form of "main direction/sub direction" such as "down first/left first." In a basic method of layout, while all "objects" are being laid out, these layout rules should not be changed.

As a method for designating a priority rule for layout positions, it can be more flexibly and sophisticatedly designated. From the fact that "objects" which are first laid out at four corners and outer peripheral sides can be compactly laid out, the priority rule can be designated in the following manner.

(a) The position with the smallest distance to the outer peripheral sides of the "container" or the sides of the circumscribed rectangle thereof, in the direction perpendicular to the sides, is treated as the priority layout position. When there are a plurality of positions with the same distance, they are laid out according to the predetermined priority order of corners and sides. The distance from the outer peripheries may be standardized with an appropriate ratio of vertical direction to horizontal direction, and the smallest standardized distance may be treated as the priority condition. In this case, the ratio of the vertical sides to the horizontal sides of the circumscribed rectangle of the "container" may be used.

(b) The "main direction/sub direction" as a priority rule for the layout positions is rotated by a predetermined angle whenever an "object" is laid out. As the rotation angle, 90 degrees (deg) or another appropriate angle may be used. Thus, "objects" can be laid out at four corners first and then positions close thereto.

In the two-dimensional layout system shown in FIG. 6, "container" and "priority rule for layout positions" have been designated. Thereafter, "objects" to be laid out are successively received. As a result, a two-dimensional layout is accomplished. In contrast, when one two-dimensional layout is received and "container" and "priority rule for layout positions" are designated, the order of the layout of "objects" can be analyzed by a reverse analyzing apparatus.

A result of the two-dimensional layout is given by the list of layout positions of "objects" and the list of the set of inscribed rectangles representing the blank space. The reversely analyzed result can include rectangles representing "occupied blank areas" along with "objects."

Figure 13:
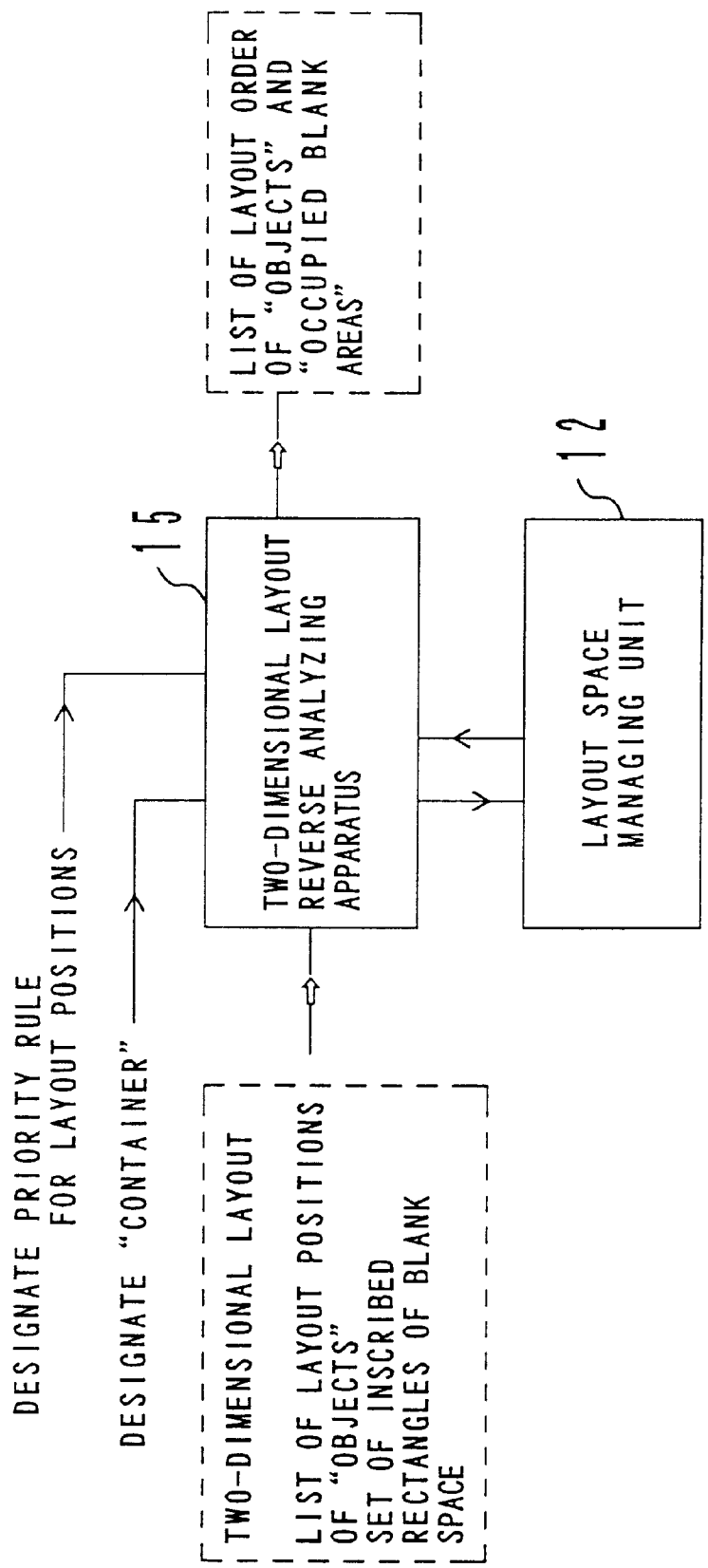
FIG. 13 is a schematic diagram showing a reverse analyzing apparatus.

When a reversely analyzed result is input to the two-dimensional layout unit 11 with the "priority rule for layout positions," it precisely restores the layout order of a two-dimensional layout to be analyzed. The input/output relation of the two-dimensional layout reverse analyzing apparatus is shown in FIG. 13.

The reverse analyzing apparatus 15 can be simply structured. Rectangles of "objects" and "blank spaces" that represent an input two-dimensional layout are successively extracted in the priority order represented by the designated "priority rule for layout positions." Since the "blank spaces" are represented with a set of inscribed rectangles, when one of them is extracted as an "occupied blank area," the set of inscribed rectangles of the remaining "blank space" should be re-calculated.

In the above-described reverse analyzing method, all inscribed rectangles of a "blank space" are extracted as "occupied blank areas." When "objects" are laid out according to the designated "priority rule of layout positions," some of "occupied blank areas" may be skipped, to obtain the same two-dimensional layout. They are not necessary to be represented as "occupied blank areas."

On the other hand, there is a case in that, when "occupied blank areas" are skipped and "objects" are laid out, a different two-dimensional layout may be formed. Thus, it is desired to correctly analyze whether or not "occupied blank areas" can be skipped. Consequently, it is desired that "occupied blank areas" are omitted so as to obtain a reversely analyzed result in which "occupied blank areas" are minimized.

With an approximately-reverse analysis (namely, by omitting the extraction of all "occupied blank areas,") a result in which only "objects" that have been laid out are re-arranged according to a designated "priority rule for layout positions" can be obtained. When the result of a two-dimensional layout according to a particular priority rule A is approximately-reversely analyzed according to the same priority rule A and then the resultant objects are laid out again according to the priority rule A, the original two-dimensional layout may not be obtained.

Likewise, when the result of a two-dimensional layout according to a different priority rule B is approximately-reversely analyzed according to the layout rule A and then the result is laid out again according to the priority rule A, a different two-dimensional layout result may be obtained. When the approximately-reverse analysis is used, the original two-dimensional layout is approximately restored. However, the original two-dimensional layout is not always correctly restored.

When the above-described two-dimensional layout system is used, various two-dimensional layouts can be accomplished. Thus, the function for evaluating the obtained two-dimensional layouts and selecting the excellent one becomes important.

The evaluation of a two-dimensional layout largely depends on the problem and objective. To evaluate a two-dimensional layout, various additional information is sometimes required along with information of layout positions. In addition, there are cases in which one evaluation value is required while other cases in which a plurality of evaluation values are required. The evaluating unit and the selecting unit according to the embodiment have the structure as shown in FIG. 14.

In FIG. 14, the result of a two-dimensional layout obtained by the two-dimensional layout system shown in FIG. 6, additional information such as the name, type, orientation, and front/rear of each of "objects," and the related information such as the relation of connections of "objects", are input to a two-dimensional layout evaluating unit 16. The evaluating unit 16 evaluates the two-dimensional layout with the obtained information according to a designated evaluating method and outputs an evaluation value (evaluation vector).

At this point, the layout result is evaluated based on the layout information such as the entire size of the layout result, the layout position of a particular object, the relative layout positions of two or more particular objects, the distribution of the layout of objects, and the layout of the blank space between objects. The selecting unit 17 selects an excellent two-dimensional layout based on the evaluated values of a plurality of two-dimensional layouts according to the given selection standard.

When the two-dimensional layout system shown in FIG. 6 is repeatedly used or when a plurality of two-dimensional layout systems are used in parallel, a plurality of two-dimensional layouts are obtained. In addition, with the evaluating unit 16 and the selecting unit 17 shown in FIG. 14, the following functions can be accomplished.

(a) When "objects" to be laid out, a "container" thereof, and the order of the layout of "objects" are designated, a two-dimensional layout is simulated according to a plurality of "priority rules for layout positions." These results are evaluated and an excellent two-dimensional layout is selected therefrom.

(b) When "objects" to be laid out, a "container" thereof, and a "priority rule for layout positions," are designated, a two-dimensional layout is simulated using a plurality of layout orders. The obtained results are evaluated and an excellent two-dimensional layout is selected therefrom.

(c) When "objects" to be laid out, a "priority rule for layout positions," and a layout order are designated, a two-dimensional layout is simulated using a plurality of "containers." The obtained results are evaluated and an excellent two-dimensional layout is selected therefrom.

(d) When "objects" to be laid out (including extra "objects"), a "container" thereof, and "a priority rule for layout positions" are designated, a two-dimensional layout is simulated using a plurality of layout orders. The obtained results are evaluated and an excellent two-dimensional layout is selected therefrom. In this case, the simulation is performed in such a manner that some of the "objects" may not be laid out and left as extra "objects."

(e) In a combination of the functions (a), (b), (c), and (d), various two-dimensional layouts are simulated. The obtained results are evaluated and an excellent two-dimensional layout is selected therefrom.

In such a manner, various conditions are varied. A two-dimensional layout is simulated in a plurality of conditions. The obtained results are evaluated and an excellent two-dimensional layout can be selected therefrom. As one method for automatically simulating a two-dimensional layout and selecting an excellent two-dimensional layout and for obtaining the optimum or semi-optimum result, the simulated annealing method is known. The simulated annealing method can be used for optimizing a two-dimensional layout in the following manner.

As a basic structure, it is assumed that a "container" has been designated, and the order of the layout of "objects" is selected as a space to be searched. An appropriate rule as the "priority rule for layout positions" may be set to the two-dimensional layout system shown in FIG. 6. Alternatively, a plurality of rules may be set to the two-dimensional layout system with the evaluating and selecting functions as shown in FIG. 14. In the latter, the optimum "priority rule for layout positions" is automatically searched for and selected.

The search space of the layout order of "objects" is treated as a parameter by generating permutations of designated N "objects." In the searching process according to the simulated annealing method, a basic converting operation for an order represented as the parameter is selected, a random conversion is repeated so as to vary the parameter, thereby the search space is searched. As the converting operation, one of the following two types can be appropriately selected.

(a) The order positions of "objects" are exchanged between an order position i that is randomly selected and the next order position (i+1). In other words, the order positions of any two successive objects one of which is designated at random are exchanged.

(b) The order positions of "objects" are exchanged between two order positions i and j that are randomly selected. In other words, the order positions of any two objects that are randomly selected are exchanged.

As an objective function of the simulated annealing method, an appropriate evaluation function represented by the compactness of a two-dimensional layout, the mutual relation of the layout of "objects, "the relation of the connections thereof, or the like is used.

In the above-described designation, "objects" are laid out only in the designated orientation. However, to vary "orientations" of "objects" and obtain the optimum two-dimensional layout, the orientations of the individual "objects" are included in the search space along with the layout order of the "objects." For example, when there are terminals for wiring around cells to be laid out, the orientations of the cells become important to design lines connected thereto.

Figure 15:
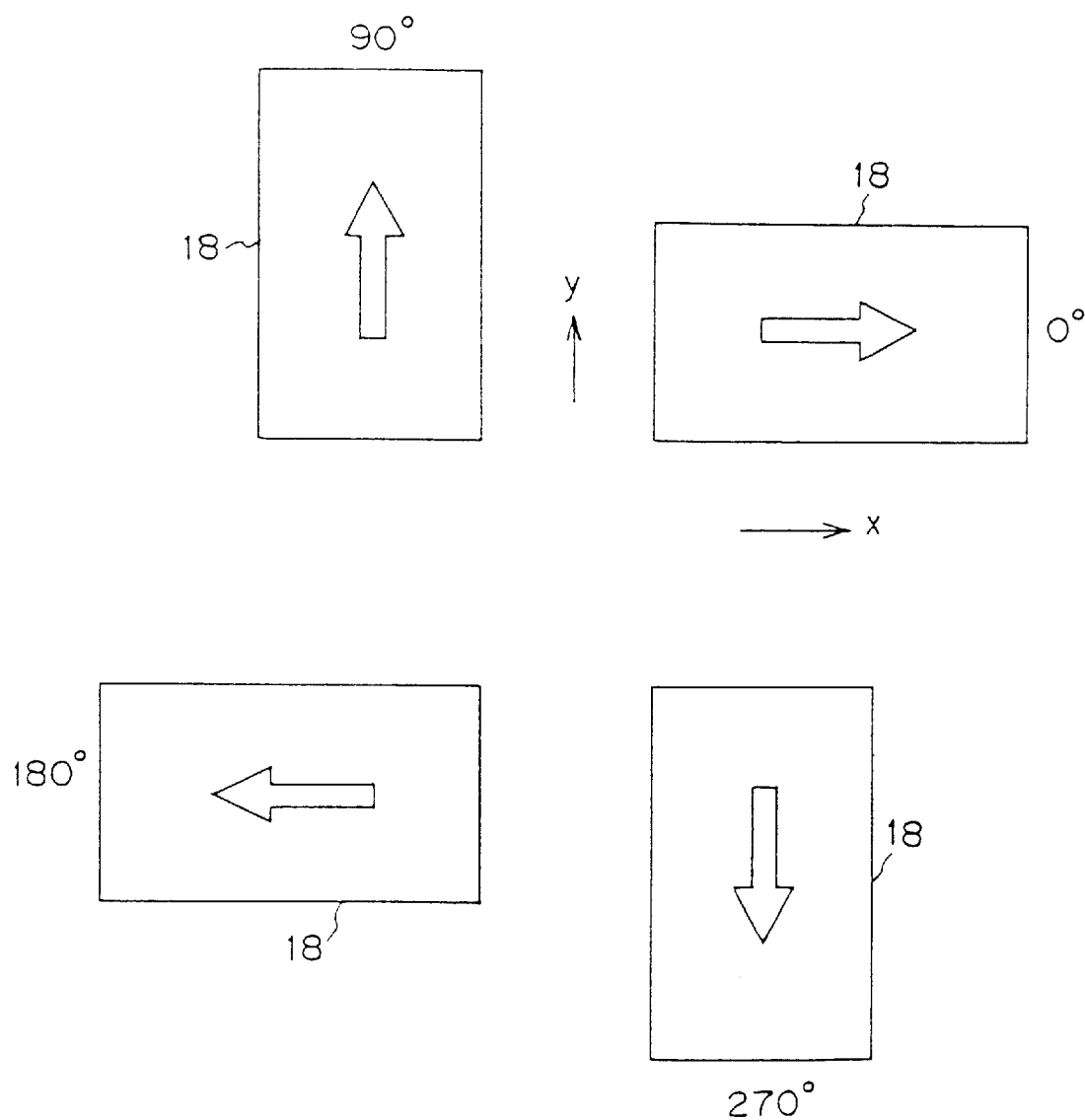
FIG. 15 is a schematic diagram showing four orientations.

As orientations of "objects", for example, rotating angles (0 deg, 90 deg, 180 deg, and 270 deg) corresponding to four positions of an object 18 shown in FIG. 15 and the front/rear face thereof are considered. The orientations of the "objects" are represented with bit data such as a vertical/horizontal bit, a 180 deg rotation bit, and a front/rear face bit. With such bit data, the converting operation is selected at random.

In the simulated annealing method, any condition such as a priority rule for layout positions and a change of orientation of each object is included in the search space so as to search an optimum state.

In a two-dimensional layout problem, even if the same priority rule for layout positions is used, different layout orders may result in the same two-dimensional layout. Thus, the search space for optimizing a two-dimensional layout becomes complicated. To alleviate this problem, the two-dimensional layout reverse analyzing apparatus 15 as shown in FIG. 13 can be used.

Assume that a two-dimensional layout is simulated in a particular layout order according to the simulated annealing method and thereby a two-dimensional layout with a relatively high evaluation value is obtained.

At this point, the two-dimensional layout reverse analyzing apparatus 15 performs a reverse analyzing process or an approximately reverse analyzing process for a two-dimensional layout. Thus, a layout order in which the two-dimensional layout is most smoothly accomplished according to the predetermined standard priority rule can be obtained. By substituting the layout order as a standard layout order with a coordinate representation (a parameter representation) in the search space, the two-dimensional layout can be searched according to the standard priority rule. Such a substitution corresponds to a process for normalizing the parameter representation.

For automatically optimizing a two-dimensional layout through simulations and selections, another general optimization method that is a genetic algorithm (GA) that represents a search space in a genetic representation can be applied. In the genetic algorithm, it is important to consider how genes are structured, how they are converted into a particular space, and how they are evaluated. In the case of a two-dimensional layout problem, with the genetic algorithm, the optimization problem can be formalized in the following manner.

In the basic structure, it is assumed that a "container" has been designated. The layout order of "objects" is represented as gene data and an optimum layout order is searched for. In the searching process, a gene group including a plurality of genes is selected and screened through a genetic operation so as to obtain an excellent two dimensional layout.

With respect to "a priority rule for layout positions," an appropriate rule may be set to the two-dimensional layout system shown in FIG. 6. Alternatively, a plurality of rules may be set to the two-dimensional layout system with the evaluating and selecting functions as shown in FIG. 14. In the latter, the optimum "priority rule for layout positions" is automatically searched for.

As a genetic operation of the genetic algorithm, one of the following operations can be effectively selected.

(a) The order positions of "objects" are exchanged between an order position i that is randomly selected in a gene and the next order position (i+1) (mutation).

(b) The order positions of "objects" are exchanged between order positions i and j that are selected at random in a gene (mutation).

(c) One order position i is selected at random in a gene. A portion from the order position i to the last order position M is moved as a block to the top of the gene. In other words, "selective circulating operation" is performed (a large scale mutation).

(d) One order position i in appropriately selected two genes A and B is selected at random. Two genes are intersected at the order position i so as to obtain the following child genes A' and B'.

A': Order positions 1 to (i−1) of A' are the same as those of A. Order positions i to M of "objects" that are not present in the order positions 1 to (i−1) are arranged in the order of occurrences in B.

B': Order positions 1 to (i−1) of B' are the same as those of B. Order positions i to M of "objects" that are not present in the order positions 1 to (i−1) are arranged in the order of occurrences in A.

(e) One order position i in appropriately selected two genes A and B is selected at random. Two genes are intersected at the order position i so as to obtain the following child genes A' and B'.

A': Order positions i to M of A' are the same as those of A. Order positions 1 to (i−1) of "objects" that are not present in the order position i and later are arranged in the order of occurrences in B.

B': Order positions i to M of B' are the same as those of B. Order positions 1 to (i−1) of "objects" that are not present in the order position i and later are arranged in the order of occurrences in A.

As an objective function of a genetic algorithm, as with the simulated annealing method, an appropriate evaluation function represented with, for example, the compactness of a two-dimensional layout, the mutual relation of the layout of "objects," or the connection relation, is used.

The generation of a gene group in a genetic algorithm, the selection of a gene group, and the preservation of an excellent gene can be performed in conventional manners. As with the simulated annealing method, along with the order of "objects," any condition such as the priority rule for layout positions and a change of the orientation of each "object" can be included in the search space so as to designate an operation of a mutation at random.

In addition, to simplify a search space for optimization, as with the simulated annealing method, the two-dimensional layout reverse analyzing apparatus can be used. For example, assume that with the genetic algorithm, a two-dimensional layout process is executed in a predetermined layout order and thereby a two-dimensional layout result is obtained. When a plurality of priority rules for layout positions are used, a two-dimensional layout with the best evaluated result is employed.

Next, the two-dimensional layout reverse analyzing apparatus 15 performs a reverse analyzing process or an approximately reverse analyzing process for the obtained two-dimensional layout. Thus, a layout order in which the two-dimensional layout is most smoothly accomplished according to the predetermined standard priority rule is obtained. The obtained layout order is substituted as a standard layout order with a genetic representation of the current generation so as to search the two-dimensional layout according to the standard priority rule. Such a substitution corresponds to the normalizing process of the genetic representation.

Figure 16:
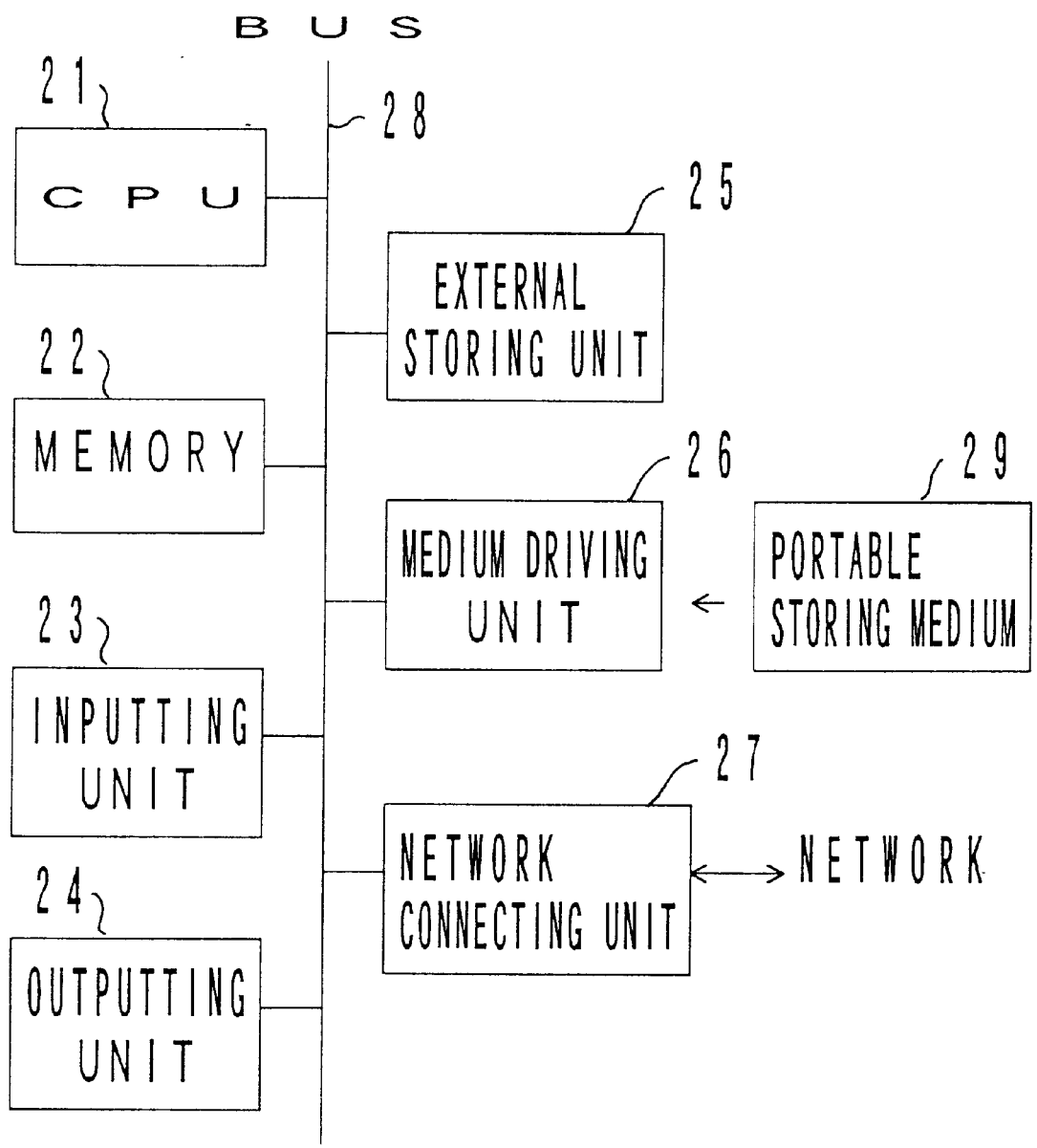
FIG. 16 is a block diagram showing the structure of an information processing apparatus.

Next, the structure of a two-dimensional layout system accomplished by a computer will be described. FIG. 16 is a block diagram showing the structure of an information processing apparatus that realizes the two-dimensional layout system. The information processing apparatus shown in FIG. 16 comprises a CPU (Central Processing Unit) 21, a memory 22, an inputting unit 23, an outputting unit 24, an external storing unit 25, a medium driving unit 26, and a network connecting unit 27 that are connected together by a bus 28.

The CPU 21 executes a program stored in the memory 22 so as to perform processes of the two-dimensional layout unit 11, the layout space managing unit 12, the reverse analyzing apparatus 15, the evaluating unit 16, and the selecting unit 17. The memory 22 is, for example, composed of a ROM (Read Only Memory) and a RAM (Random Access Memory).

The inputting unit 23 is equivalent to, for example, a keyboard, a pointing device, and so forth. With the inputting device 23, the user inputs commands to the system. The outputting unit 24 is equivalent to, for example, a display unit, a printer, and so forth. With the outputting unit 24, the system prompts the user to input commands and outputs processed results to the user.

The external storing unit 25 is, for example, a magnetic disk unit, an optical disc unit, a magnetooptical disc unit, or the like. The external storing unit 25 stores programs and data. In addition, the external storing unit 25 is used as a database for storing priority rules for layout positions, information of "containers," information of "objects," layout orders, evaluating methods, and so forth. The medium driving unit 26 drives the portable storing medium 29 and accesses the contents stored thereon. The portable storing medium 29 is, for example, a memory card, a floppy disk, a CD-ROM (Compact Disk Read Only Memory), an optical disc, a magneto-optical disc, or the like, from which the computer can read data. The portable storing medium 29 stores data used for the processes of the two-dimensional layout system, and programs for executing the processes.

The network connecting unit 27 is connected to any communication network such as a LAN (Local Area Network). The network connecting unit 27 converts data for communication. The two-dimensional layout system can receive data and programs from an external database or the like through the network connecting unit 27.

Next, with reference to FIGS. 17 to 23, the space management method of the layout space managing unit 12 shown in FIG. 6 will be described in detail.

In the space management method using a set of inscribed rectangles, calculations for "sum" and "difference" of two rectangles act as basic roles thereof. The calculation for "sum" of two rectangles is accomplished in the following manner.

Input: Rectangles a□ (($x_0^a, x_1^a$), ($y_0^a, y_1^a$)) and b□ (($x_0^b, x_1^b$), ($y_0^b, y_1^b$))

Figure 17:
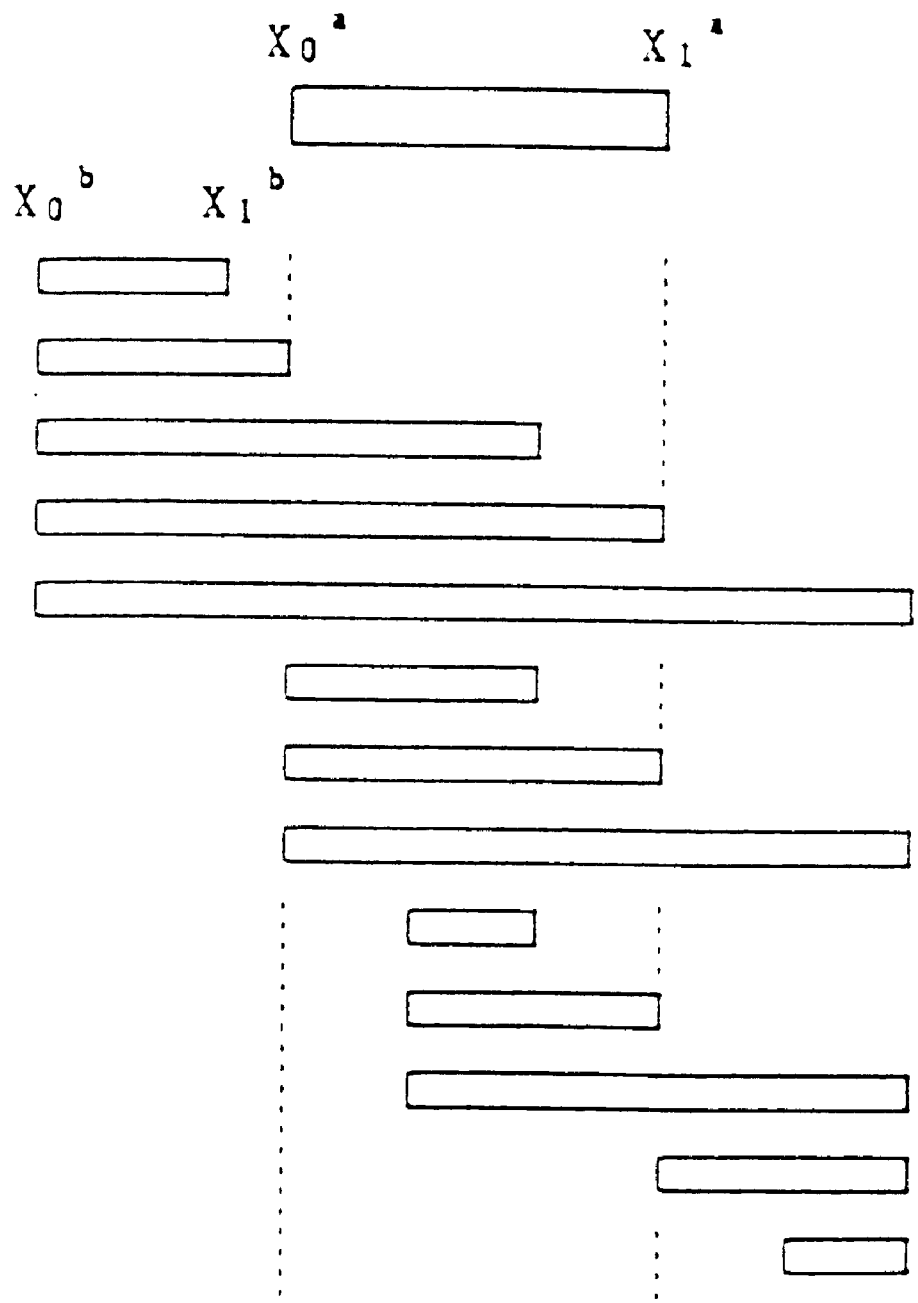
FIG. 17 is a schematic diagram showing relative positions of two rectangles.

Output: A set of inscribed rectangles of a space a□ ∪b□ of the "sum" of rectangles a and b Process: In this case, the inscribed rectangles are represented as follows.

$$<ijkl>=Q\square((x_0^i, x_1^j)\ (y_0^k, y_1^l))$$

where i, j, k, and l represent a or b. The values of i, j, k, and l depend on the relative positions of the two rectangles. For example, the relative positions of the two rectangles with respect to the horizontal coordinate (x coordinate) are categorized into the 13 cases as shown in FIG. 17. Likewise, the relative positions of the rectangles with respect to the vertical coordinate (y coordinate) are categorized into 13 cases. Thus, when a calculation table for 13×13 cases is formed, the calculated result for the "sum" can be represented.

Figure 18:
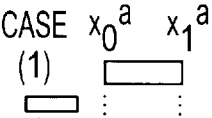
FIG. 18 is a calculation table for the sum of rectangles (No. 1)
Figure 19:
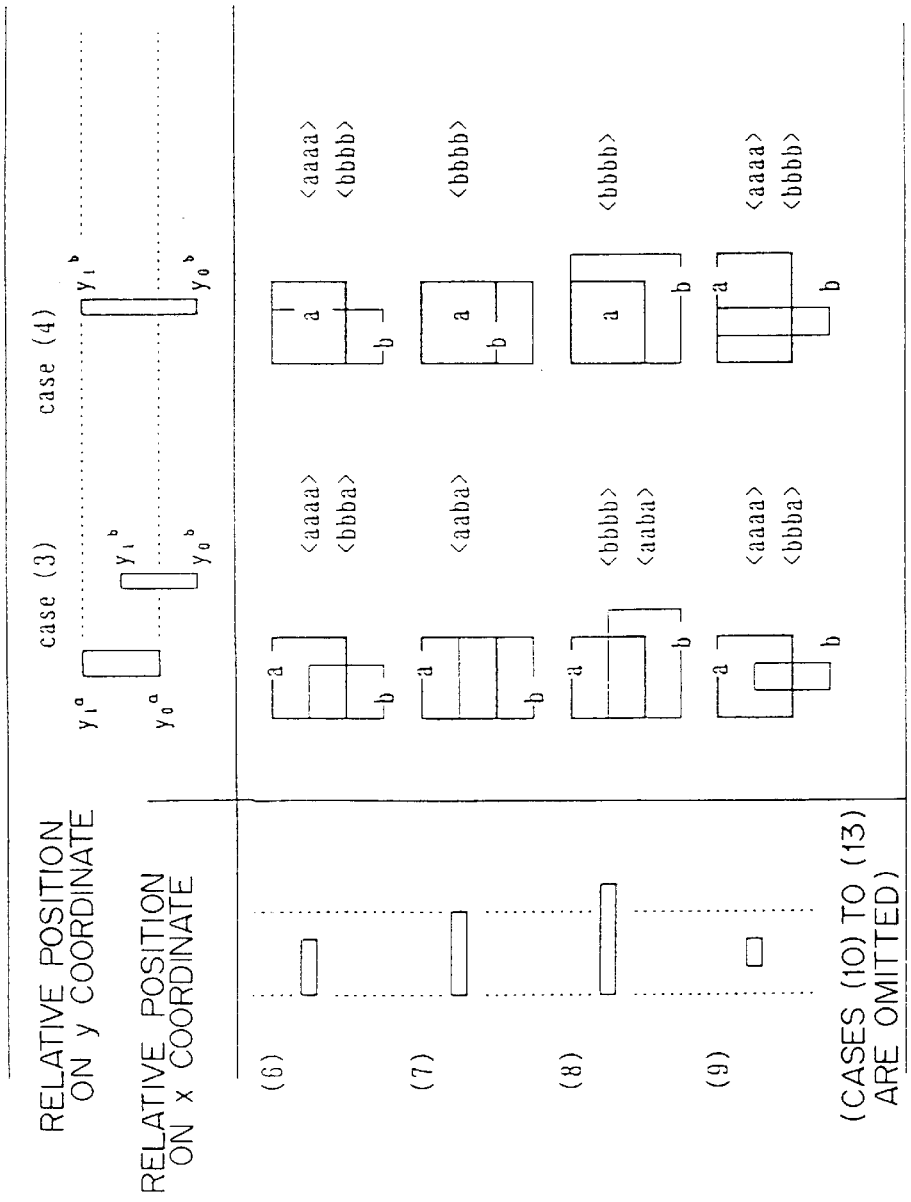
FIG. 19 is a calculation table for the sum of rectangles (No. 2)

FIGS. 18 and 19 show part of such a calculation table for "sum". For example, as shown in FIG. 18, when the relative positions of the rectangles a and b on the x coordinate have the relation of case (1) and the relative positions of the rectangles a and b on the y coordinate have the relation of case (3), a set of inscribed rectangles of the "sum" are composed of the rectangles a and b. In other words, an inscribed rectangle of which <ijkl>=<aaaa> and an inscribed rectangle of which <ijkl>=<bbbb> become elements of a set of inscribed rectangles of the "sum."

On the other hand, when the relative positions of rectangles a and b on the x coordinate have the relation of case (3) and the relative positions of the rectangles a and b on the y coordinate have the relation of case (3), a set of inscribed rectangles of the "sum" are composed of four inscribed rectangles <ijkl>=<aaaa>, <bbbb>, <baab>, <abba>. This tabular method applies to the representation of the calculated results of other cases.

Figure 20:
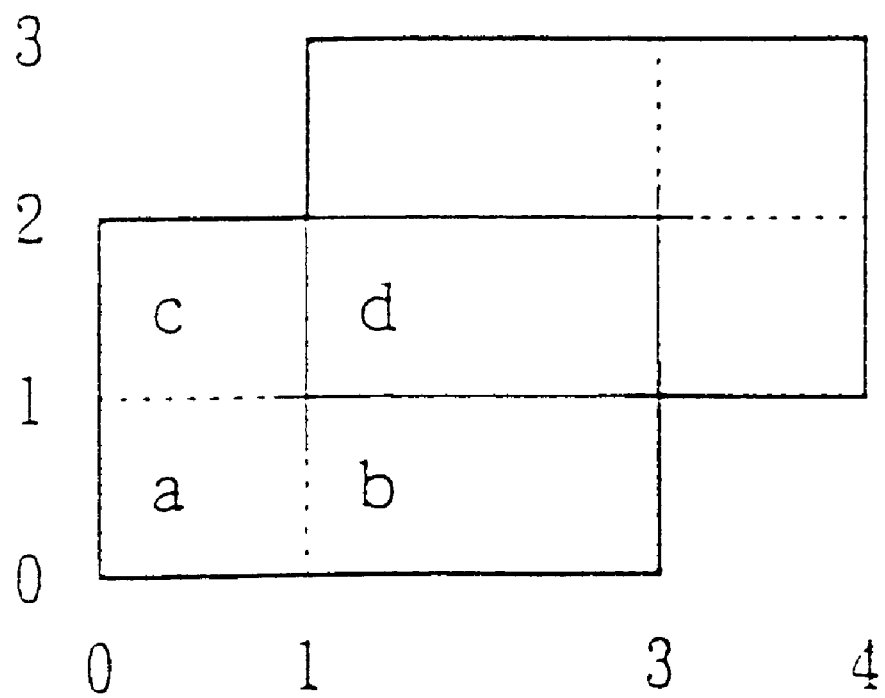
FIG. 20 is a schematic diagram showing the first example of the sum of rectangles.

In the case of two rectangles shown in FIG. 20, the "sum" can be calculated as follows.

$$Q_1 \square ((0, 3), (0, 2)) \cup Q_2 \square ((1, 4),$$

$$\rightarrow a \square ((0, 3), (0, 2)) \cup b \square ((1, 3), (0, 3)) \cup$$

$$c \square ((0, 4), (1, 2)) \cup d \square ((1, 4), (1, 3))$$

The "difference" of the two rectangles can be calculated as follows.

Input: Rectangles a$\square$ (($x_0^a$, $x_1^a$), ($y_0^a$, $y_1^a$)) and b$\square$ ($x_0^b$, $x_1^b$), ($y_0^b$, $y_1^b$))

Output: A set of inscribed rectangles of a space a$\square$–b$\square$ in which the rectangle b is subtracted from the rectangle a Process: In this case, the inscribed rectangles are represented as follows.

$$<ijkl> = Q\square((x_s^i, x_t^j), (y_u^k, y_v^l))$$

where superscripts i, j, k, and 1 represent a or b; and subscripts s, t, u, and v represent 0 or 1. When the superscript of an element is a, the corresponding subscript represents the normal value at the position of that element. When the superscript of an element is b, the corresponding subscript represents the reverse value at the position of that element.

As with the calculation for "sum," the values of i, j , k, and 1 depend on the relative positions of the two rectangles. For example, the relative positions of the two rectangles on the horizontal coordinate (x coordinate) have 13 cases as shown in FIG. 17. Likewise, the relative positions of the two rectangles on the vertical coordinate (y coordinate) have 13 cases. Thus, when a calculation table for 13×13 cases are formed, the calculated result for the "difference" can be represented.

Figure 21:
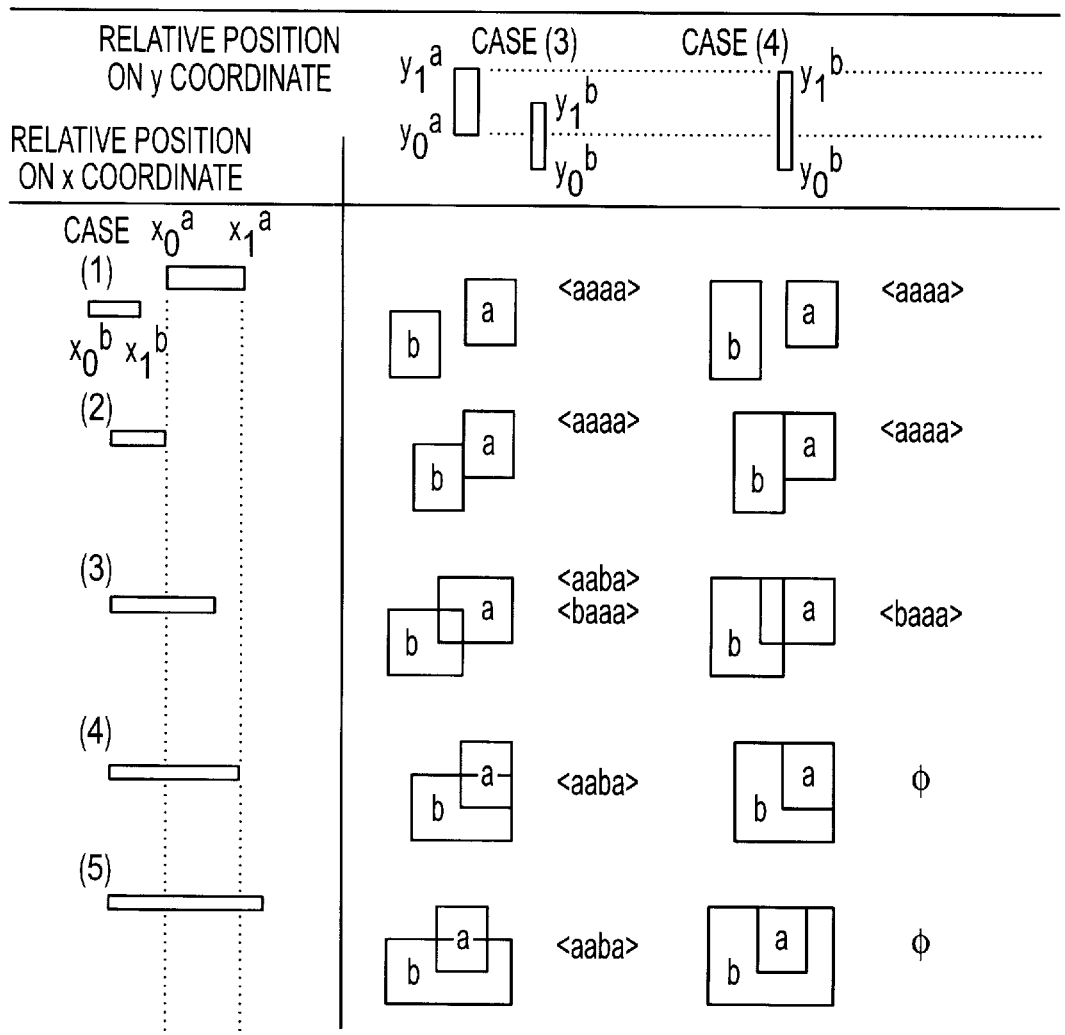
FIG. 21 is a calculation table for the difference of rectangles (No. 1)
Figure 22:
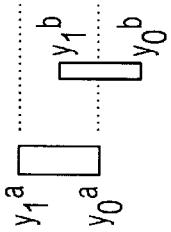
FIG. 22 is a calculation table for the difference of rectangles (No. 2)

FIGS. 21 and 22 show part of such a calculation table for "difference." For example, in FIG. 21, when the relative positions of the rectangles a and b on the x coordinate have the relation of case (1) and the relative positions of the rectangles a and b on the y coordinate have the relation of case (3), a set of inscribed rectangles of the result in which the rectangle b is subtracted from the rectangle a, is the rectangle a itself. In other words, only the inscribed rectangle <ijkl>=<aaaa> becomes an element of the set of the inscribed rectangles of the "difference."

On the other hand, when the relative positions of the rectangles a and b on the x coordinate have the relation of case (3) and the relative positions of the rectangles a and b on the y coordinate have the relation of case (3), a set of inscribed rectangles of the "difference" thereof are composed of two inscribed rectangles <ijkl >=<aaba>, <baaa>. This tabular method applies to the representation of the calculated results of the other cases.

Figure 23:
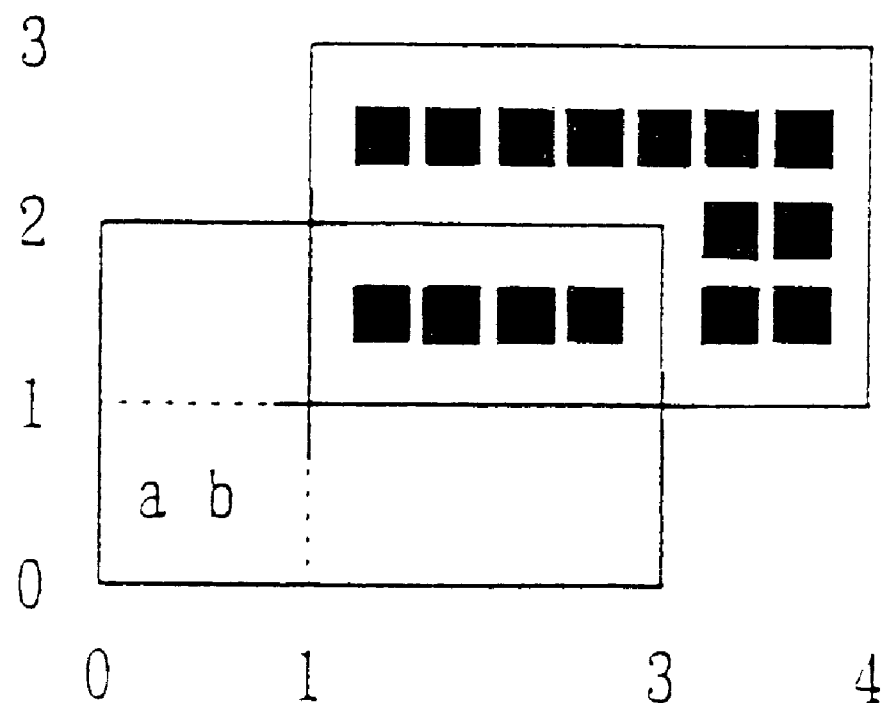
FIG. 23 is a schematic diagram showing an example of the difference of rectangles.

In the case of two rectangles shown in FIG. 23, the "difference" can be calculated as follows.

$$S_1 \square ((0, 3), (0, 2)) - S_2 \blacksquare ((1, 4), (1, 3))$$

$$\rightarrow a \square ((0, 3), (0, 1)) \cup b \square ((0, 1), (0, 2))$$

Next, with reference to FIGS. 24 to 46, a space management method will be described, the space being represented with a composite figure.

With calculations for "sum" and "difference" of rectangles, a rectangle with any size can be added at any position of one or more closed figures represented by vertical sides and horizontal sides. In addition, a rectangle with any size can be subtracted from any position of the closed figures. Thus, one or more closed figures can be composed of several rectangles, and represented as a set of inscribed rectangles so as to dynamically manage them.

Next, with reference to simple and then complicated examples, the calculating method and the managing method of the space managing unit 12 shown in FIG. 6 will be described. In the process of the calculations, it is necessary to carefully manage whether or not many rectangles appearing as intermediate data affect other rectangles. To do that, a special data structure is used. The data structure and the method thereof will be described later when necessary.

Basically, each intermediate rectangle is categorized as two levels. The first level (hereinafter, denoted by a prefix #) represents a rectangle included in a set of inscribed rectangles in the preceding stage or a rectangle listed as a candidate of a current set of inscribed rectangles.

The second level (hereinafter, denoted by an indentation and a prefix @) is a rectangle newly formed as the result of a calculation for "sum" or "difference." When a rectangle in the second level satisfies a predetermined condition with respect to a relation to another rectangle (interaction), the rectangle in the second level can be raised to the first level. When one rectangle is added to a set of inscribed rectangles or one rectangle is subtracted from a set of inscribed rectangles, the influence of the addition (subtraction) of the rectangle against all the inscribed rectangles should be considered.

Figure 24:
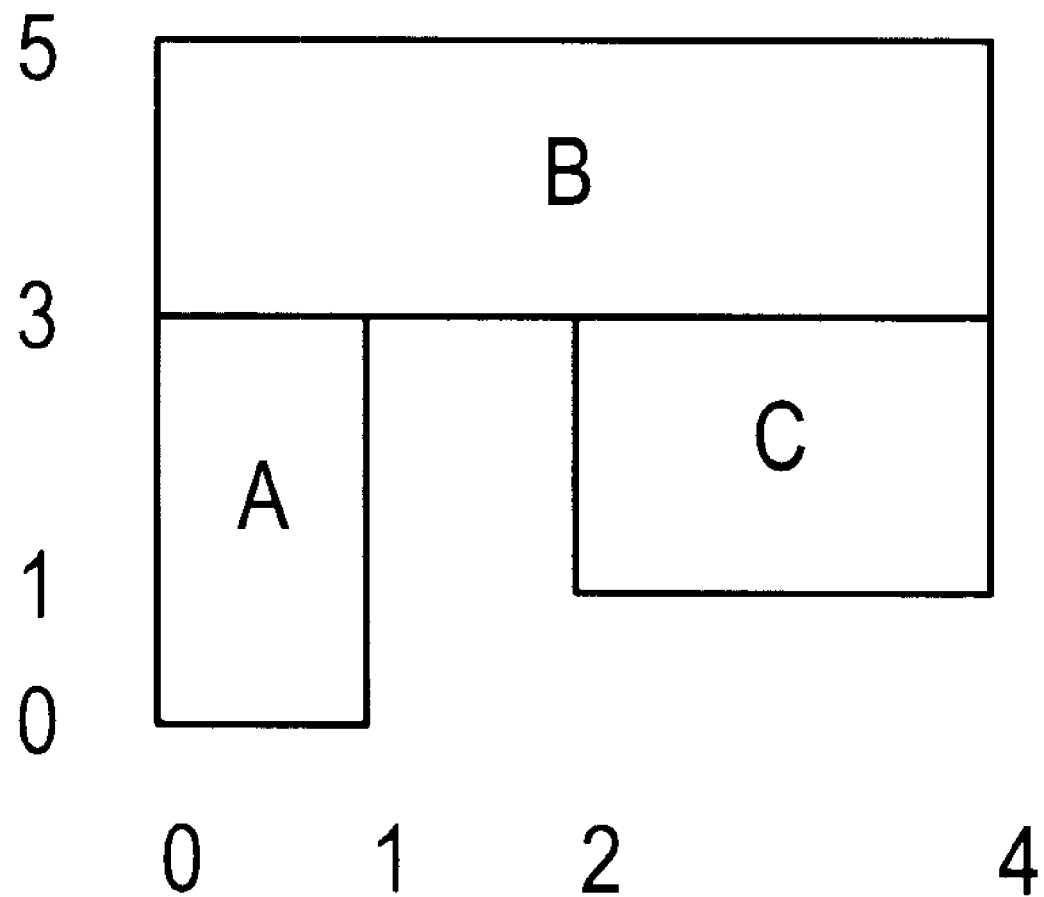
FIG. 24 is a schematic diagram showing the second example of the sum of rectangles.

For example, in the case of a figure having a concaved portion as shown in FIG. 24, the figure can be composed of three rectangles A, B, and C and thereby a set of inscribed rectangles thereof can be obtained. In this case, the rectangles A, B, and C can be represented as follows.

$$A\square((0, 1), (0, 3))$$

$$B\square((0, 4), (3, 5))$$

$$C\square((2, 4), (1, 3))$$

Assuming that the first rectangle A forms a set of inscribed rectangles, an area S1 thereof is represented as follows.

$$S^1 = [\#A\square((0, 1), (0, 3))]$$

Figure 25:
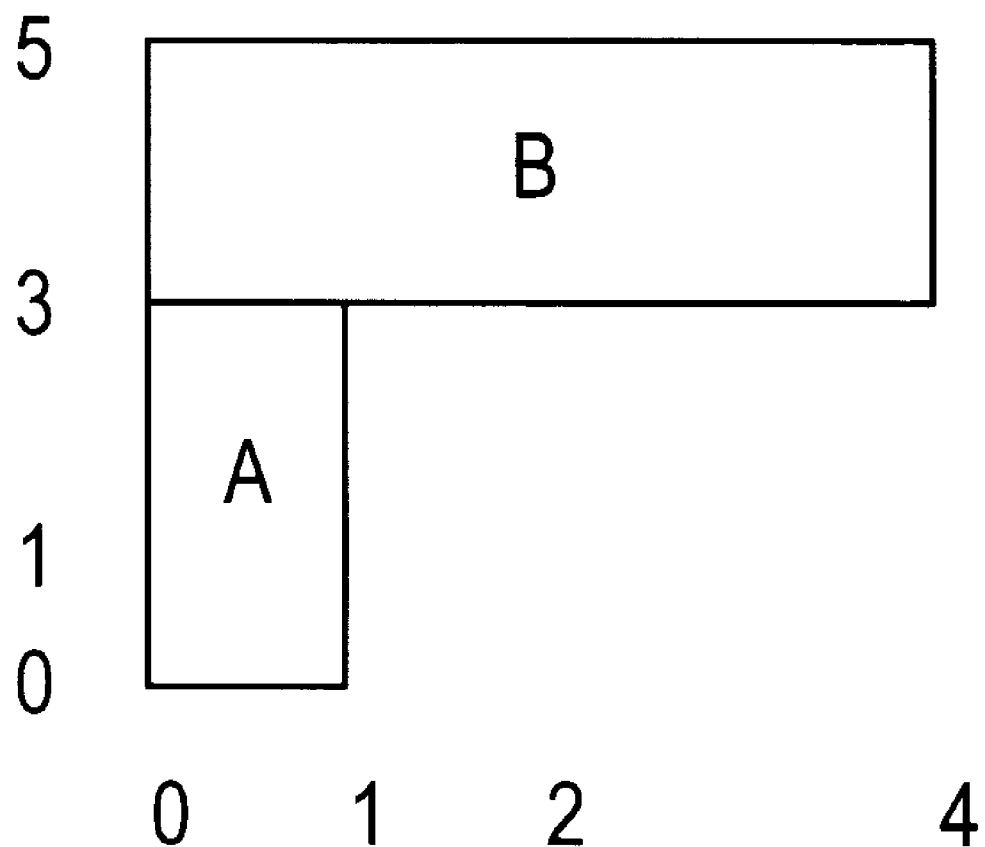
FIG. 25 is a schematic diagram showing the first intermediate data.

Next, as shown in FIG. 25, the second rectangle B is added to the area $S^1$.

$$S^2 = S^1 \cup B\square((0, 4), (3, 5))$$

At this point, with a calculation for "sum," a set of inscribed rectangles of the area $S^2$ is represented as follows.

$$\rightarrow [\#b_1 \square ((0, 1), (0, 5))$$

$$\#B\square((0, 4), (3, 5))]$$

Figure 26:
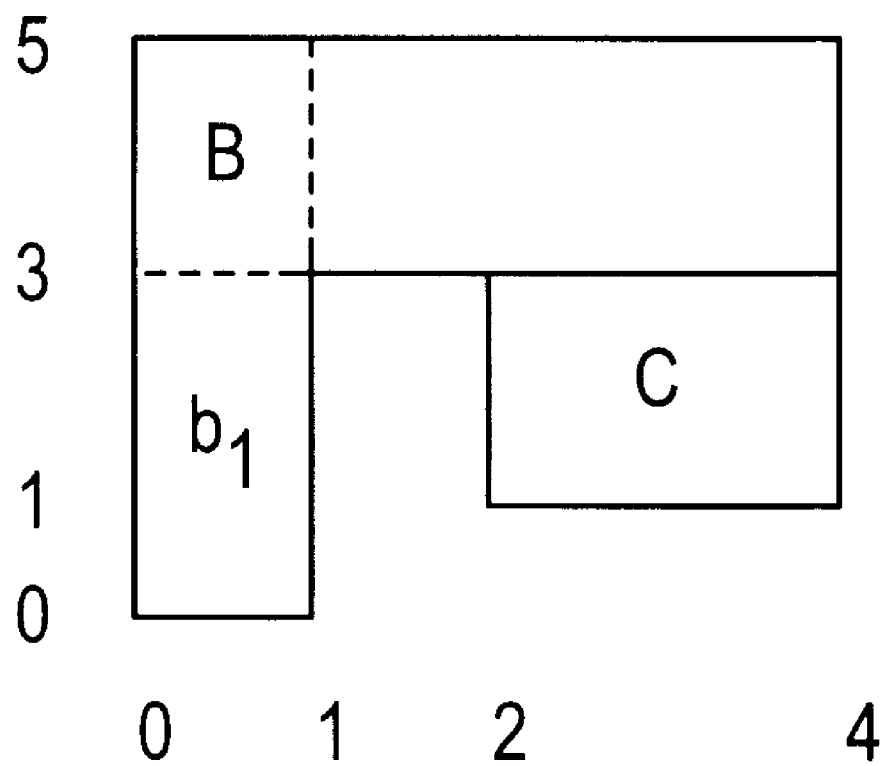
FIG. 26 is a schematic diagram showing the second intermediate data.

Next, as shown in FIG. 26, a third rectangle C is added to the area $S^2$.

$$S^3 = S^2 \cup C\square((2, 4), (1, 3))$$

Figure 27:
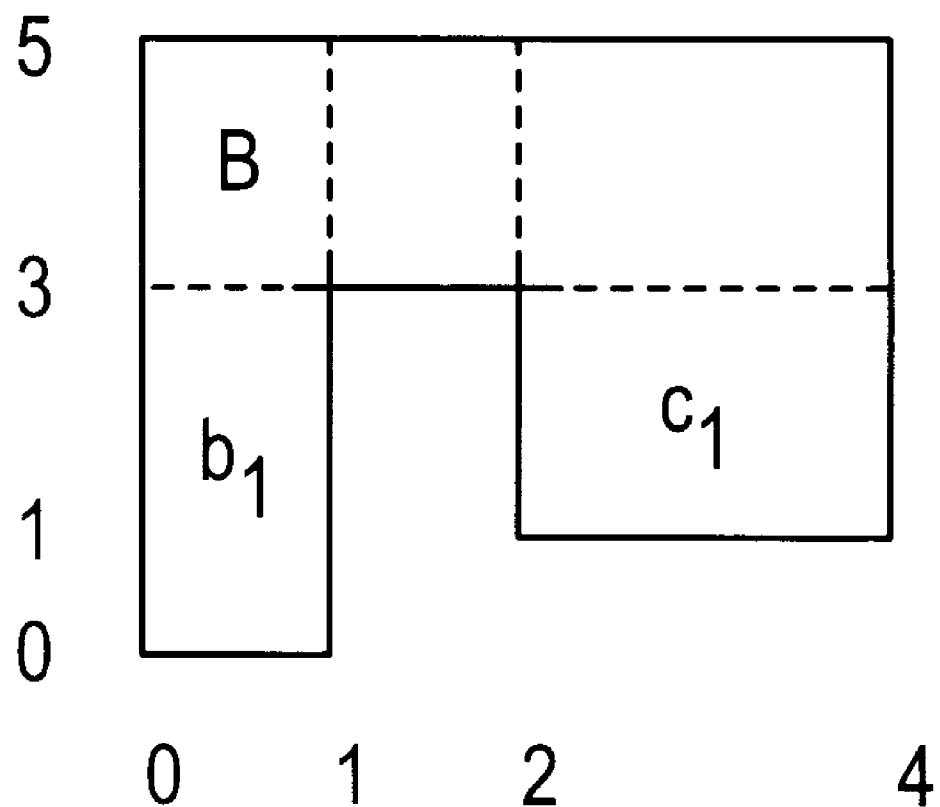
FIG. 27 is a schematic diagram showing the first set of inscribed rectangles.

At this point, when the rectangle C is interacted with the two inscribed rectangles $b_1$ and B, a calculation of B$\square\cup$C$\square$ causes the rectangle C to be eliminated to form a new inscribed rectangle $c_1$. As shown in FIG. 27, a set of inscribed rectangles of $S_3$ are represented as follows.

→[#$b_1$□ ((0, 1), (0, 5))

B□((0, 4), (3, 5))

@$c_1$□ ((2, 4), (1, 5))]

After the interaction of the rectangle $c_1$ in the second level and the other rectangle $b_1$ is checked, the rectangle $c_1$ in the second level is raised to the first level. Thus, a set of inscribed rectangles of $S^3$ are represented as follows.

→[#$b_1$□ ((0, 1), (0, 5))

B□((0, 4), (3, 5))

$c_1$□ ((2, 4), (1, 5))]

Figure 28:
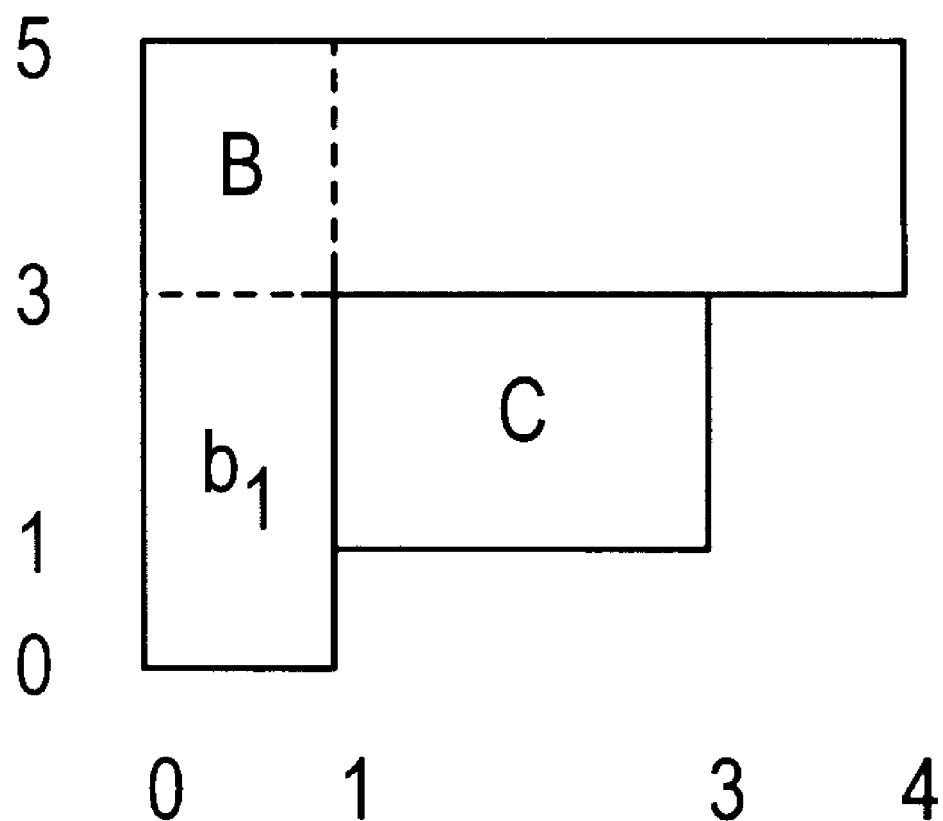
FIG. 28 is a schematic diagram showing the third example of the sum of rectangles.

Next, it is assumed that the position of the rectangle C shown in FIG. 26 is moved to the left so as to form a composite figure as shown in FIG. 28. When the rectangle C is added to the area $S^2$ in which the rectangle B is added to the rectangle A, the following area is formed.

$S$=[#$b_1$□ ((0, 1), (0, 5)) #B□((0, 4), (3, 5))]∪C□((1, 3), (1, 3))

Figure 29:
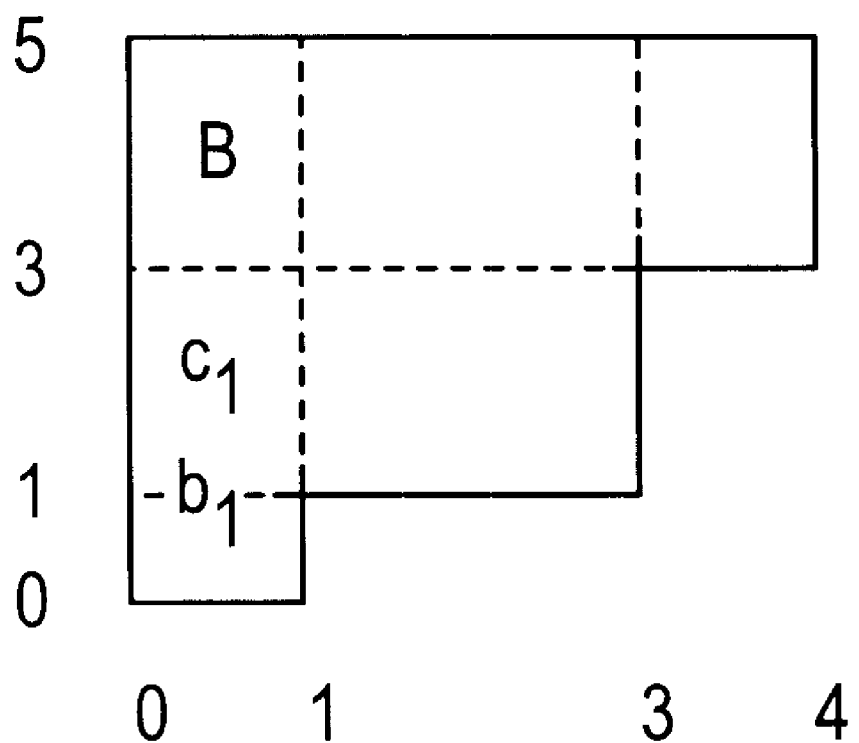
FIG. 29 is a schematic diagram showing the third intermediate data.

When the "sum" of each of the rectangles $b_1$ and B and the rectangle C is calculated, as shown in FIG. 29, the area S is represented as follows.

→[#$b_1$□ ((0, 1), (0, 5)) @$c_1$□ ((0, 3), (1, 3)) #B□((0, 4), (3, 5))]

Figure 30:
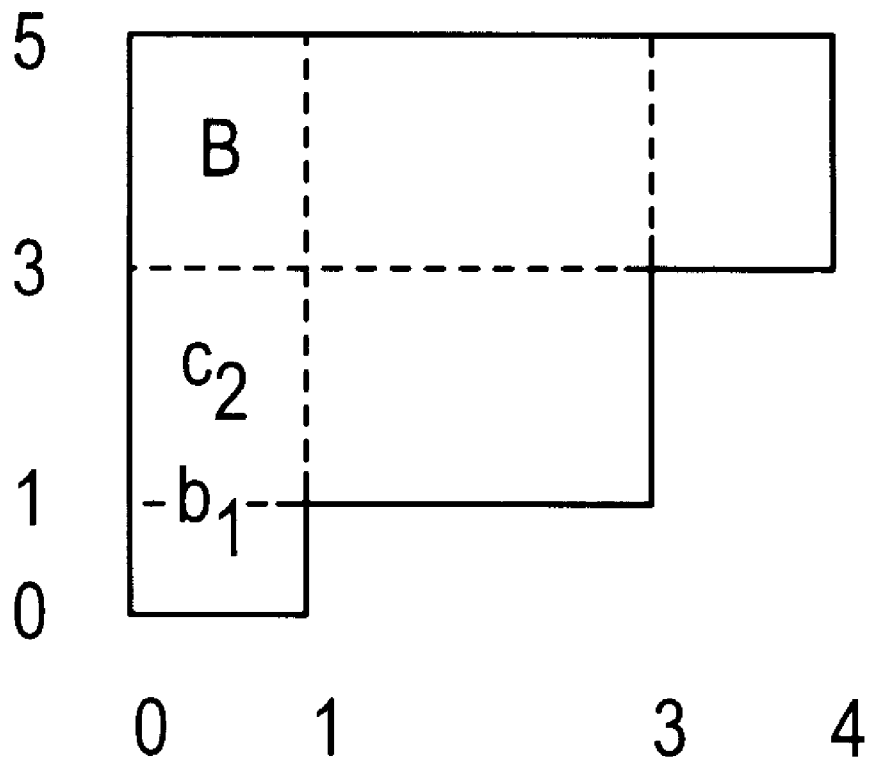
FIG. 30 is a schematic diagram showing the second set of inscribed rectangles.

The "sum" of the rectangles C and $b_1$ generates the rectangle $c_1$. Thus, since the rectangle C is included in the rectangle $c_1$ and eliminated, the "sum" of the rectangles C and B is not required. Next, the interaction of the rectangle cl in the second level and the other rectangle B is checked. As shown in FIG. 30, since the interaction generates the rectangle cz and thereby eliminates the rectangle $c_1$, the area S is represented as follows.

→[#$b_1$□ ((0, 1), (0, 5)) #B□((0, 4), (3, 5)) @$c_2$□ ((0, 3), (1, 5))]

In this case, since the sum of the rectangles C and $b_1$ has generated the rectangle $c_1$, it is not necessary to check the interaction of the rectangles $c_1$ and $b_1$. Next, the interaction of the rectangle $c_2$ in the second level and the rectangle $b_1$ is checked and then the rectangle $c_2$ is raised to the first level.

→[#$b_1$□ ((0, 1), (0, 5)) #B□((0, 4), (3, 5)) #$c_2$□ ((0, 3), (1, 5))]

Thus, the rectangles in the second level are eliminated and a set of inscribed rectangles of the area S are obtained.

Figure 31:
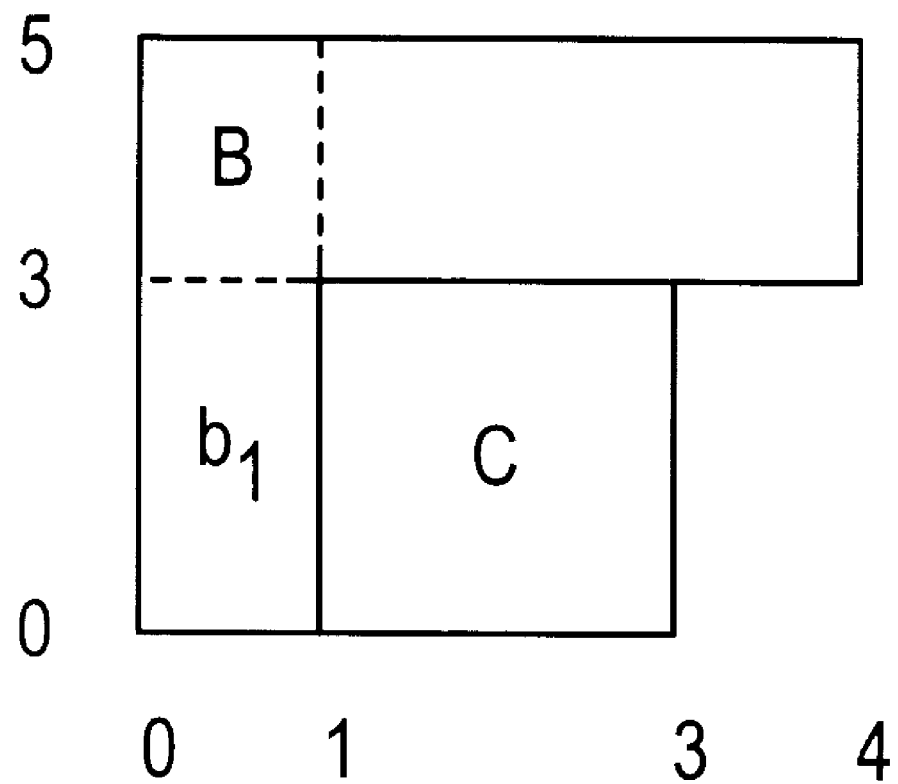
FIG. 31 is a schematic diagram showing the fourth example of the sum of rectangles.

Next, it is assumed that the rectangle C shown in FIG. 26 is slightly enlarged and thereby a composite figure as shown in FIG. 31 is formed. When the rectangle C is added to an area $S^2$ of which a rectangle B is added to a rectangle A, the following area is formed.

$S$=[#$b_1$□ ((0, 1), (0, 5)) #B□((0, 4), (3, 5))]∪c□((1, 3), (0, 3))

Figure 32:
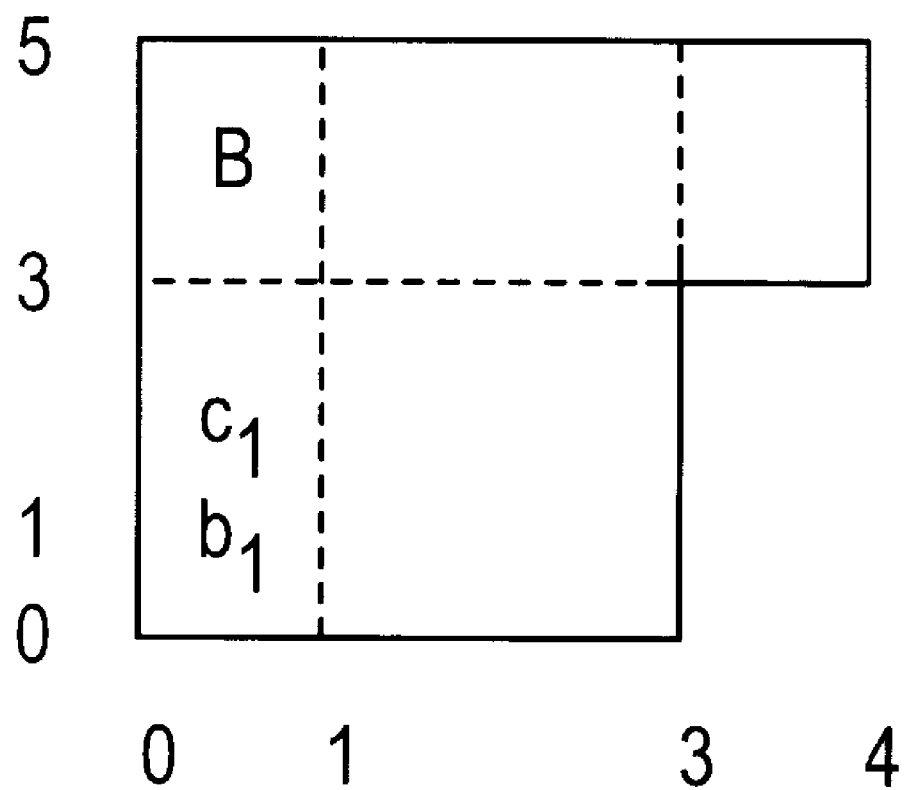
FIG. 32 is a schematic diagram showing the fourth intermediate data.

When the sum of each of the rectangles $b_1$ and B and the rectangle C is calculated, as shown in FIG. 32, the area S is represented as follows.

→[#$b1$□ ((0, 1), (0, 5)) @$c_1$□ ((0, 3), (0, 3)) #B□((0, 4), (3, 5))]

Figure 33:
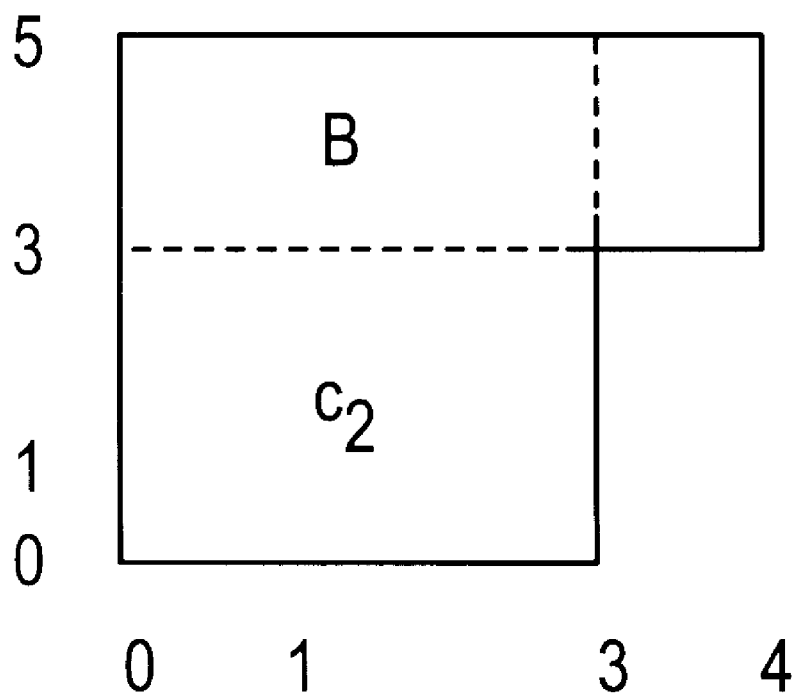
FIG. 33 is a schematic diagram showing the third set of inscribed rectangles.

In this case, the sum of the rectangle C and the rectangle $b_1$ generates the rectangle $c_1$ and thereby the rectangle C is eliminated. Thus, the sum of the rectangles C and B is not required. Next, the interaction of the rectangles $c_1$ in the second level and the other rectangle B is checked. As shown in FIG. 33, the interaction generates the rectangle $c_2$ and thereby the rectangle $c_1$ is eliminated. Thus, the area S is represented as follows.

→[#$b_1$□ ((0, 1), (0, 5)) #B□((0, 4), (3, 5)) @$c_2$□ ((0, 3), (0, 5))]

Next, the interaction of the rectangle $c_2$ in the second level and the rectangle $b_1$ is checked and then the rectangle $c_2$ is raised to the first level. At this point, since the rectangle $b_1$ is absorbed by the rectangle $c_2$, the rectangle $b_1$ is eliminated. Thus, a set of inscribed rectangles of the area S are represented as follows.

→[#B□((0, 4), (3, 5)) #$c_2$□ ((0, 3), (0, 5))]

In these examples, when a rectangle to be added generates a larger rectangle including itself and thereby is eliminated, a calculation for the sum with another rectangle or a calculation for the interaction with another rectangle is omitted so as to prevent an unnecessary process from being performed. Even if the rectangle is not eliminated and the interaction with all other rectangles is calculated, the same result is obtained.

Figure 34:
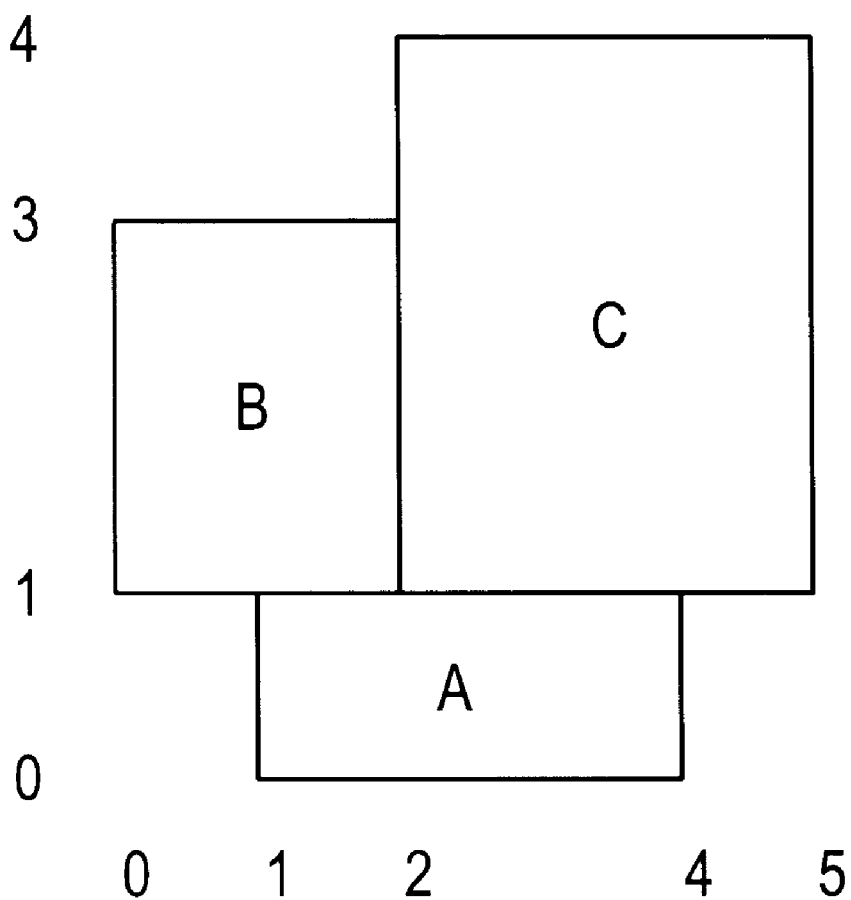
FIG. 34 is a schematic diagram showing the fifth example of the sum of rectangles.

In the case of a figure shown in FIG. 2, by combining three rectangles A, B, and C, a set of inscribed rectangles thereof can be obtained as shown in FIG. 34. In this case, an area composed of the rectangles A, B, and C is represented as follows.

A□((1, 4), (0, 1))∪

B□((0, 2), (1, 3))∪

C□((2, 5), (1, 4))

Figure 35:
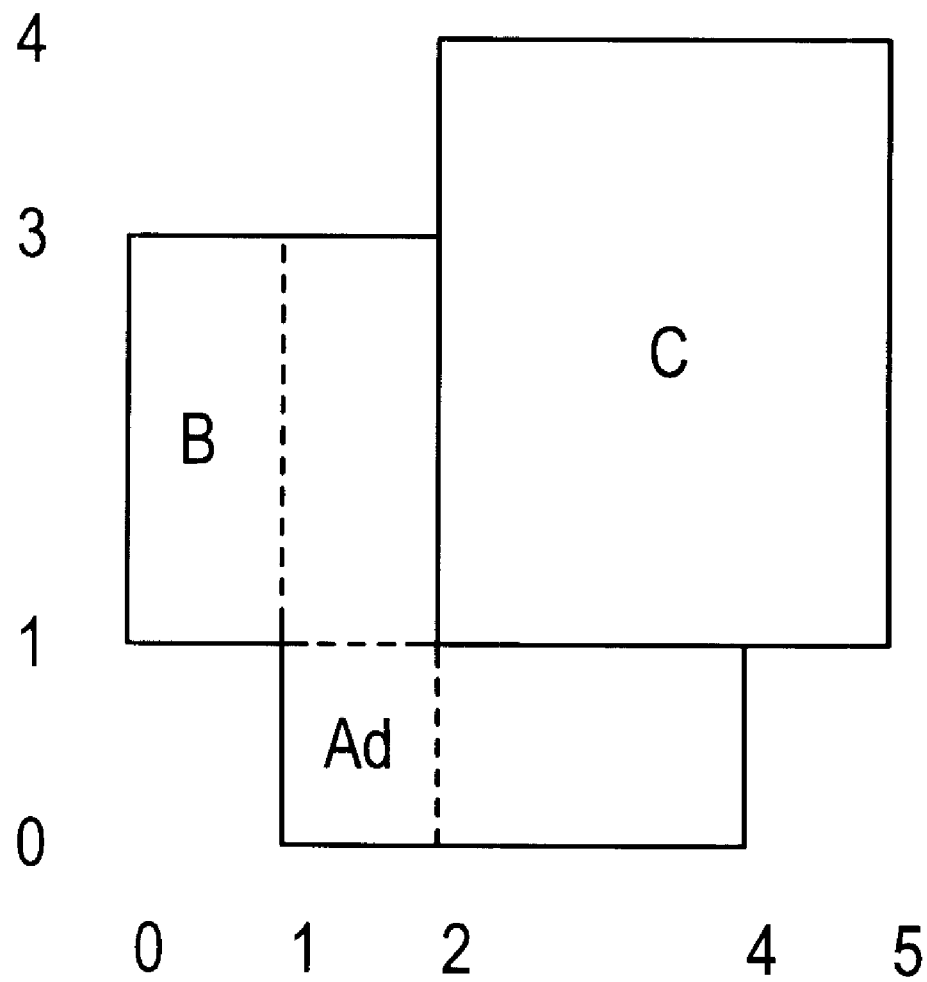
FIG. 35 is a schematic diagram showing the fifth intermediate data.

When the two rectangles A and B are combined, as shown in FIG. 35, the resultant area $S^2$ is represented as follows.

$S^2$=A□((1, 4), (0, 1))∪B□((0, 2), (1, 3))→[#A□((1, 4), (0, 1)) #d□((1, 2), (0, 3)) #B□((0, 2), (1, 3))]

Next, when the rectangle C is added to the area $S^2$, the resultant area $S^3$ is represented as follows.

$S^3$=$S^2$∪C□((2, 5), (1, 4))

Figure 36:
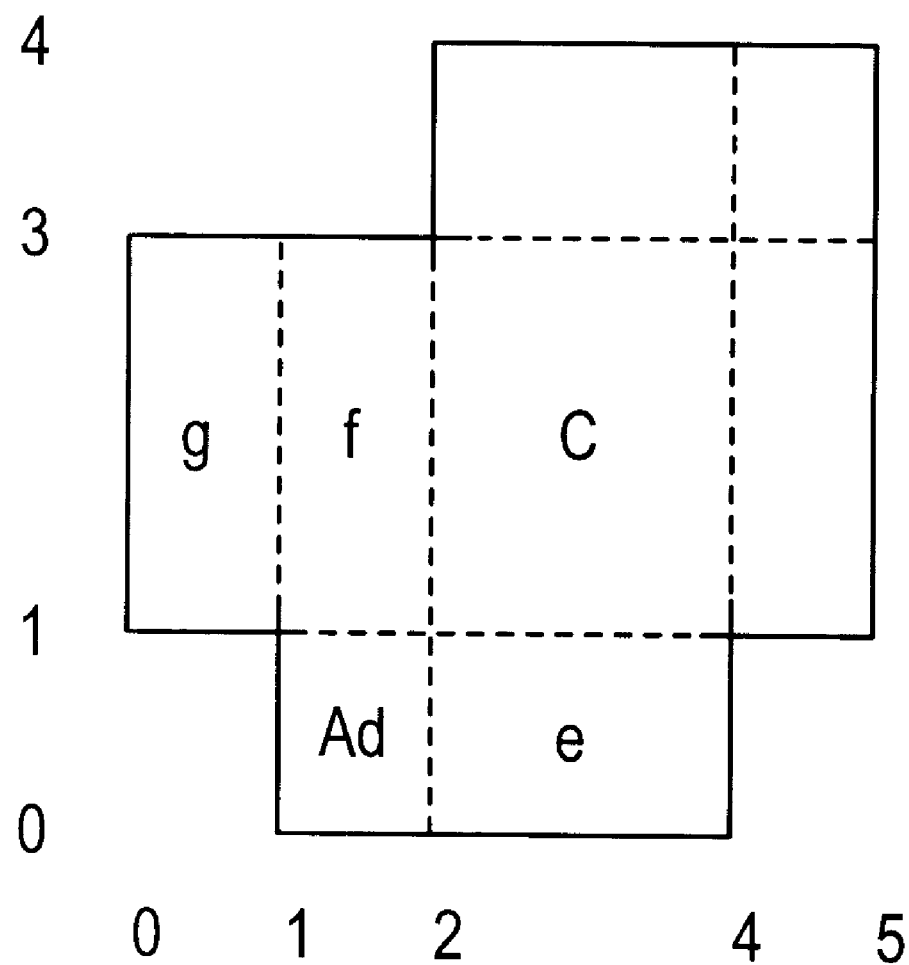
FIG. 36 is a schematic diagram showing the sixth intermediate data.

The sum of the rectangle C and each of other rectangles is calculated one after the other. Thus, as shown in FIG. 36, the rectangle B generates a rectangle g and thereby the rectangle B is eliminated.

→[#A□ ((1, 4), (0, 1)) @e□((2, 4), (0, 4)) #d□((1, 2), (0, 3)) @f□((1, 5), (1, 3)) #@g□((0, 5), (1, 3)) #C□((2, 5), (1, 4))]

Figure 37:
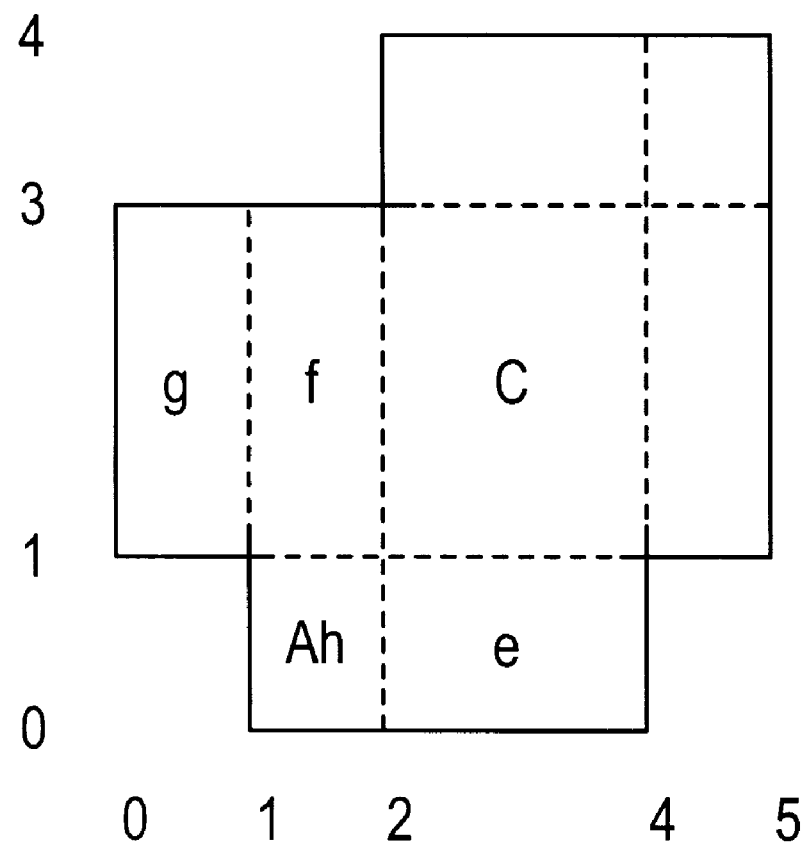
FIG. 37 is a schematic diagram showing the seventh intermediate data.

A prefix # of the rectangle g in the second level represents that the rectangle g is derived from a rectangle at this position in the first level. Next, the rectangle a in the second level is raised to the first level. At this point, the rectangle a is interacted with each of the other rectangles d, f, and g, but it is not necessary to check the interaction of the rectangle a and each of the rectangles A and C. Thus, as shown in FIG. 37, a rectangle h is generated as follows.

Figure 38:
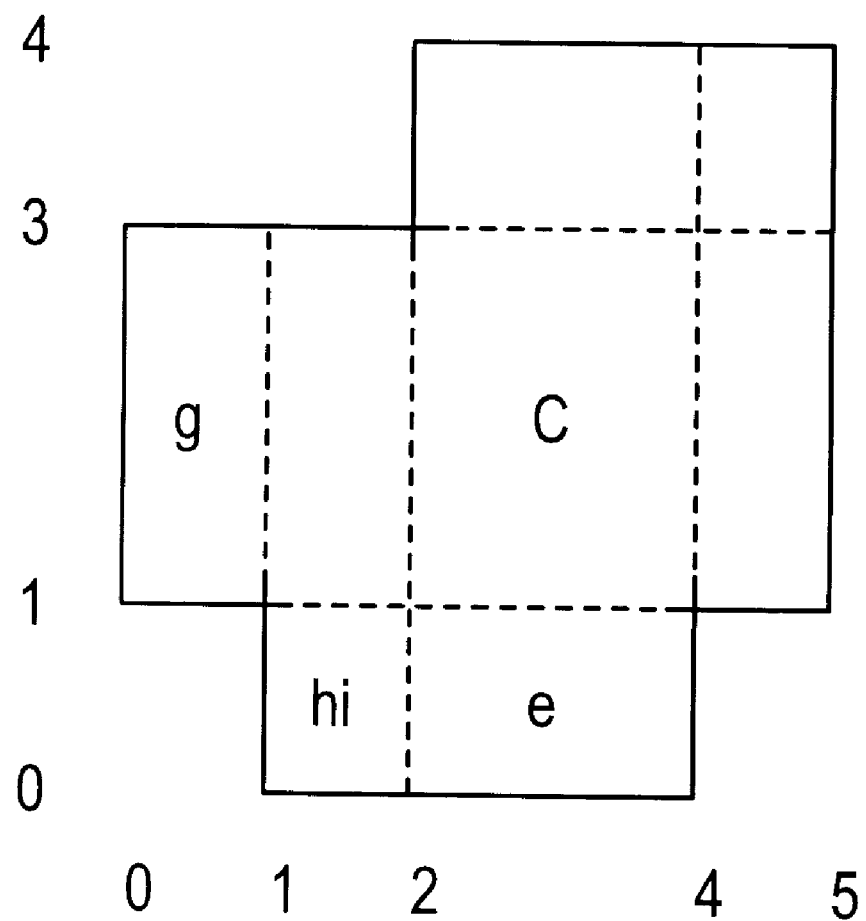
FIG. 38 is a schematic diagram showing the eighth intermediate data.

→[#A□((1, 4), (0, 1)) #@'h□((1, 4), (0, 3)) @f□((1, 5), (1, 3)) #@g□((0, 5), (1, 3)) #C□ ((2, 5), (1, 4)) #e□((2, 4), (0, 4))]

where @' represents a new rectangle generated by a raising operation of a rectangle in the second level to the first level. Thereafter, rectangles in the second level are raised in the order of occurrences. When the rectangle f is raised to the first level and interacted with each of the rectangles A, h, and g, as shown in FIG. 38, the rectangle f is absorbed by the rectangle g and eliminated as follows.

→[#@i□(1, 4), (0, 3)) #@'h□((1, 4), (0, 3)) #@g□((0, 5), (1, 3)) #C□ ((2, 5), (1, 4)) #e□((2, 4), (0, 4))]

Although the generated rectangles i and h are the same, the algorithm of the space managing unit 12 does not know that. Next, when the rectangle g is raised to the first level and interacted with each of the rectangles i and h, the resultant area is represented as follows.

→[#@i□((b 1, 4), (0, 3)) #@'h□((b 1, 4), (0,3)) #C□((2, 5), (1, 4)) #e□((2, 4), (0, 4)) #g□((0, 5), (1, 3))]

Figure 39:
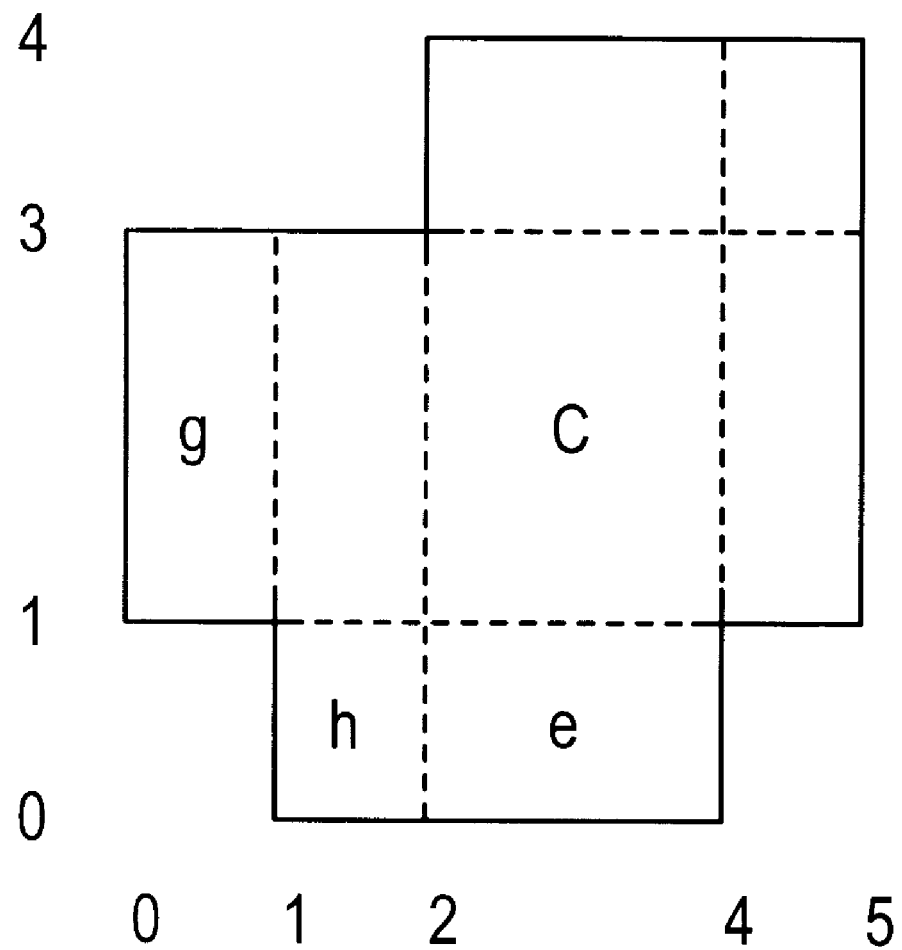
FIG. 39 is a schematic diagram showing the ninth intermediate data.
Figure 40:
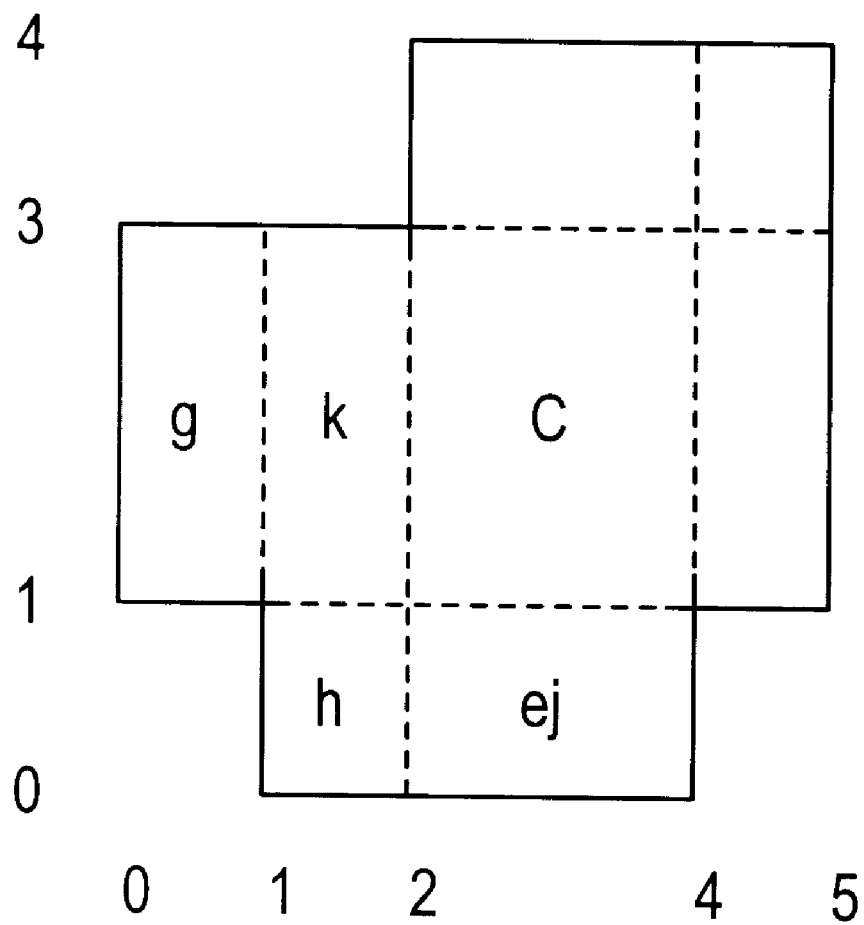
FIG. 40 is a schematic diagram showing the tenth intermediate data.

When the rectangle h is raised to the first level and interacted with the rectangle i, as shown in FIG. 39, the rectangle 1 is absorbed by the rectangle h and thereby eliminated. When the rectangle h is interacted with the rectangle C, as shown in FIG. 40, the resultant area is represented as follows.

→[#c□((2, 5), (1, 4)) @j□((2, 4), (0, 4)) @k□((1, 5), (1, 3)) #e□((2, 4), (0, 4)) #g□((0, 5), (1, 3)) #h□((1, 4), (0, 3))]

Although the generated rectangles j and a are the same, the space managing unit 12 does not know that. Next, when the rectangle j is raised to the first level and interacted with each of the rectangles a and g, the rectangle j is absorbed by the rectangle a and thereby eliminated. Thus, the resultant area is represented as follows.

→[#C□((2, 5), (1, 4)) @k□((1, 5), (1, 3)) #e□((2, 4), (0, 4)) #g□((0, 5), (1, 3)) #h□((1, 4), (0, 3))]

Figure 41:
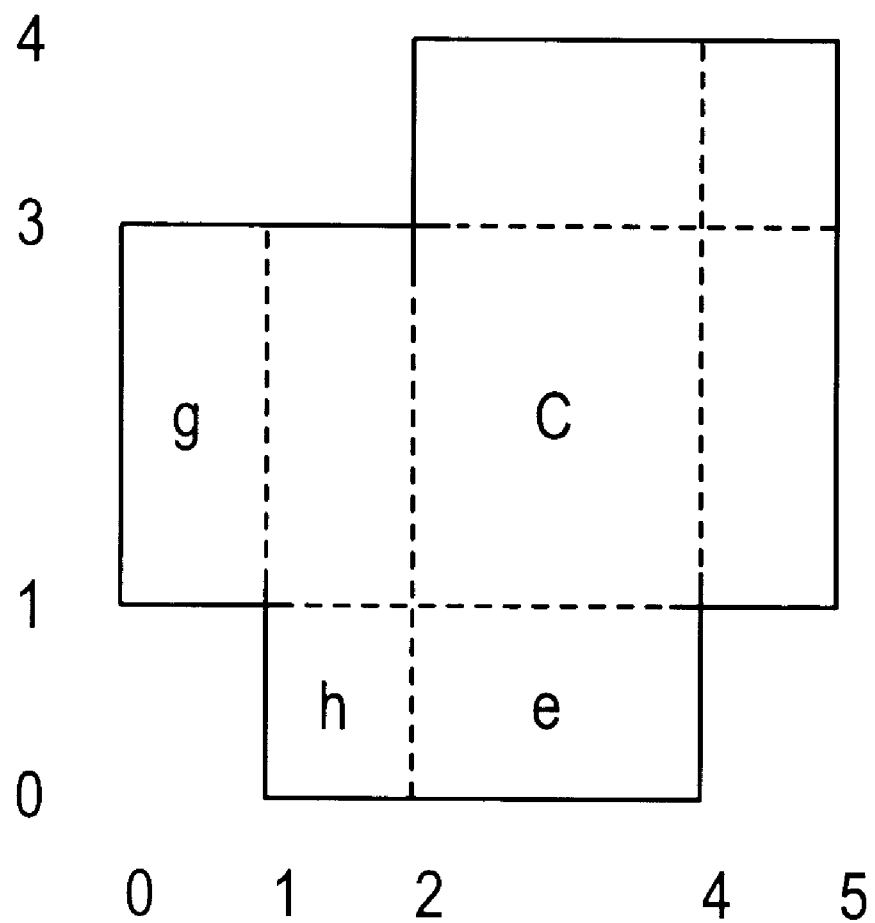
FIG. 41 is a schematic diagram showing the fourth set of inscribed rectangles.

Next, when the rectangle k is raised to the first level and interacted with each of the rectangles e and g, as shown in FIG. 41, the rectangle k is absorbed by the rectangle g and thereby eliminated. The resultant set of inscribed rectangles are represented as follows.

→[#C□((2, 5), (1, 4)) #e□((2, 4), (0, 4)) #g□((0, 5), (1, 3)) #h□((1, 4), (0, 3))]

Figure 42:
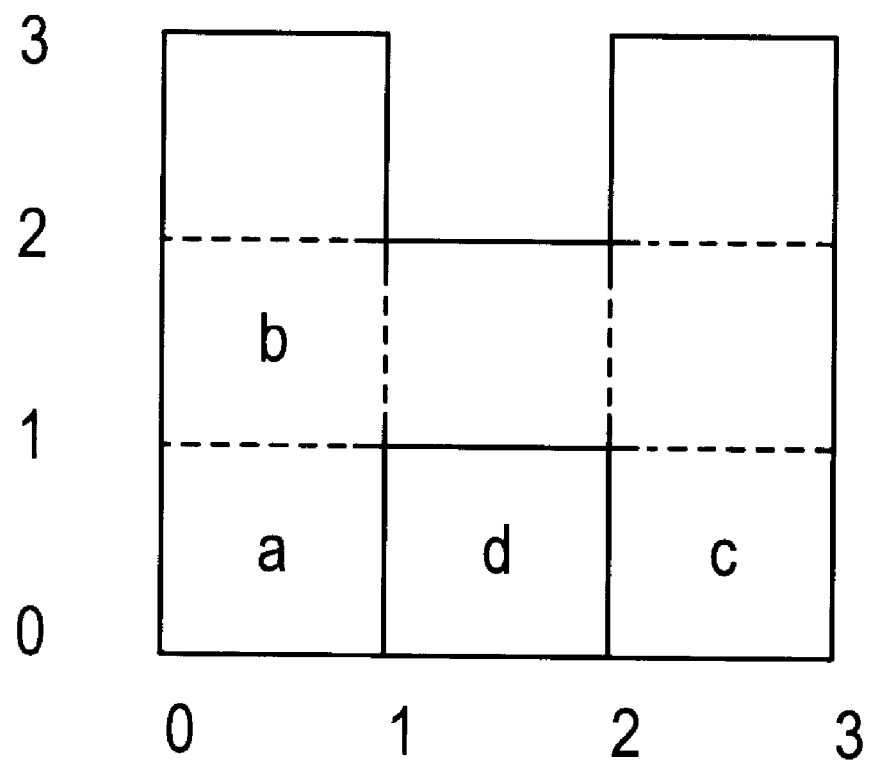
FIG. 42 is a schematic diagram showing the sixth example of the sum of rectangles.

Next, it is considered that a rectangle is added to a concaved portion of a particular figure. An H-shaped area shown in FIG. 42 is represented by the following set of inscribed rectangles.

$S^3$=[#a□((0, 1), (0, 3)) #b□((0, 3), (1, 2)) #c□((2, 3), (0, 3))]

When a rectangle d□ ((1, 2), (0, 1)) is added to the concaved portion of the area $S^3$, the resultant area is represented as follows.

$S=S^3 \cup d$□((1, 2), (0, 1))

Figure 43:
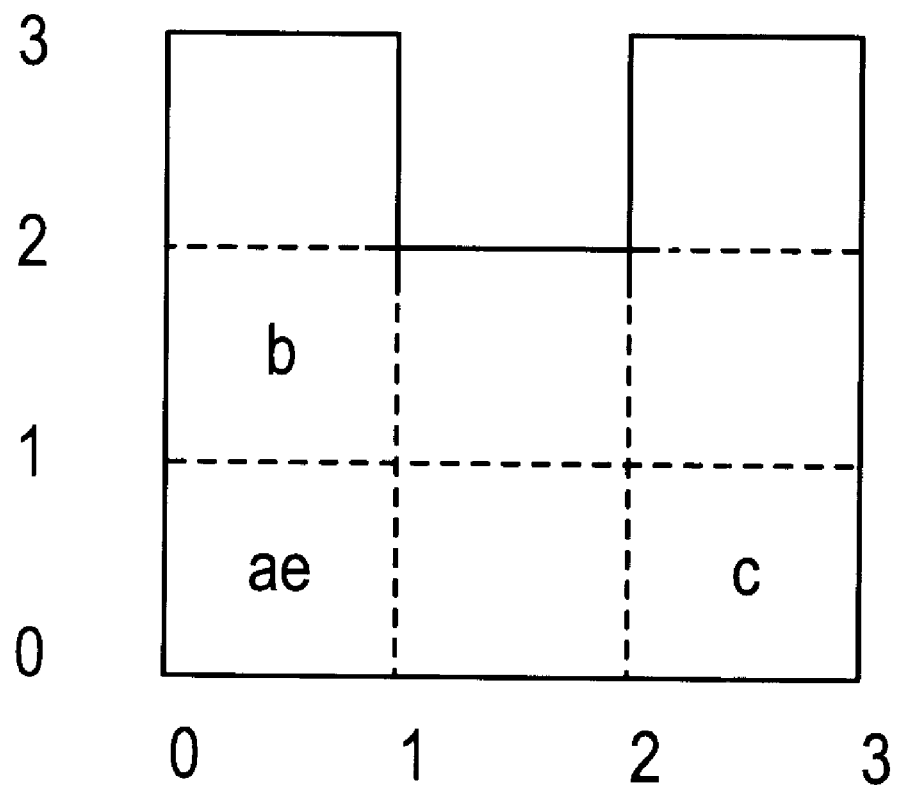
FIG. 43 is a schematic diagram showing the eleventh intermediate data.

When the sum of the rectangle d and each of the rectangles a, b, and c is calculated one after the other, as shown in FIG. 43, the rectangle d generates a rectangle a and thereby is eliminated. Thus, it is clear that the sum of the rectangle d and each of the rectangles b and c is not required. The area S is represented as follows.

→[#a□((0, 1), (0, 3)) @e□((0, 2), (0, 1)) #b□((0, 3), (1, 2)) #c□((2, 3), (0, 3))]

Figure 44:
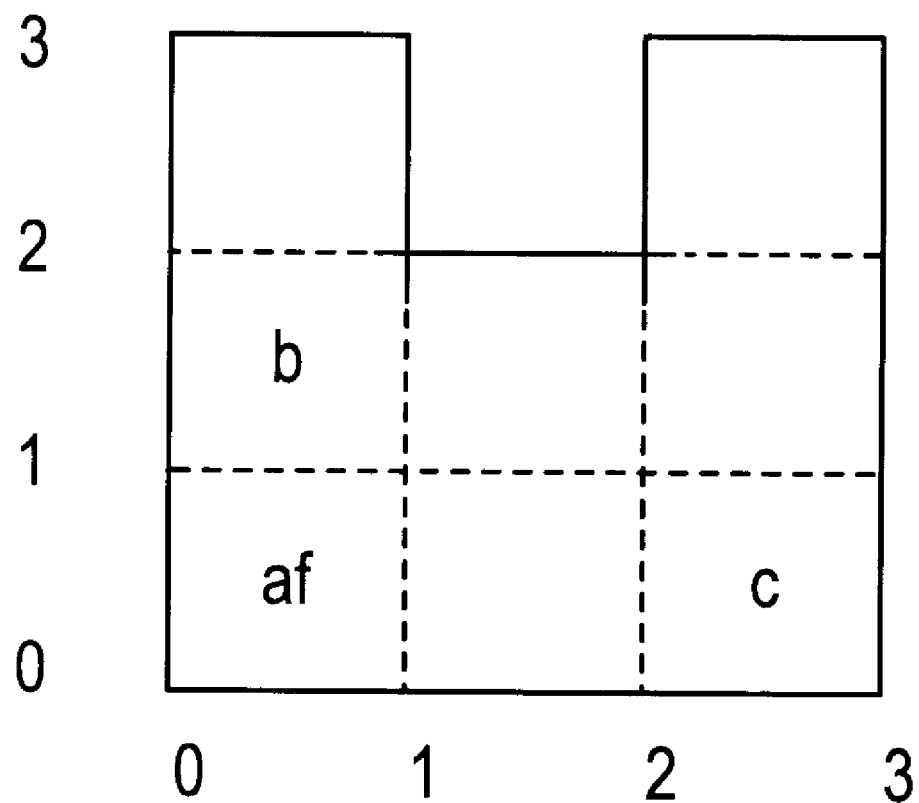
FIG. 44 is a schematic diagram showing the twelfth intermediate data.

Next, when the rectangle a is raised to the first level and interacted with each of the rectangles b and c, as shown in FIG. 44, the rectangle a generates a rectangle f and thereby is eliminated. Thus, it is clear that the sum of the rectangles a and c is not required. The area S is represented as follows.

→[#a□((0, 1), (0, 3)) #b□((0, 3), (1, 2)) @f□((0, 2), (0, 2)) #c□((2, 3), (0, 3))]

Figure 45:
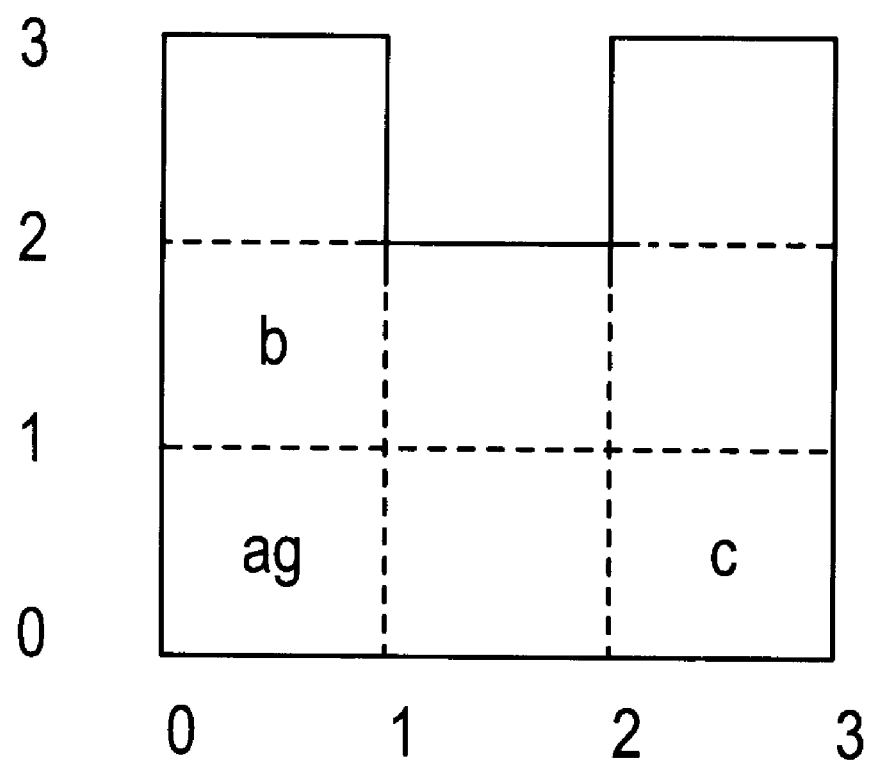
FIG. 45 is a schematic diagram showing the thirteenth intermediate data.

Next, when the rectangle f is raised to the first level and interacted with each of the rectangles a and c, as shown in FIG. 45, the rectangle f generates a rectangle g and thereby is eliminated. Thus, the resultant area is represented as follows.

→[#a□((0, 1), (0, 3)) #b□((0, 3), (1, 2)) #c□((2, 3), (0, 3)) @g□((0, 3), (0, 2))]

Figure 46:
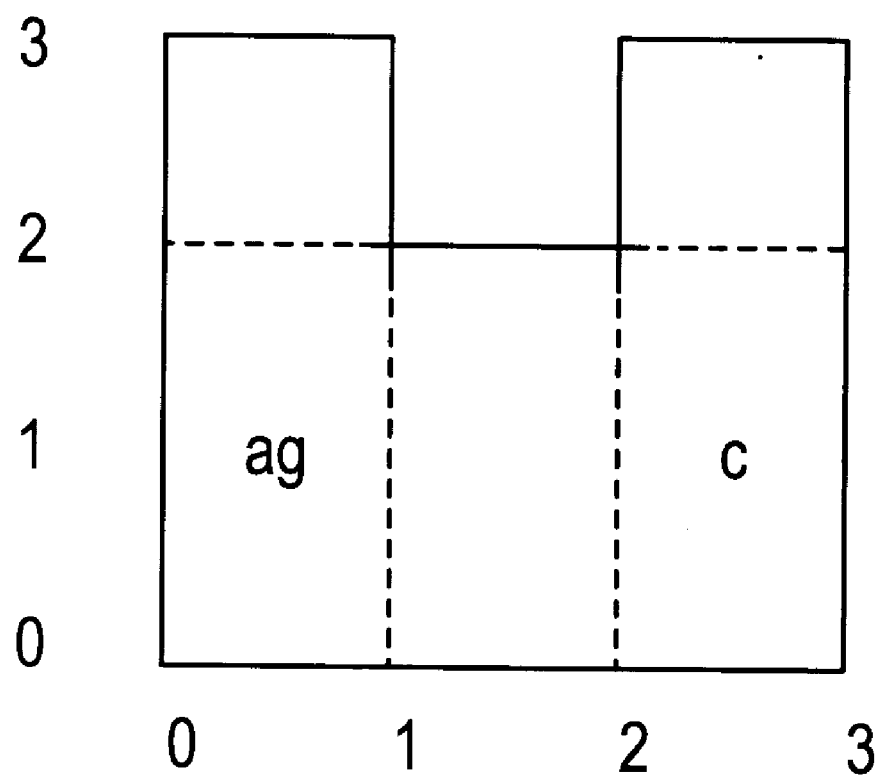
FIG. 46 is a schematic diagram showing the fifth set of inscribed rectangles.

Next, when the rectangle g is raised to the first level and interacted with each of the rectangles a and b, as shown in FIG. 46, the rectangle b is absorbed by the rectangle g and thereby eliminated. The resultant set of inscribed rectangles are represented as follows.

→[#a□((0, 1), (0, 3)) #c□((2, 3), (0, 3)) #g□((0, 3), (0, 2))]

Next, with reference to FIGS. 47 to 57, a process for laying out "objects" in a blank space performed by the space managing unit 12 shown in FIG. 6 will be described. In the previous examples shown in FIGS. 24 to 46, a set of inscribed rectangles of an area was obtained by adding rectangles. In the example shown in FIGS. 47 to 57, a process for removing an area of a particular rectangle from a closed figure represented by a set of inscribed rectangles is described.

When an "object" is laid out, it is checked that the "object" does not protrude from the closed figure. Thereafter, the rectangle corresponding to the "object" is eliminated. Next, for the example of the two-dimensional layout shown in FIG. 7, the algorithm for managing a set of inscribed rectangles is described, without the layout position checking process, for the sake of clarity in explanation. The size of an "object" a in this example is slightly different from that shown in FIG. 7.

[0] Initial setting $S^0$=[#S□((0, 10), (0, 8))]

Figure 47:
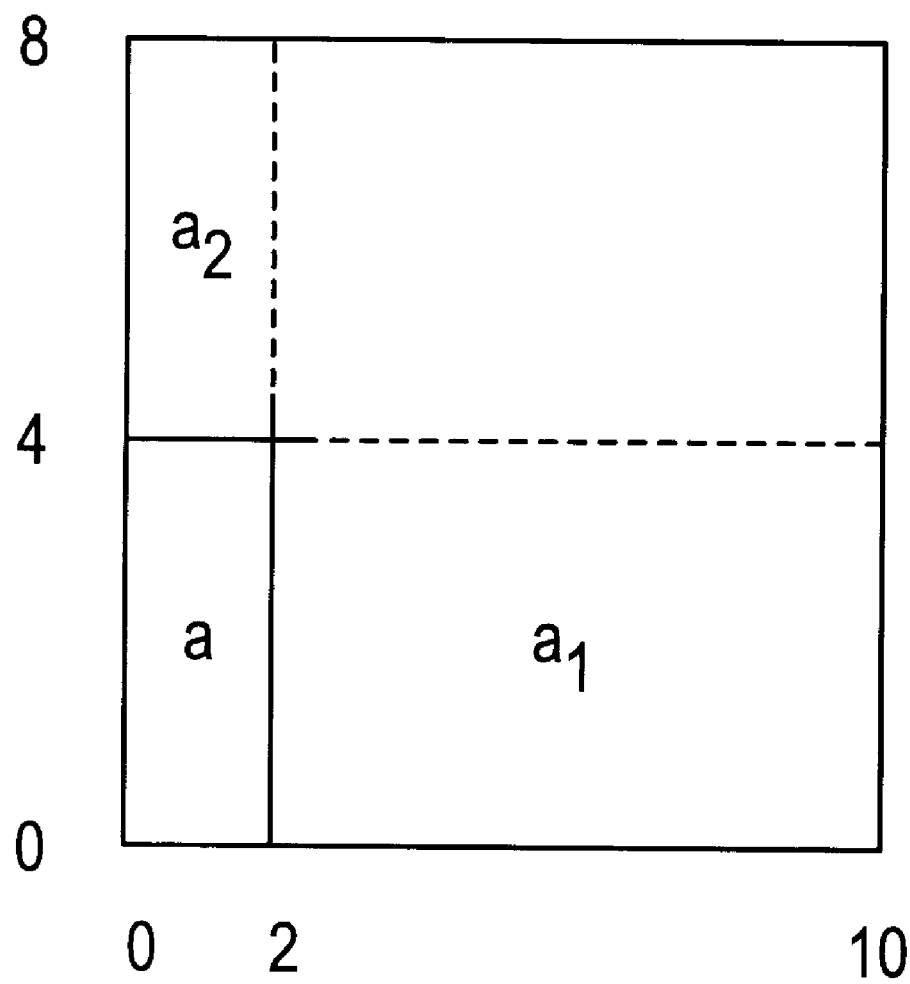
FIG. 47 is a schematic diagram showing the first layout process.

[1] As shown in FIG. 47, when an "object" a is laid out at the position of a rectangle a■ ((0, 2), (0, 4)), the remaining area is represented as the difference between the two rectangles $S^0$ and a.

$S^1=S^0-a$■((0, 2), (0, 4)) →[#$a_1$□ ((2, 10), (0, 8)) #$a_2$□ ((0, 10), (4, 8))]

Figure 48:
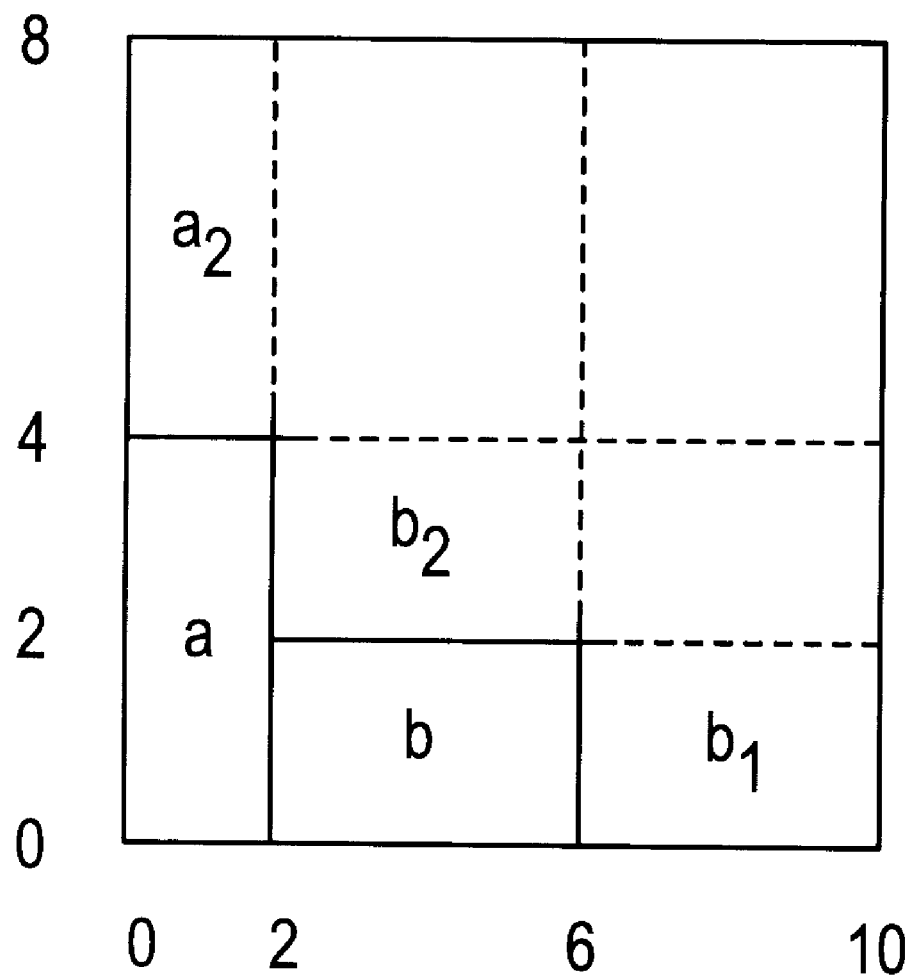
FIG. 48 is a schematic diagram showing the second layout process.

[2] As shown in FIG. 48, an "object" b is laid out at the position of a rectangle b■ ((2, 6), (0, 2)).

$S^2=S^1-b$■((2, 6), (0, 2))

When the rectangle b is subtracted from each of the inscribed rectangles of the area $S^1$, the resultant area is represented as follows.

→[#@$b_1$□ ((6, 10), (0,8)) @$b_2$□ ((2, 10), (2, 8)) #$a_2$□ ((0, 10), (4, 8)]

Next, each of the rectangles in the second level is raised. When the rectangle $b_1$ is raised to the first level and interacted with the rectangle $a_2$, the resultant area is represented as follows.

→[#@$b_2$□ ((2, 10), (2, 8)) #$a_2$□ ((0, 10), (4, 8)) #$b_1$□ ((6, 10), (0, 8))]

When the rectangle $b_2$ is raised to the first level and interacted with the rectangle $a_2$, the resultant area is represented as follows.

→[#$a_2$□ ((0, 10), (4, 8)) #$b_1$□ ((6, 10), (0, 8)) #$b_2$□ ((2, 10), (2, 8))]

When the order of the rectangles is sorted in the priority order of layout, the resultant rectangles are represented as follows.

→[#$b_1$□ ((6, 10), (0, 8)) #$b_2$□ ((2, 10), (2, 8)) #$a_2$□ ((0, 10), (4, 8))]

Figure 49:
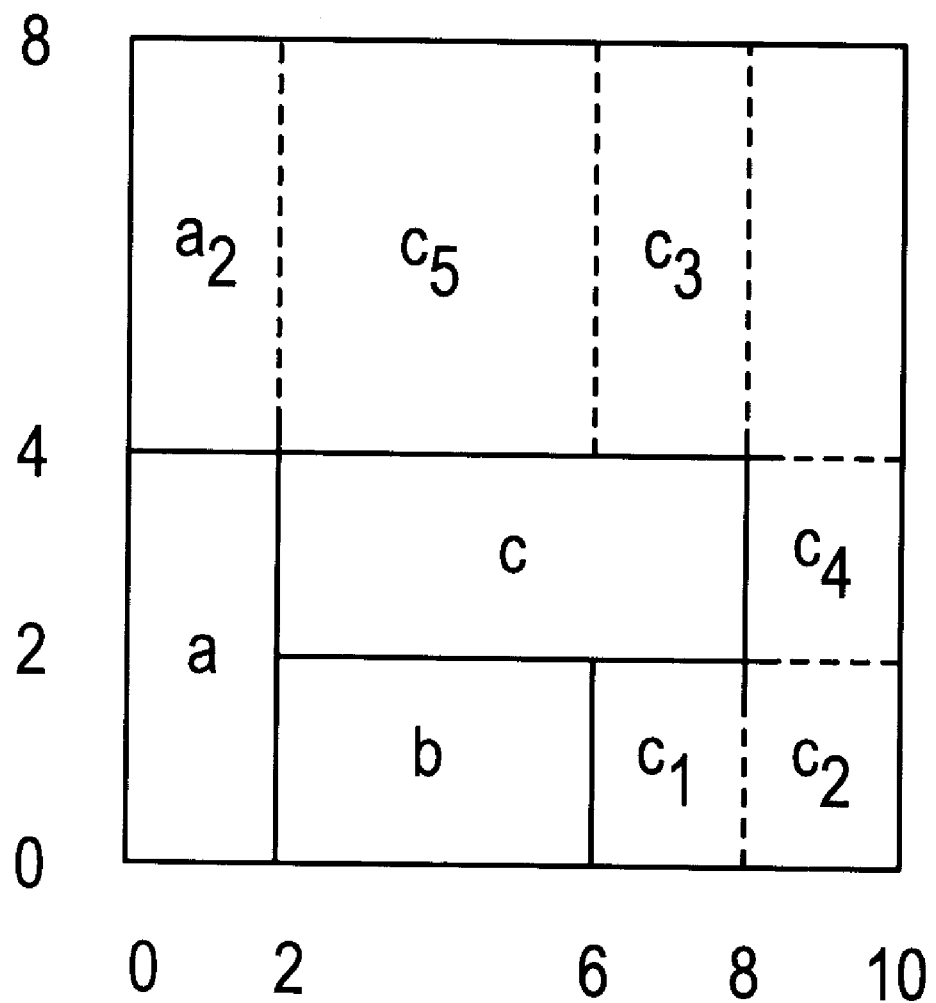
FIG. 49 is a schematic diagram showing the third layout process.

[3] As shown in FIG. 49, an "object" c is laid out at the position of a rectangle c■ ((2, 8), (2, 4)).

$S^3 = S^2 - c$■((2, 8), (2, 4))

When the rectangle c is subtracted from each of inscribed rectangles of the area $S^2$, the resultant area is represented as follows.

→[#@$c_1$□ ((6, 10), (0, 2)) @$c_2$□ ((8, 10), (0, 8)) @$c_3$□ ((6, 10), (4, 8)) #@$c_4$□ ((8, 10), (2, 8)) @$c_5$□ ((2, 10), (4, 8)) #$a_2$□ ((0, 10), (4, 8))]

Figure 50:
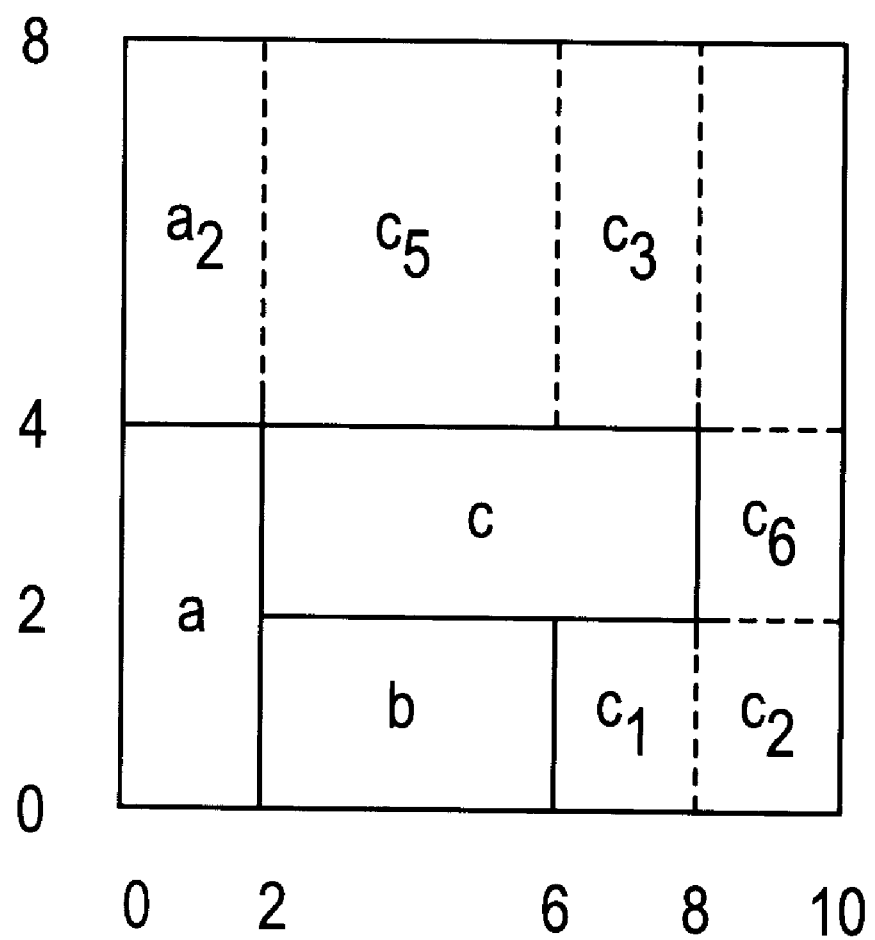
FIG. 50 is a schematic diagram showing the first raising process.

Next, each of the rectangles in the second level is raised to the first level. First, the rectangle $c_1$ is raised to the first level and interacted with each of the rectangles $c_4$, $c_5$, and $a_2$. Thus, as shown in FIG. 50, the resultant area is represented as follows.

→[#@$c_2$□ ((8, 10), (0, 8)) @$c_3$□ ((6, 10), (4, 8)) #@'$c_6$□ ((8, 10), (0, 8)) @$c_5$□ ((2, 10), (4, 8)) #$a_2$□ ((0, 10), (4, 8)) #$c_1$□ ((6, 10), (0, 2))]

Figure 51:
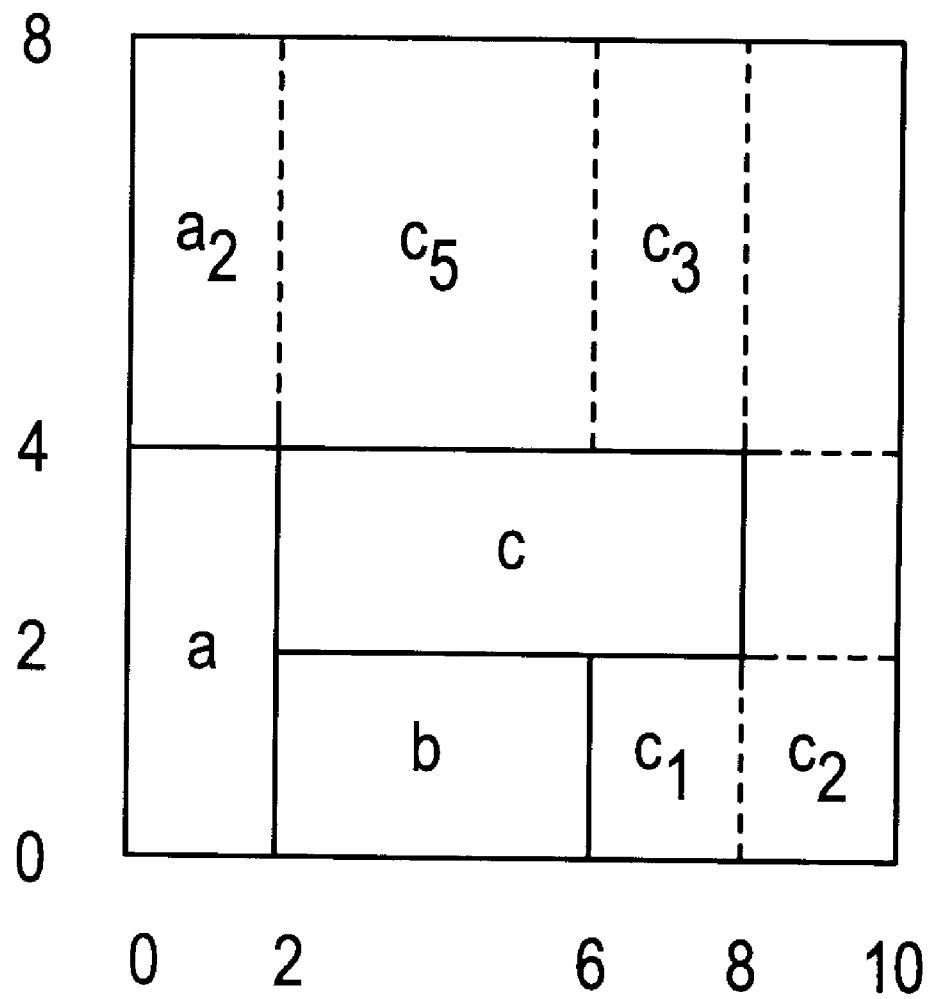
FIG. 51 is a schematic diagram showing the second raising process.

Next, the rectangle $c_2$ is raised to the first level and interacted with each of the rectangles $c_6$, $c_5$, and $a_2$. Thus, as shown in FIG. 51, the rectangle $c_6$ is absorbed by the rectangle $c_2$ and thereby eliminated. The resultant area is represented as follows.

→[#@$c_3$□ ((6, 10), (4, 8)) #@$c_5$□ ((2, 10), (4, 8)) #$a_2$□ ((0, 10), (4, 8)) #$c_1$□ ((6, 10), (0, 2)) #$c_2$□ ((8, 10), (0, 8))]

Next, when the rectangle $c_3$ is raised to the first level and interacted with each of the rectangles $c_5$ and $a_2$, the rectangle $c_3$ is absorbed by the rectangle cs and thereby eliminated. Thus, the resultant area is represented as follows.

→[#@$c_5$□ ((2, 10), (4, 8)) #$a_2$□ ((0, 10) , (4, 8) #$c_1$□ ((6, 10), (0, 2)) #$c_2$□ ((8, 10), (0, 8))]

Figure 52:
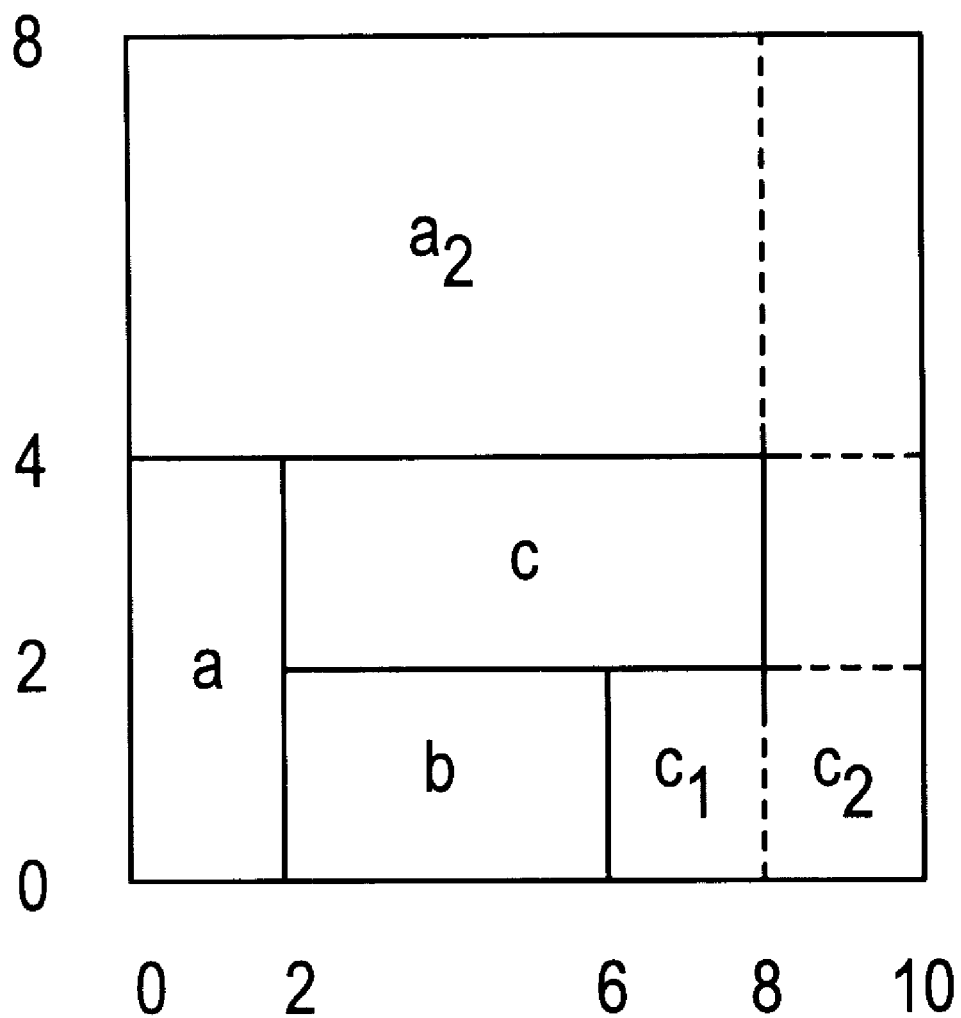
FIG. 52 is a schematic diagram showing the third raising process.

When the rectangle cs is raised to the first level and interacted with the rectangle $a_2$, as shown in FIG. 52, the rectangle $c_5$ is absorbed by the rectangle $a_2$ and thereby eliminated. Thus, the resultant area is represented as follows.

→[#$a_2$□ ((0, 10), (4, 8)) #$c_1$□ ((6, 10), (0, 2)) #$c_2$□ ((8, 10), (0, 8))]

When the rectangles are sorted in the priority order of layout, the resultant rectangles are represented as follows.

→[#$c_1$□ ((6, 10), (0, 2)) #$c_2$□ ((8, 10), (0, 8)) #$a_2$□ ((0, 10), (4, 8))]

Figure 53:
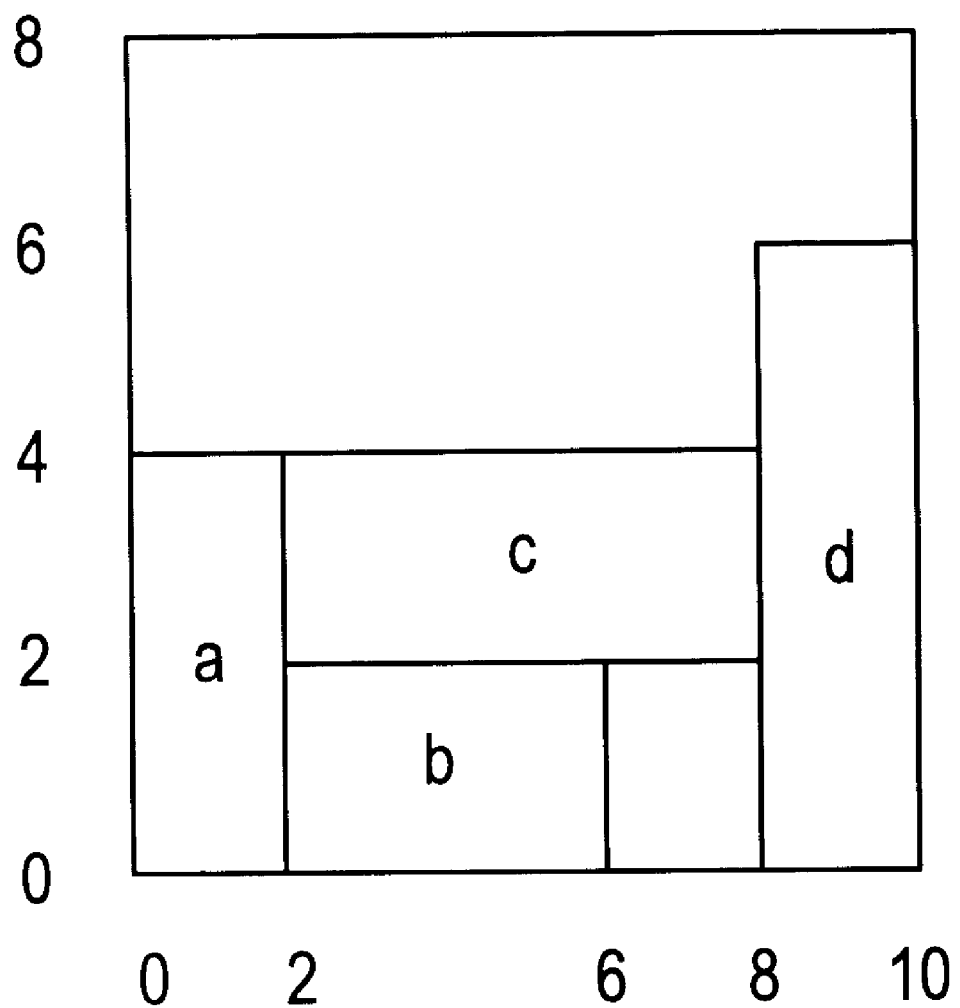
FIG. 53 is a schematic diagram showing the fourth layout process.

[4] As shown in FIG. 53, an "object" d is laid out at the position of a rectangle d■ ((8, 10), (0, 6)). The resultant area $s^4$ is represented as follows.

$S^4 = S^3 - d$■((8, 10), (0, 6))

Figure 54:
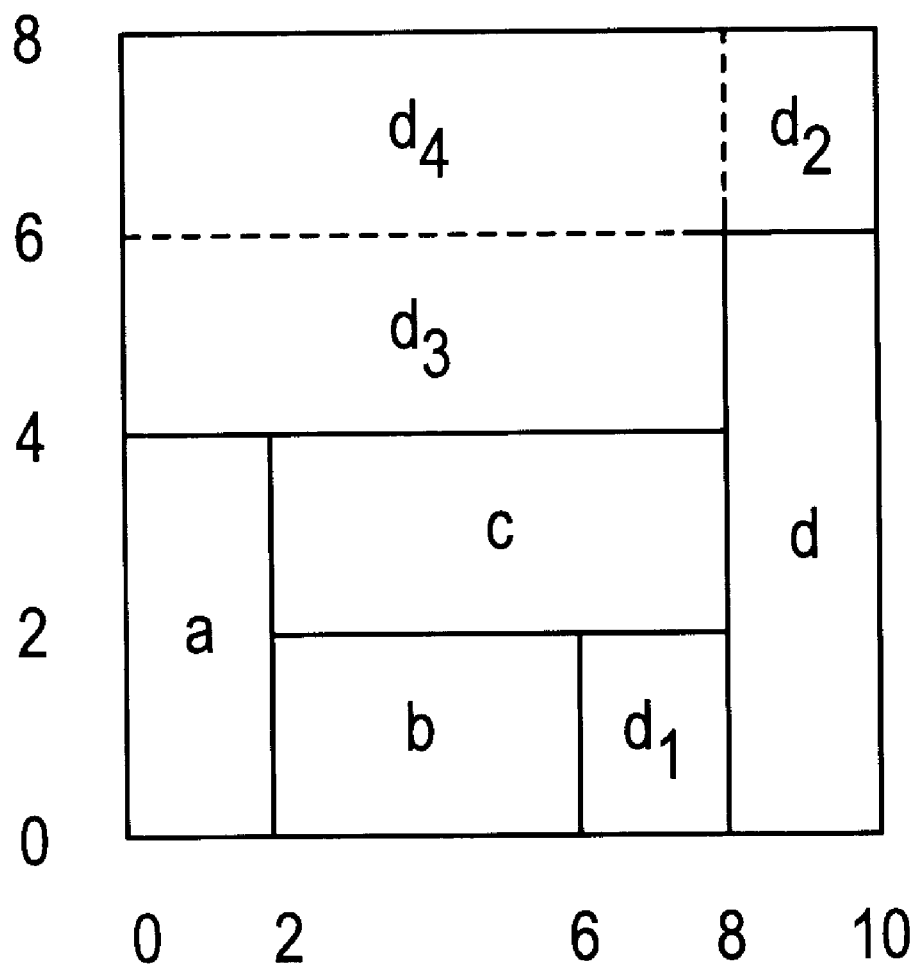
FIG. 54 is a schematic diagram showing the fourth raising process.

When the rectangle d is subtracted from each of the inscribed rectangles of the area $S^3$, as shown in FIG. 54, the resultant area is represented as follows.

→[#@$d_1$□ ((6, 8), (0, 2)) #@$d_2$□ ((8, 10), (6, 8)) #@$d_3$□ ((0, 8), (4, 8)) @$d_4$□ ((0, 10), (6, 8))]

Next, the rectangles in the second level are raised to the first level in the order of occurrences. First, the rectangle $d_1$ is raised to the first level and interacted with each of the rectangles $d_2$, $d_3$, and $d_4$. Thus, the resultant area is represented as follows.

→[#@$d_2$□ ((8, 10), (6, 8)) #@$d_3$□ ((0, 8), (4, 8)) @$d_4$□ ((0, 10), (6, 8)) #$d_1$□ ((6, 8), (0, 2))]

Next, the rectangle $d_2$ is raised to the first level and interacted with each of the rectangles $d_3$ and $d_4$. Thus, the resultant area is represented as follows.

→[#@$d_3$□ ((0, 8), (4, 8)) @'$d_5$□ ((0, 10), (6, 8)) @$d_4$□ ((0, 10), (6, 8)) #$d_1$□ ((6, 8), (0, 2))]

In this case, the algorithm of the space managing unit 12 does not know that the rectangle $d_5$ is the same as the rectangle $d_4$. Next, the rectangle $d_3$ is raised to the first level and interacted with each of the rectangles $d_4$ and $d_5$. Thus, the resultant area is represented as follows.

→[#@'$d_5$□ ((0, 10), (6, 8)) @$d_4$□ ((0, 10), (6, 8)) #$d_1$□ ((6, 8), (0, 2)) #$d_3$□ ((0, 8), (4, 8))]

Figure 55:
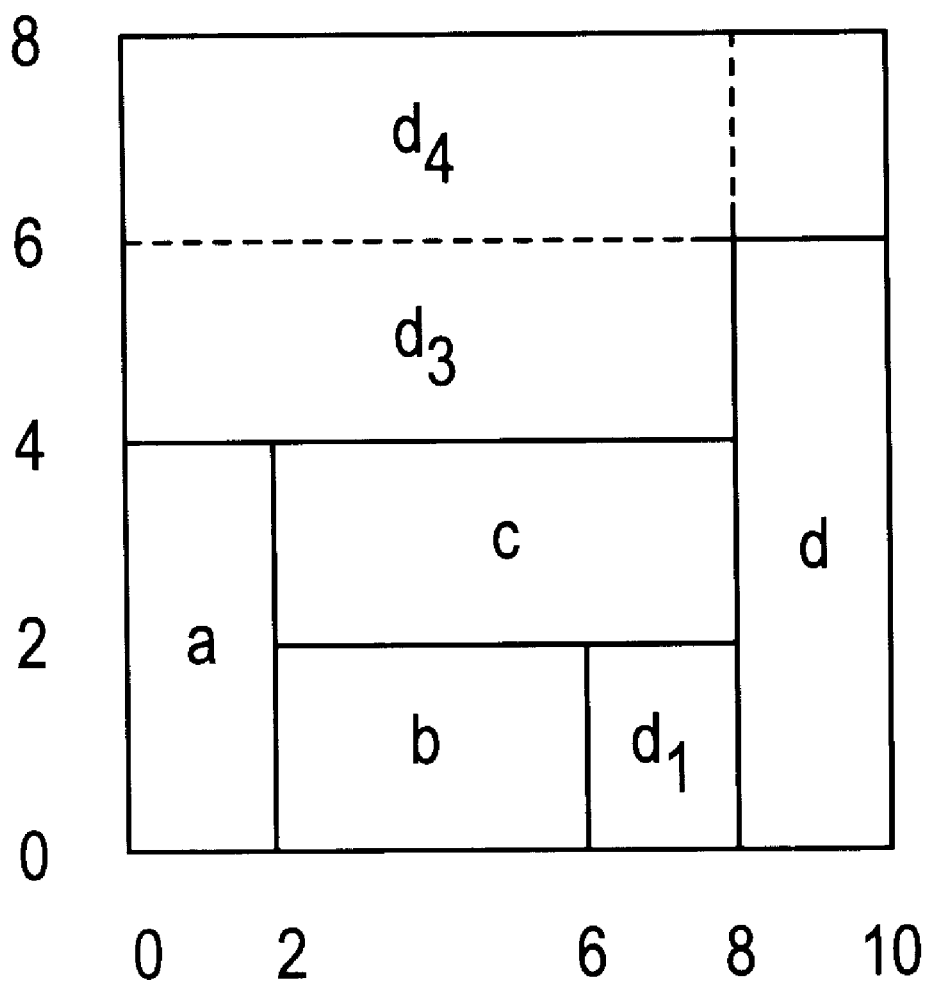
FIG. 55 is a schematic diagram showing the fifth raising process.

Next, the rectangle $d_4$ is raised to the first level and interacted with the rectangle $d_5$. Thus, the rectangle $d_5$ is absorbed by the rectangle $d_4$ and thereby eliminated. Consequently, as shown in FIG. 55, the resultant area is represented as follows.

→[#$d_1$□ ((6, 8), (0, 2)) #$d_3$□ ((0, 8), (4, 8)) #$d_4$□ ((0, 10), (6, 8)]

Figure 56:
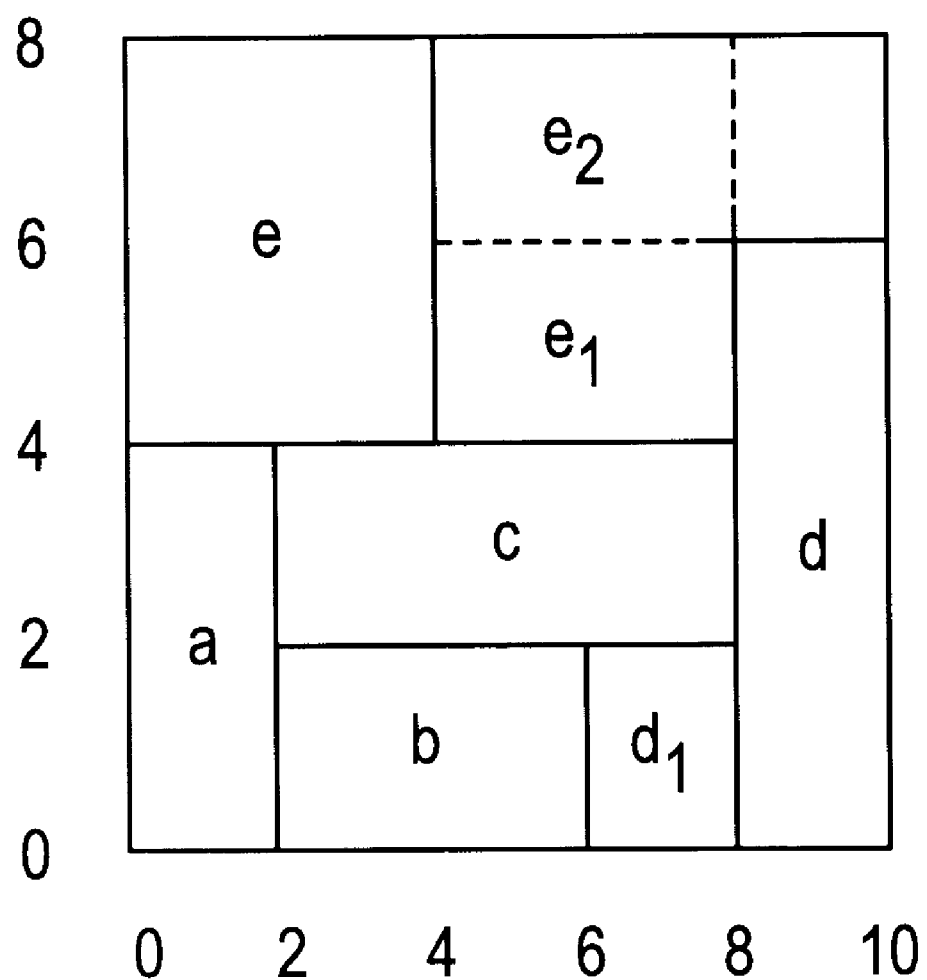
FIG. 56 is a schematic diagram showing the fifth layout process.

[5] As shown in FIG. 56, an "object" a is laid out at the position of a rectangle e■ ((0, 4), (4, 8)). The resultant area $S^5$ is represented as follows.

$S^5 = S^4 - e$■((0, 4), (4, 8))

When the rectangle e is subtracted from each of the inscribed rectangles of the area $S^4$, the resultant area is represented as follows.

→[#$d_1$□ ((6, 8), (0, 2)) #@$e_1$□ ((4, 8), (4, 8)) #@$e_2$□ ((4, 10), (6, 8))]

Next, the rectangles in the second level are raised to the first level in succession. When the rectangle $e_1$ is raised to the first level and interacted with each of the rectangles $d_1$ and $e_2$, the resultant area is represented as follows.

→[#$d_1$□ ((6, 8), (0, 2)) #@$e_2$□ ((4, 10), (6, 8)) #$e_1$□ ((4, 8), (4, 8))]

Next, the rectangle $e_2$ is raised to the first level and interacted with the rectangle $d_1$. Thus, the resultant area is represented as follows.

→[#$d_1$□ ((6, 8), (0, 2)) #$e_1$□ ((4, 8), (4, 8)) #$e_2$□ ((4, 10), (6, 8))]

Figure 57:
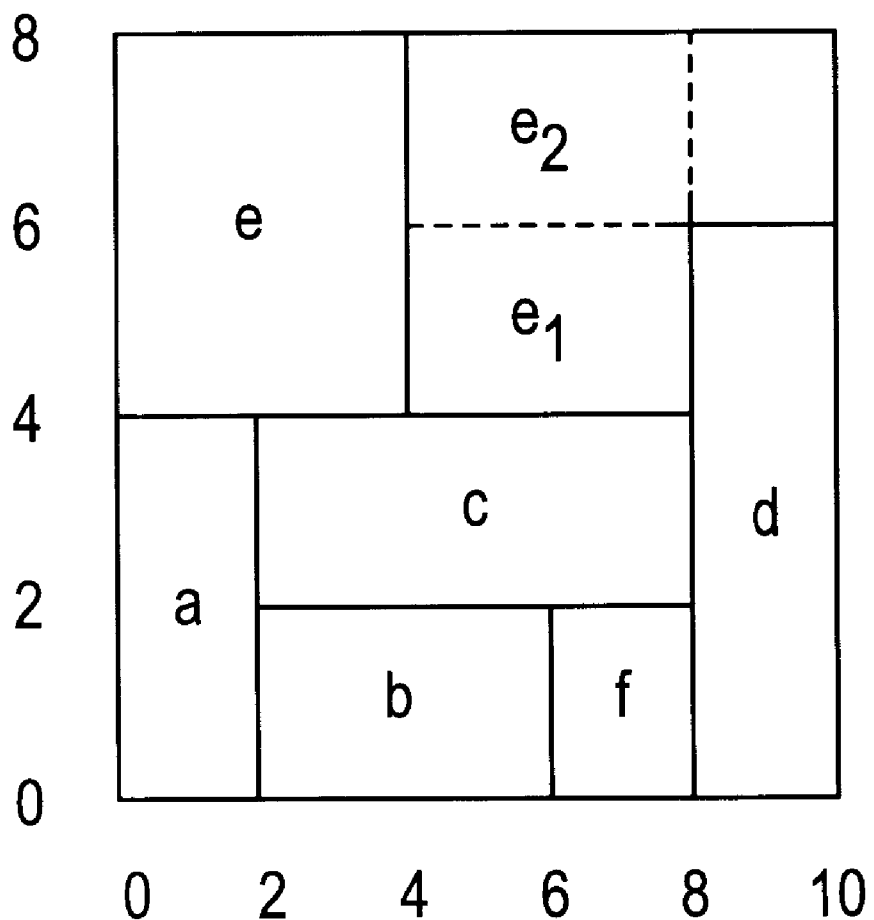
FIG. 57 is a schematic diagram showing the sixth layout process.

[6] As shown in FIG. 57, an "object" f is laid out at the position of a rectangle f■ ((6, 8), (0, 2)). The resultant area $S^6$ is represented as follows.

$$S^6 = S^5 - f\blacksquare((6, 8), (0, 2))$$

When the rectangle f is subtracted from each of the inscribed rectangles of the area $S_5$, the resultant area is represented as follows.

$$\rightarrow [\#e_1\square ((4, 8), (4, 8)) \#e_2\square ((4, 10), (6, 8))]$$

Since all the rectangles of the area $S^6$ are in the first level, they form the set of inscribed rectangles. Now that there are no "objects" to be laid out, the process is completed.

As shown in FIGS. 24 to 57, the process for managing a space with a set of inscribed rectangles is complicated. To systematically describe the process, the data structure and process flow of the space managing unit (SM) 12 shown in FIG. 6 will be described.

(a) Data Structure for Managing Space

In the SM 12, a set of rectangles that represents a space are represented with the following three types of data structures.

List structure pointing to rectangles in the first level: T

List structure pointing to rectangles in the second level: W

List of data of individual rectangles: Q

Each element (cell) of the list structure T in the first level has the following data.

Generation order number: gen

Number of rectangles in the second level belonging to the element: nsub

Pointer to a rectangle: jq (When there is no rectangle in the first level included in the cell, jq=Nil, where Nil represents a blank list.)

Each element (cell) of the list structure W in the second level has the following data.

Generation order number: gen

Generation order number of an element (cell) in the first level to which the cell in the second level belongs (this generation order number is referred to as "affiliation number"): genl Pointer to a rectangle: jq≠Nil)

Each element (cell) of the list Q of individual rectangles has the following data.

Name (or identification number): idq

Position and size of rectangle ("position information"): $((x_0, x_1), (y_0, y_1))$ When the SM 12 represents a set of inscribed rectangles with such a data structure, each element of the list structure T in the first level points to one inscribed rectangle. The list structure W in the second level for a work storage is a blank list that has no elements. The SM 12 can receive input instructions (for example, addition of a space, layout of an "object", and report on a blank space).

At this point, it is assumed that the generation order numbers gen of the list structure T in the first level have been sorted as 1, 2, . . , n. In addition, it is assumed that the number of current rectangles nsub in the second level is cleared to 0.

Figure 58:
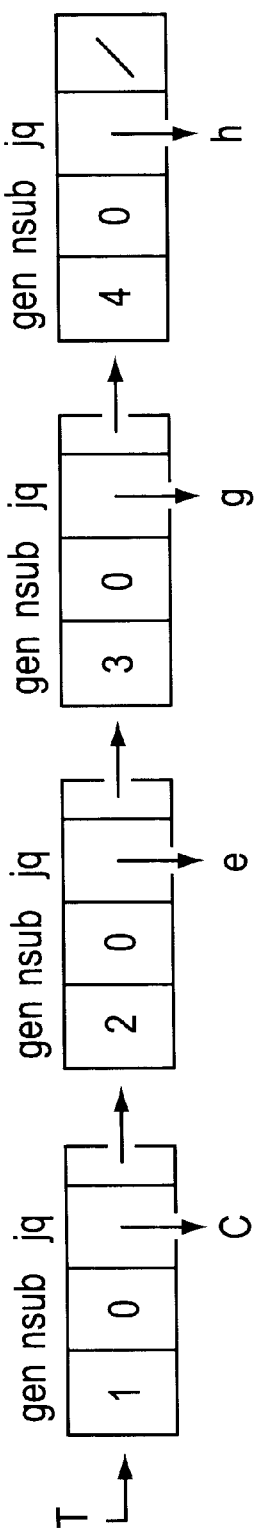
FIG. 58 is a schematic diagram showing the first list structure pointing to rectangles in the first level.
Figure 59:
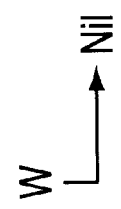
FIG. 59 is a schematic diagram showing the second list structure pointing to rectangles in the second level.
Figure 60:
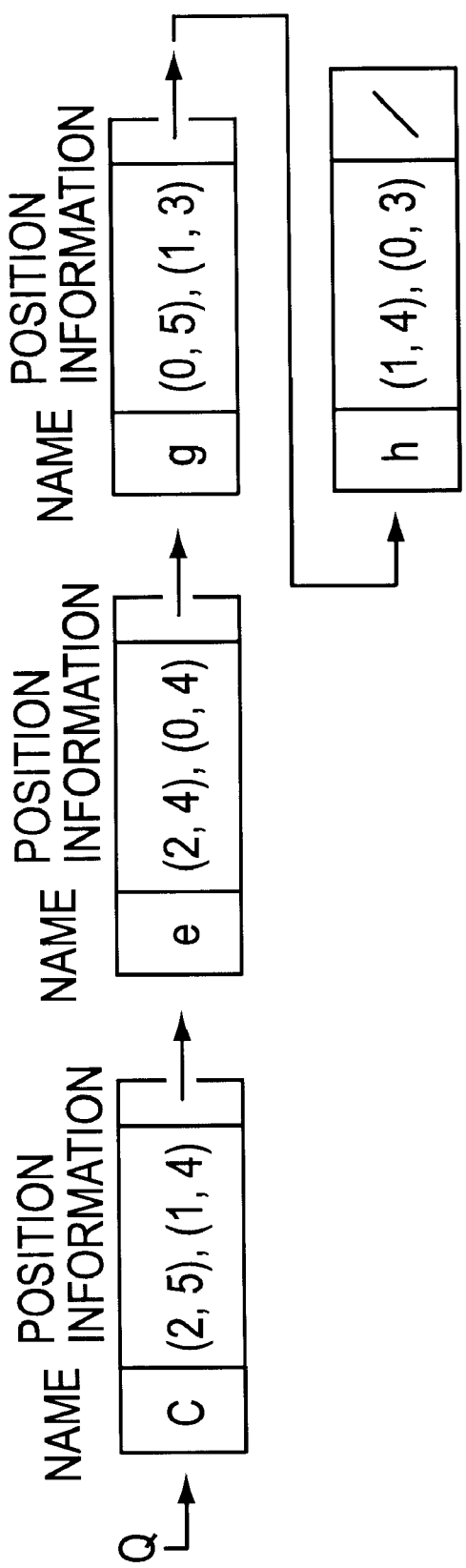
FIG. 60 is a schematic diagram showing the first list of data of individual rectangles.

As an example, in the case of a set of inscribed rectangles shown in FIG. 41, the list structure T in the first level is as shown in FIG. 58. The list structure W in the second level is Nil as shown in FIG. 59. The list Q of individual rectangles is as shown in FIG. 60.

Figure 61:
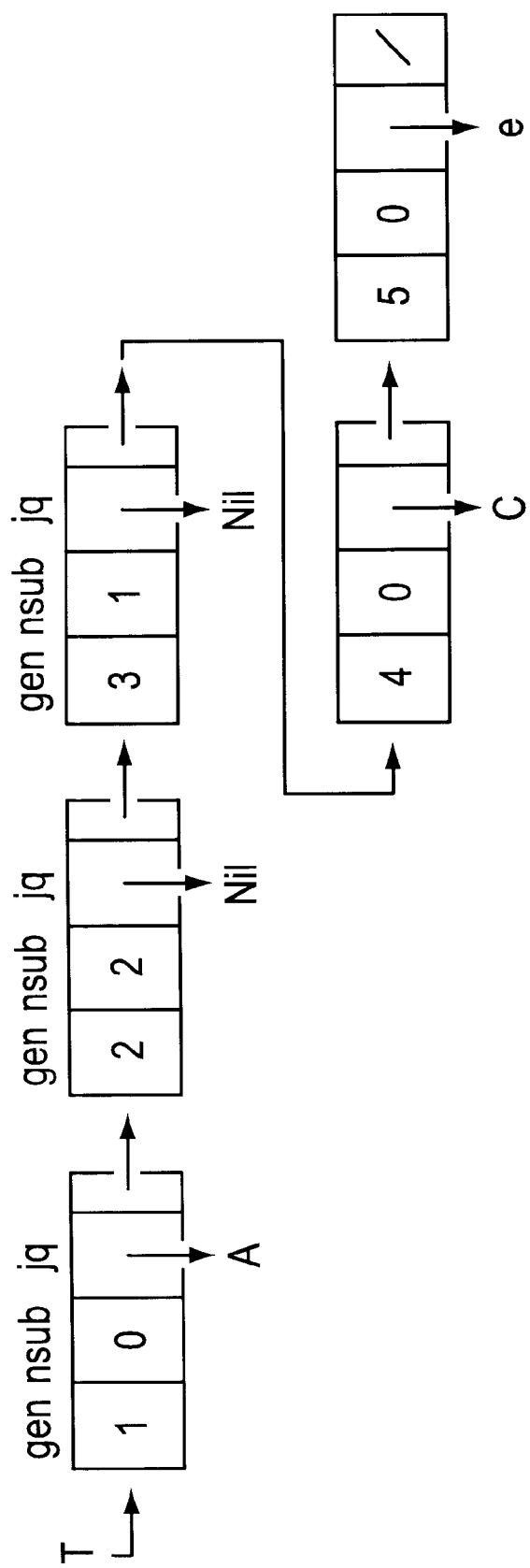
FIG. 61 is a schematic diagram showing the third list structure pointing to rectangles in the first level.
Figure 62:
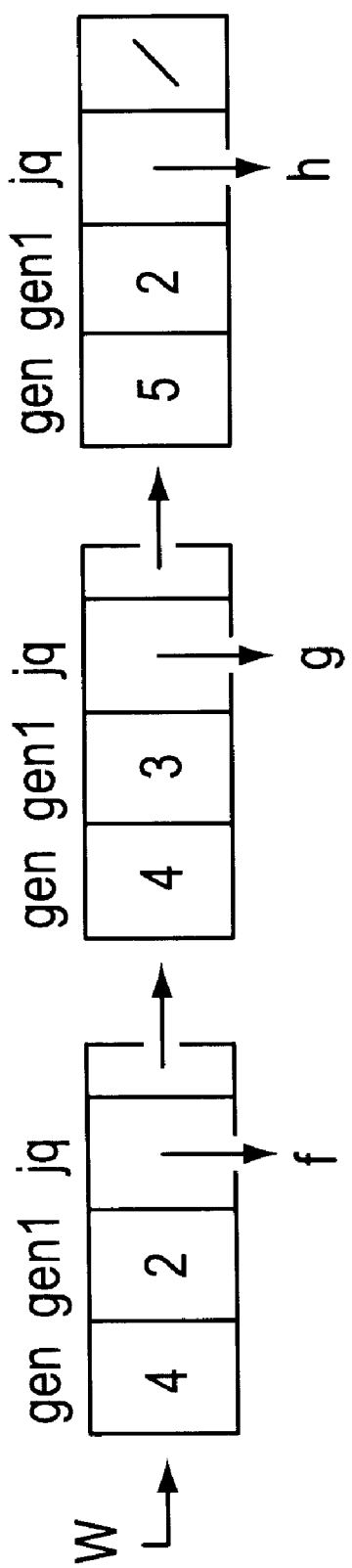
FIG. 62 is a schematic diagram showing the fourth list structure pointing to rectangles in the second level.
Figure 63:
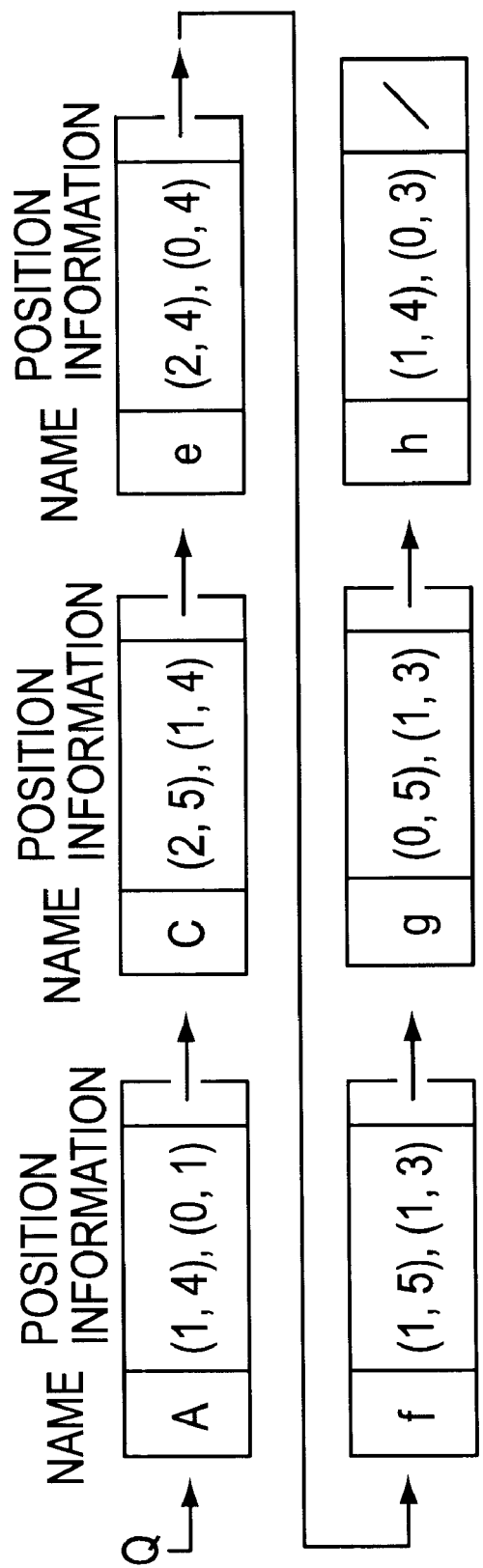
FIG. 63 is a schematic diagram showing the second list of data of individual rectangles.

In the intermediate stage of the calculation as shown in FIG. 37, the list structure T in the first level is as shown in FIG. 61. The list structure W in the second level is as shown in FIG. 62. The list Q of individual rectangles is as shown in FIG. 63.

(b) Outline of the Space Managing Process

In the initial state, it is assumed that the SM 12 represents one set of inscribed rectangles. In the initial state, there are the following cases.

In the case of "Nil": The list structure T in the first level is a blank list that has no elements.

In the case of one rectangle: The list structure T in the first level has only one element that represents one rectangle. The list structure W in the second level has no elements.

In the general case: The list structure T in the first level has a plurality of elements that represent respective inscribed rectangles. The list structure W in the second level has no elements.

For the initial state where there are n inscribed rectangles, when one rectangle B is input and added, the variable igen, which represents the current generation order number, is set to (n+1). The "sum" of each of the rectangles in the first level is successively calculated. The result is stored in the list structures T, W, and Q. The obtained result is "re-arranged" and converted into a set of inscribed rectangles. When one rectangle B is specified and subtracted from the set of inscribed rectangles, the variable igen, which represents the generation order number, is set to (n+1). The rectangle B is subtracted from each of the rectangles in the first level. The result is stored in the list structures T, W, and Q. The result is "re-arranged" and converted into a set of inscribed rectangles.

When one rectangle B is laid out as an "object" to a set of inscribed rectangles, it is checked whether or not one of rectangles in the first level includes the rectangle B. When the determined result is Yes, the process for subtracting the rectangle B is performed. When the determined result is No, a "layout rejection" is output.

The "re-arrangement"represents that each of rectangles in the second level obtained in the process of the calculations (namely, rectangles to be checked for interactions with other rectangles) is selected and calculated for interactions with other rectangles in the first level and other rectangles in the second level. However, such calculations are not necessary for some of the rectangles.

In the calculations for the interactions, rectangles in the first level may remain or may not. In the second level, one or more rectangles may be generated or may not. In the first level, rectangles may be added or may not. In the space managing process, by repeating the process for "raising"individual rectangles in the second level to the first level, a representation of a set of inscribed rectangles can be obtained again.

The process for "raising" one rectangle in the second level to the first level for the "re-arrangement" is similar to the process for obtaining the sum with a rectangle designated from the outside. The "raising" process is performed in the following manner.

One rectangle B in the second level is selected as an object to be raised. The current generation order number igen is incremented by 1. Next, the sum of the rectangle B and each of required rectangles in the first level and the second level is calculated. The result is stored in the list structures T, W, and Q. When the obtained result includes a rectangle in the second level, the "raising" process is performed again.

Based on the above-described processes, the internal space managing process will be described from the three view points of the process for interactions with rectangles in the first level, the process for interactions with rectangles in the second level, and the process for "raising" rectangles in the second level to the first level.

(c) Process for Interactions with Rectangles in the First Level

To interact one rectangle B with a rectangle (cell) A in the first level, the following calculation is performed correspondingly to the type of the interaction.

Addition of rectangle B: Calculation for "sum": A+B

Subtraction of rectangle B: Calculation for "difference": A−B

"Raising" rectangle B to the first level: Calculation for "sum": A+B

According to the calculated result, the following cases are examined and a relevant process is performed.

When a rectangle D (one or more rectangles) other than the rectangles A and B is generated, the rectangle D is treated as a rectangle in the second level. At this point, the number of rectangles to be added as rectangles in the second level is added to nsub in the cell A of the rectangle A and the generated rectangle D is added to the list structure Q of rectangles along with its position information. The current generation order number igen is set to the generation order number gen of the list structure W in the second level for each rectangle D. The generation order number A.gen in the cell A is set to the affiliation number genl. The pointer jq to the rectangle is set so that it points to the rectangle D in the list structure Q.

When the rectangle A is left, it is maintained in the first level. When the rectangle A is not left, a cell of the rectangle A is eliminated from the list structure Q of rectangles, and the pointer jq in the cell A of the list structure T in the first level is set to Nil. At this point, when nsub in the cell A is 0, the cell A is eliminated from the list structure T.

When the rectangle B is eliminated in the calculation for "sum," the value of the control flag LDELB is set to "1."

(d) Process for Interactions with Rectangles in the Second Level

When a rectangle B in the second level is "raised" to the first level, the interaction of the rectangle B with the rectangle C in the second level is examined. In this process, the "sum" of the rectangles C and B is calculated and then the following process is performed according to the result.

When a rectangle D (one or more rectangles) other than rectangles C and B is generated, the rectangle D is treated as a rectangle in the second level. At this point, when a cell in the first level, to which the rectangle C belongs, is a cell A (designated by genl of the rectangle C), the number of rectangles D that are newly generated is added to the number of current rectangles nsub of the cell A and the generated rectangles D are added to the list structure Q of rectangles.

Then, a cell in the list structure W in the second level is prepared for each of the generated rectangles. The current generation order number igen is set to the generation order number gen in the cell so that the affiliation number genl accords with the affiliation number of the rectangle C. The pointer jq to a rectangle is set so that it points to the rectangle D in the structure list Q of rectangles.

When the rectangle C is left, it is maintained in the second level. When the rectangle C is not left, the rectangle C is removed from the list structure Q of rectangles and the list structure W in the second level. The number of current rectangles nsub in the cell A in the first level indicated by the affiliation number genl of the rectangle C is decremented by 1. At this point, if nsub=0 and A.jq=Nil, the cell A is eliminated from the list structure T in the first level.

When the rectangle B is eliminated in a calculation for "sum," the value of the flag LDELB is set to "1."

(e) Process for "Raising" a Rectangle in the Second Level to the First Level

In the "re-arranging" process, one rectangle B in the list structure W of rectangles in the second level is raised to the first level and interacted with each of rectangles in the second level and rectangles in the first level. These process are performed in the following manner. The oldest rectangle B is selected from the list structure W in the second level. In reality, a rectangle with the minimum generation order number gen and the minimum affiliation number genl is selected as the rectangle B to be raised to the first level from the list structure W. If the list structure W is Nil, the "re-arranging" process is completed.

Next, the current generation order number igen is incremented by 1 and the flag LDELB is set to "0." The selected rectangle (cell) B in the second level is treated as a work rectangle (cell) B for a raising operation.

At this point, the cell B of the rectangle B in the list structure W in the second level is copied to the work cell B and then eliminated from the list structure W. Next, a cell AB in the list structure T in the first level corresponding to the affiliation number genl of the rectangle B is obtained. The number of current rectangles nsub in the cell AB is decremented by 1. At this point, if nsub=0 and pointer jq=Nil, the cell AB is eliminated from the list structure T in the first level.

The selected rectangle B is interacted with the following rectangles. First, the rectangle AB in the first level to which the rectangle B belongs is excluded from the rectangles A of the list structure T in the first level. Then, all rectangles with the older generation order number A.gen than the generation order number B.gen of the rectangle B are interacted as the first level objects with the selected rectangle B.

Second, rectangles with the same generation order number gen as the rectangle B and with the same affiliation number genl as the rectangle B are excluded from the rectangles C in the list structure W in the second level. Then, rectangles with the newer generation order number gen than the rectangle B are excluded. The remaining rectangles are interacted as the second level objects with the selected rectangle B.

The order of the interactions of the rectangle B with these rectangles does not affect the final result. Thus, the following order can be used. The selected rectangle B is interacted with rectangles in the first level in the order of their generation. Thereafter, the selected rectangle B is interacted with rectangles in the second level in the order of their generation. The processes to be performed are the same as those in (c) and (d) described above.

Whenever the selected rectangle B is interacted with each rectangle, the value of the flag LDELB is checked. When LDELB=1, which means that the rectangle B is eliminated in the interaction with the corresponding rectangle, the rectangle B is eliminated from the list structure Q of rectangles. In this case, the "raising" process of the rectangle B is terminated. After the selected rectangle B is interacted with each of all the rectangles, if LDELB=0, the rectangle B is added to the list structure T in the first level. At this point, a new cell is added to the list structure T in the first level. As its generation order number gen, the current generation order number igen is set. The number of current rectangles nsub is set to "0." The pointer jq to a rectangle is set so that it points to the rectangle B. Thus, the "raising" process for the rectangle B is completed.

Next, with reference to FIGS. 64 to 73, the flow of the process of the SM 12 will be described. In the above-described data structures, when a newly generated rectangle is added to the list structures T and W, as a rule, if it is added to the last of the list, the process may be simplified. In this example, with such a rule being applied, part of the process for judging the generation order is simplified.

Figure 64:
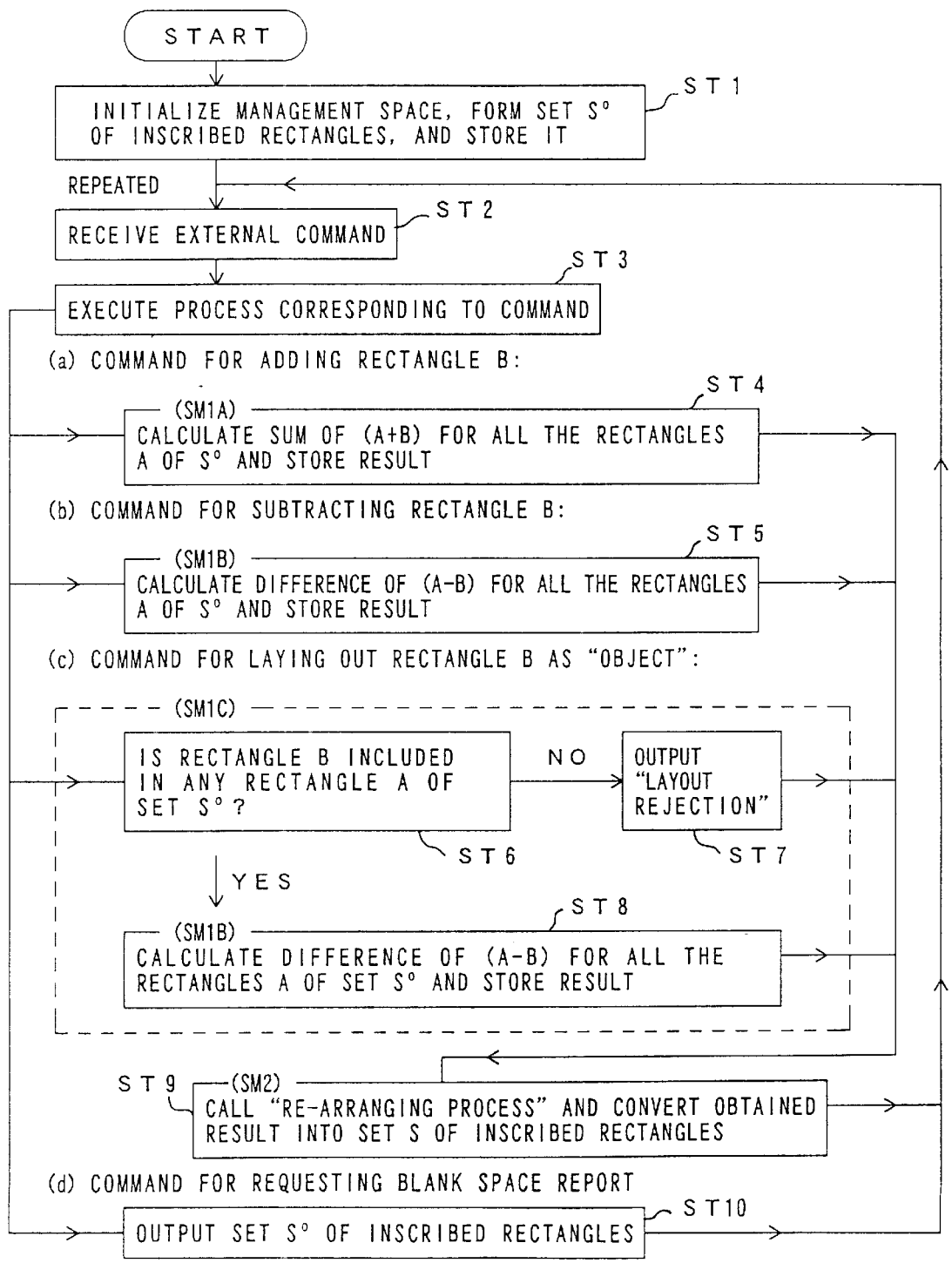
FIG. 64 is a flowchart showing a process of a space managing unit.

FIG. 64 is a flowchart showing an outline of a process performed by the SM 12. When the process is started, the SM 12 initializes a management space, forms a set of inscribed rectangles $S^o$ in the initial state, and stores it (at step ST1). The SM 12 receives an external command (at step ST2) and executes a process corresponding to the received command (at step ST3).

When a command for adding a rectangle B is received, a process SM1A calculates the sum of (A+B) for each rectangle A of all inscribed rectangles of the set $S^o$ and stores the result (at step ST4). When a command for subtracting a rectangle B is received, a process SM1B calculates the difference of (A−B) for each of all inscribed rectangles of the set $S^o$ and stores the result (at step ST5).

When a command for laying out a rectangle B as an "object" is received, a process SM1C determines whether or not any inscribed rectangle A of the set $S^o$ includes a rectangle B (at step ST6). When the determined result is No, the process SM1C outputs a "layout rejection" (at step ST7). When the determined result is Yes, the process SM1C calculates the difference of (A−B) for each of all the inscribed rectangles of the set $S^o$ and stores the result (at step ST8).

After steps ST4, ST5, S17, and ST8, a process SM2 of the SM 12 calls a "re-arranging" process and converts the obtained result into a set S of inscribed rectangles (at step ST9). The SM 12 repeats the process at and after step ST2 with the set S instead of the set $S^o$.

When a command for requesting a blank space report is received, the SM 12 outputs the information of the set $S^o$ of inscribed rectangles (at step ST10) and repeats the process at and after step ST2.

Figure 65:
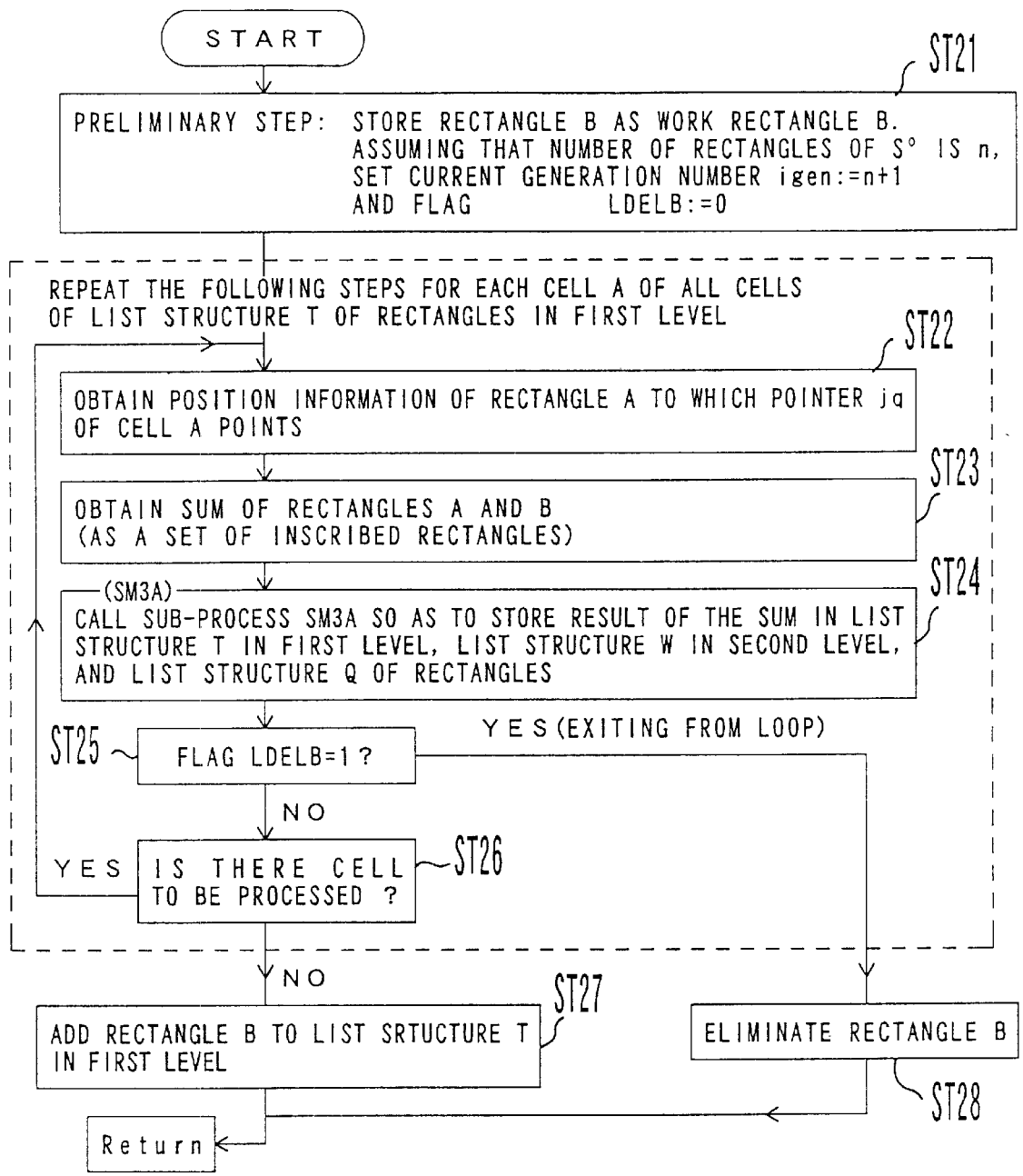
FIG. 65 is a flowchart showing a process for calculating the sum of rectangles.

FIG. 65 is a flowchart showing the rectangle adding process SM1A performed at step ST4 shown in FIG. 64. When the process is started, the SM 12 stores a rectangle B as a work rectangle B at the preliminary step. Assuming that the number of rectangles in the set $S^o$ is n, the SM 12 sets igen=n+1 and LDELB=0 (at step ST21). Thereafter, the SM 12 performs the process from step ST22 to step ST26 for all cells of the list structure T in the first level.

Assuming that one of the cells of the list structure T is a cell A, the SM 12 obtains the position information of the rectangle A to which the pointer jq in the cell A points (at step ST22). The SM 12 obtains the sum of the rectangles A and B as a set of inscribed rectangles (at step ST23). Next, a sub-process SM3A of the SM 12 stores the calculated result of the sum as the list structures T, W, and Q (at step ST24).

Next, the SM 12 determines whether or not the value of the flag LDELB is 1 (at step ST25). When the determined result is No, the SM 12 determines whether or not there is a cell of a rectangle to which the rectangle B is added (at step ST26). When the determined result at step ST26 is Yes, the SM 12 treats the cell as the cell A and repeats the process at and after step ST22. When the SM 12 has performed the process for all the cells, the SM 12 adds a cell of the rectangle B to the list structure T (at step ST27) and returns to the process shown in FIG. 64.

When the determined result at step ST25 is Yes, the flow advances to step ST28. At step ST28, the SM 12 eliminates the rectangle B and returns to the process shown in FIG. 64. The content of the sub-process SM3A will be described later.

Figure 66:
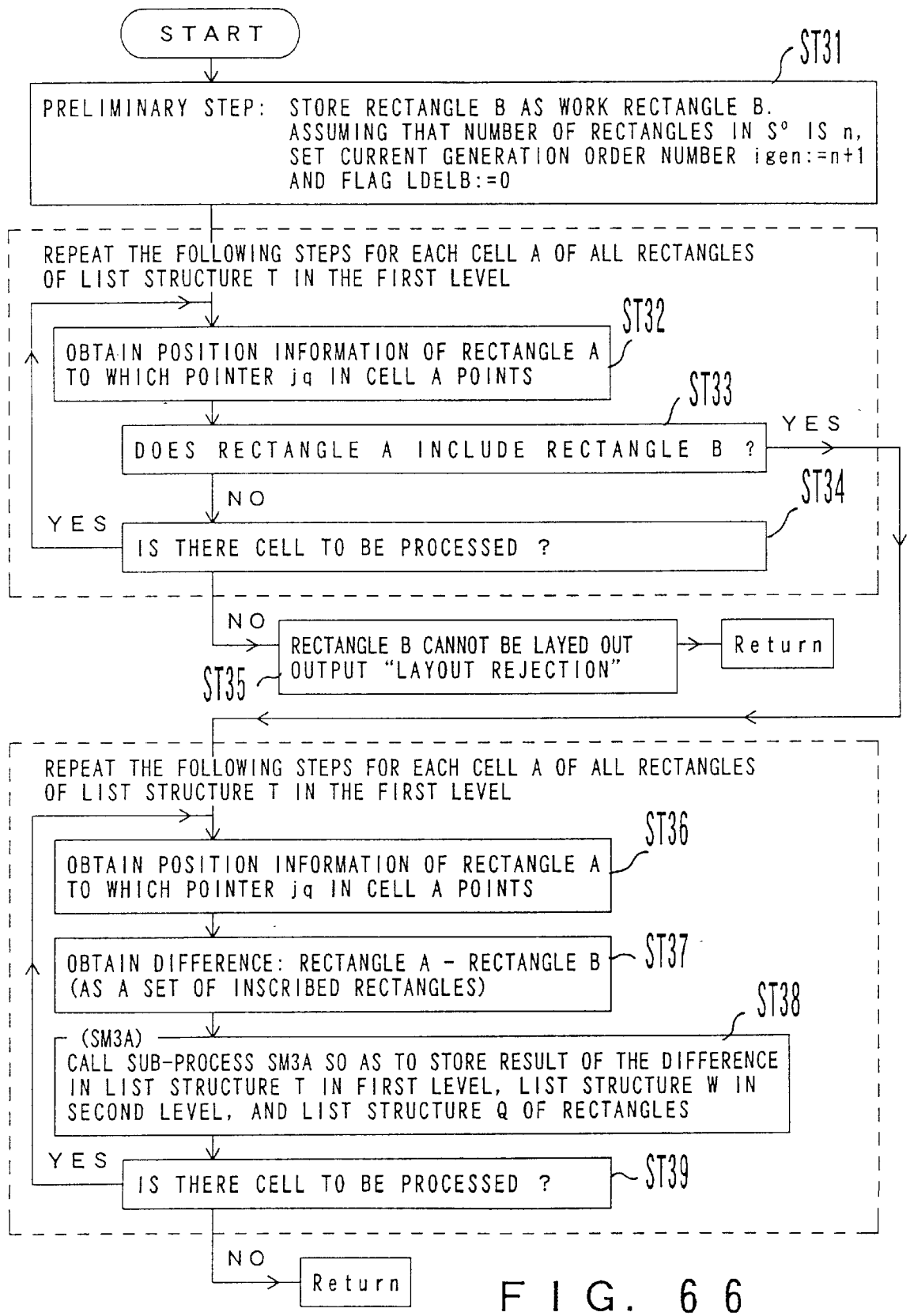
FIG. 66 is a flowchart showing a rectangle layout process.

FIG. 66 is a flowchart showing the layout process SM1C for laying out a rectangle as an "object" at steps ST6, ST7, and ST8 shown in FIG. 64. When the process is started, the SM 12 stores a rectangle B as a work rectangle B as a preliminary step. Assuming that the number of rectangles of the set $S^o$ is n, the sub-process SM1C sets igen=n+1 and LDELB=0 (at step ST31). The sub-process SM1C repeats the process from steps ST32 to ST34 for all cells of the list structure T in the first level.

Assuming that one of the cells of the list structure T is a cell A, the SM 12 obtains the position information of the rectangle A to which the pointer jq in the cell A points (at step ST32) and determines whether or not the rectangle A includes the rectangle B (at step ST33). The state of that the rectangle A includes the rectangle B means that the rectangle B is included in the rectangle A.

When the determined result at step ST33 is No, the SM 12 determines whether or not there is another cell in the list structure T (at step ST34). When the determined result at step ST34 is Yes, the SM 12 treats the cell as the cell A and repeats the process at and after step ST32. When all the rectangles cannot include the rectangle B, the SM 12 outputs a "layout rejection" (at step ST35) and returns to the routine shown in FIG. 64.

When the determined result at step ST33 is Yes, the SM 12 repeats the process from step ST36 to step ST39 for all the cells of the list structure T.

The SM 12 treats one of the cells of the list structure T as a cell A and obtains the position information of the rectangle A to which the pointer jq in the cell A points (at step ST36). The SM 12 obtains the subtraction result in which the rectangle B is subtracted from the rectangle A as a set of inscribed rectangles (at step ST37). Next, a sub-process SM3A of the SM 12 stores the calculated result of the difference as list structures T, W, and Q (at step ST38).

Next, the SM 12 determines whether or not there is a cell of a rectangle from which the rectangle B is to be subtracted (at step ST39). When the determined result at step ST39 is Yes, the SM 12 treats the cell as the cell A and repeats the process at and after step ST36. When the SM 12 has performed the calculations for all the cells, the flow returns to the routine shown in FIG. 64.

The content of the subtracting process SM1B for the rectangles performed at step ST5 shown in FIG. 64 is basically the same as the process from steps ST36 to ST39 shown in FIG. 66.

Figure 67:
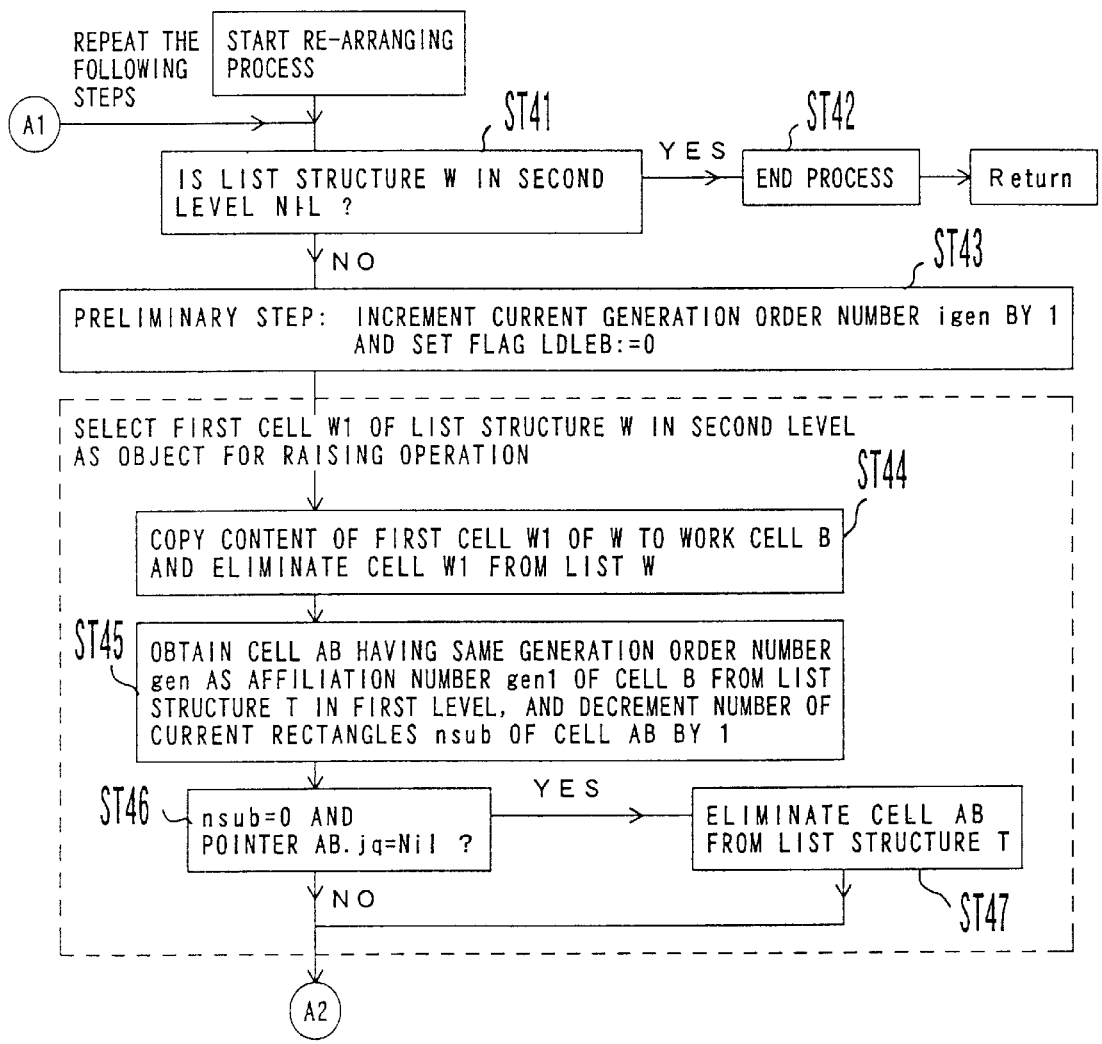
FIG. 67 is a flowchart (No. 1) showing a rearranging process.
Figure 69:
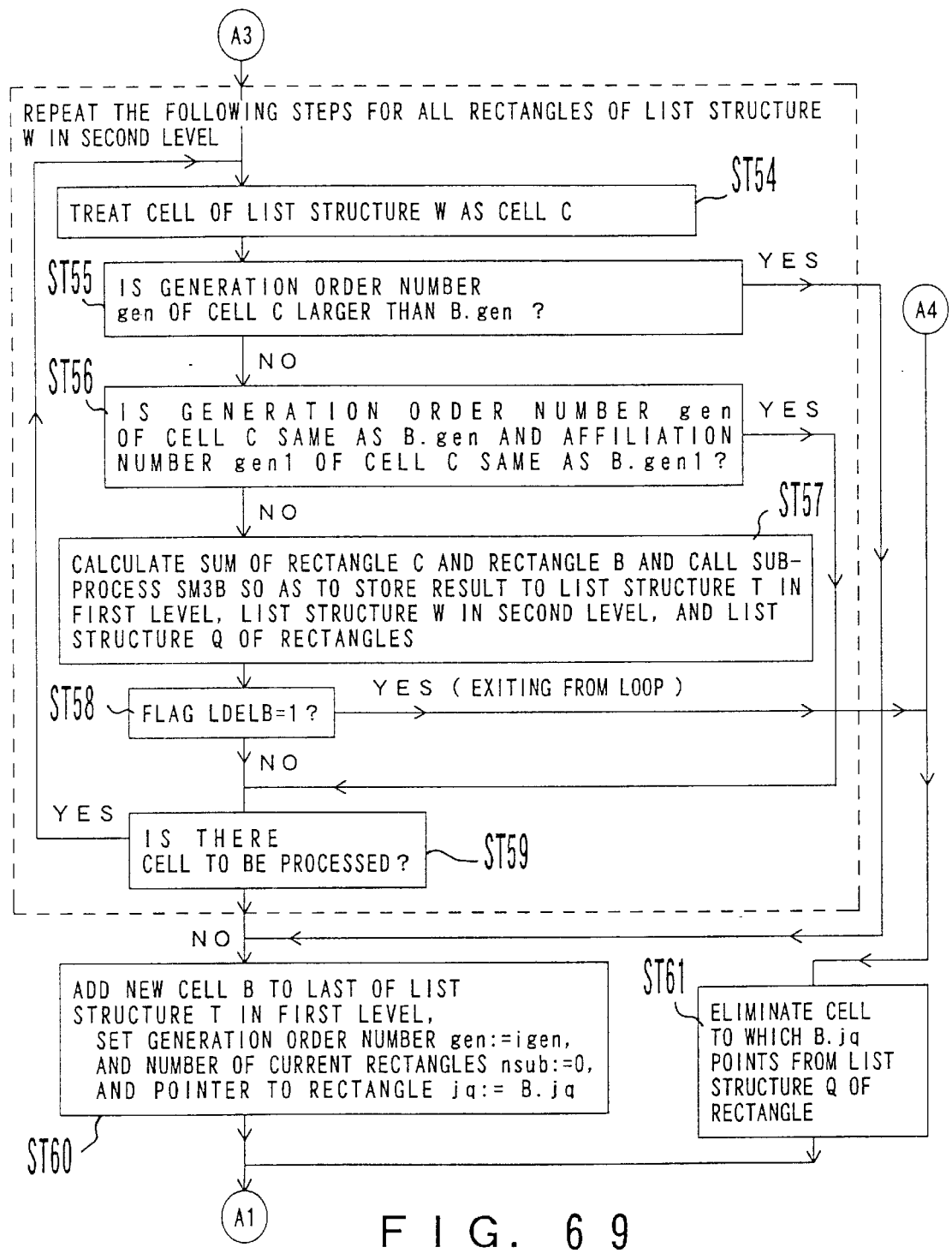
FIG. 69 is a flowchart (No. 3) showing a rearranging process.

FIGS. 67, 68, and 69 are flowcharts showing the re-arranging process SM2 performed at step ST9 shown in FIG. 64. When the process is started, the SM 12 determines whether or not the list structure W in the second level is Nil (at step ST41 shown in FIG. 67).

When the determined result is No, the SM 12 increments igen by 1 and set LDELB=0 as a preliminary step (at step ST43). The SM 12 treats the first cell of the list structure W in the second level as a cell Wl and selects it as an object for a raising operation. The SM 12 selects the object in the following manner.

The SM 12 copies the content of the cell WI to a work cell B and eliminates the cell WI from the list structure W (at step ST44). Next, the SM 12 obtains the cell AB which has the generation order number gen same as the affiliation number genl of the cell B from the list structure T and decrements nsub of the cell AB by 1 (at step ST45).

The SM 12 determines whether or not nsub=0 and AB.jq= Nil for the cell AB (at step ST46). When the determined result at step ST46 is Yes, the SM 12 eliminates the cell AB from the list structure T (at step ST47). Thereafter, the SM 12 repeats the process from step ST48 to ST53 shown in FIG. 68 for all cells of the list structure T and calculates interactions.

The SM 12 treats one of the cells of the list structure T as a cell A (at step ST48 shown in FIG. 68) and determines whether gen of the cell A is larger than gen of the cell B (at step ST49). When the determined result at step ST 49 is No, the SM 12 determines whether or not gen of the cell A is the same as gen of the cell B (at step ST50).

When the determined result at step ST50 is No, the SM 12 obtains the sum of the rectangle A corresponding to the cell A and the rectangle B corresponding to the cell B and causes a sub-process SM3A to store the calculated result of the sum to the list structures T, W, and Q (at step ST51).

Next, the SM 12 determines whether or not the value of the flag LDELB is 1 (at step ST52). When the determined result at step ST52 is No, the SM 12 determines whether there is a cell of a rectangle to be interacted with the rectangle B in the list structure T in the first level (at step ST53). When the determined result at step ST53 is Yes, the SM 12 treats the cell as the cell A and repeats the process at and after step ST48. When the determined result at step ST50 is yes, the SM 12 performs the process at and after step ST53.

When the determined result at step ST53 is No and when the determined result at step ST49 is Yes, the SM 12 repeats the process from steps ST54 to ST59 shown in FIG. 69 for all the cells of the list structure W so as to calculate interactions.

The SM 12 treats one of the cells of the list structure W as a cell C (at step ST54 shown in FIG. 69) and determines whether or not gen of the cell C is larger than gen of the cell B (at step ST55). When the determined result at step ST55 is No, the SM 12 determines whether or not gen of the cell C is the same as gen of the cell B and gen1 of the cell C is the same as gen1 of the cell B (at step ST56).

When the determined result at step ST56 is No, the SM 12 calculates the sum of the rectangle C and the rectangle B and causes a sub-process SM3B to store the result to the list structures T, W, and Q (at step ST57). The content of the sub-process SM3B will be described later.

Next, the SM 12 determines whether or not the value of the flag LDELB is 1 (at step ST58). When the determined result at step ST58 is NO, the SM 12 determines whether or not there is a cell of a rectangle to be interacted with the rectangle B (at step ST59). When the determined result at step ST59 is Yes, the SM 12 treats the cell as the cell C and repeats the process at and after step ST54. When the determined result at step ST56 is Yes, the SM 12 performs the process at and after step ST59.

When the determined result at step ST59 is No and when the determined result at step ST55 is Yes, the SM 12 adds a new cell of the rectangle B at the last of the list structure T and sets gen=igen, nsub=0, and jq=B.jq (at step ST60). Next the SM 12 repeats the process at and after step ST41.

When the determined result at step ST52 is Yes, and when the determined result at step ST58 is Yes, the SM 12 stops calculating the interactions and eliminates the cell to which the pointer B.jq of the cell B points from the list structure Q of rectangles (at step ST61). Next, the SM 12 repeats the process at and after step ST41.

When the list structure W is Nil at step ST41, the SM 12 performs an end process (at step ST42) and returns to the process shown in FIG. 64. In the end process, the SM 12 re-sorts the generation order number gen of each cell of the list structure T in the ascending order 1, 2, . . . and sets the number of cells of the list structure T to the variable n.

Figure 70:
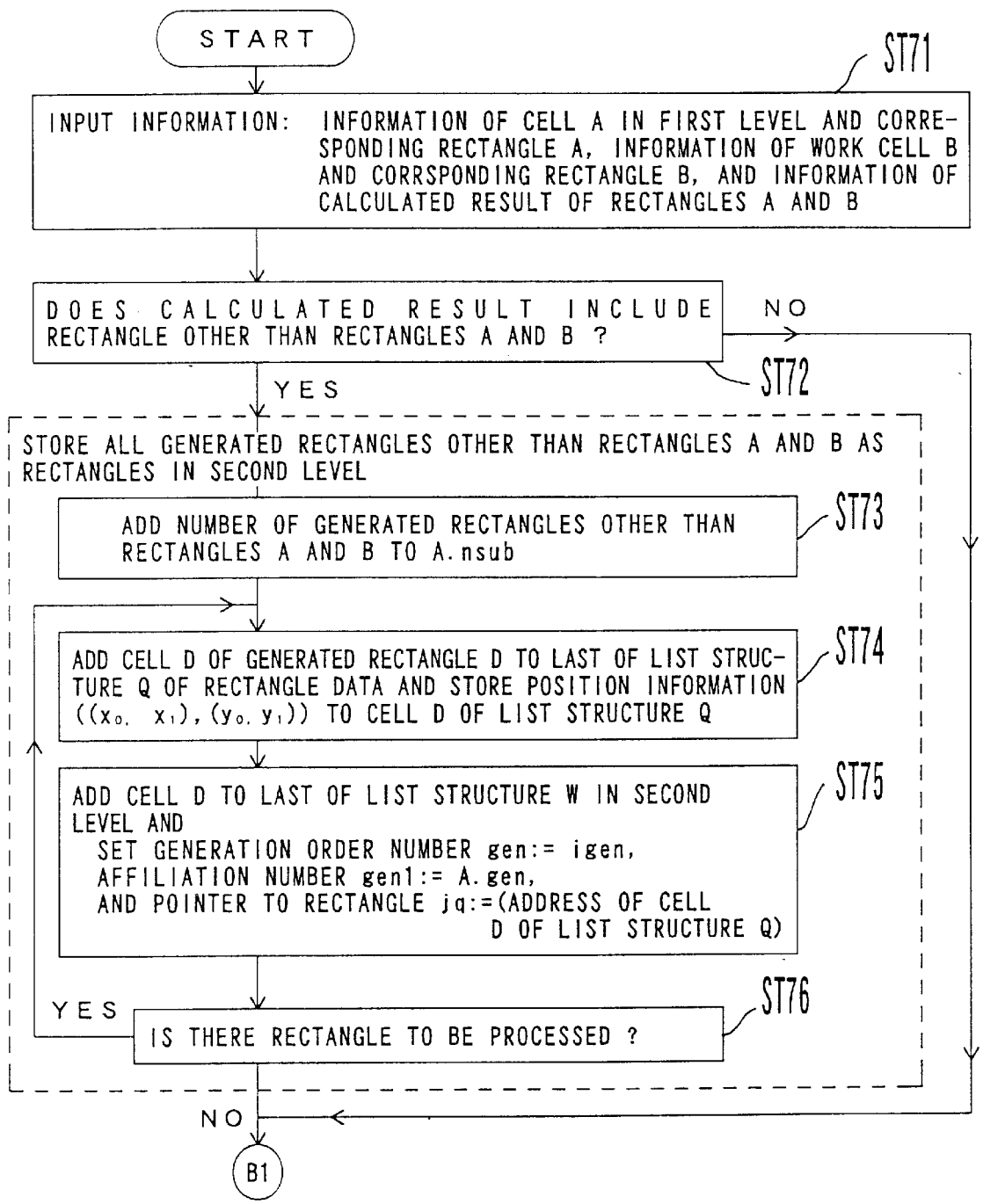
FIG. 70 is a flowchart (No. 1) showing the first calculated result storing process.
Figure 71:
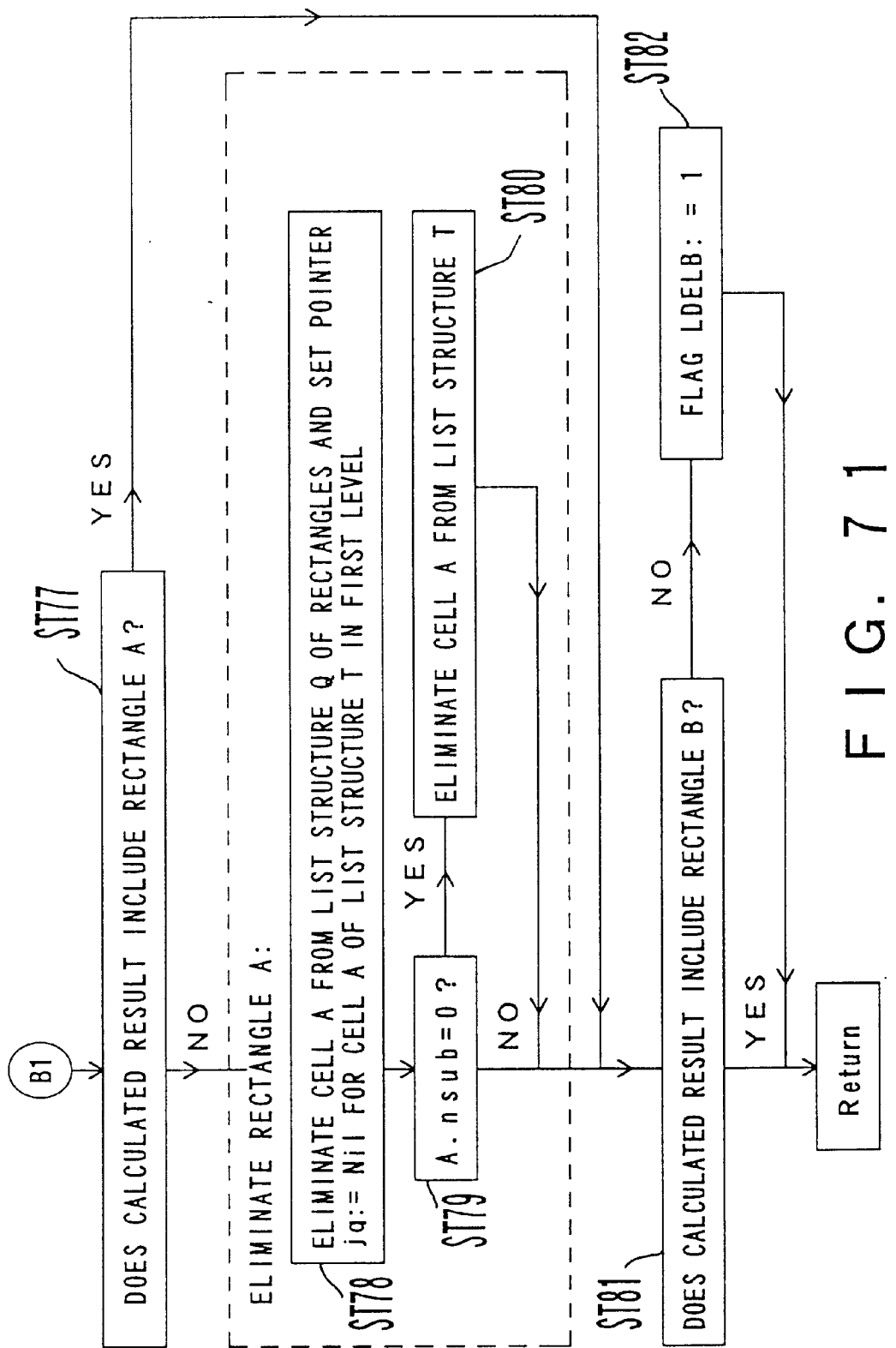
FIG. 71 is a flowchart (No. 2) showing the first calculated result storing process.

FIGS. 70 and 71 are flowcharts showing the calculated result storing process SM3A called at step ST24 shown in FIG. 65, step ST38 shown in FIG. 66, and step ST51 shown in FIG. 68. When the process is started, the SM 12 receives information of a cell A in the first level, information of a rectangle A corresponding to the cell A, information of a work cell B, information of a rectangle B corresponding to the cell B, and information of the calculated result of the rectangles A and B (at step ST71 shown in FIG. 70).

Next, the SM 12 determines whether or not the calculated result includes any rectangle other than the rectangles A and B (at step ST72). When the determined result at step ST72 is Yes, the SM 12 performs the process from steps ST73 to ST76 and stores the rectangle as a rectangle in the second level.

The SM 12 adds the number of generated rectangles other than the rectangle A and B to A.nsub (at step ST73), treats one of the rectangles as a rectangle D, and adds a cell D of the rectangle D to the last of the list structure Q (at step S174). At this point, the SM 12 stores the position information $((x_0, x_1), (y_0, y_1))$ of the rectangle D in the cell D added to the list structure Q.

Next, the SM 12 adds a cell D to the last of the list structure W and sets gen=igen, gen1=A.gen, and jq=address of the cell D of the list structure Q (at step ST75). Thereafter, the SM 12 determines whether or not there is another rectangle other than the rectangles A and B (at step ST76). When the determined result at step ST76 is Yes, the SM 12 treats the rectangle as the rectangle D and repeats the process at and after step ST74.

When the determined result at step ST76 is No and when the determined result at step ST72 is No, the ST 12 determines whether or not the calculated result includes a rectangle A (at step ST77 shown in FIG. 71). When the determined result at step ST77 is No, the SM 12 performs the process from step ST78 to step ST80 and eliminates the information of the rectangle A.

First, the SM 12 eliminates the rectangle A from the list structure Q and sets jq in the cell A of the list structure T to Nil (at step ST78). The SM 12 determines whether or not the value of nsub of the cell A is 0 (at step ST79). When the determined result at step ST79 is Yes, the SM 12 eliminates the cell A from the list structure T (at step ST80).

Next, the SM 12 determines whether or not the calculated result includes the rectangle B (at step ST81). When the determined result at step ST77 is Yes and when the determined result at step ST79 is No, the SM 12 performs the process at and after step ST81.

When the determined result at step ST81 is Yes, the SM 12 returns to the main routine that has called the sub-process SM3A. When the determined result at step ST81 is No, the SM 12 sets LDELB=1 (at step ST82) and returns to the main routine.

Figure 72:
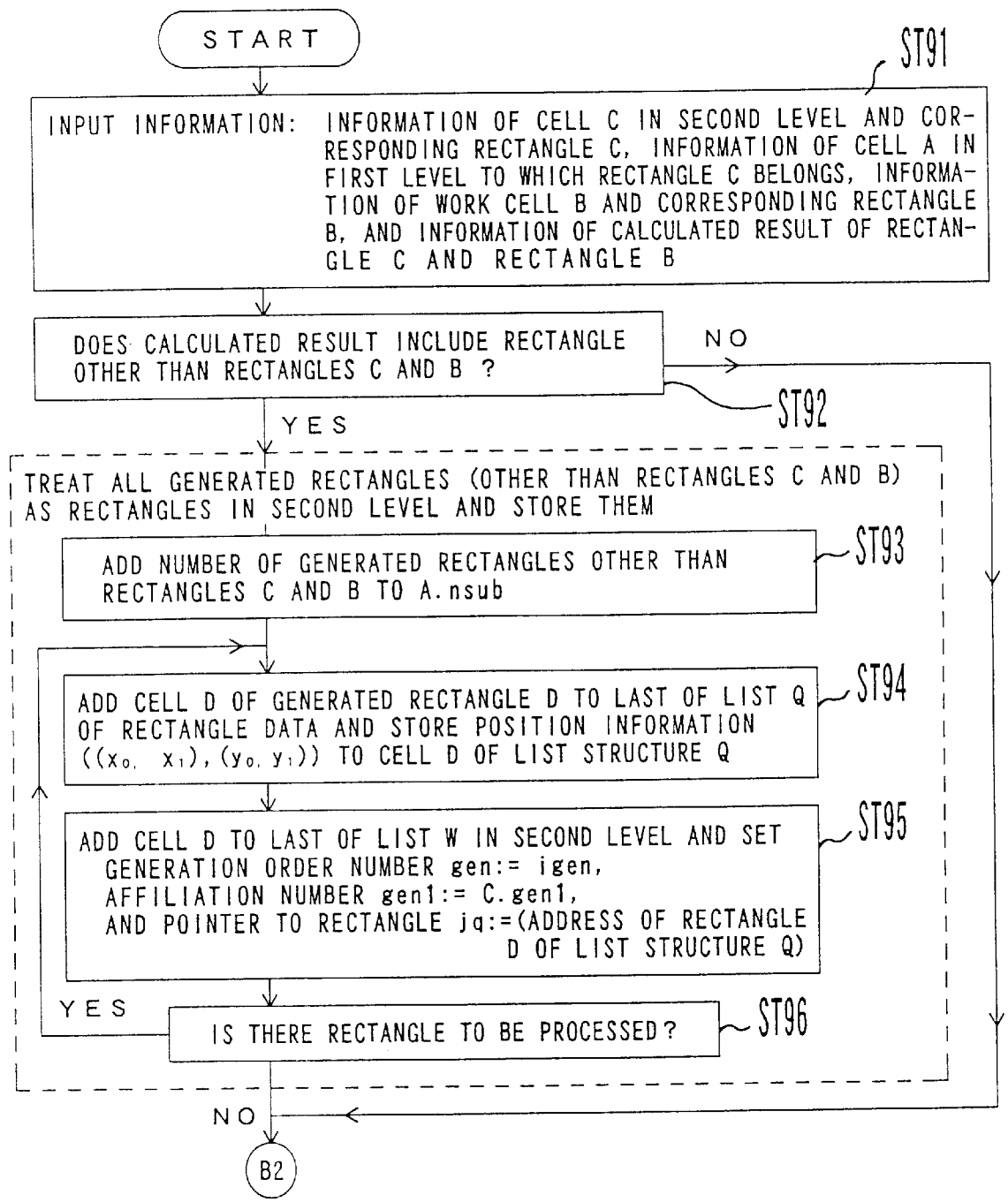
FIG. 72 is a flowchart (No. 1) showing the second calculated result storing process.
Figure 73:
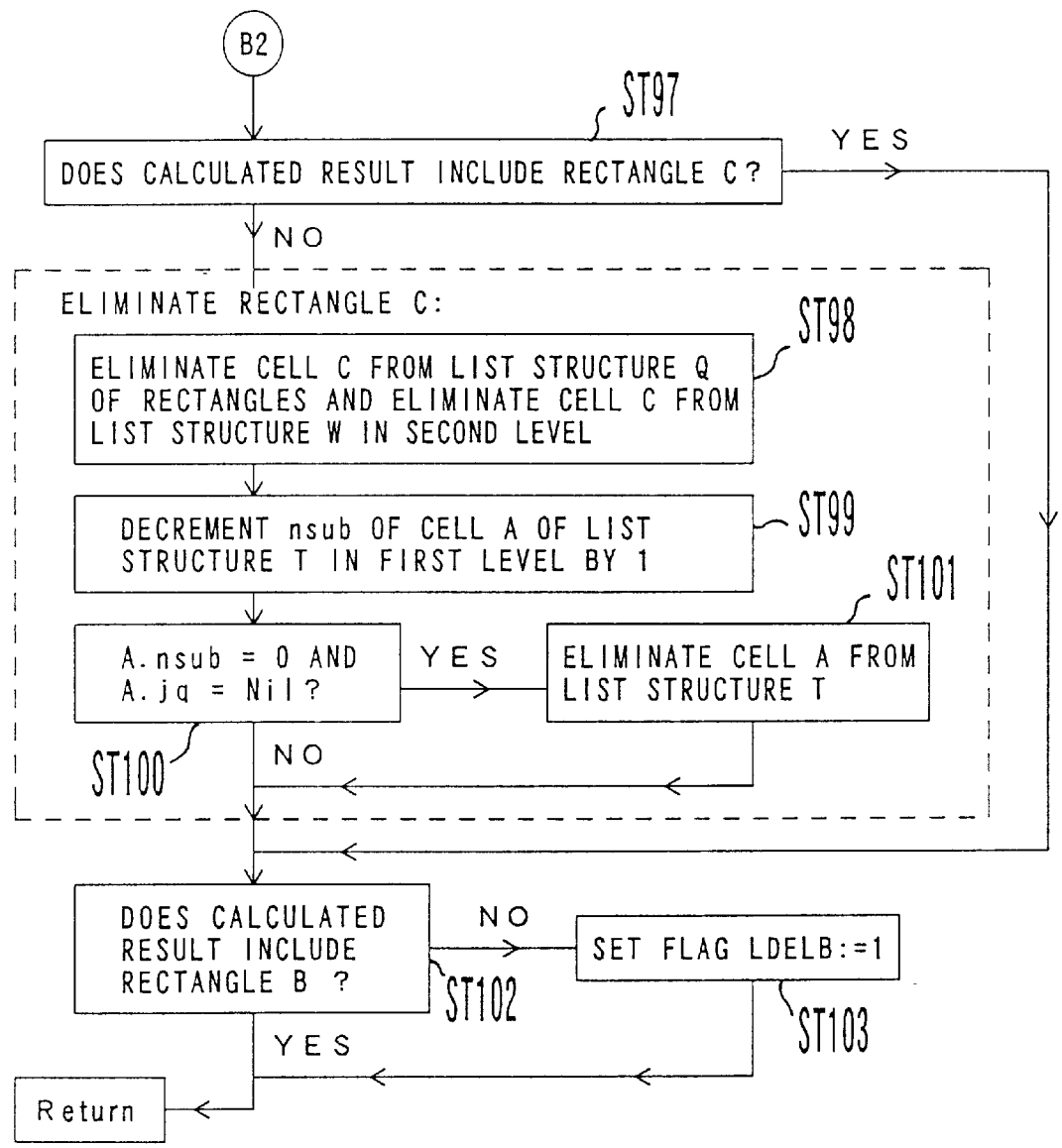
FIG. 73 is a flowchart (No. 2) showing the second calculated result storing process.

FIGS. 72 and 73 are flowcharts showing a calculated result storing process SM3B called at step ST57 shown in FIG. 69. When the process is started, the SM 12 receives information of a cell C in the second level, information of a rectangle C corresponding to the cell C, information of a cell A in the first level to which the rectangle C belongs, information of a work cell B, information of a rectangle B corresponding to the cell B, and information of the calculated result of the rectangle C and the rectangle B (at step ST91 shown in FIG. 72) .

Next, the SM 12 determines whether or not the calculated result includes any rectangle other than the rectangles C and B (at step ST92). When the determined result at step ST92 is Yes, the SM 12 performs the process from step ST93 to step ST96 and stores all the rectangles (other than B and C) as rectangles in the second level.

The SM 12 adds the number of rectangles other than the rectangles C and B to A.nsub (at step ST93). Then the SM 12 adds a cell of one of the rectangles as a cell D of a rectangle D to the last of the list structure Q (at step ST94). At this point, the SM 12 stores the position information (($x_0$, $x_1$), ($y_0$, $y_1$)) of the rectangle D to the cell D added to the list structure Q.

Next, the SM 12 adds a cell D of the rectangle D to the last of the list structure W and sets gen=igen, gen1=C.gen1, and jq=address of the cell D of the list structure Q (at step ST95). Next, the SM 12 determines whether or not the calculated result includes any rectangle other than the rectangles C and B (at step ST96). When the determined result at step ST96 is Yes, the SM 12 treats the rectangle as the rectangle D and repeats the process at and after step ST94.

When the determined result at step ST96 is No and when the determined result at step ST92 is No, the SM 12 determines whether or not the calculated result includes a rectangle C (at step ST97 shown in FIG. 73). When the determined result at step ST97 is No, the SM 12 performs the process from step ST98 to step ST101 and eliminates the information of the rectangle C.

First, the SM 12 eliminates the cell C from the list structure Q and eliminates the cell C from the list structure W (at step ST98). Next, the SM 12 decrements the value of nsub of the cell A of the list structure T by 1 (at step ST99). Thereafter, the SM 12 determines whether or not nsub=0 and A.jq=Nil for the cell A (at step ST100).

When the determined result at step ST100 is Yes, the SM 12 eliminates the cell A from the list structure T (at step ST101). Next, the SM 12 determines whether or not the calculated result includes the rectangle B (at step ST102). When the determined result at step ST97 is Yes and when the determined result at step ST100 is No, the SM 12 performs the process at and after step ST102.

When the determined result at step ST102 is Yes, the SM 12 returns to the routine that has called the sub-process SM3B. When the determined result at step ST102 is No, the SM 12 sets LDELB=1 (at step ST103) and returns to the routine.

In the above-described process, the space managing process is performed with a set of inscribed rectangles. Next, the basics, inventive points and the variation of the space managing process of the SM 12 will be additionally explained.

The theoretical basis of which a set of inscribed rectangles are determined in the above-described process without an endless loop in the "re-arranging" process is in that the set of inscribed rectangles is unique with respect to a given closed figure and includes rectangles corresponding to local maxima.

In the "re-arranging" process, the sum of a "raised" rectangle and each of other rectangles is repeatedly calculated. Thus, various intermediate rectangles gradually become larger. Thus, "a set of inscribed rectangles" is obtained as a set of rectangles with a maximum size.

The fact that only unidirectional calculations for "sum" are performed is the theoretical basis of which the "re-arranging" process is always completed. This theoretical basis can be explained with Church-Rosser's theory.

According to Church-Rosser's theory, as long as only calculations for "sum" are performed until the result does not change "a set of inscribed rectangles" obtained as a final result is not affected by a rectangle used in the "re-arranging" process.

However, it is possible to form a loop with unsuitable calculations rather than suitable calculations. In a normal case rather than such an extreme case, unnecessary calculations adversely affect the process speed. To prevent that, in the "re-arranging" process, it is important to use a suitable rectangle as a work rectangle and perform calculations for "sum" with other rectangles in a suitable order so as to form a required algorithm.

In the method of the process according to the embodiment, various intermediate rectangles are categorized as rectangles in the first level and rectangles in the second level. The generation order of these rectangles is strictly managed.

Each of rectangles in the first level was an element of "a set of inscribed rectangles" in the preceding stage. When a command for adding or subtracting a rectangle is input to the SM 12, it treats all intermediate rectangles that are newly generated as rectangles in the second level. The SM 12 calculates the sum of each of the intermediate rectangles with each of the other rectangles, checks the results, and performs the "raising" process to the first level.

In this process, some rectangles in the first level may generate another larger rectangle which include the original rectangle. Thus, they may be eliminated from the first level. By repeating the process, rectangles in the second level are lost. When a set of rectangles only in the first level is obtained, it becomes "a set of inscribed rectangles."

In the embodiment, the SM 12 manages the generation order of rectangles so as to perform calculations for "sum" in the "re-arranging" process and thereby determines whether or not it is needed to verify interactions. In the process for "raising" rectangles from the second level to the first level, the interaction of each of the rectangles in the second level with each of the other rectangles therein is checked.

Thus, in the case that one rectangle in the second level is "raised" to the first level, it is not necessary to perform calculations for "sum" with rectangles in the first level that have been generated. Unless the generation order is managed in this manner, the process for calculating "sum" may enter into an endless loop with unnecessary processes.

The "affiliation" of rectangles in the second level to rectangles in the first level is managed because it is necessary to determine whether or not each of them should be added to each of other rectangles. A set of (up to four) rectangles as the calculated result of "sum" of two rectangles have the relation of a set of inscribed rectangles. Thus, it is not necessary to perform calculations for "sum" of these rectangles. Otherwise, the process result may be adversely affected.

When a rectangle B to be raised to the first level is absorbed by a larger rectangle D in a calculation for "sum" with another rectangle, calculations for "sum" with other rectangles are not performed so as to increase the process speed. In other words, the rectangle D that absorbs the rectangle B is treated as a rectangle to be "raised" to the first level as soon as possible.

In the "re-arranging" process, there may be a case in which a plurality of rectangles are the same or have an inclusion relation. Such rectangles may be combined and processed. However, although such a relation can be easily recognized by a user, a computer for such a process becomes complicated and thereby the process performance may deteriorate.

For example, in the case of rectangles i and h in FIG. 38, the description "although the two rectangles are the same, the algorithm does not know that." means that such a recognition process is not provided. The "raising" process for rectangles spontaneously checks whether or not two rectangles are the same.

When a plurality of rectangles are included in the same "affiliation," the rectangles may be the same or may have the inclusion relation. Alternatively, the rectangles may partly overlap or have adjacent positions. Thus, when rectangles in the second level are generated, it is determined whether or not the same "affiliation" has other rectangles in the second level. When the "affiliation" has such rectangles, if "sum" with each of them is calculated in a earlier stage, the process speed is expected to be improved.

Figure 74:
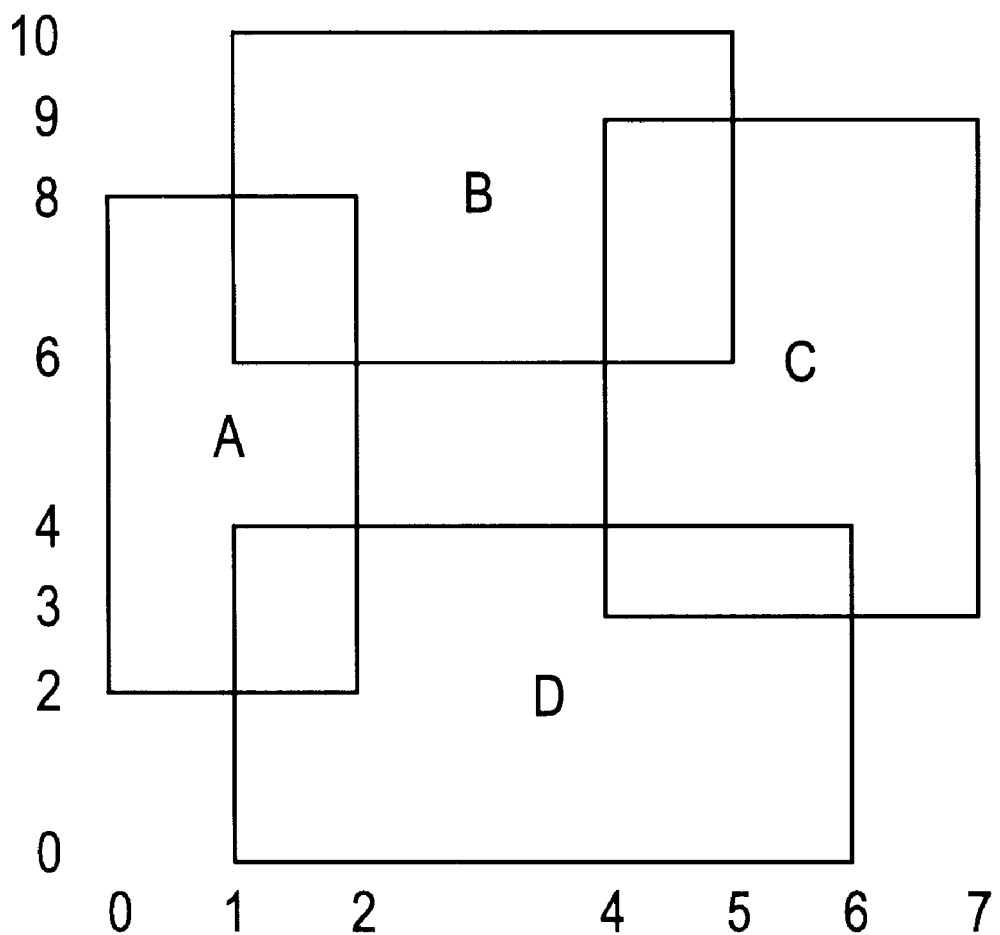
FIG. 74 is a schematic diagram showing a figure with four rectangles connected in a chain pattern.

As described above, it is known that the space managing process according to the embodiment of the present invention is always terminated or completed. Next, with reference to FIGS. 74 to 94, the space managing process will be described using an example of a complicated figure. FIG. 74 shows a figure composed of four rectangles connected in a chain shape. The figure has a blank area (hole) at the center. In this case, by precisely tracing the above-described algorithm, it is clear that the "re-arranging" process is competed without entering into a closed loop.

An area S of the figure shown in FIG. 74 is represented as follows.

$$S = A\square((0, 2), (2, 8)) \cup B\square((1, 5), (6, 10)) \cup C\square((4, 7), (3, 9)) \cup D\square((1, 6), (0, 4))$$

Figure 75:
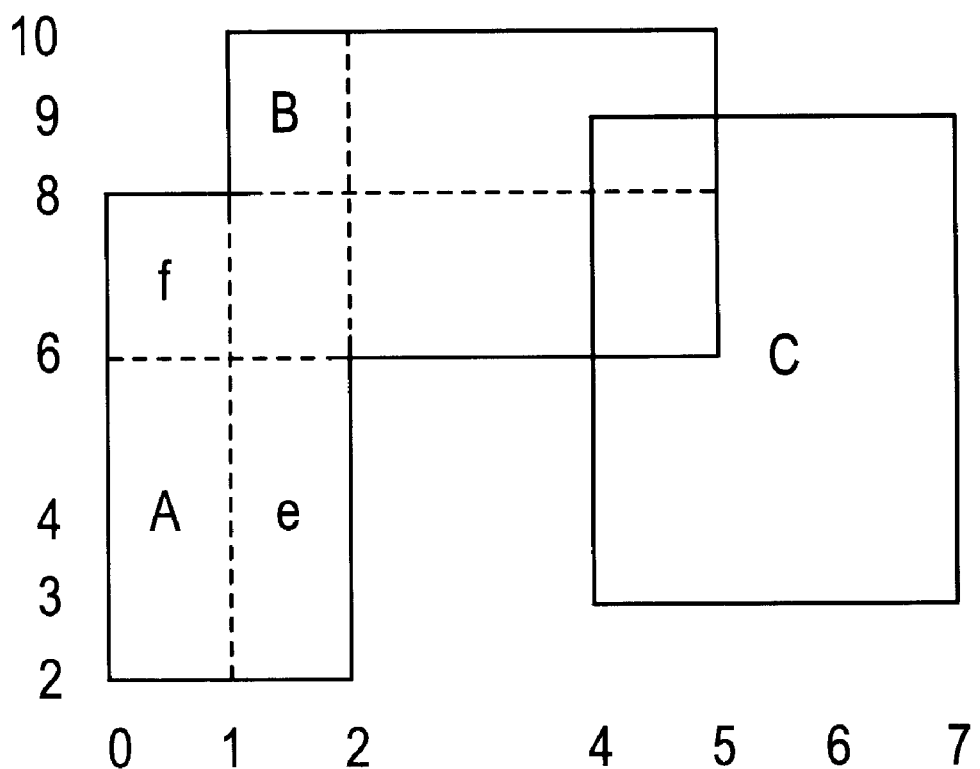
FIG. 75 is a schematic diagram showing the fourteenth intermediate data.

When intermediate data that represents the sum of the rectangles A and B is obtained, the resultant area is represented as shown in FIG. 75.

$$S^2 = A\square((0, 2), (2, 8)) \cup B\square((1, 5), (6, 10)) \rightarrow [\#A\square((0, 2), (2, 8)) \#e\square((1, 2), (2, 10)) \#f\square((0, 5), (6, 8)) \#B\square((1, 5), (6, 10)]$$

Figure 76:
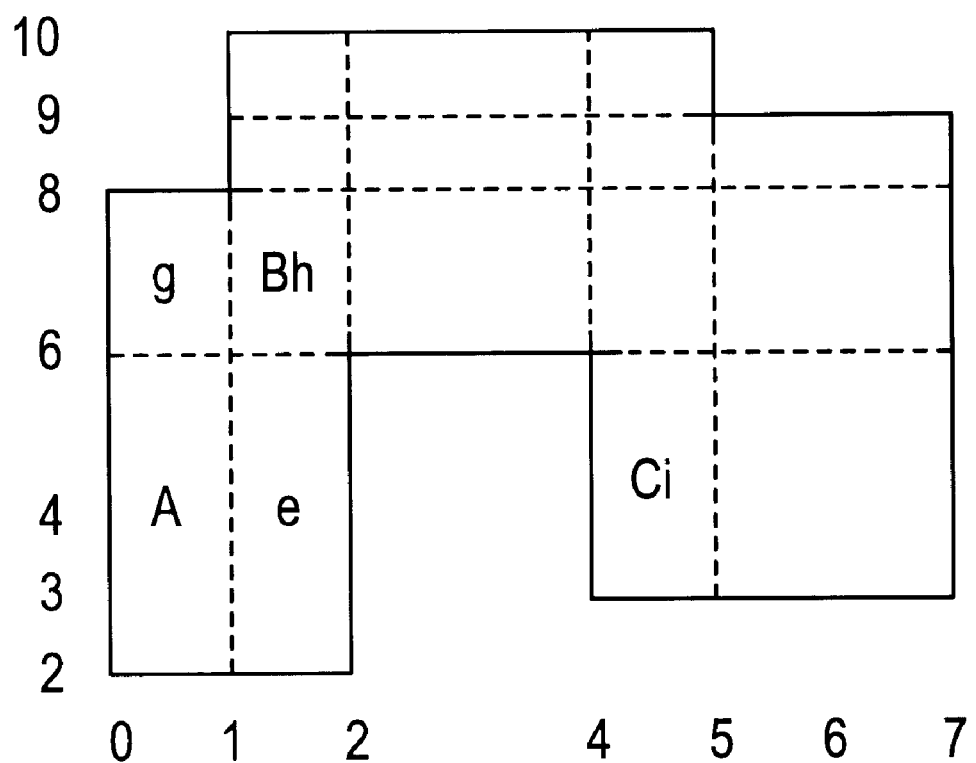
FIG. 76 is a schematic diagram showing the fifteenth intermediate data.

When a rectangle C is added to the area $S^2$, the resultant area is represented as shown in FIG. 76.

$$S^3 = S^{2 \cup C\square}((4, 7), (3, 9)) \rightarrow [\#A\square(0, 2), (2, 8))$$

$$\#e\square((1, 2), (2, 10)) \#@g\square((0, 7), (6, 8)) \#B\square((1, 5), (6, 10))$$

$$@h\square((1, 7), (6, 9)) @i\square((4, 5), (3, 10)) \#C\square((4, 7), (3, 9))]$$

When the rectangle g is raised to the first level and interacted with each of the rectangles A, e, B, h, and i, the resultant area is represented as follows.

→[#A□((0, 2), (2, 8)) #e□((1, 2), (2, 10)) #B□((1, 5), (6, 10))
@h□((1, 7), (6, 9)) @i□((4, 5), (3, 10)) #C□((4, 7), (3, 9))
g□((0, 7), (6, 8))]

Figure 77:
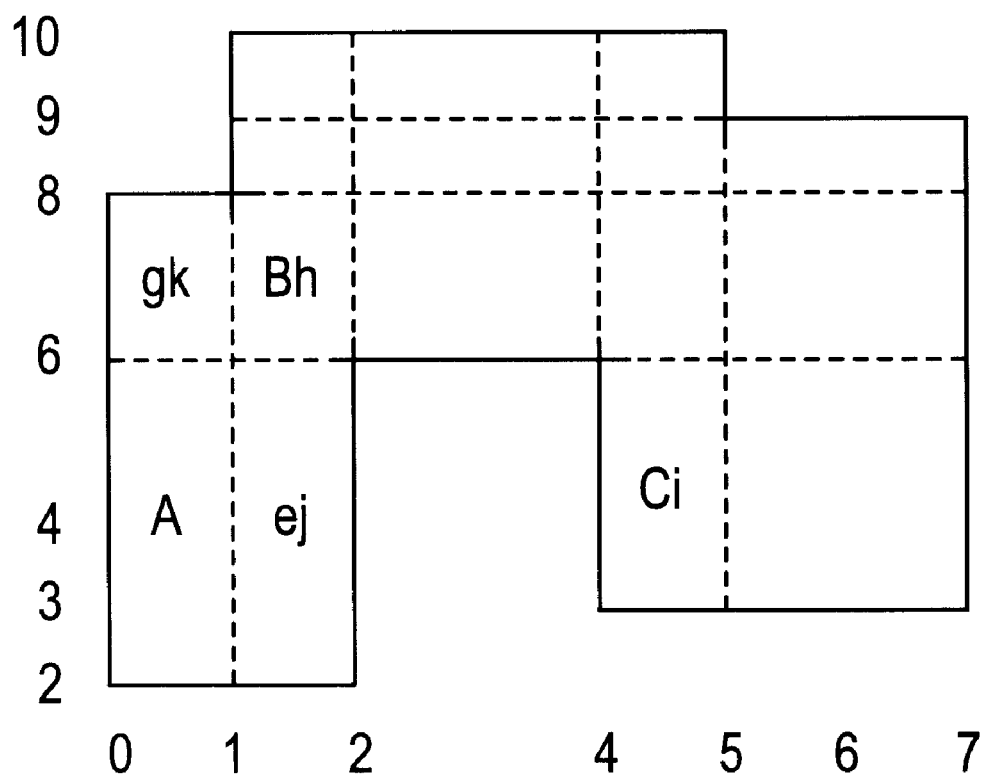
FIG. 77 is a schematic diagram showing the sixteenth intermediate data.

Next, when the rectangle h is raised to the first level and interacted with each of the rectangles A and e, the resultant area is represented as shown in FIG. 77.

→[#A□[((0, 2), (2, 8)) @j□((1, 2), (2, 9)) @k□((0, 7), (6, 8))
e□((1, 2), (2, 10)) #B□((1, 5), (6, 10))

@i□((4, 5), (3, 10)) #C□((4, 7), (3, 9)) #g□((0, 7), (6, 8))
h□((1, 7), (6, 9))]

When the rectangle i is raised to the first level and interacted with each of the rectangles A, j, k, and e, the resultant area is represented as follows.

→[#A□((0, 2), (2, 8)) @j□((1, 2), (2, 9)) @k□((0, 7), (6, 8))
e□((1, 2), (2, 10))

B□((1, 5), (6, 10)) #C□((4, 7), (3, 9)) #g□((0, 7), (6, 8))
h□((1, 7), (6, 9)) #i□((4, 5), (3, 10))]

Figure 78:
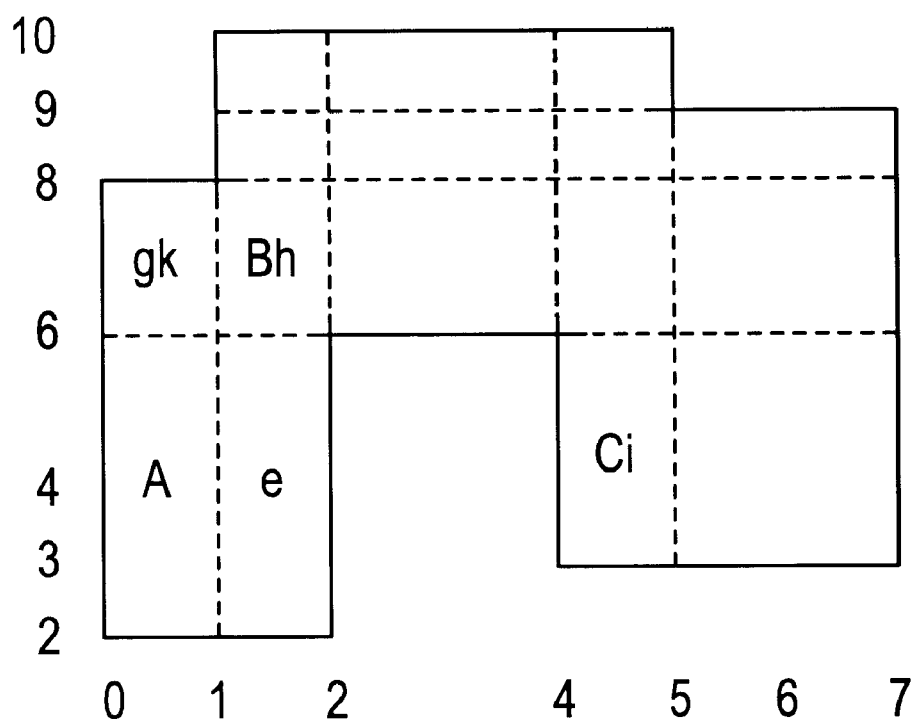
FIG. 78 is a schematic diagram showing the seventeenth intermediate data.

Next, when the rectangle j is raised to the first level and interacted with each of the rectangles e, B, c, and g, the rectangle j is absorbed by the rectangle a and thereby eliminated as shown in FIG. 78. Thus, the resultant area is represented as follows.

→[#A□((0, 2), (2, 8)) @k□((0, 7), (6, 8)) #e□((1, 2), (2, 10))
B□((1, 5), (6, 10)) #C□((4, 7), (3, 9)) #g□((0, 7), (6, 8))
h□((1, 7), (6, 9)) #i□((4, 5), (3, 10))]

Figure 79:
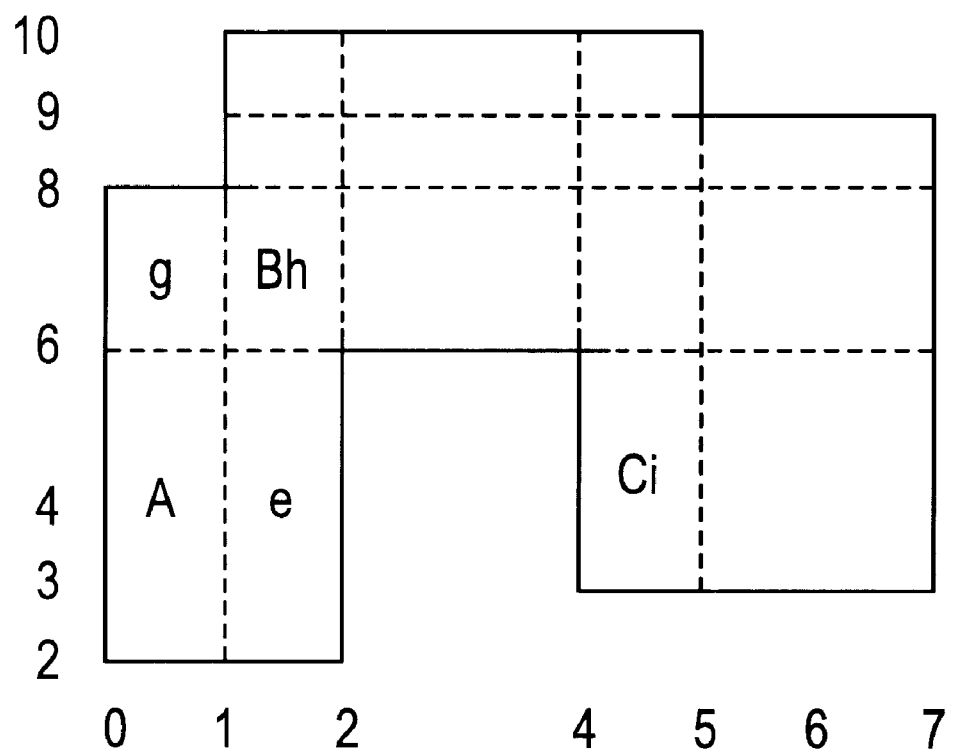
FIG. 79 is a schematic diagram showing the eighteenth intermediate data.

Next, when the rectangle k is raised to the first level and interacted with each of the rectangles e, B, C, and g, the rectangle k is absorbed by the rectangle g and thereby eliminated as shown in FIG. 79. Thus, the resultant area is represented as follows.

→[#A□((0, 2), (2, 8)) #e□((1, 2), (2, 10)) #B□((1, 5), (6, 10))
C□((4, 7), (3, 9)) #g□((0, 7), (6, 8)) #h□((1, 7), (6, 9))
i□((4, 5), (3, 10))]

Figure 80:
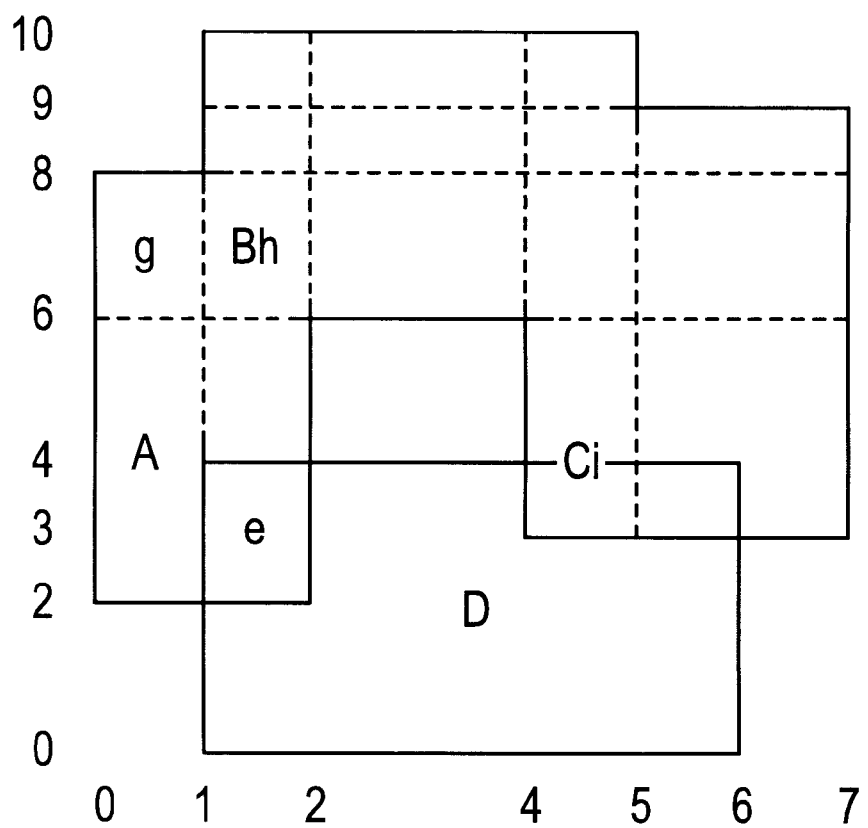
FIG. 80 is a schematic diagram showing the nineteenth intermediate data.
Figure 81:
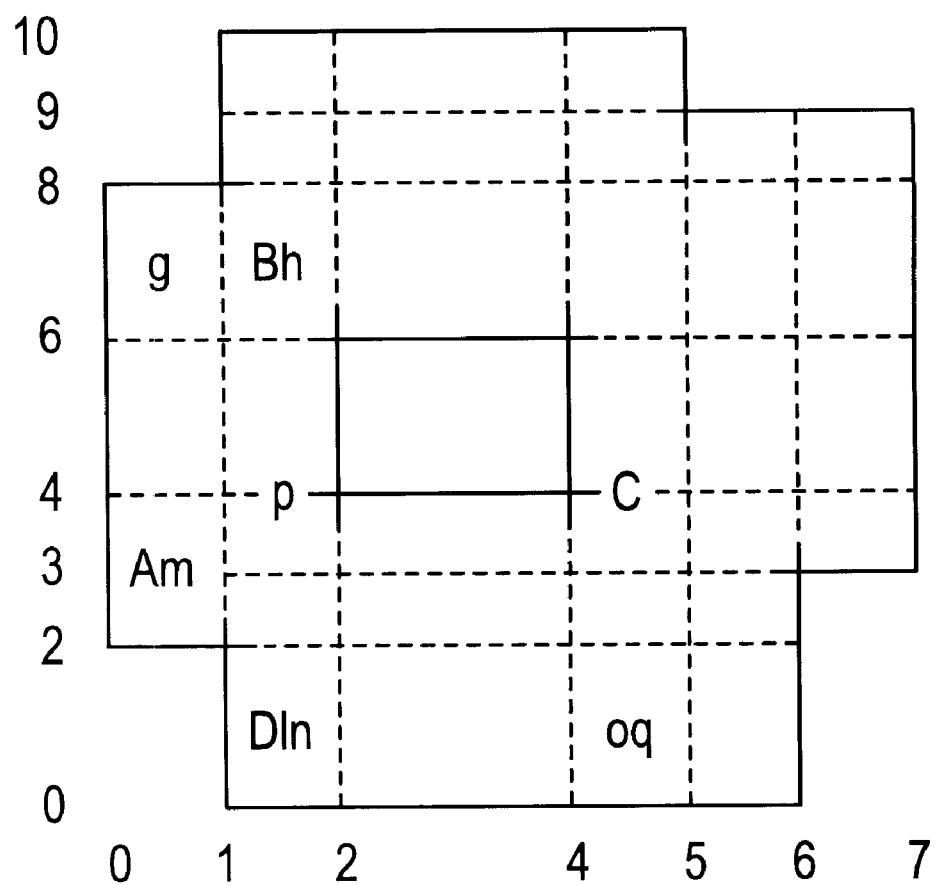
FIG. 81 is a schematic diagram showing the twentieth intermediate data.

Next, when a rectangle D is added to the area $S_3$ as shown in FIG. 80, the resultant area is represented as shown in FIG. 81.

$$S^4 = S^3 \cup D\square((1, 6), (0, 4)) \rightarrow [\#A\square ((0, 2), (2, 8)) @l\square((1, 2), (0, 8)) @m1((0, 6), (2, 4))$$

@n□ ((1, 2), (0, 10)) #B□ ((1, 5), (6, 10)) #C□ ((4,7),(3,9))
@o□ ((4, 6), (0, 9))

@p□ ((1, 7), (3, 4)) #g□ ((0, 7), (6, 8)) #h□ ((1, 7), (6, 9))
@q□ ((4, 5), (0, 10)) #D□ ((1, 6), (0, 4))]

Figure 82:
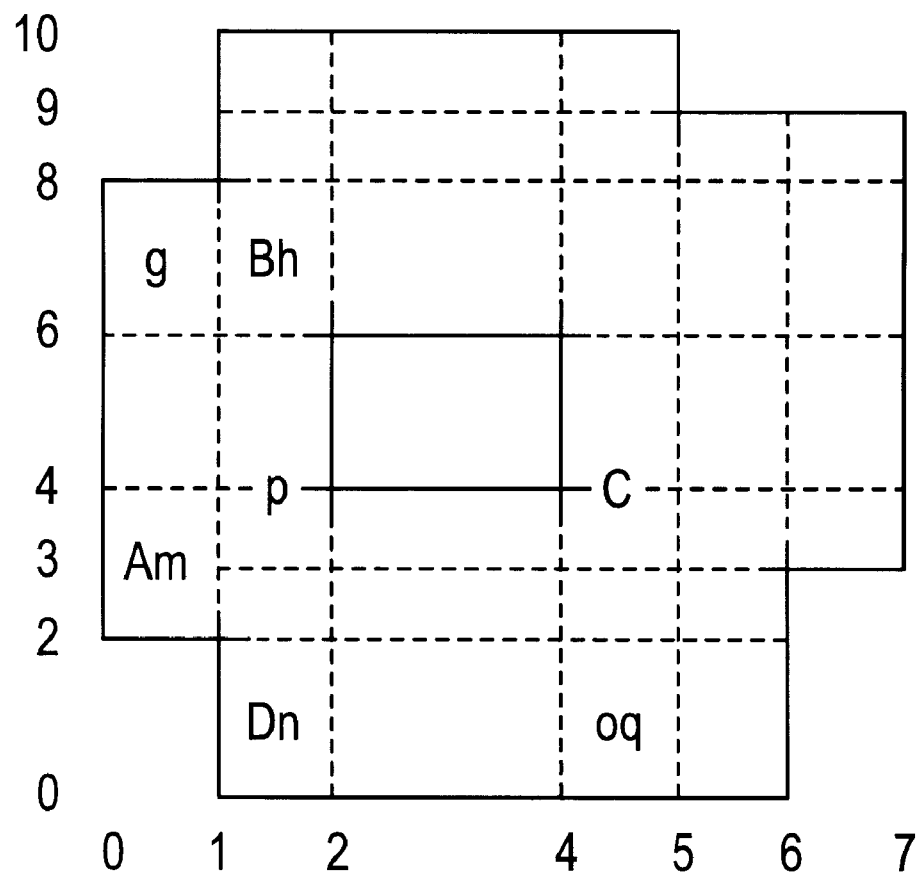
FIG. 82 is a schematic diagram showing the twenty-first intermediate data.

Next, when the rectangle 1 is raised to the first level and interacted with each of the rectangles n, B, C, o, p, g, h, and q, the rectangle 1 is absorbed by the rectangle n and thereby eliminated as shown in FIG. 82. Thus, the resultant area is represented as follows.

→[#A□ ((0, 2), (2, 8)) @m□ ((0, 6), (2, 4)) #@n□ ((1, 2), (0, 10)) #B□ ((1, 5), (6, 10)) #C□ ((4, 7), (3, 9)) @o□ ((4, 6), (0, 9))

@p□ ((1, 7), (3, 4)) #g□ ((0, 7), (6, 8)) #h□ ((1, 7), (6, 9))
@q□ ((4, 5), (0, 10) #D□ ((1, 6), (0, 4))]

Figure 83:
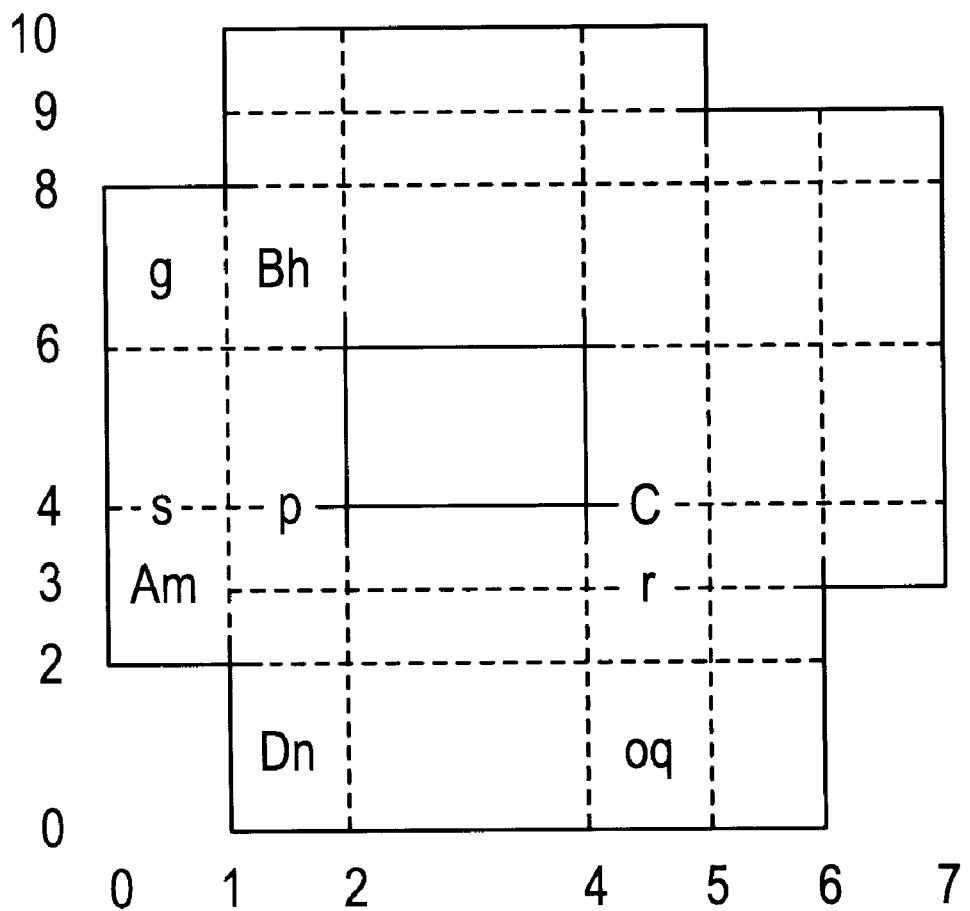
FIG. 83 is a schematic diagram showing the twenty-second intermediate data.

Next, when the rectangle m is raised to the first level and interacted with each of the rectangles n, B, C, o, p, g, h, and q, the resultant area is represented as shown in FIG. 83.

→[#A□ ((0, 2), (2, 8)) #@n□ ((1, 2), (0, 10)) #B□ ((1, 5), (6, 10)) #C□ ((4,7), (3,9))

@'r□ ((4, 6), (2, 9)) @'s□ ((0, 7), (3, 4)) @o□ ((4, 6), (0, 9))
@p□ ((1, 7), (3, 4))

g□ ((0, 7), (6, 8)) #h□ ((1, 7), (6, 9)) #@q□ ((4, 5), (0, 10))
D□ ((1, 6), (0, 4)) #m□ ((0, 6), (2, 4))]

Next, when the rectangle n is raised to the first level and interacted with each of the rectangles A, B, C, r, s, o, p, g, h, and q, the resultant area is represented as follows.

→[#A□ ((0, 2), (2, 8)) #B□ ((1, 5), (6, 10)) #C□ ((4, 7), (3, 9))
@'r□ ((4, 6), (2, 9)) @'s□ ((0, 7), (3, 4)) @o□ ((4, 6), (0, 9))
@p□ ((1, 7), (3, 4))

g□ ((0, 7), (6, 8)) #h□ ((1, 7), (6, 9)) #@q□ ((4, 5), (0, 10))
D□ ((1, 6), (0, 4)) #m□ ((0, 6), (2, 4)) #n□ ((1, 2), (0, 10))]

Figure 84:
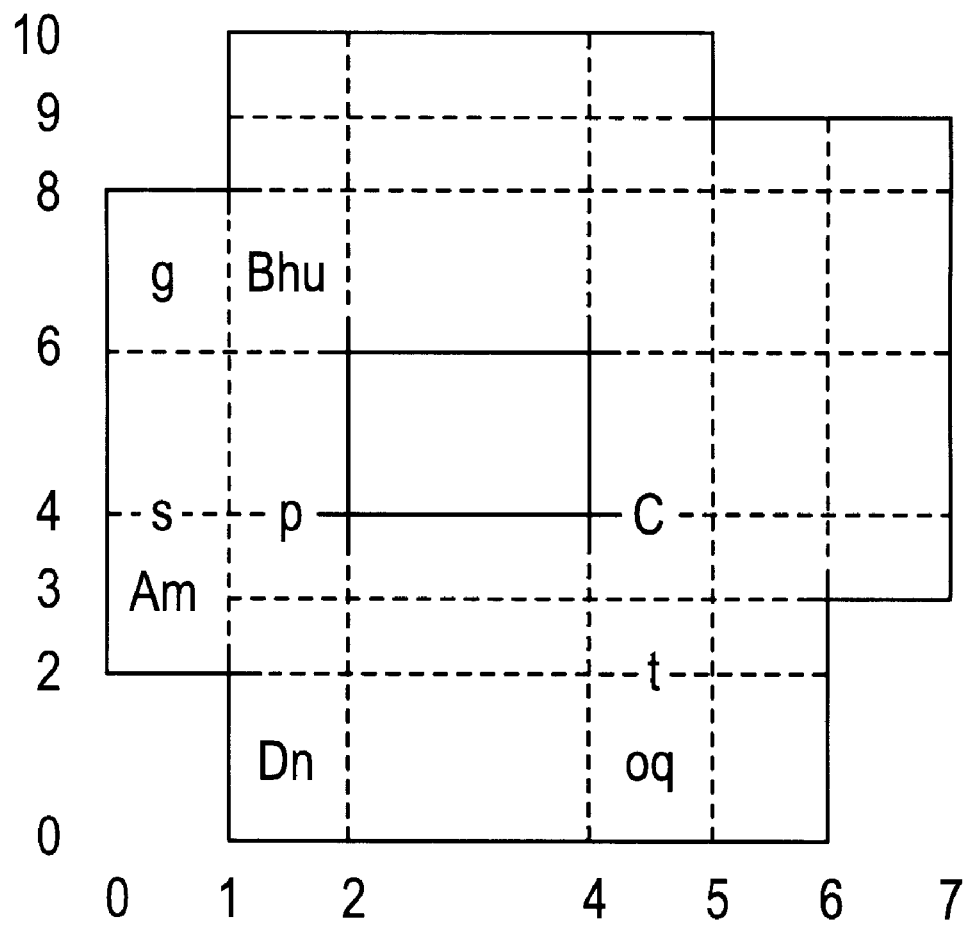
FIG. 84 is a schematic diagram showing the twenty-third intermediate data.

Next, when the rectangle o is raised to the first level and interacted with each of the rectangles A, B, r, s, g, h, and q, the rectangle r is absorbed by the rectangle o and thereby eliminated as shown in FIG. 84. Thus, the resultant area is represented as follows.

→[#A□((0,2), (2, 8)) #B□((1, 5), (6, 10)) @t□ ((4, 5), (0, 10))
@u□ ((1, 6), (6, 9)) #C□ ((4, 7), (3, 9)) @'s□ ((0, 7), (3, 4))
@p□ ((1, 7), (3, 4))

g□ ((0, 7), (6, 8)) #h□ ((1, 7), (6, 9)) #@q□ ((4, 5), (0, 10))
D□ ((1, 6), (0, 4)) #m□ ((0, 6), (2, 4)) #n□ ((1, 2), (0, 10))
o□ ((4, 6), (0, 9))]

Figure 85:
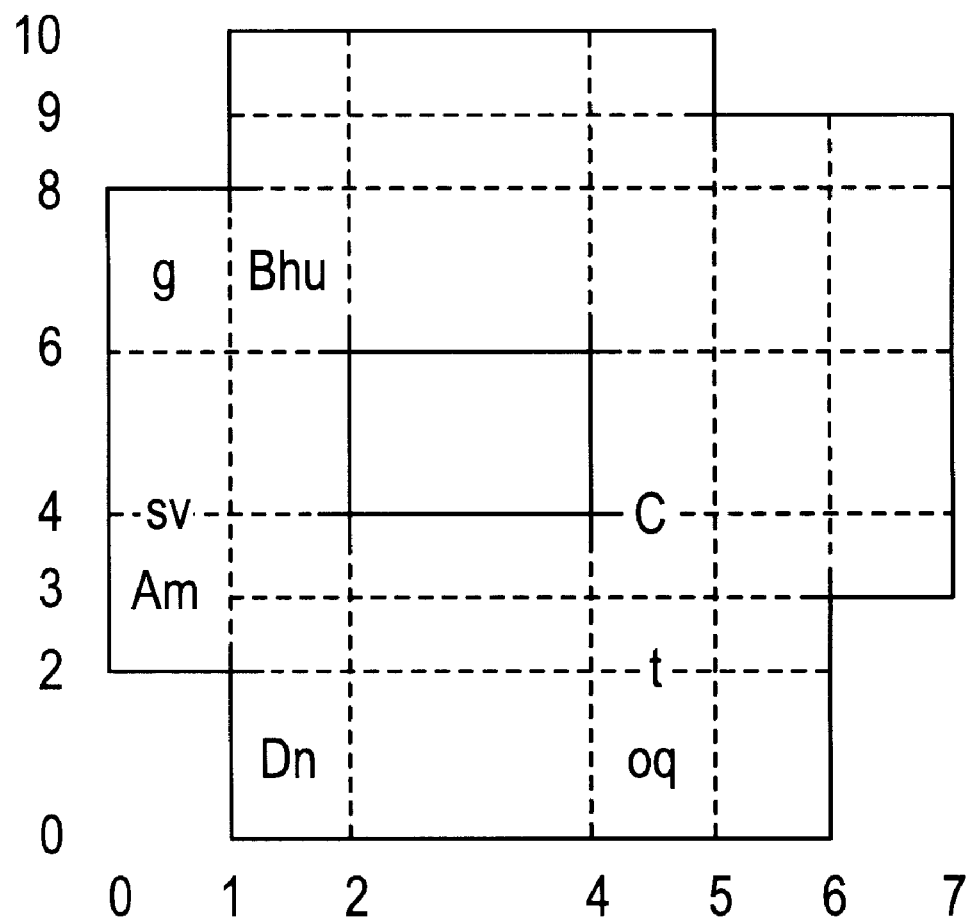
FIG. 85 is a schematic diagram showing the twenty-fourth intermediate data.

Next, when the rectangle p is raised to the first level and interacted with each of the rectangles A, B, t, u, s, g, h, and q, the rectangle p is interacted with the rectangle A and a rectangle v is generated as shown in FIG. 85. Thus, the rectangle p is eliminated. Consequently, the resultant area is represented as follows.

→[#A□ ((0, 2), (2, 8)) @v□ ((0, 7), (3, 4)) #B□ ((1, 5), (6, 10))
@t□ ((4, 5), (0, 10)) @u□ ((1, 6), (6, 9)) #C□ ((4, 7), (3, 9))

@'s□ ((0, 7), (3, 4)) #g□ ((0, 7), (6, 8)) #h□ ((1, 7), (6, 9))

@q□ ((4, 5), (0, 10)) #D□ ((1, 6), (0, 4)) #m□ ((0, 6), (2, 4))
n□ ((1, 2), (0, 10)) #o□ ((4, 6), (0, 9))]

Figure 86:
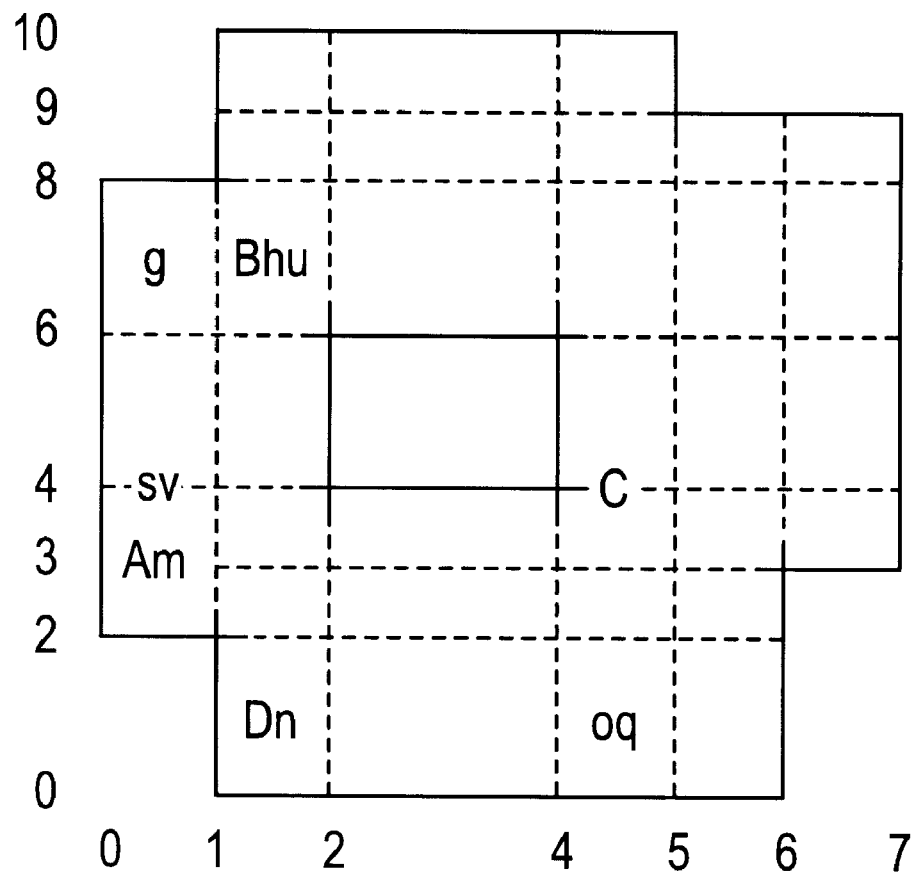
FIG. 86 is a schematic diagram showing the twenty-fifth intermediate data.

Next, when the rectangle q is raised to the first level and interacted with each of the rectangles A, v, B, t, u, C, s, g, and h, the rectangle t is absorbed by the rectangle q and eliminated as shown in FIG. 86. Thus, the resultant area is represented as follows.

→#A□ ((0, 2), (2, 8)) @v□ ((0, 7), (3, 4)) #B□ ((1, 5), (6, 10))
@u□ ((1, 6), (6, 9)) #C□ ((4, 7), (3, 9)) @'s□ ((0, 7), (3, 4))

g□ ((0, 7), (6, 8)) #h□ ((1, 7), (6, 9)) #D□ ((1, 6), (0, 4)) #m□
((0, 6), (2, 4)) #n□ ((1, 2), (0, 10)) #o□ ((4, 6), (0, 9)) #q□
((4, 5), (0, 10))]

Figure 87:
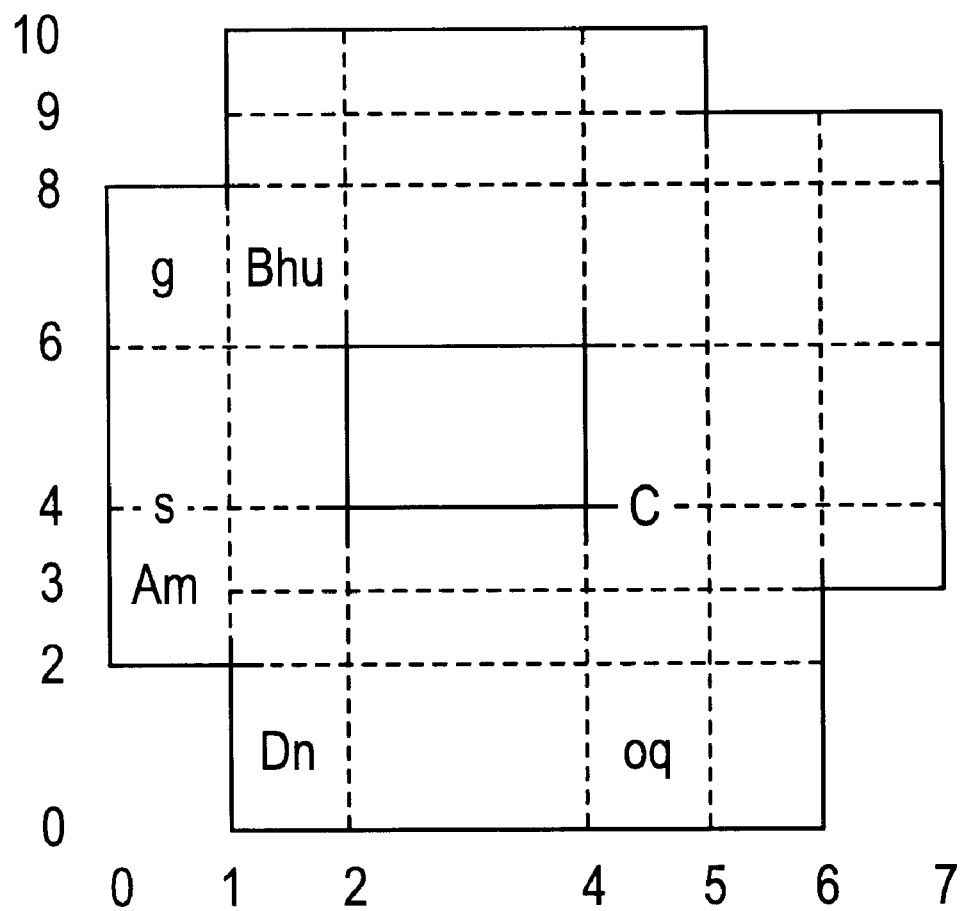
FIG. 87 is a schematic diagram showing the twenty-sixth intermediate data.

Next, when the rectangle s is raised to the first level and interacted with each of the rectangles A, v, B, u, g, h, and D, the rectangle v is absorbed by the rectangle s and eliminated as shown in FIG. 87. Thus, the resultant area is represented as follows.

→[#A□ ((0, 2), (2, 8)) #B□ ((1, 5), (6, 10)) @u□ ((1, 6), (6, 9))
C□ ((4, 7), (3, 9)) #g□ ((0, 7), (6, 8))

h□ ((1, 7), (6, 9)) #D□ ((1, 6), (0, 4)) #m□ ((0, 6), (2, 4)) #n□
((1, 2), (0, 10)) #o□ ((4, 6), (0, 9)) #q□ ((4, 5), (0, 10)) #s□
((0, 7), (3, 4))]

Figure 88:
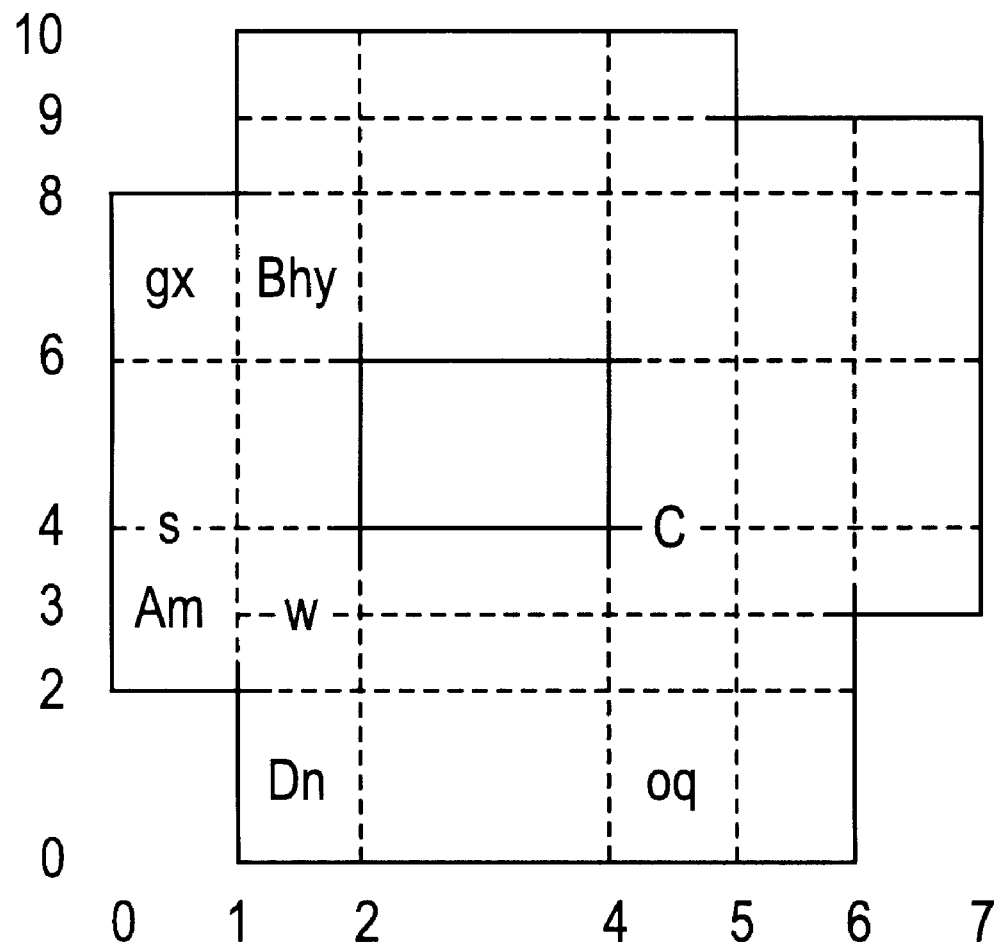
FIG. 88 is a schematic diagram showing the twenty-seventh intermediate data.

Next, when the rectangle a is raised to the first level and interacted with each of the rectangles A, C, g, h, D, m, and n, the rectangle a is absorbed by the rectangle h and eliminated as shown in FIG. 88. Thus, the resultant area is represented as follows.

→[#A□ ((0, 2), (2, 8)) @w□ ((1, 2), (2, 9)) @x□ ((0, 6), (6, 8))
B□ ((1, 5), (6, 10)) #C□ ((4, 7), (3, 9)) @y□ ((1, 7), (6, 9))
g□ ((0, 7), (6, 8))

h□ ((1, 7), (6, 9)) #D□ ((1, 6), (0, 4)) #m□ ((0, 6), (2, 4)) #n□
((1, 2), (0, 10)) #o□ ((4, 6), (0, 9)) #q□ ((4, 5), (0, 10)) #s□
((0, 7), (3, 4))]

Figure 89:
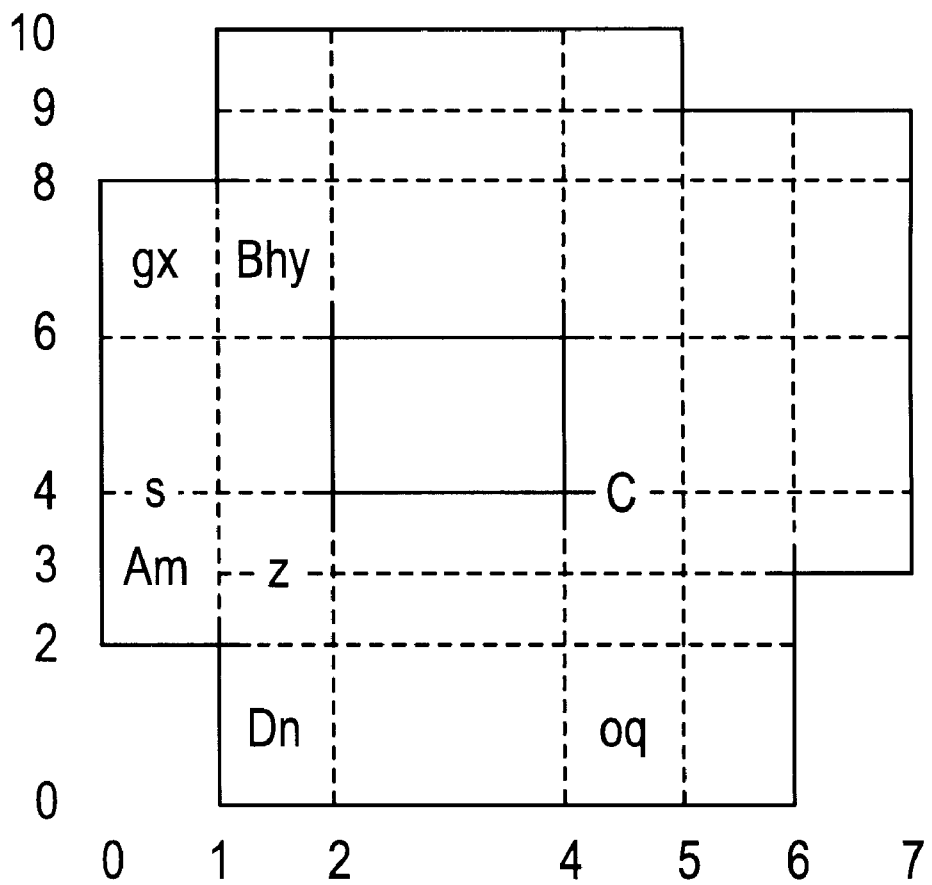
FIG. 89 is a schematic diagram showing the twenty-eighth intermediate data.

Next, when the rectangle w is raised to the first level and interacted with each of the rectangles B, C, y, g, h, D, m, n, o, q, and s, the rectangle w is interacted with the rectangle B and a rectangle z is generated as shown in FIG. 89. Thus, the rectangle w is eliminated. Consequently, the resultant area is represented as follows.

→[#A ((0, 2), (2, 8)) @x□ ((0, 6), (6, 8)) #B□ ((1, 5), (6, 10))
@z□ ((1, 2), (2, 10)) #C□ ((4, 7), (3, 9)) @y□ ((1, 7), (6, 9))

g□ ((0, 7), (6, 8)) #h□ ((1, 7), (6, 9)) #D□ ((1, 6), (0, 4))

m□ ((0, 6), (2, 4)) #n□ ((1, 2), (0, 10)) #o□ ((4, 6), (0, 9)) #q□
((4, 5), (0, 10)) #s□ ((0, 7), (3, 4))]

Figure 90:
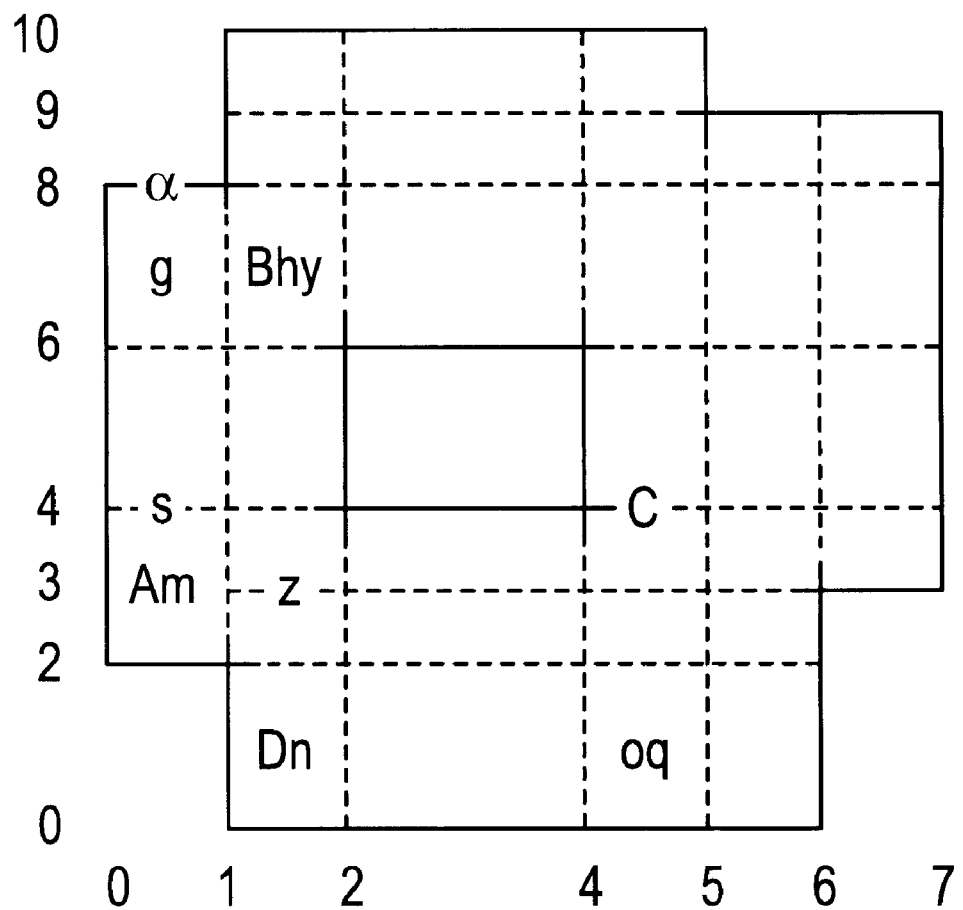
FIG. 90 is a schematic diagram showing the twenty-ninth intermediate data.

Next, when the rectangle x is raised to the first level and interacted with each of the rectangles B, z, C, y, g, h, D, m, n, o, q, and s, the rectangle x is interacted with the rectangle C and a rectangle α is generated as shown in FIG. 90. Thus, the rectangle x is eliminated. Consequently, the resultant area is represented as follows.

→[#A□ ((0, 2), (2, 8)) #B□ ((1, 5), (6, 10)) @z□ ((1, 2), (2, 10))
C□ ((4, 7), (3, 9)) @'a□ ((0, 7), (6, 8)) @y□ ((1, 7), (6, 9))
g□ ((0, 7), (6, 8))

h□ ((1, 7), (6, 9)) #D□ ((1, 6), (0, 4)) #m□ ((0, 6), (2, 4)) #n□
((1, 2), (0, 10)) #o□ ((4, 6), (0, 9)) #q□ ((4, 5), (0, 10)) #s□
((0, 7), (3, 4))]

Figure 91:
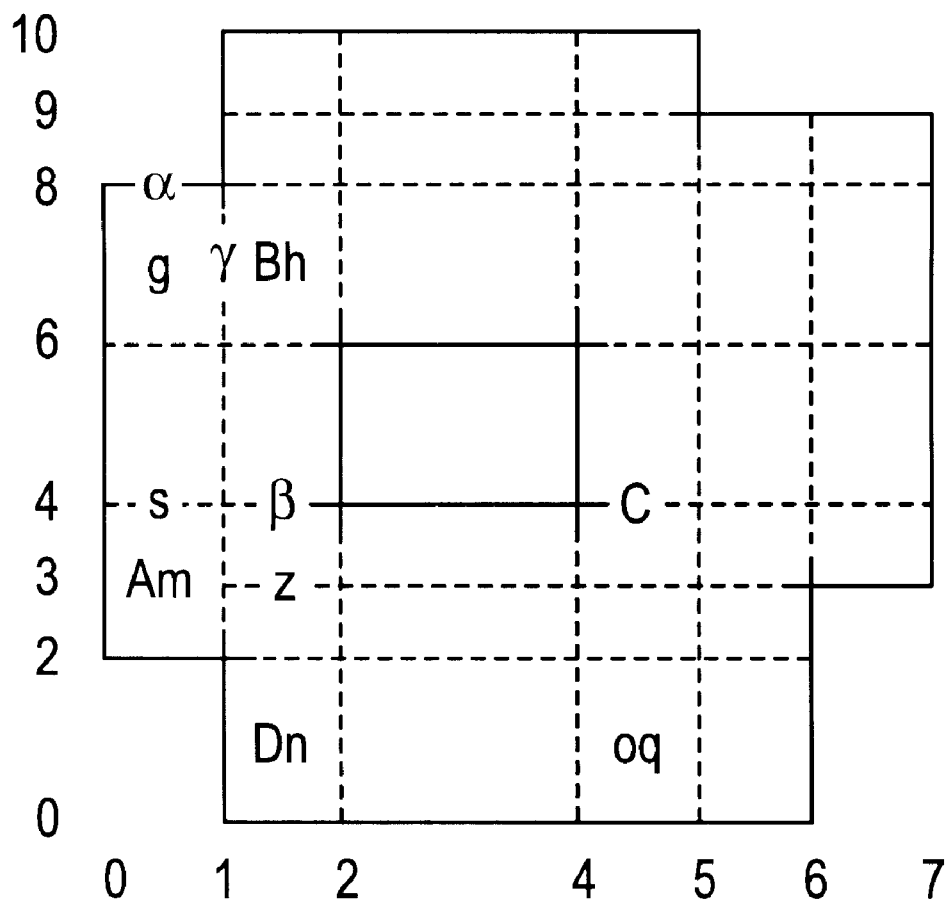
FIG. 91 is a schematic diagram showing the thirtieth intermediate data.

Next, when the rectangle y is raised to the first level and interacted with each of the rectangles A, B, z, a, g, h, D, m, n, o, q, and s, the rectangle y is interacted with the rectangle A and rectangles P and y are generated as shown in FIG. 91. The rectangle y is absorbed by the rectangle h and eliminated. Thus, the resultant area is represented as follows.

→[#A□ ((0, 2), (2, 8)) @β□ ((1, 2), (2, 9)) @γ□ ((0, 7), (6, 8))
B□ ((1, 5), (6, 10)) @z□ ((1, 2), (2, 10)) #C□ ((4, 7), (3, 9))
@'a□ ((0, 7), (6, 8))

g□ ((0, 7), (6, 8)) #h□ ((1, 7), (6, 9)) #D□ ((1, 6), (0, 4)) #m□
((0, 6), (2, 4))

n□ ((1, 2), (0, 10)) #o□ ((4, 6), (0, 9)) #q□ ((4, 5), (0, 10))
s□ ((0, 7), (3, 4))]

Figure 92:
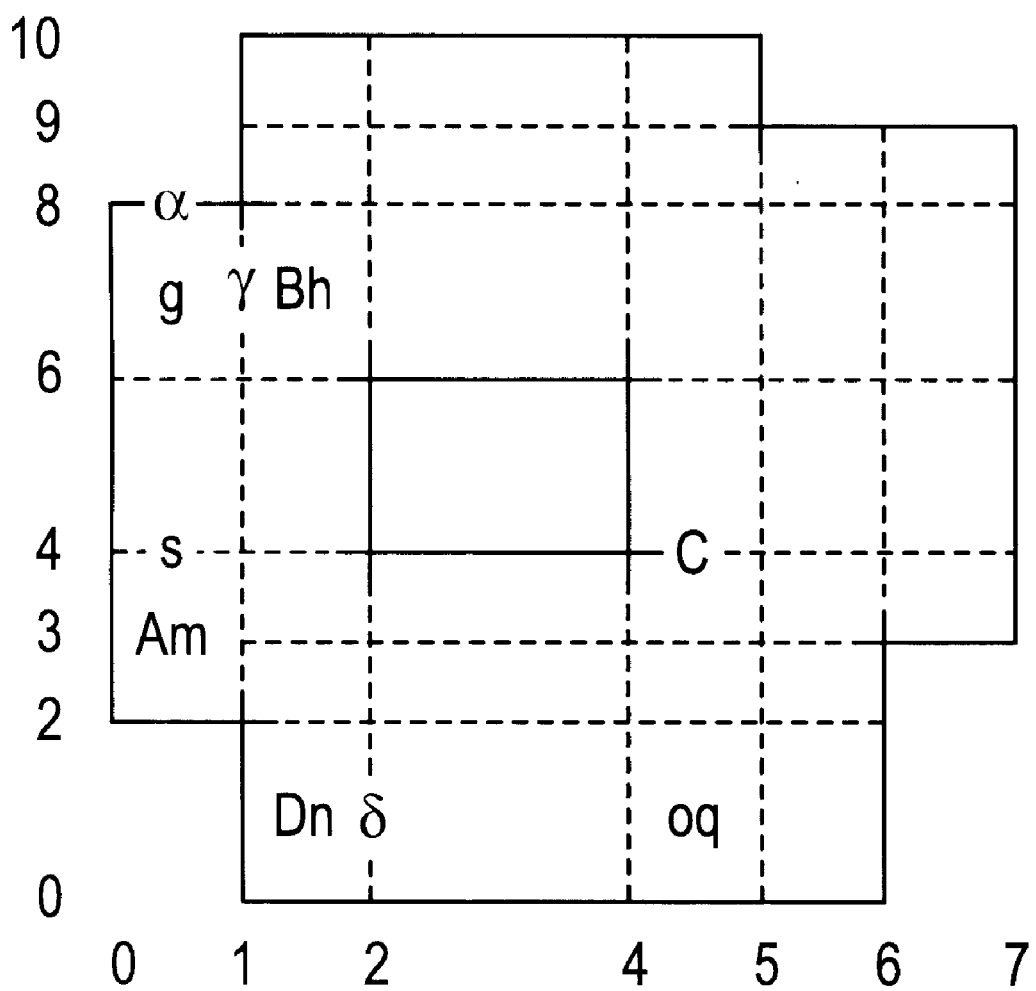
FIG. 92 is a schematic diagram showing the thirty-first intermediate data.

Next, when the rectangle z is raised to the first level and interacted with each of the rectangles A, β, γ, C, α, g, h, D, m, n, o, q, and s, the rectangle z absorbs the rectangle β and interacts with the rectangle D as shown in FIG. 92. Thus, a rectangle δ is generated and the rectangle z is eliminated. Consequently, the resultant area is represented as follows.

→[#A□ ((0, 2), (2, 8)) @γ□ ((0, 7), (6, 8)) #B□ ((1, 5), (6, 10))
C□ ((4, 7), (3, 9))

@'α□ ((0, 7), (6, 8)) #g□ ((0, 7), (6, 8)) #h□ ((1, 7), (6, 9))
D□ ((1, 6), (0, 4))

@δ((1, 2), (0, 10)) #m□ ((0, 6), (2, 4)) #n□ ((1, 2), (0, 10)) #o□
((4, 6), (0, 9)) #q□ ((4, 5), (0, 10)) #s□ ((0, 7), (3, 4))]

Figure 93:
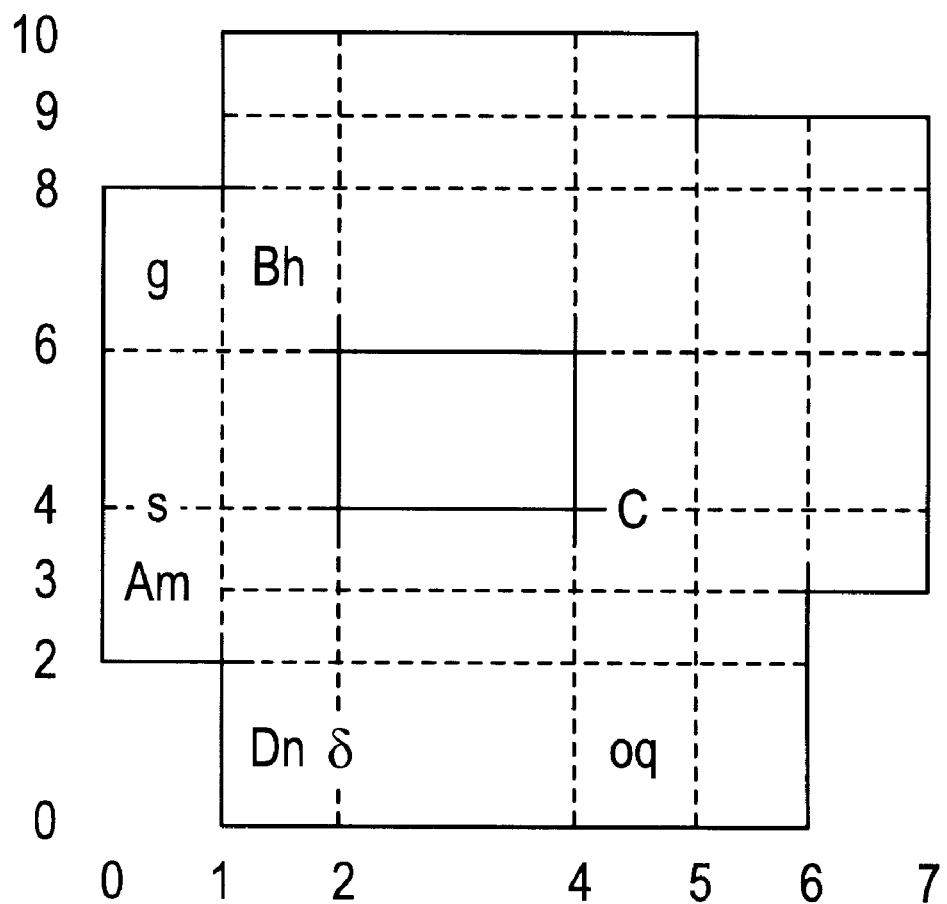
FIG. 93 is a schematic diagram showing the thirty-second intermediate data.

Next, when the rectangle a is raised to the first level and interacted with each of the rectangles A, γ, B, g, h, D, δ, m, n, o, q, and s, the rectangle γ is absorbed by the rectangle a and then the rectangle a is absorbed by the rectangle g as shown in FIG. 93. Thus, the rectangle β is eliminated. Consequently, the resultant area is represented as follows.

→[#A□ ((0, 2), (2, 8)) #B□ ((1, 5), (6, 10)) #C□ ((4, 7), (3, 9))
g□ ((0, 7), (6, 8)) #h□ ((1, 7), (6, 9)) #D□ ((1, 6), (0, 4))

@δ□ ((1, 2), (0, 10)) #m□ ((0, 6), (2, 4)) #n□ ((1, 2), (0, 10))
o□ ((4, 6), (0, 9)) #q□ ((4, 5), (0, 10)) #s□ ((0, 7), (3, 4))]

Figure 94:
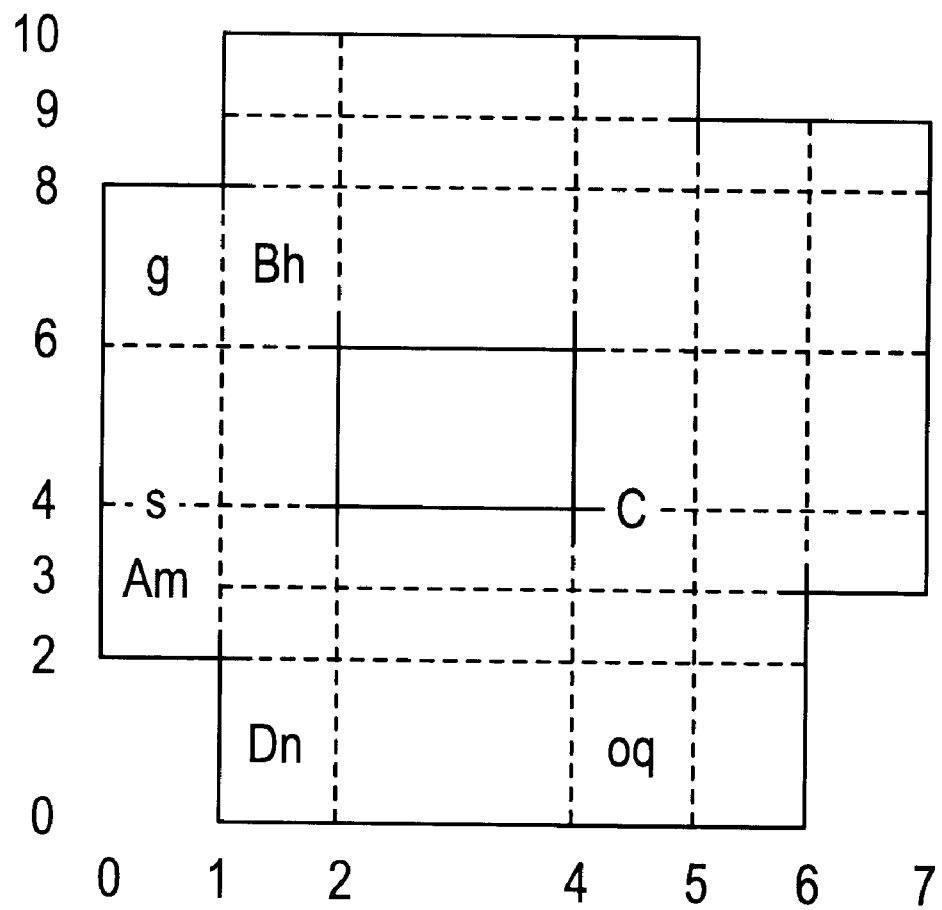
FIG. 94 is a schematic diagram showing the sixth set of inscribed rectangles.

Next, when the rectangle δ is raised to the first level and interacted with each of the rectangles A, B, C, g, h, m, n, o, q, and s, the rectangle δ is absorbed by the rectangle n and eliminated as shown in FIG. 94. Thus, the resultant area is represented as follows.

→[#A□ ((0, 2), (2, 8)) #B□ ((1, 5), (6, 10)) #C□ ((4, 7), (3, 9))
g□ ((0, 7), (6, 8)) #h□ ((1, 7), (6, 9))

D□ ((1, 6), (0, 4)) #m□ ((0, 6), (2, 4)) #n□ ((1, 2), (0, 10))
o□ ((4, 6), (0, 9)) #q□ ((4, 5), (0, 10)) #s□ ((0, 7), (3, 4))]

Thus, in the case of a complicated figure as shown in FIG. 74, the process is completed without entering into a closed loop. Consequently, a set of inscribed rectangles can be obtained.

In addition, by an application of calculations for "sum" and "difference" of such rectangles, one or a plurality of closed figures can be added to any position of one or a plurality of other closed figures. In contrast, one or a plurality of closed figures can be removed from any position of one or a plurality of other closed figures. Thus, the shape of an "object" to be laid out is not limited to a rectangle, but any closed figure is used for the shape.

With the space managing unit 12 using a set of inscribed rectangles, a two-dimensional layout system that has the structure and function shown in FIG. 6 can be accomplished. Next, the layout process shown in FIG. 7 accomplished by the two-dimensional layout unit (LM) 11 and the space managing unit (SM) 12 will be described focusing on internal processes thereof. Unless otherwise mentioned, the process performed by the LM 11 will be described.

[0] Initial setting (1) It is assumed that "objects" are laid out in the first quadrant of right-hand xy coordinate system.

(2) A "priority rule for layout positions" is input and stored. In this example, it is assumed that the "main direction" of the priority of layout positions is the down direction (the negative direction of the y axis) and that the "sub direction" thereof is the left direction (the negative direction of the x axis).

(3) A "container" is designated. In this example, a simple rectangle □ (10, 8) is designated. The LM 11 causes the SM 12 to initialize a set $S_0$ of inscribed rectangles to be a rectangle □ ((0, 10), (0, 8)).

(4) A laid-out rectangle list is initialized to be Nil.

(5) Since the preparation has been completed, "objects" to be laid out are successively accepted.

[1] Laying Out the First "Object"

(1) The LM 11 receives a "object a■ (2, 4)" and a layout command.

(2) The LM 11 asks the SM 12 for the set $S^o$ of inscribed rectangles of the current space and receives the following reply therefrom.

$$S^o = \{0((0, 10), (0, 8))\}$$

(3) The LM 11 treats the inscribed rectangle "□ ((0, 10), (0, 8))" as the layout space and selects the lower left corner (0, 0) as the layout position according to the priority rule for layout positions.

(4) The LM 11 sends a command "layout: □ ((0, 2), (0, 4))" to the SM 12.

(5) The LM 11 receives a reply "layout OK, completed" from the SM 12.

(6) The LM 11 stores the "a■ ((0, 2), (0, 4))" to the laid-out rectangle list.

[2] Laying Out the Second "Object"

(1) The LM 11 receives a "object b■ (4, 2)" and a layout command.

(2) The LM 11 asks the SM 12 for a set $S^o$ of inscribed rectangles of the current space and obtains the following reply.

$$S^o = \{□ ((2, 10), (0, 8)), □ ((0, 10), (4, 8))\}$$

(3) The LM 11 determines the first priority is "□ ((2, 10), (0, 8))" according to the priority rule for layout positions and selects the lower left corner (2, 0) as the layout position.

(4) The LM 11 sends a command "layout: b■ ((2, 6), (0, 2))" to the SM 12.

(5) The LM 11 receives a reply "layout OK, completed" from the SM 12.

(6) The LM 11 adds and stores the "b■ ((2, 6), (0, 2))" to the laid-out rectangle list.

[3] Laying Out the Third "Object"

(1) The LM 11 receives a "object c■ (6, 2)" and a layout command.

(2) The LM 11 asks the SM 12 for a set $S^o$ of inscribed rectangles of the current space and receives the following reply from the SM 12.

$$S^o = \{0 ((6, 10), (0, 8)), □ ((2, 10), (2, 8)), □((0, 10), (4, 8))\}$$

(3) The LM 11 determines that the first priority is "□ ((6, 10), (0, 8))" according to the priority rule for layout positions and selects the lower left corner (6, 0) as the layout position.

(4) The LM 11 sends a command "layout: c■ ((6, 12), (0, 2))" to the SM 12.

(5) The LM 11 receives a reply "layout invalid, rejected" from the SM 12.

(6) The LM 11 determines that the second priority is "□ ((2, 10), (2, 8))" according to the priority rule for layout positions and selects the lower left corner (2, 2) as the layout position.

(7) The LM 11 sends a command "layout: c■ ((2, 8), (2, 4))" to the SM 12.

(8) The LM 11 receives a reply "layout OK, completed" from the SM 12.

(9) The LM 11 adds and stores the "c■ ((2, 8), (2, 4))" to the laid-out rectangle list.

[4] Laying Out the Fourth "Object"

(1) The LM 11 receives a "object d■ (2, 6)" and a layout command.

(2) The LM 11 asks the SM 12 for a set $S^o$ of inscribed rectangles of the current space and receives the following reply.

$$S^o = \{□ ((6, 10), (0, 2)), □ ((8, 10), (0, 8)), □ ((0, 10), (4, 8))\}$$

(3) The LM 11 determines that the first priority is "□ ((6, 10), (0, 2))" according to the priority rule for layout positions and selects the lower left corner (6, 0) as the layout position.

(4) The LM 11 sends a command "layout: d■ ((6, 8), (0, 6))" to the SM 12.

(5) The LM 11 receives a reply "layout invalid, rejected" from the SM 12.

(6) The LM 11 determines that the second priority is "□ ((8, 10), (0, 8))" according to the priority rule for layout positions and selects the lower left corner (8, 0) as the layout position.

(7) The LM 11 sends a command "layout: d□ ((8, 10), (0, 6))" to the SM 11.

(8) The LM 11 receives a reply "layout OK, completed" from the SM 12.

(9) The LM 11 adds and stores the "d■ ((8, 10), (0, 6))" to the laid-out rectangle list.

[5] Laying Out the Fifth "Object"

(1) The LM 11 receives a "object e■ (6, 4)" and a layout command.

(2) The LM 11 asks the SM 12 for a set $S^o$ of inscribed rectangles of the current space and receives the following reply.

$$S^o = \{□ ((6, 8), (0, 2)), □ ((0, 8), (4, 8)), □ ((0, 10), (6, 8))\}$$

(3) The LM 11 determines that the first priority is "□ ((6, 8), (0, 2))" according to the priority rule for layout positions and selects the lower left corner (6, 0) as the layout position.

(4) The LM 11 sends a command "layout: e■ ((6, 12), (0, 4))" to the SM 12.

(5) The LM 11 receives a reply "layout invalid, rejected" from the SM 12.

(6) The LM 11 determines that the second priority is "□ ((0, 8), (4, 8))" according to the priority rule for layout positions and selects the lower left corner (0, 4) as the layout position.

(7) The LM 11 sends a command "layout: e■ ((0, 6), (4, 8))" to the SM 12.

(8) The LM 11 receives a reply "layout OK, completed" from the SM 12.

(9) The LM 11 adds and stores the "e■ ((0, 6), (4, 8))" to the laid-out rectangle list.

[6] Laying Out the Sixth "Object"

(1) The LM 11 receives an "object f■ (2, 2)" and a layout command.

(2) The LM 11 asks the SM 12 for a set $S^0$ of inscribed rectangles of the current space and receives the following reply.

$$S^0=\{\square\ ((6, 8), (0, 2)), \square\ ((6, 8), (4, 8)), \square\ ((6, 10), (6, 8))\}$$

(3) The LM 11 determines that the first priority is "□ ((6, 8), (0, 2))" according to the priority rule for layout positions and selects the lower left corner (6, 0) as the layout position.

(4) The LM 11 sends a command "layout: f■ ((6, 8), (0, 2))" to the SM 12.

(5) The LM 11 receives a reply "layout OK, completed" from the SM 12.

(6) The LM 11 adds and stores the "f■ ((6, 8), (0, 2))" to the laid-out rectangle list.

[7] End Process (1) The LM 11 receives an "object " input end message.

(2) The LM 11 outputs the following laid-out rectangle list.

$a$■((0, 2), (0, 4)), $b$■((2, 6), (0, 2)), $c$■((2, 8), (2, 4)), $d$■((8, 10), (0, 6)), $e$■((0, 6), (4, 8)), $f$■((6, 8), (0, 2))

(3) The LM 11 asks the SM 12 for a set $S^0$ of inscribed rectangles of the current space and receives the following reply.

$$S^0=\{\square\ ((6, 8), \square\ (4, 8)), ((6, 10), (6, 8))\}$$

Thereafter, the LM 11 outputs the set $S^0$ of inscribed rectangles.

(4) The LM 11 completes the layout process.

In this example, the SM 12 determines whether or not an inscribed rectangle as a candidate for layout is smaller than a rectangle of a "object." However, the LM 11 also has information necessary for this determination. Thus, the LM 11 can perform this determination, check inscribed rectangles in the priority order according to a layout rule, find an inscribed rectangle in which the "object" can be laid out, and cause the SM 12 to lay it out in the inscribed rectangle. Although the efficiency of the process in the latter case is higher than the efficiency of the process in the former case, in this example, from a view point of a functional distribution, the process in the former case was described.

Figure 95:
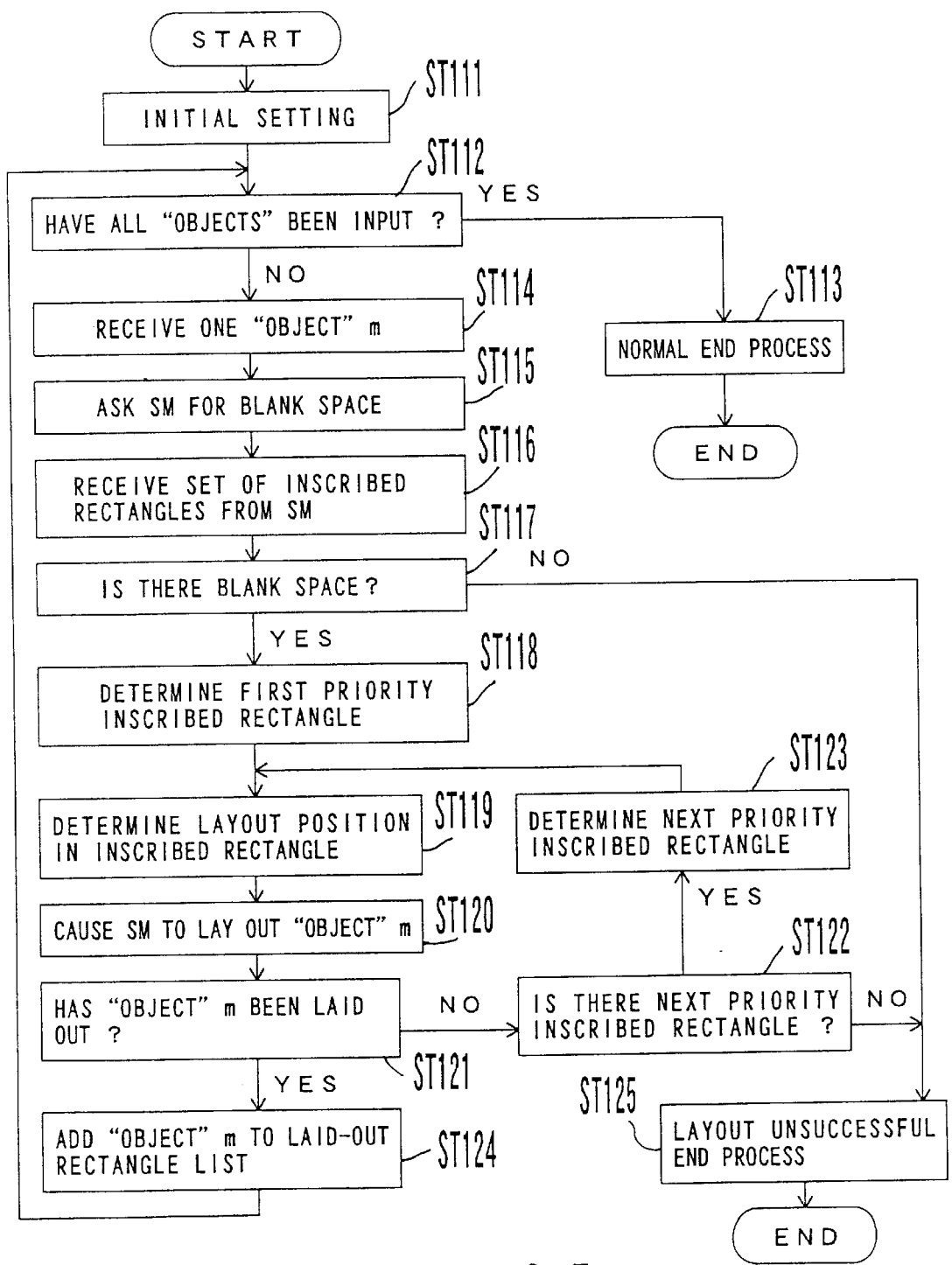
FIG. 95 is a flowchart showing a process of a two-dimensional layout apparatus.

FIG. 95 is a flowchart showing the process of the LM 11 that accomplishes the above-described layout process. When the process is started, the LM 11 performs an initial setting (at step ST111).

At step ST111, the LM 11 sets a priority rule R for layout positions and receives a command for a "container." The "container" is designated with one rectangle or a figure composed of a plurality of rectangles as shown, for example, in FIGS. 24, 28, 31, and 34. The LM 11 initializes the SM 12 and inputs the designated rectangle or the plurality of rectangles to the SM 12. Thus, the SM 12 internally forms the "container." In addition, the LM 11 initializes the laid-out rectangle list L to be empty ($\phi$).

Next, the LM 11 successively inputs "objects" and lays them out. The LM 11 determines whether or not an "object input completed" message has been received (at step ST112). When the determined result at step ST112 is No, the LM 11 receives one "object" and represents it as a "m1 (w, h)", where the name of the "object" is m and the size thereof is (w, h), at step ST114.

Next, the LM 11 asks the SM 12 for a set $S^0$ of inscribed rectangles of the current blank space (at step ST115). Thereafter, the LM 11 receives a reply from the SM 12 (at step ST116) and determines whether or not there is a blank space (at step ST117). When the LM 11 has received the following reply as the blank space from the SM 12, $$S^0=\{Q_i\square\ ((x_0, x_1), (y_0, y_1))$$

(where i=1, . . . , $n_0$: $n_0$ represents the number of inscribed rectangles of the set $S^0$)} the LM 11 designates the first priority inscribed rectangle of the set $S^0$ as Q (at step ST118).

Next, the LM 11 determines the layout position ($x_0'$, $y_0'$) according to the priority rule R for layout positions (at step ST119). The LM 11 sends a command "layout: m■ (($x_0'$, $x_0'$+w), ($y_0'$, $y_0'$+h))" to the SM 12 (at step ST120). The LM 11 checks a reply received from the SM 12 (at step ST121).

When the LM 11 has received a reply "layout invalid, rejected" from the LM 12, the LM 11 determines whether or not the set $S^0$ has the next priority inscribed rectangle (at step ST122). When the determined result at step ST122 is Yes, the LM 11 designates the inscribed rectangle as Q (at step ST123) and repeats the process at and after step ST119.

When the LM 11 has received a reply "layout OK, completed" from the SM 12, the LM 11 adds a "m■ (($x_0'$, $x_0'$+w), ($y_0'$, $y_0'$+h))" to the laid-out rectangle list L (at step ST124) and repeats the process at and after step ST112.

When the LM 11 has received a message "object input completed" , it performs a normal end process (at step ST113). In this example, the LM 11 outputs the laid-out rectangle list L={m■ ($x_0$, $x_1$,), ($y_0$, $y_1$)), . . . ) and asks the SM 12 for the set $S^0$ of inscribed rectangles of the remaining blank space. The LM 11 outputs the set $S^0$ of inscribed rectangles received from the SM 12 and completes the process.

When the determined result at step ST117 is No and when the determined result at step ST122 is No, the LM 11 performs a layout unsuccessful end process (at step ST125).

In this case, the LM 11 outputs the laid-out rectangle list L={m■ (($x_0$, $x_1$) , ($y_0$, $y_1$)), . . . } and the rectangle "m■ (w, h)" to be currently laid out along with a message "layout unsuccessful." The LM 11 asks the SM 12 for the set $S^0$ of inscribed rectangles of the remaining blank space, outputs the set $S^0$ of inscribed rectangles received from the SM 12, and completes the process.

Next, examples of several additional functions of the LM 11 will be supplemented.

(1) As was described in the process at step ST111, a "container" may be a figure composed of a plurality of rectangles rather than a simple rectangle. When a plurality of rectangles is input to the LM 11 with their position information, they are sent to the SM 12. Thus, the SM 12 automatically forms the complex figure from the rectangles and treats it as a "container."

(2) A particular "object" can be easily laid out at a particular position with priority. To do this, when an "object" to be laid out is designated at step ST114, the layout position should be explicitly designated along with the name and size thereof.

In this case, an "object" is input in the format of, for example, "m■ (($x_0$, $x_1$), ($y_0$, $y_1$))." The LM 11 skips the process from step ST 12 to step ST119. At step ST120, the LM 11 outputs a command "layout: m■ (($x_0$, $x_1$), ($y_0$, $y_1$))" to the SM 12.

When the SM 12 sends a reply "layout invalid, rejected" to the LM 11, the layout process has failed and the process terminates. The layout according to the designation of this format can be securely and easily performed in an early stage of the layout process. Using such a designation a particular "object" can be two-dimensionally laid out at a desired position.

(3) With the process shown in FIG. 95, an "occupied blank" can be laid out as a "object." In this case, it is necessary to distinguish the "occupied blank" with the name of the "object" or additional information thereof. After the "occupied blank" has been laid out, it can be easily distinguished with reference to the result of the two-dimensional layout.

(4) An "occupied blank area" can be additionally laid out in the vicinity of a "object in the following two manners. As the first manner, an "object" with an "occupied blank area" is designated at step ST114.

In this first manner, the process of the LM 11 is not changed.

As the second manner, at step ST111, a rule for adding an "occupied blank area" is stored as part of layout rule R beforehand. The additional rule is used in the process at steps ST119 and ST120. When a layout position is designated in one inscribed rectangle at step ST119, an appropriate "occupied blank area" is secured. In addition, an appropriate "occupied blank area" is secured for the size designated at step ST120. This second manner is very flexible. In other words, depending on a layout position and a space, the "occupied blank area" can be adjusted. In this case, however, detailed designations should be described in the layout rule R and the process program thereof.

Figure 96:
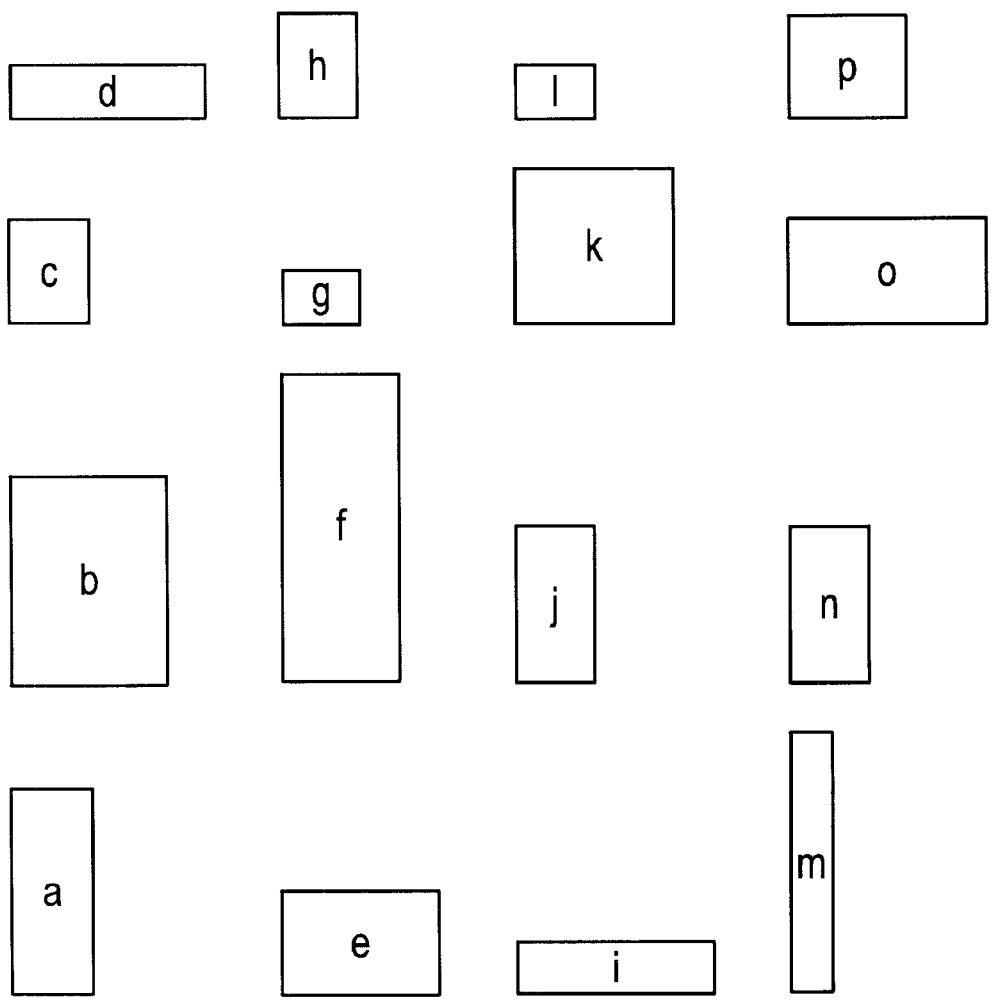
FIG. 96 is a schematic diagram showing 16 rectangles.

Next, with reference to FIGS. 96 to 116, a designation example of "a priority rule for layout positions" and a layout example thereof will be described. In this example, a problem for laying out 16 rectangles as shown in FIG. 96 on a plane will be considered.

These rectangles are denoted by "a☐ (2, 4), b☐ (4, 4), c☐ (2, 2), d☐ (5, 1), e☐ (4, 2), f☐ (3, 6), g☐ (2, 1), h☐ (2, 2), i☐ (5, 1), j☐ (2, 3), k☐ (4, 3), l☐ (2, 1), m☐ (1, 5), n☐ (2, 3), o☐ (5, 2), p☐ (3, 2)." The layout order of these rectangles is "a, e, i, m, b, f, j , n, c, g, k, o, d, h, 1, p."

The basic method for designating "a priority rule for layout positions" is to designate a priority "main direction" and a "sub direction" that intersects perpendicularly therewith or at an angle thereto. The "main direction" may be selected from up, down, left, right, upper right, upper left, lower left, lower right, slope ½ of lower left, and so forth.

An "object" is laid out at the farthest position in the "main direction" in the blank space. When the layout priority position cannot be uniquely designated only with the "main direction," the "sub direction" is used.

Next, a problem for laying out 16 rectangles shown in FIG. 96 will be described as layout examples in the cases that the size of the "container" and the "main direction"/"sub direction" are varied.

Figure 97:
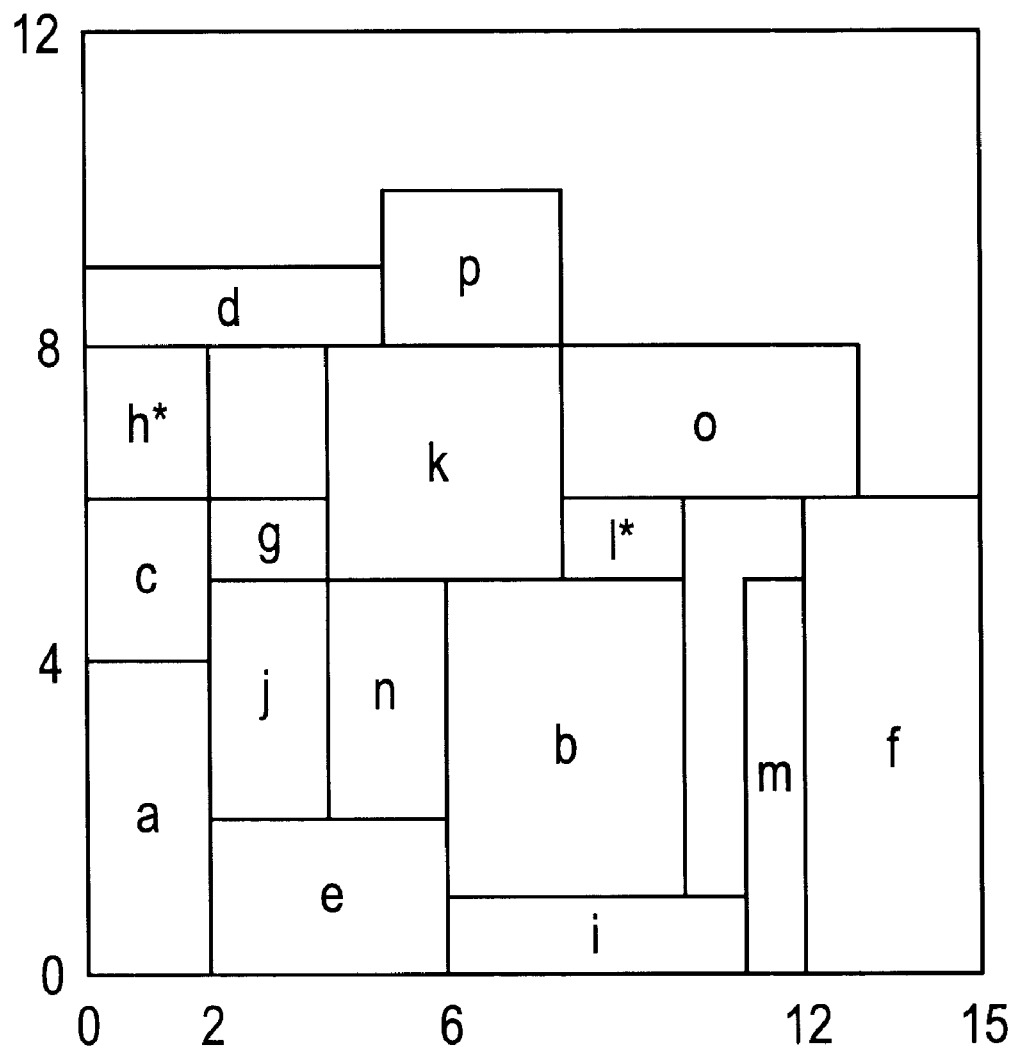
FIG. 97 is a schematic diagram showing the second layout example.
Figure 98:
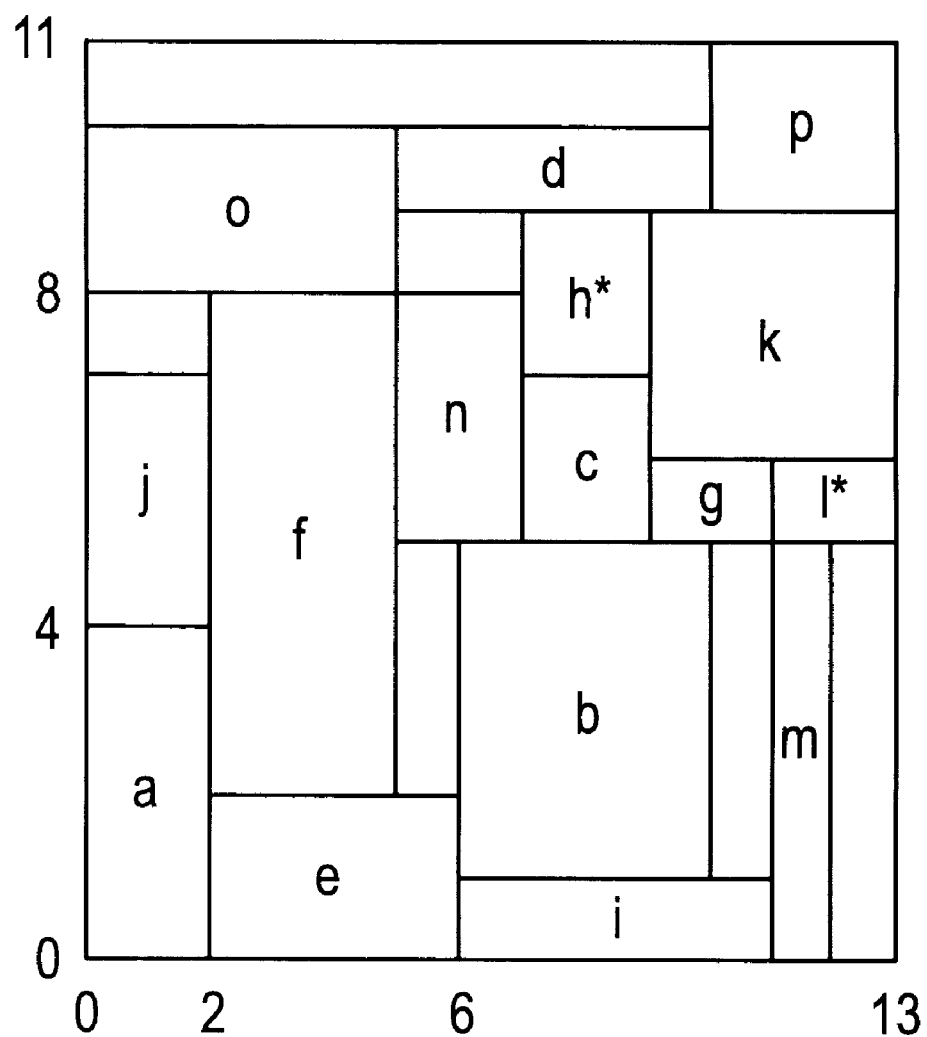
FIG. 98 is a schematic diagram showing the third layout example.
Figure 99:
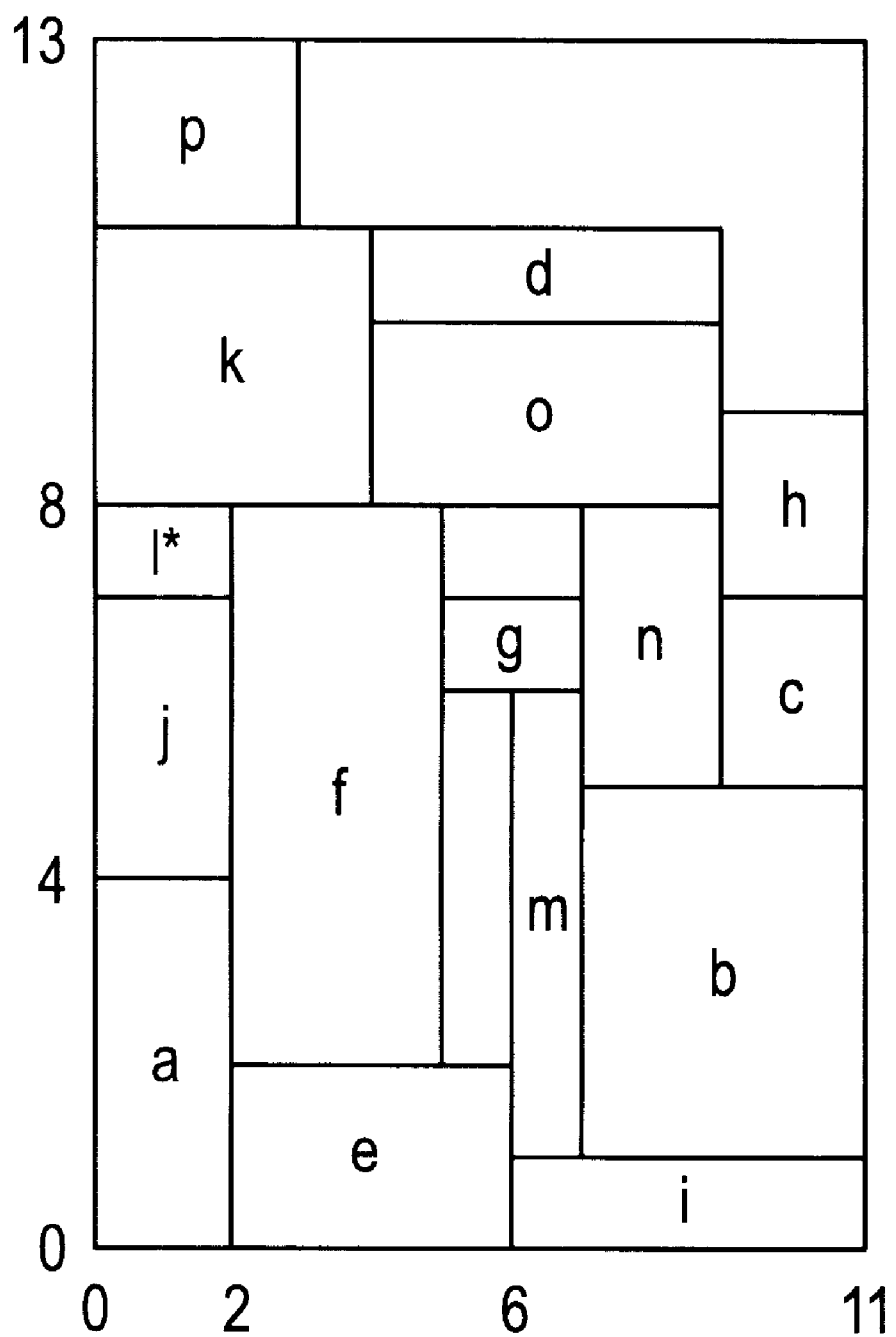
FIG. 99 is a schematic diagram showing the fourth layout example.

FIG. 97 shows a layout in the case that the size of a "container" is 15×12 and that the layout rule is down first/left first. In this case, the rectangles h and l are laid out in closed blank spaces after they are formed. FIG. 98 shows a layout in the case that the size of a "container" is 13×11 and that the layout rule is down first/left first. FIG. 99 shows a layout in the case that the size of a "container" is 11×13 and that the layout rule is down first/left first.

Figure 100:
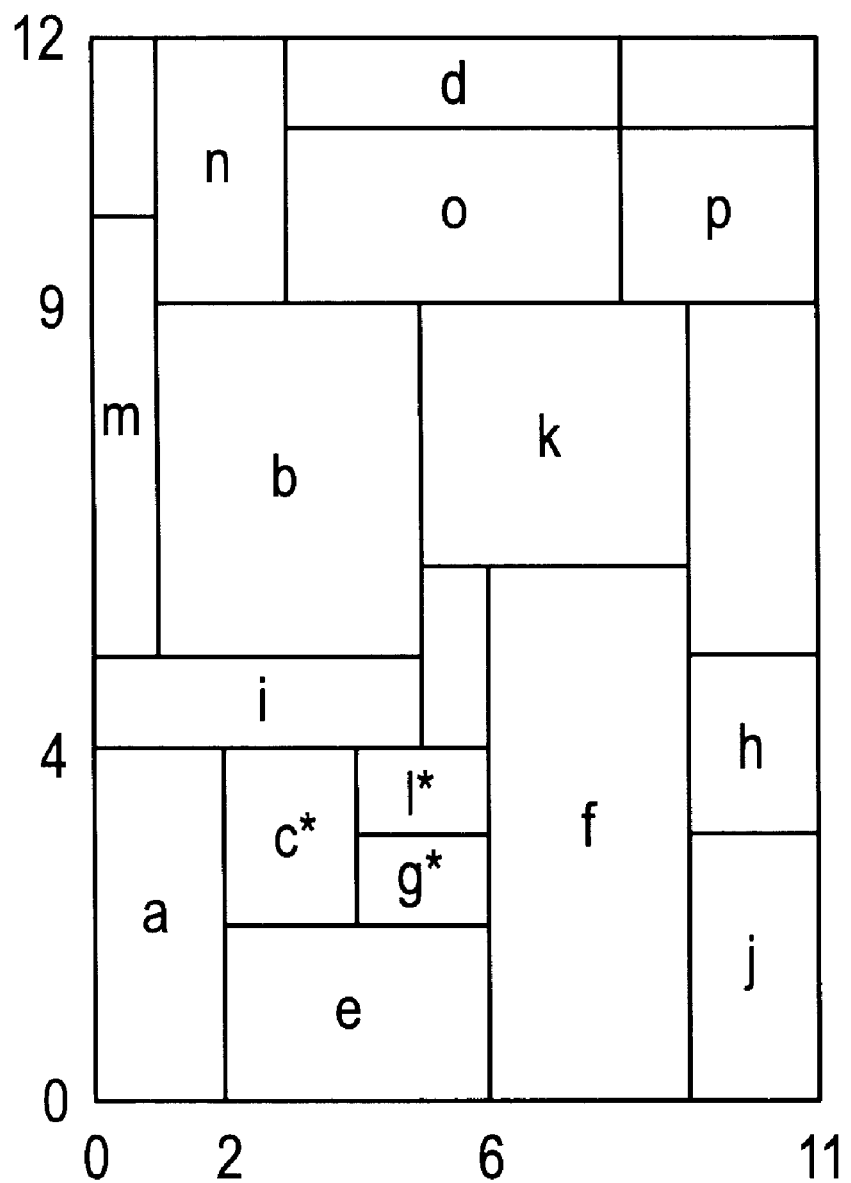
FIG. 100 is a schematic diagram showing the fifth layout example.
Figure 101:
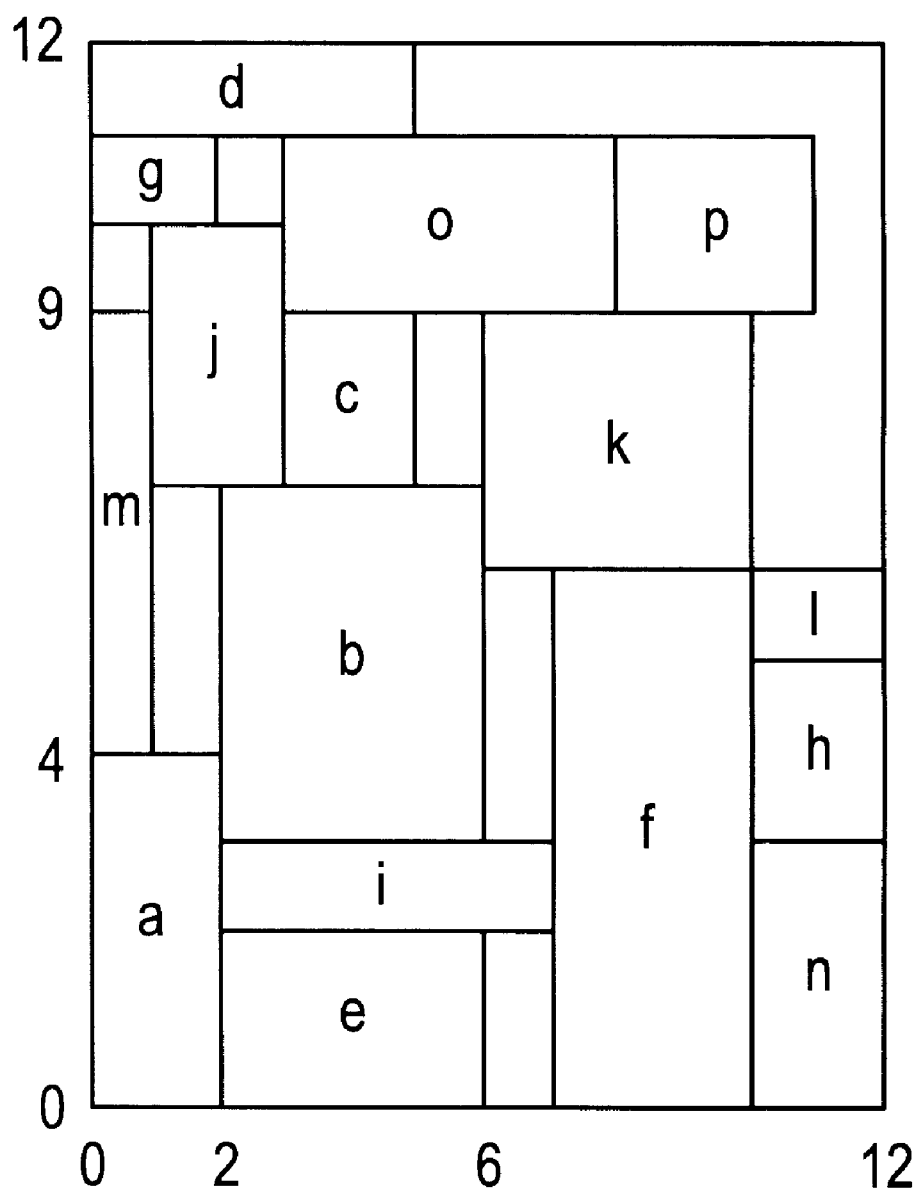
FIG. 101 is a schematic diagram showing the sixth layout example.
Figure 102:
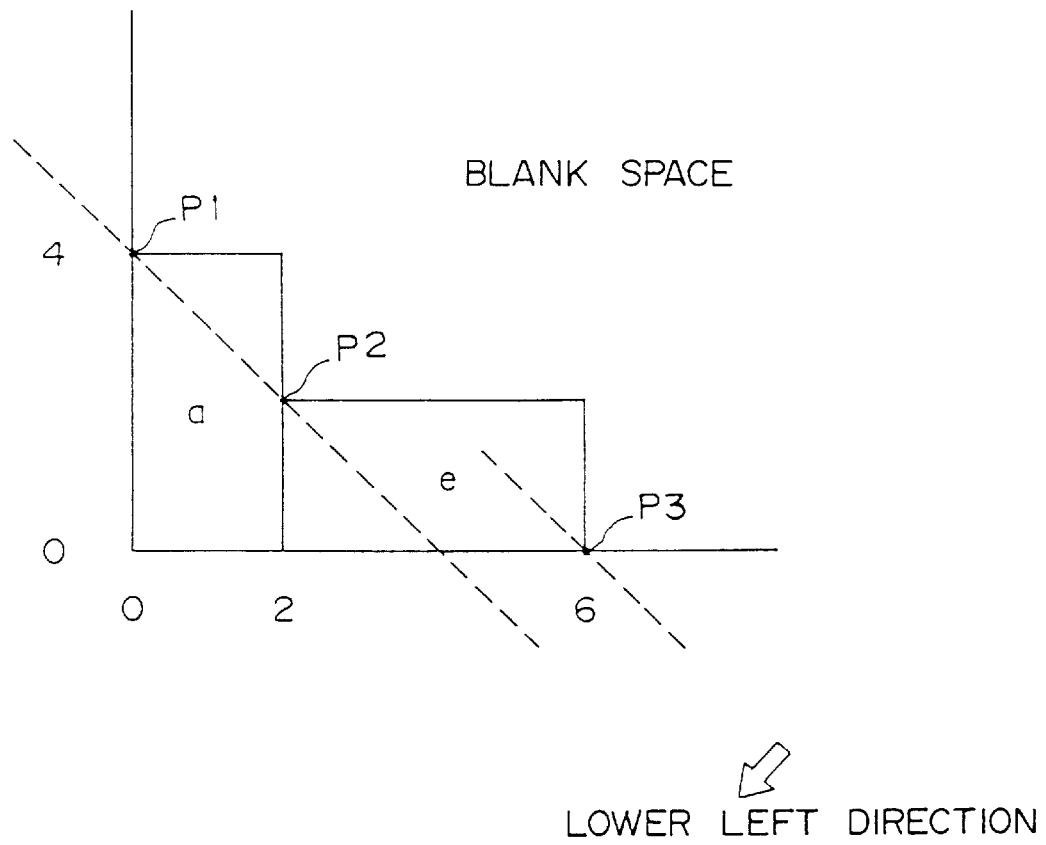
FIG. 102 is a schematic diagram showing layout positions with priority at a lower left position.

FIG. 100 shows a layout in the case that the size of a "container" is 11×12 and that the layout rule is lower left first/left first. FIG. 101 shows a layout in the case that the size of a "container" is 12×12 and that the layout rule is lower left first/down first. With these layout rules, the rectangles a and a are laid out as shown in FIG. 102.

To determine the next layout priority position, the farthest position in the lower left direction as the main direction is obtained. In FIG. 102, when lower left vertices P1, P2, and P3 of inscribed rectangles of the blank space are compared, it is clear that the vertices P1 and P2 are laid out at the farthest lower left positions. Thus, the vertices P1 and P2 have higher priority than the vertex P3. However, with only the main direction, it is not determined which of the vertices P1 and P2 has priority to the other.

Thus, the sub direction of the layout rule is referenced. In the example shown in FIG. 100, since the sub direction is left, the vertex P1 at the left of the vertex P2 is determined as the highest priority layout position. Thus, the next rectangle i is laid out at the position of the vertex P1. In contrast, in the example shown in FIG. 101, since the sub direction is down, the vertex P2 below the vertex P1 is determined as the highest priority layout position. Thus, the next rectangle i is laid out at the position of the vertex P2. The other directions such as upper left, upper right, and lower right are determined in the same manner.

Figure 103:
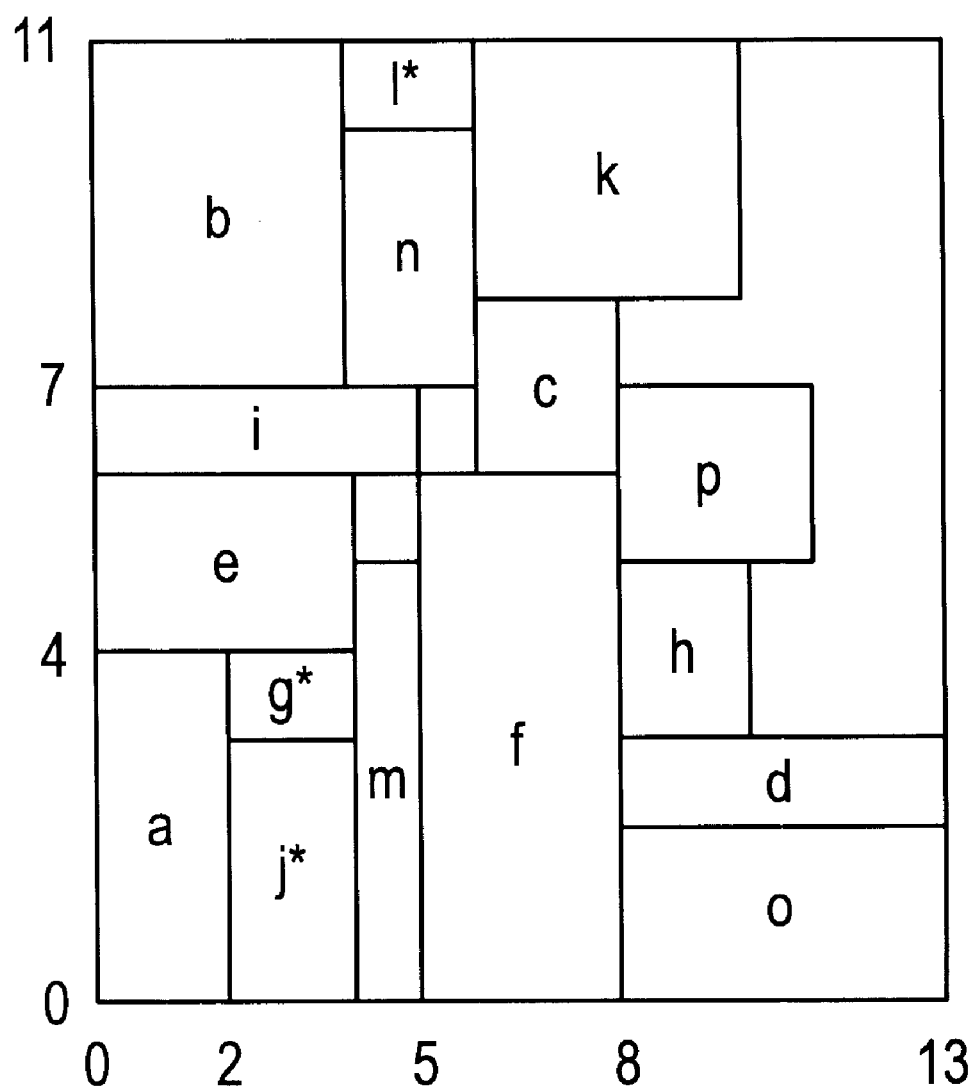
FIG. 103 is a schematic diagram showing the seventh layout example.
Figure 104:
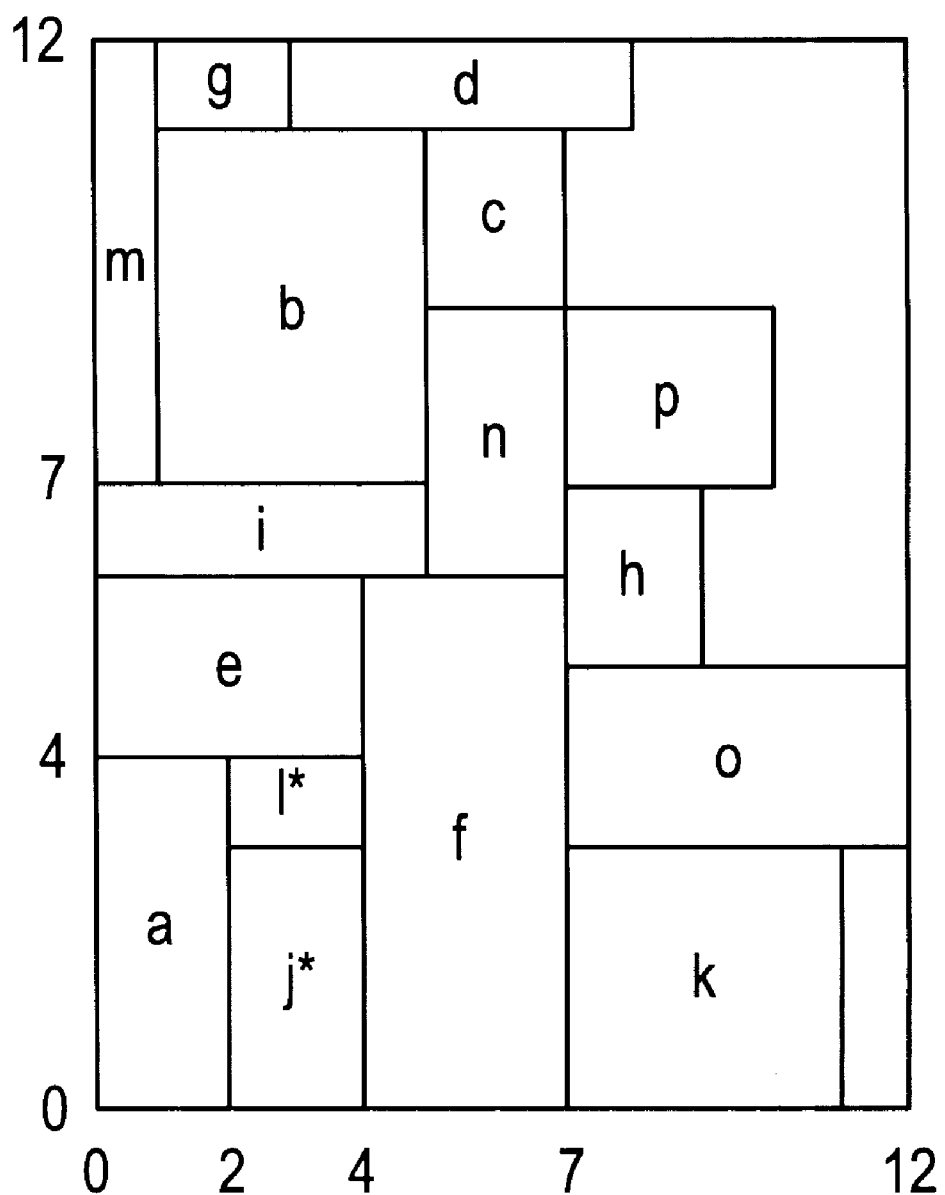
FIG. 104 is a schematic diagram showing the eighth layout example.

FIG. 103 shows a layout in the case that the size of a "container" is 13×11 and that the layout rule is left first/down first.

In designating "a priority rule for layout positions," whenever one "object" is laid out, the "main direction"/"sub direction" can be varied according to an appropriate rule. Thus, "objects" can be laid out at positions on the outer periphery of the "container" as priority positions.

For example, it is assumed that the lower left direction is designated as the first "main direction" and that whenever an "object" is laid out, the "main direction" is rotated clockwise by 90 deg. In addition, it is assumed that the phase of the "sub direction" always leads the phase of the "main direction" by 90 deg. Thus, the first "sub direction" is upper left. According to such a priority rule, the 16 rectangles shown in FIG. 96 are laid out as follows.

Figure 105:
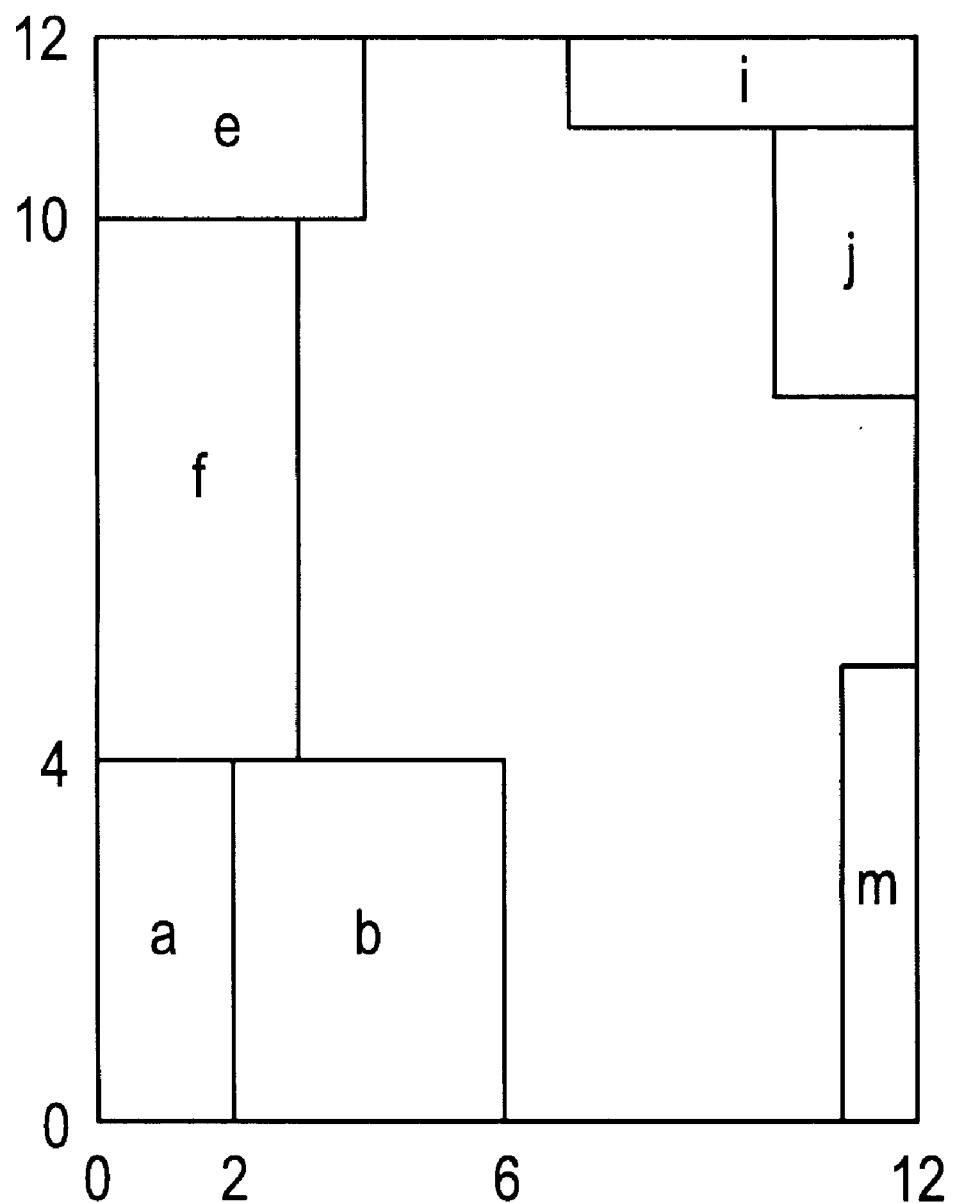
FIG. 105 is a schematic diagram showing the first intermediate layout.
Figure 106:
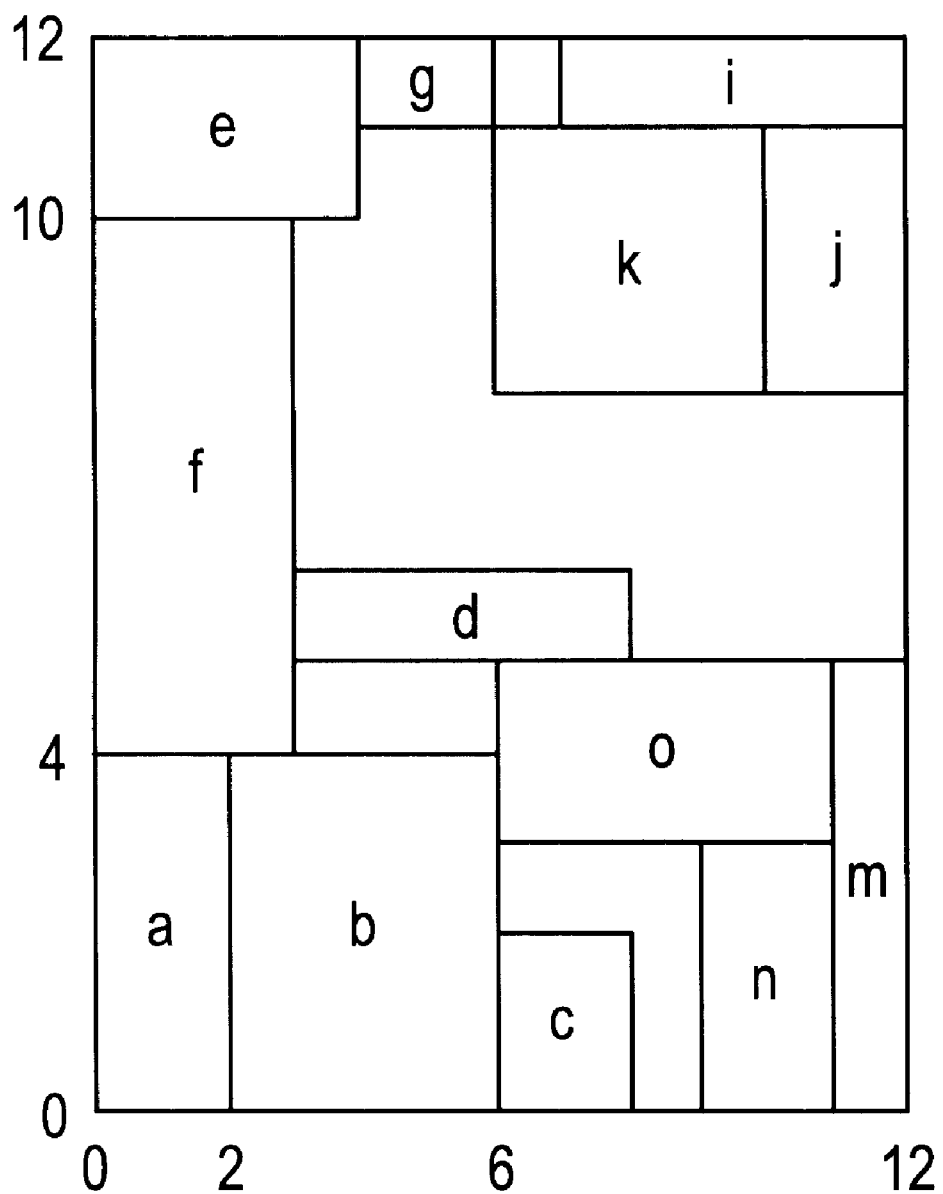
FIG. 106 is a schematic diagram showing the second intermediate layout.
Figure 107:
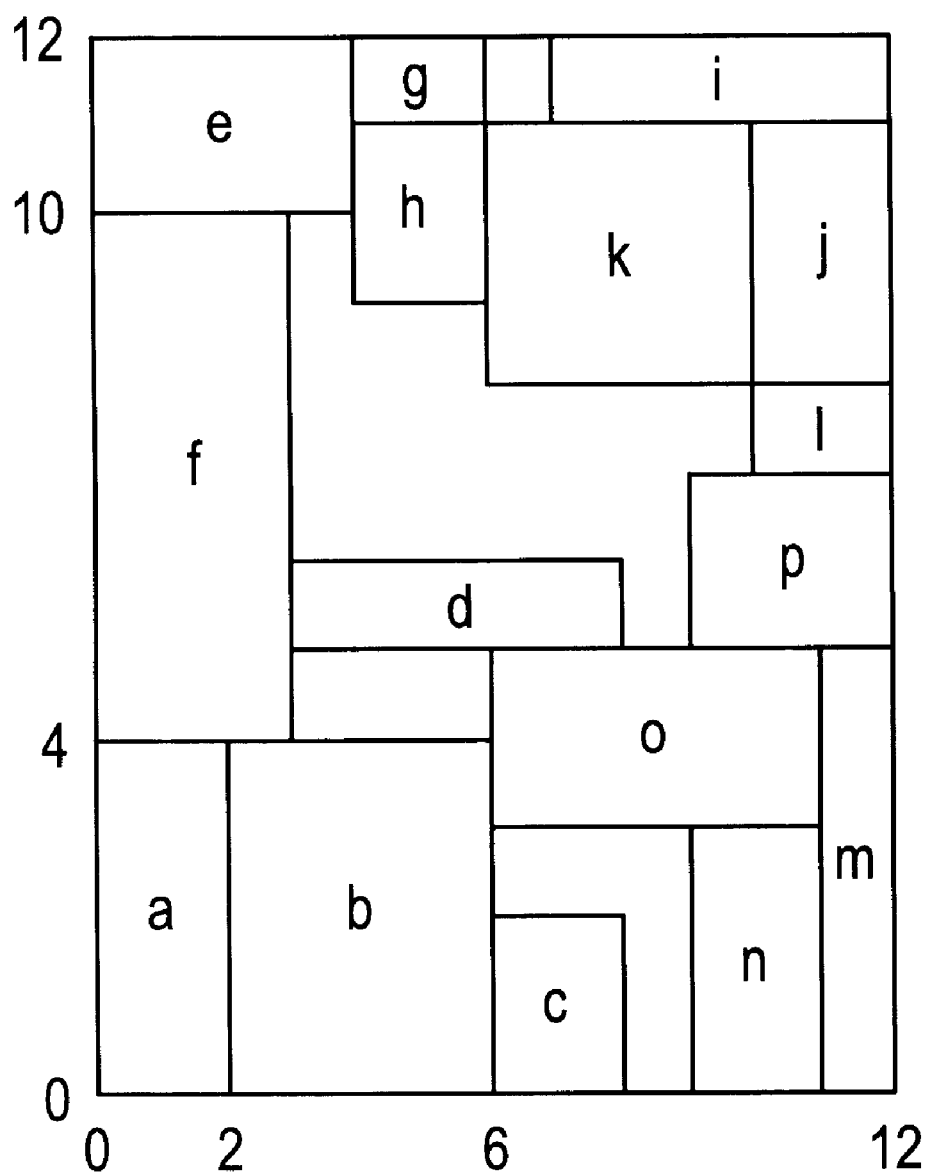
FIG. 107 is a schematic diagram showing the ninth layout example.

Assuming that the size of the "container" is 12×12 and that the layout rule is a clockwise rotation of the "main direction", the rectangles a, e, i, m, b, f, and j are laid out as shown in FIG. 105. Next, the rectangles n, c, g, k, o, and d are laid out as shown in FIG. 106. Finally, the 16 rectangles are laid out as shown in FIG. 107. Thus, it is clear that "objects" are laid out inwardly from the outer periphery of the "container."

Figure 108:
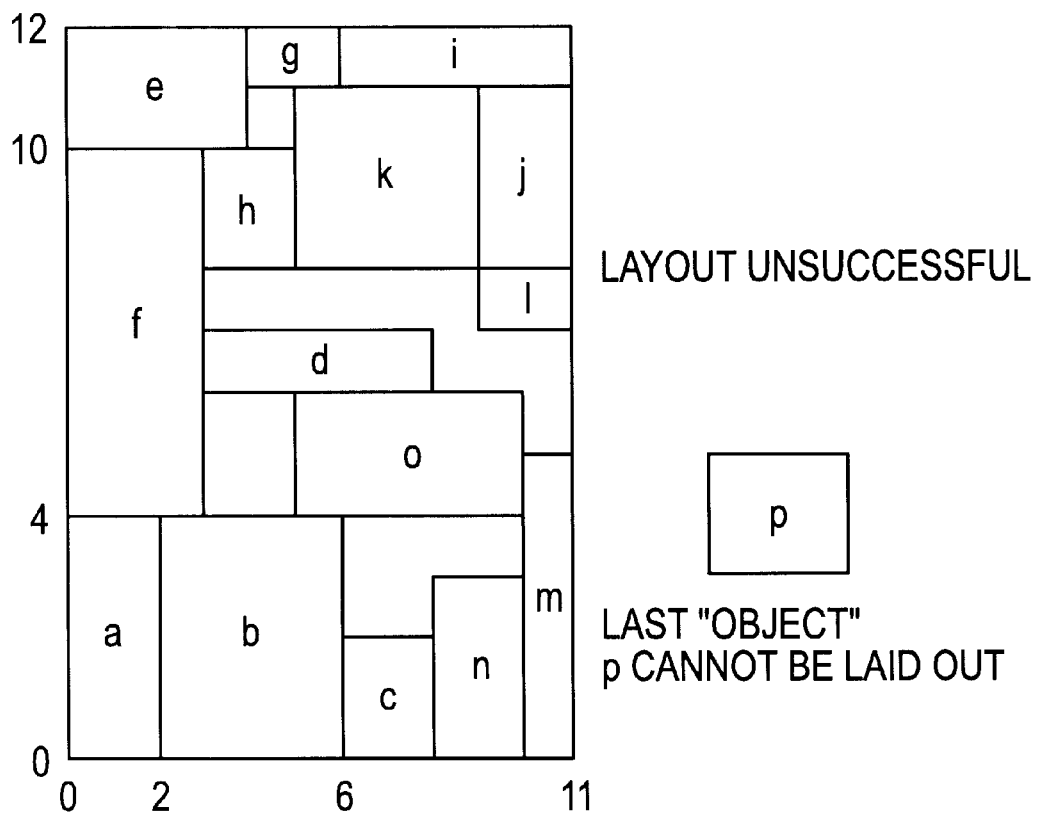
FIG. 108 is a schematic diagram showing the tenth layout example.
Figure 109:
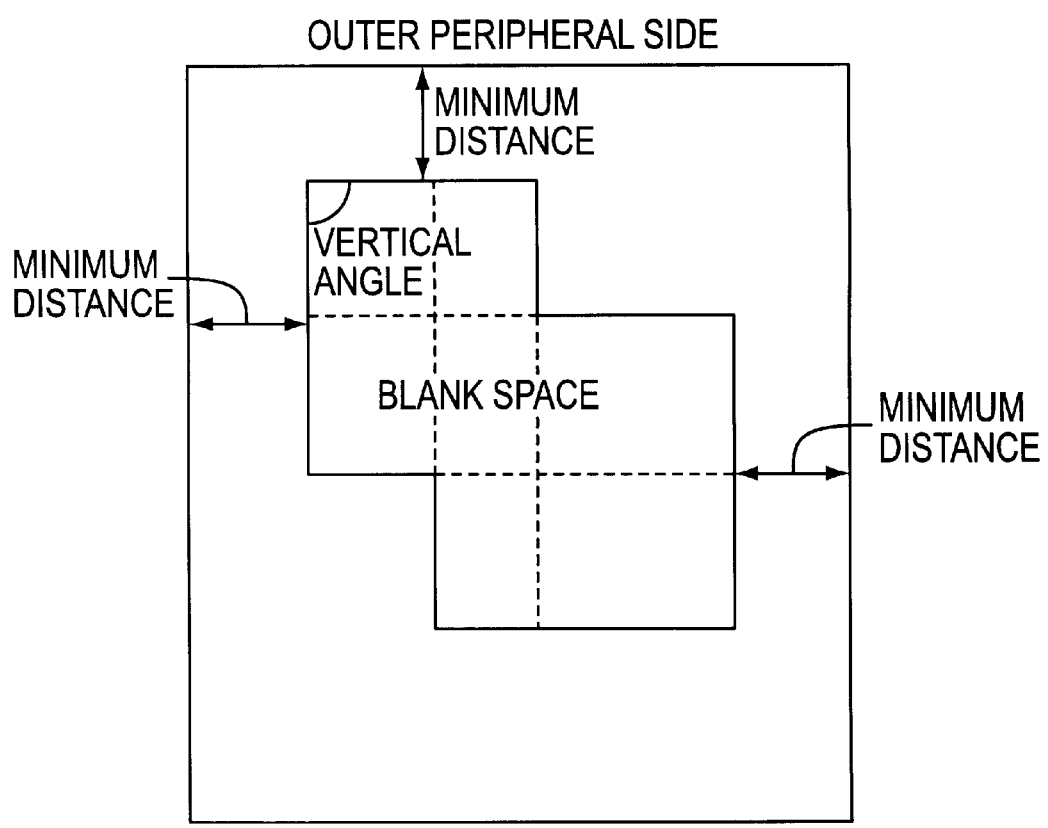
FIG. 109 is a schematic diagram showing distances from outer peripheral sides.

Next, assuming that the size of a "container" is 11×12 and that the similar layout rule is applied, the last rectangle p is not laid out as shown in FIG. 108. Thus, the layout process is terminated as unsuccessful.

Alternatively, in designating "a priority rule for layout positions," the distance from the outer peripheral sides of the "container" can be used instead of the priority direction of a layout. The distance can be designated in various manners. In this example, the distance is designated in the following manner.

(a) The distance between each side of each inscribed rectangle that composes the blank space and the corresponding outer peripheral side of the container is calculated in a direction perpendicular to the sides. A side of the inscribed rectangles with the smallest distance is selected as a priority side.

(b) When there are a plurality of sides with the minimum distance to the outer peripheral sides, a vertex of a vertical angle formed by two sides with the minimum distance to the outer peripheral sides is selected with priority. The position of such a vertex is treated as a priority layout position. The priority of the directions of the vertex is designated in the order of lower left, upper left, upper right, and lower right.

(c) On the other hand, when sides of inscribed rectangles do not form a vertical angle, the priority of the sides is designated in the order of left, up, right, and down. When there are a plurality of positions that satisfy the same condition on one side, the priority is designated to the nearest position in the clockwise direction.

Figure 110:
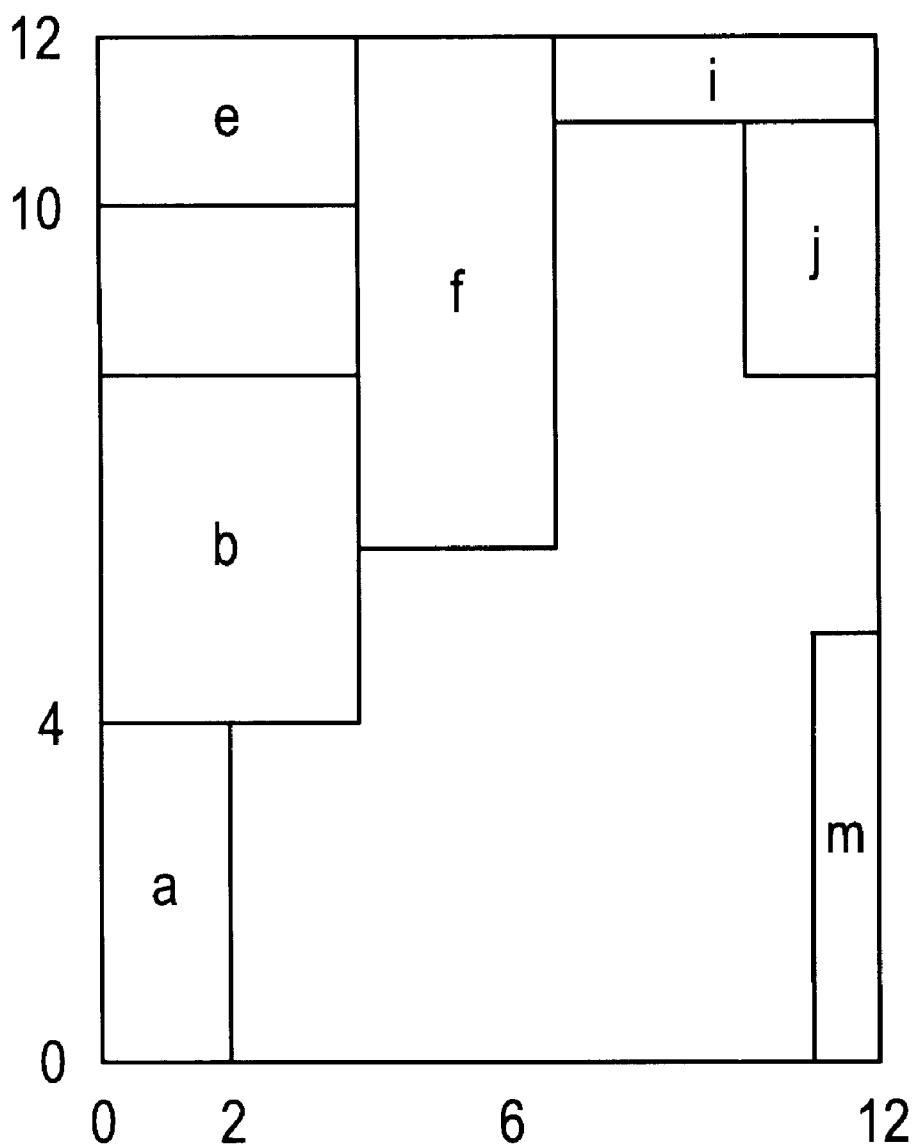
FIG. 110 is a schematic diagram showing the third intermediate layout.
Figure 111:
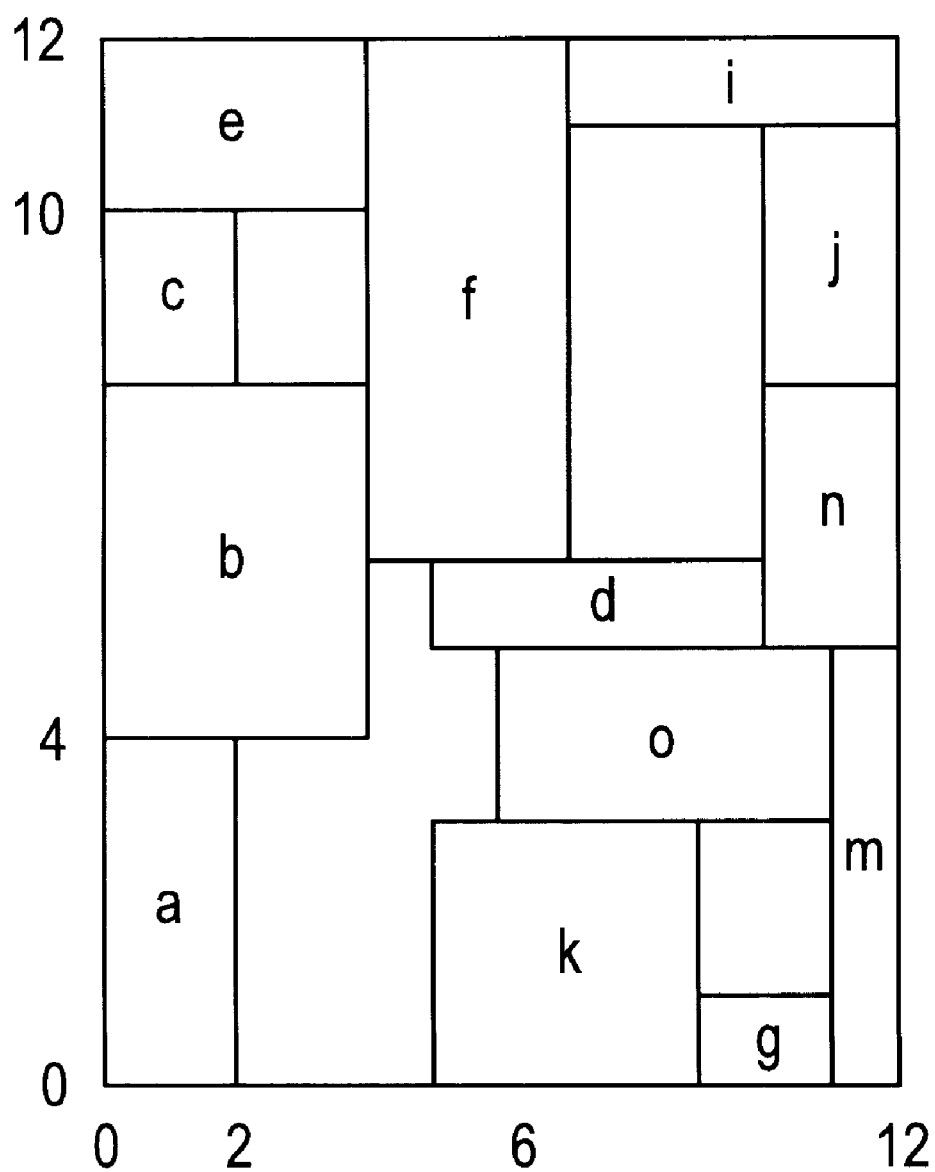
FIG. 111 is a schematic diagram showing the fourth intermediate layout.
Figure 112:
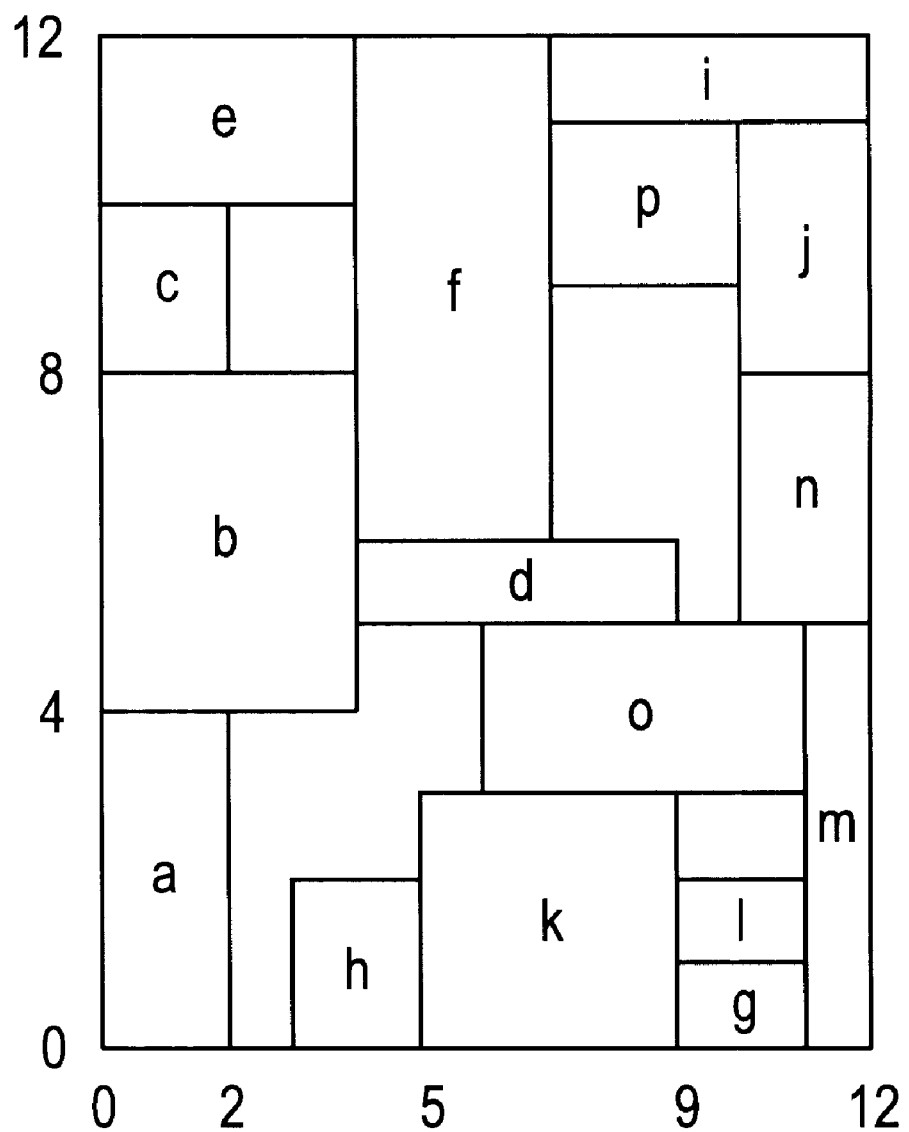
FIG. 112 is a schematic diagram showing the eleventh layout example.

Assuming that the size of a "container" is 12×12 and that a position with the smallest distance from the corresponding outer peripheral side has priority as the layout rule, the rectangles a, e, i, m, b, f, and j are laid out as shown in FIG. 110. Next, the rectangles n, c, g, k, o, and d are laid out as shown in FIG. 111. Finally, the 16 rectangles are laid out as shown in FIG. 112.

Figure 113:
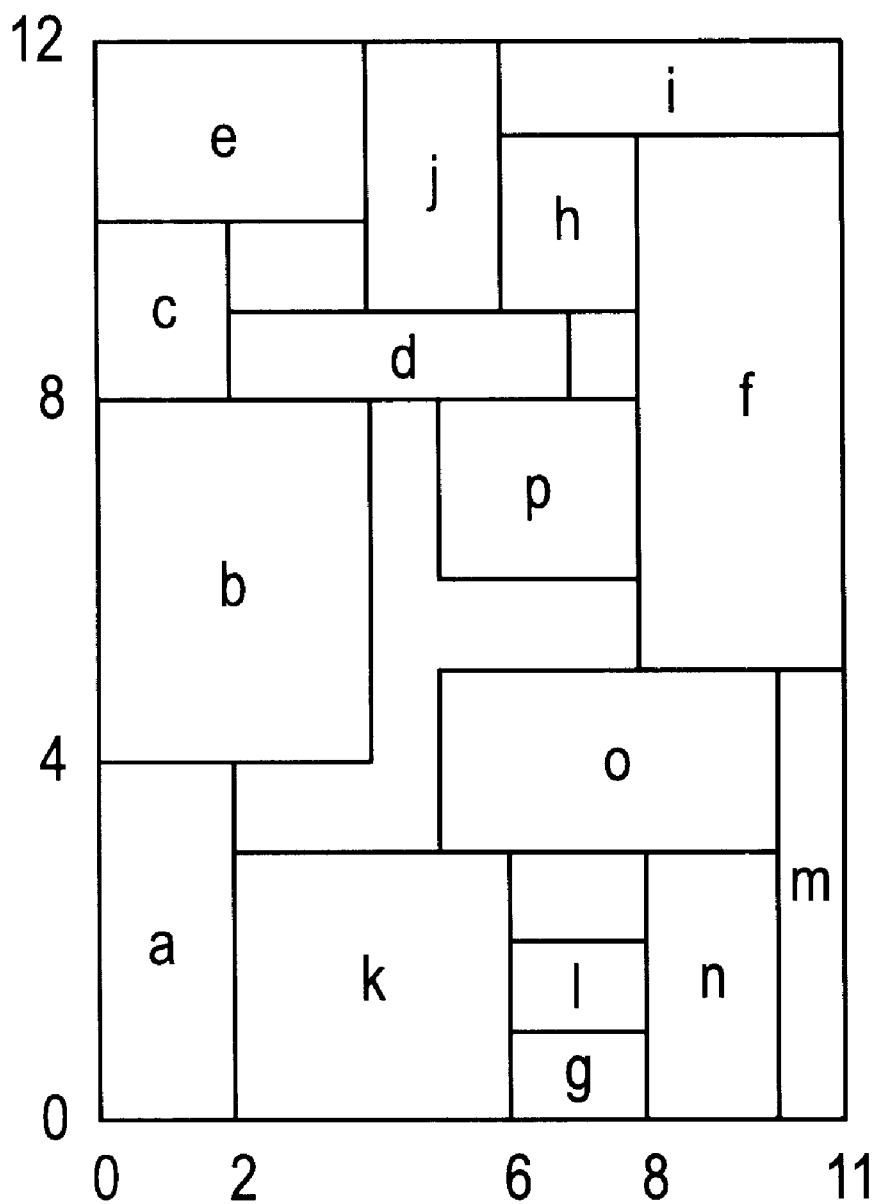
FIG. 113 is a schematic diagram showing the twelfth layout example.

In the layout process, it is clear that "objects" are laid out inwardly from the outer periphery of the "container." When the size of the "container" is 11×12 and the similar layout rule is applied, the 16 rectangles are laid out as shown in FIG. 113.

Next, an example in which "objects" are laid out in a closed blank space will be described. In this case, the closed space represents a blank space where a priority direction is blocked with another "object" that has been laid out or the like.

As an example for laying out "objects" with the "down first/left first" as "a priority rule for layout positions", there is a layout as shown in FIG. 7. In this example, the rectangle f is laid out as the last rectangle. The rectangle f is laid out in a closed blank space surrounded by the rectangles b, c, and d.

In the two-dimensional layout system according to the embodiment of the present invention, regardless of whether the priority direction is open or closed, as long as there is a blank space in the direction, a process for laying out an "object" in the space can be very easily performed. With the algorithm of the process of the LM 11 shown in FIG. 95, just before the rectangle f is laid out, the SM 12 outputs the following set of inscribed rectangles of the blank space.

$$S^0 = \{\Box \ ((6, 8), \Box \ (0, 2)), \Box \ ((6,8), (4, 8)), \Box((6, 10), (6, 8))\}$$

When the set is examined with the priority rule of "main direction/sub direction," the "□ ((6, 8), (0, 2))" is selected as the first priority inscribed rectangle. Since the SM 12 can freely handle a plurality of separated closed figures, it can easily lay out the rectangle to the closed blank space.

Figure 114:
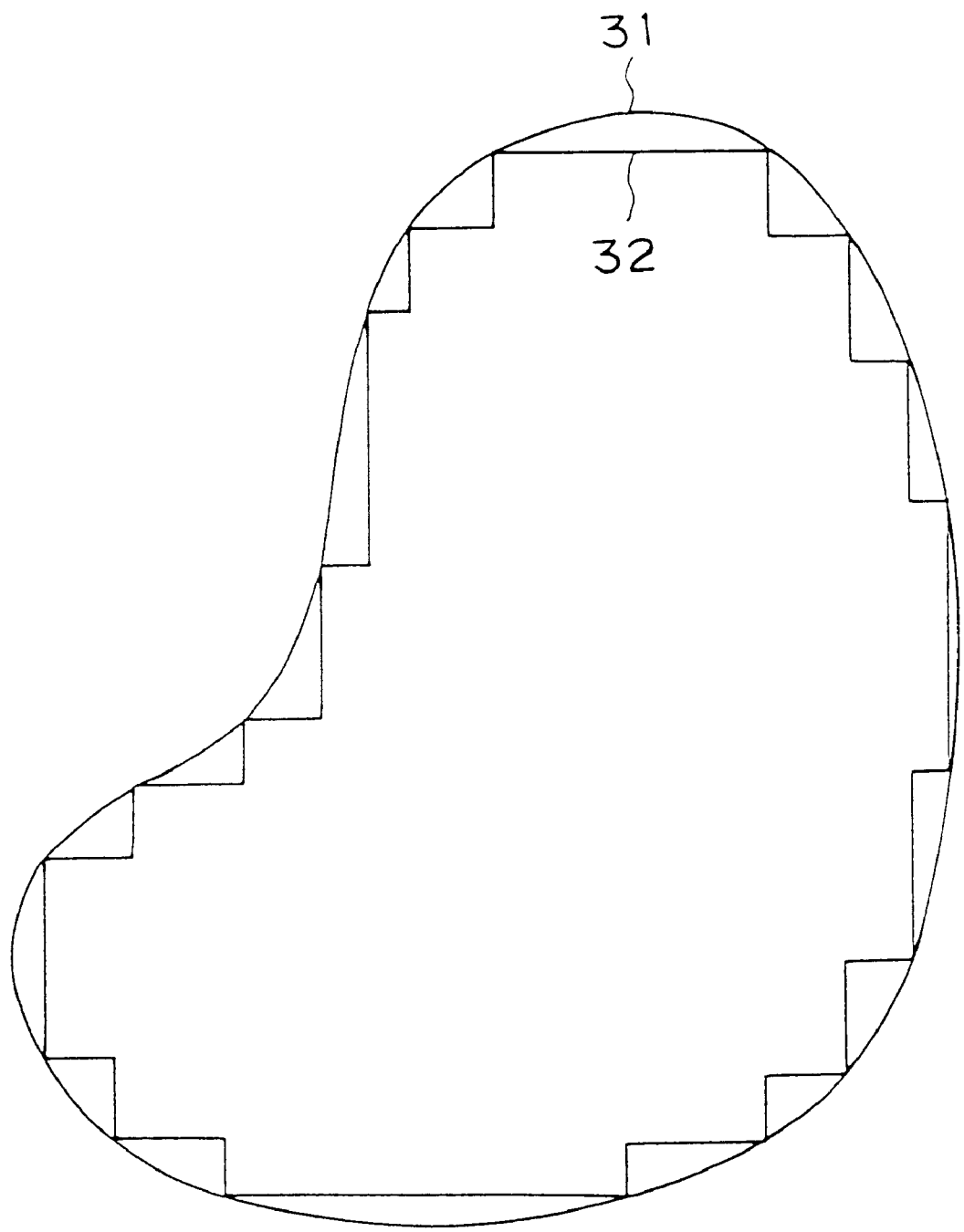
FIG. 114 is a schematic diagram showing an approximating method of an arbitrary shape.
Figure 115:
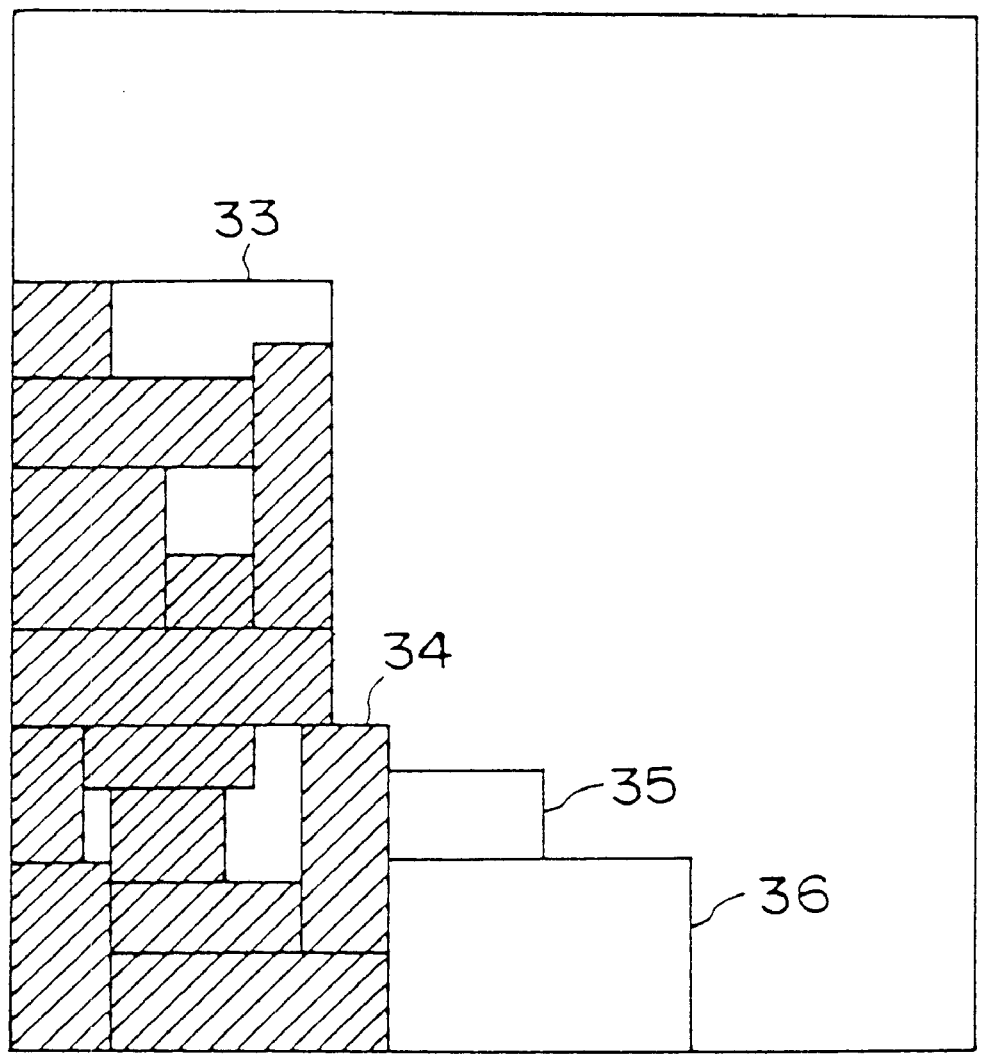
FIG. 115 is a schematic diagram showing a hierarchical layout.

In the above-described layout process, a "container" is composed of one or more rectangles. However, a "container" in any shape surrounded by a curved line or the like can also be used. In this case, as shown in FIG. 114, the two-dimensional layout system approximates a FIG. 31 in any given shape with vertical sides and horizontal sides having a desired accuracy, generates a composite FIG. 32 composed of a plurality of rectangles, and uses the composite FIG. 32 as a "container."

Alternatively, a rectangle circumscribed to a layout result of the two-dimensional layout system are input as part of "objects" to be newly laid out so as to lay out it to a larger "container." Thus, a hierarchical two-dimensional layout can be accomplished. For example, in a layout example shown in FIG. 115, circumscribed rectangles 33 and 34 obtained as a layout result of small rectangles (hatched rectangles) are laid out as "objects" as well as other rectangles 35 and 36.

Next, the process of the two-dimensional layout reverse analyzing unit 15 shown in FIG. 13 will be described. In this example, as an object for a practical reverse analysis, a layout example shown in FIG. 98 will be employed. In this problem, the following information is input to the reverse analyzing apparatus 15.

Layout Rule of Reverse Analysis: "Down First/Left First"
"Container": □ ((0, 13), (0, 11))
Laid-out rectangle list:
a□ ((0, 2), (0, 4)), e□ ((2, 6), (0, 2)), i□ ((6, 11), (0, 1)), m□((11, 12), (0, 5)), b□((6, 10), (1, 5)), f□ ((2, 5), (2, 8)), j□ ((0, 2), (4, 7)), n□((5, 7), (5, 8)), c□ ((7, 9), (5, 7)), g□ ((9, 11), (5, 6)), k□ ((9, 13), (6, 9)), o□ ((0, 5), (8, 10)), d□((5, 10), (9, 10), h□ ((7, 9), (7, 9)), l□ (11, 13), (5, 6)), p□ ((10, 13), (9, 11))

Figure 116:
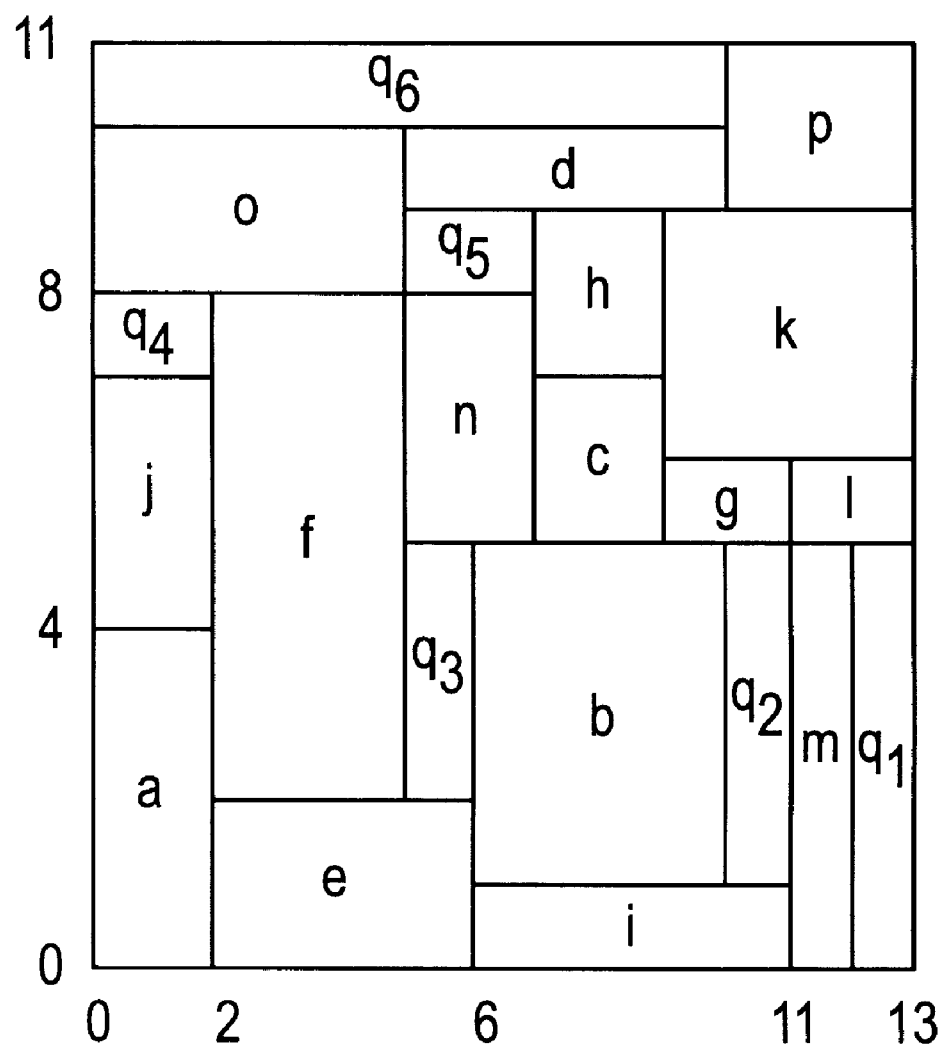
FIG. 116 is a schematic diagram showing blank spaces in the third layout example.

Set $S^0$ of inscribed rectangles of blank space:
$\{q_1\Box \ ((12, 13), (0, 5)), q_2\Box \ ((10, 11), (1, 5)), q_3\Box \ ((5, 6), (2, 5)), q_4\Box \ ((0, 2), (7, 8)), q_5\Box \ ((5, 7), (8, 9)), q_6\Box \ ((0, 10), (10, 11))\}$ where the inscribed rectangles $q_1, q_2, q_3, q_4, q_5,$ and $q_6$ of the blank space do not overlap with each other, but are independently laid out as shown in FIG. 116. As described earlier, to reversely analyze the layout as shown in FIG. 116, all laid-out rectangles and all inscribed rectangle of the blank space $S^0$ are extracted according to the "priority rule for layout positions" in the priority order.

At this point, normally, the space managing unit 12 manages the set $S^0$. Whenever a rectangle of the blank space is extracted as an "occupied blank area," the space managing unit 12 eliminates it from the set $S^0$ and finally verified that there is no blank space. However, in this example, since inscribed rectangles are not connected, there is no problem. Rectangles including inscribed rectangles of the blank space are extracted in the following order.

a, e, i, m, qj, b, $q_2$, f , $q_{33}$, j, n, c, g, l, k, $q_4$, h, o, $q_5$, d, p, $q_6$

When the method for extracting all rectangles and blank spaces is used, although its applications are limited, a reverse analyzing problem can be strictly solved. In other words, a solution of a reverse analysis problem can be uniquely obtained. When rectangles are re-laid out according to the "priority rule for layout positions" used in the reverse analysis in the obtained order, the ordinal two-dimensional layout can be always restored.

In this example, as blank spaces, many "occupied blank areas" are present. However, most of the "occupied blank areas" are redundant and unnecessary. If only "occupied blank areas", which are necessary for restoring the original two-dimensional layout in re-laying out rectangles with the layout rule of "down first/left first," are left, the reversely analyzed result is as follows.

a, e, i, m, b, f, j, n, c, g, l, k, $q_4$, h, o, d, p

In other words, as an "occupied blank area," it is necessary to leave only the rectangle $q_4$. Thus, the reversely analyzed result with less redundancy is a desired representation for standardizing the layout order in varying the layout order and optimizing a two-dimensional layout.

To obtain such a result, the following process is performed. After a reversely analyzed result for extracting all "occupied blank areas" is obtained, while all the "occupied blank areas" are being neglected, the two-dimensional layout process is executed again using the reversely analyzed result, and the intermediate result is successively compared with the original two-dimensional layout.

If the layout position of an "object" differs between the original two-dimensional layout and the intermediate two-dimensional layout, a corresponding "occupied blank area" obtained in the reverse analysis is inserted. Thus, the other redundant "occupied blank areas" are removed.

In the reverse analysis of a two-imensional layout, the result depends on how an "occupied blank area" formed between "objects" is handled. From this view point, the reverse analyzing method can be categorized as the following three types.

(a) Redundant reverse analysis: A reverse analysis of which all "objects" and all "occupied blank areas" are extracted.

(b) Non-redundant reverse analysis: A reverse analysis of which all "objects" and only necessary "occupied blank areas" are extracted.

(c) Approximately reverse analysis: A reverse analysis of which all "objects" and no "occupied blank areas" are extracted.

When these reverse analyses are considered, the following points should be evaluated.

(1) How was layout data Layout0 as an object of the reverse analysis created ?

What is the designated priority rule Rule0 for the layout positions ?

What is an order Order0 of the layout of "objects" ?

Was an "occupied blank area" explicitly added ?

(2) In what method is the reverse analysis performed ?

What is the designated priority rule Rule1 for layout positions ?

Which of the above-described three methods is used for handling "occupied blank areas" ?

(3) In what method is the two-dimensional layout performed with the reversely analyzed result?

What is the designated priority rule Rule2 for layout positions ?

Assuming that these three processes are called "original layout," "reverse analysis," and "relayout," information is input and output as shown in FIG. 117. Normally, "occupied blank areas" are not required for the "original layout." However, "occupied blank areas" can be added to Order0. Focusing on the reverse analysis in the processes shown in FIG. 117, the following three points are common in the three reverse analyzing methods.

Object of reverse analysis: Any original layout result Layout0 can be handled. Under one layout rule Rule0, the same layout result Layout0 can be obtained from a plurality of different layout orders Order0. In addition, the same original layout result Layout0 can be obtained from a plurality of different sets of "layout rule Rule0 and layout order Order0."

Result of reverse analysis: A unique reversely analyzed result Order1 can be obtained from one original layout result Layout0.

Use of reversely analyzed result: Even if the same reversely analyzed result Order1 is used, when the re-layout rule Rule2 is different, a different re-layout result Layout2 is obtained normally.

In the simplest case, the layout rules of the three processes are the same. In this case (the first case), the three reverse analyzing methods have the following properties.

In the case (Rule0=Rule1=Rule2):

(a) Redundant reverse analysis: Any original layout Layout0 can be analyzed. The re-layout layout result Layout2 accords with the original layout Layout0.

(b) Non-redundant reverse analysis: Any original layout Layout0 can be analyzed. The re-layout result Layout2 accords with the original layout Layout0.

(c) Approximate reverse analysis: Although any original layout Layout0 can be analyzed, the re-layout result Layout2 does not always accord with the original layout Layout0. In other words, the original layout Layout0 is approximately restored.

In the second case, only the layout rule of the original layout process is different and the layout rule of the reverse analyzing process is the same as the layout rule of the re-layout process. In this case, as with the first case, the three reverse analyzing methods have the following properties.

In the case (Rule0≠Rule1=Rule2):

(a) Redundant reverse analysis: Any original layout Layout0 can be analyzed. The relayout result Layout2 accords with the original layout Layout0.

(b) Non-redundant reverse analysis: Any original layout Layout0 can be analyzed. The re-layout result Layout2 accords with the original layout Layout0.

(c) Approximate reverse analysis: Although any original layouto can be analyzed, the re-layout result Layout2 does not always accord with the original layout layouto.

In the third case, the layout rule in the reverse analyzing process is different from the layout rule in the re-layout process. The layout rule of the original layout is irrespective of the layout rule of the reverse analysis. In this case, the three reverse analyzing methods have the following properties.

In the case (Rule1≠Rule 2) (Rule0 is irrespective):

(a) Redundant reverse analysis: Although any original layout Layout0 can be analyzed, the re-layout result Layout2 depends on the layout rule Rule2 of the re-layout. Due to excessive blank spaces, the re-layout result Layout2 does not accord with the original layout Layout0 in many cases.

(b) Non-redundant reverse analysis: Although any original layout Layout0 can be analyzed, the re-layout result Layout2 depends on the layout rule Rule2 of the re-layout. Due to excessive blank spaces, the re-layout result Layout2 does not accord with the original layout Layout0 in many cases.

(c) Approxilnate reverse analysis: Although any original layout Layout0 can be analyzed, the re-layout result Layout2 depends on the layout rule Rule2 of the re-layout. Thus, the re-layout result Layout2 does not accord with the original layout Layout0 in many cases. The re-layout result Layout2 may be superior to or inferior to the original layout Layout0 in a packing density.

Next, the process of the two-dimensional layout evaluating unit 16 shown in FIG. 14 will be described. There are many evaluating methods for two-dimensional layouts corresponding to applications. In a real application, an "object" has a lot of additional information. In particular, information such as connection relation of "oobjects" becomes an important element. The connection relation of "objects" represents, for example, a wiring network of a circuit structure.

In the system according to the embodiment, an "object" is laid out as a simple rectangle. Only the layout position of the "object" is directly handled. In the following examples, evaluation relating to this system will be roughly described.

(a) Evaluation by the size of a two-dimensional layout: A condition of that the maximum width of the layout result does not exceed a predetermined value, a condition of that the area of a circumscribed rectangle of a layout result does not exceed a predetermined value, etc. are used for evaluation.

(b) Evaluation by the packing ratio of a two-dimensional layout: The ratio of the total area of "objects" to the area of a "container", the ratio of the total area of "objects" to the area of the circumscribed rectangle of a "container", etc. are calculated and used for evaluation.

(c) Evaluation by the layout position of a particular "object": A condition of that a particular "object" is present at a particular position, a condition of that a particular "object" is present in the vicinity of a particular position, a condition of that a particular "object" is present at a corner or in the vicinity of sides of a "container," etc. are used for evaluation.

(d) Evaluation by the relative position of particular "objects": A condition of that a plurality of particular "objects" are in contact, a condition of that a plurality of particular "objects" are in contact in the vertical direction, a condition of that a plurality of particular "objects" are arranged (spaced) in vertical positions, a condition of that a plurality of particular "objects" are within a predetermined distance, a condition of that a plurality of particular "objects" are spaced by a predetermined distance, a condition of that a plurality of particular "objects" are arranged in a predetermined order, etc. are used for evaluation.

(e) Evaluation by the distribution of "objects": A condition of that "objects" are categorized in attributes, types, and so forth and laid out correspondingly thereto, a condition of that "objects" are laid out without deviations of attributes, types, and so forth, etc. are used for evaluation.

(f) Evaluation by space between "objects": A condition of that a space (such as a path) is present between particular "objects," a condition of that a space is laid out between "objects" without a deviation, etc. are used for evaluation.

The two-dimensional layout evaluating unit 16 can use the simulated annealing method (SA) as a general basis for automatically optimizing a two-dimensional layout.

FIG. 118 is a flowchart showing an automatic optimizing process for a two-dimensional layout based on the SA method in which a layout order of "objects" is used for a search space. When the process is started, as an initial setting, the two-dimensional layout evaluating unit 16 receives a designated "container", one type or a plurality of types of designated "priority rule for layout positions," and an "object" list (at step ST131).

Next, as an initial state of the layout order of "objects," the two-dimensional layout evaluating unit 16 designates an arbitrary layout order to a state X, causes the two-dimensional layout unit 11 to perform a two-dimensional layout in the initial state, and calculates an evaluation value E(X) of the layout result (at step ST132). The two-dimensional layout evaluating unit 16 sets a temperature parameter T of the SA method to a high temperature (at step ST133). The two-dimensional layout evaluating unit 16 repeats the process from step ST134 to step ST139 a sufficient number of times.

First, the two-dimensional layout evaluating unit 16 selects a state change process for changing an order position of "objects", changes the layout order of the state X, and generates a changed state X' (at step ST134). Next, the two-dimensional layout evaluating unit 16 causes the two-dimensional layout unit 11 to perform a two-dimensional layout in the state X' and obtains an evaluation value E (X') of the result (at step ST135).

Next, with the difference of the evaluation values $\Delta=E(X')-E(X)$, the two-dimensional layout evaluating unit 16 obtains $\sigma(-\Delta/T)$ using Sigmoid function $\sigma$ (where $\sigma(x)=1/(1+\exp(-x))$) (at step ST136). Correspondingly to the value of $\sigma(-\Delta/T)$, the two-dimensional layout evaluating unit 16 performs a relevant selection operation. With probability $\sigma(-\Delta/T)$, the two-dimensional layout evaluating unit 16 selects the changed state X' and thereby sets X=X'. With probability $1-\sigma(-\Delta/T)$, the two-dimensional layout evaluating unit 16 selects the original state X (at step ST137).

Next, the two-dimensional layout evaluating unit 16 determines whether or not the process from step ST134 to step ST137 has been repeated the predetermined number of times (at step ST137a). When the determined result at step ST137a is No, the two-dimensional layout evaluating unit 16 repeats the process.

When the determined result at step ST137a is Yes, the flow advances to step ST138. At step ST138, the two-dimensional layout evaluating unit 16 slightly decreases the value of the temperature parameter T. Next, the two-dimensional layout evaluating unit 16 determines whether or not the value T is sufficiently low (at step ST139). When the determined result at 20 step ST139 is No, the two-dimensional layout evaluating unit 16 repeats the process of step ST134 and after. When the determined result at step ST139 is Yes, the two-imensional layout evaluating unit 16 outputs the layout order of "objects" and the two-dimensional layout result (at step ST140).

Thereafter, the two-dimensional layout evaluating unit 16 completes the process.

In this automatic optimizing process, particularly, the selection of a changing operation at step ST134 is important. It is preferred to select this operation from the following two types as mentioned before.

(a) The order of "objects" is exchanged between an order position i that is randomly selected and the next order position (i+1).

(b) The order of "objects" is exchanged between two order positions i and j that are randomly selected.

Figure 119:
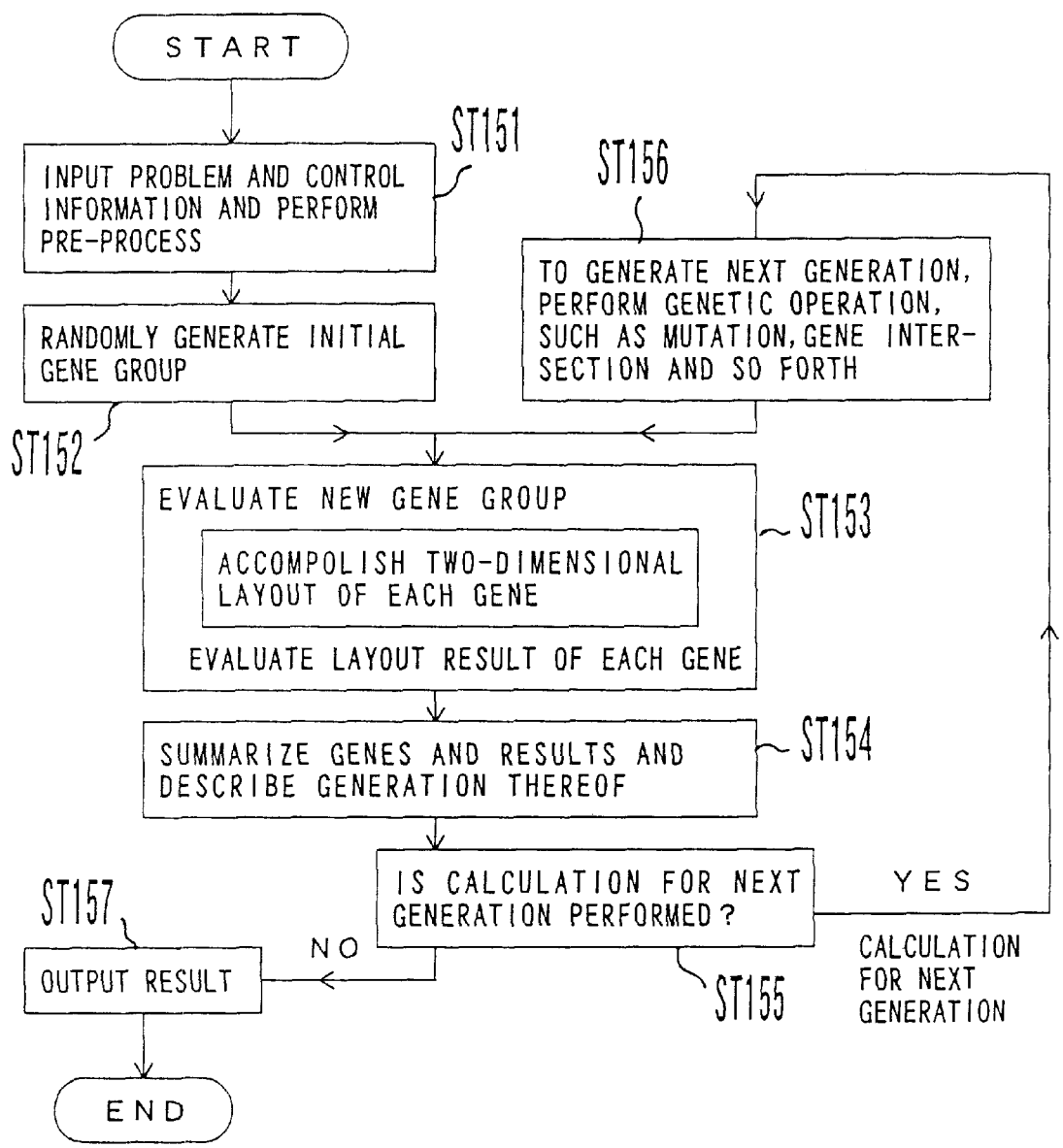
FIG. 119 is a flowchart showing a genetic algorithm.

As with the SA method, the genetic algorithm (GA) is well known as a general basis for optimization. FIG. 119 is a flowchart showing an automatic optimizing process for a two-dimensional layout based on a GA such that a layout order of objects correspond to a gene and the GA searches for an optimum gene.

When the process is started, the two-dimensional layout evaluating unit 16 receives a two-dimensional layout problem and control information and performs an appropriate pre-process (at step ST151). The two-dimensional layout evaluating unit 16 randomly generates a plurality of layout orders and treats them as an initial gene group (at step ST152).

Next, the two-dimensional layout evaluating unit 16 supplies the layout orders described as the genes of the generated gene group to the two-dimensional layout unit 11. The two-dimensional layout unit 11 two-dimensionally lays out "objects." The two-dimensional layout unit 11 outputs a layout result to the two-dimensional layout evaluating unit 16. The two-dimensional layout evaluating unit 16 calculates the evaluation value of the layout result corresponding to each gene (at step ST153).

The two-dimensional layout evaluating unit 16 summarizes each gene and the evaluation value thereof, describes the generation thereof (at step ST154), and determines whether or not to perform a calculation for the next generation (at step ST155). When the determined result at step ST155 is Yes, the two-dimensional layout evaluating unit 16 performs a genetic operation for the next generation (at step ST156) and repeats the process of step ST153 for the new gene group.

When a predetermined condition (for example, an attainment of a predetermined generation) is satisfied, the two-dimensional layout evaluating unit 16 outputs each gene of the generation, the layout result thereof, and the evaluation value thereof (at step ST157). Thereafter, the two-dimensional layout evaluating unit 16 completes the process.

As the genetic operation performed at step ST156, it is preferred to use a combination of the following operations as mentioned before.

(a) The order of "objects" is exchanged between an order position i that is randomly selected in a gene and the next order position (i+1) (mutation).

(b) The order of "objects" is exchanged between two order positions i and j that are randomly selected in a gene (mutation).

(c) One order position i is randomly selected in a gene. Entire "objects" from the order position i to the last order position are moved to the top of the gene. This operation is referred to as selective circulating operation (mutation).

(d) One order position i is randomly selected in two genes A and B that are appropriately selected. While portions of the order position 1 to the order position (i−1) of the genes A and B are being reserved, remaining portions of the genes A and B are interchanged.

(e) One order position i is randomly selected in two genes A and B that are appropriately selected. While portions of the order position i to the last order position of the two genes are being reserved, remaining portions of the two genes A and B are interchanged.

Correspondingly to a combination of the three layout rules shown in FIG. 117, the reverse analysis has the above-described properties. Thus, when a two-dimensional layout is optimized with SA and GA, the reverse analysis can be used in the following manners.

Manner 1. In the case that only one layout rule is consistently handled in SA or GA:

To normalize parameters of SA or genes of GA, the non-redundant reverse analyzing method or approximate reverse analyzing method can be used. Although the accuracy of the process of the non-redundant reverse analyzing method is higher than that of the approximate reverse analyzing method, the speed of the process of the former is lower than that of the latter. In other words, although the speed of the process of the approximately reverse analyzing method is very high, the accuracy thereof is not always high.

By normalizing parameters or genes, a complicated layout order can be converted into a simple order. Thus, an optimized layout of "objects" can be searched for systematically under a standard layout rule. A complicated layout order represents an order in which many "objects" are laid out at layout positions with low priority. A simple order represents an order in which many "objects" are smoothly laid out at layout positions with the highest priority.

Manner 2. In the case that a plurality of layout rules are used separately or together in SA or GA:

Separated worlds for individual layout rules (gene groups in GA) are generated. For each layout rule, the non-redundant reverse analyzing method or approximate reverse analyzing method is used. A pair of a layout rule and a layout order is handled as a parameter of SA or a gene of GA.

Manner 3. In the case that a plurality of layout rules are used together in SA or GA:

A plurality of layouts in each layout order are attempted using a plurality of layout rules together. One of the layout rules is selected as a standard layout rule. Under the selected standard layout rule, parameters of SA or genes of GA are normalized according to the nonredundant reverse analyzing method.

Although the process speed of the reverse analyzing process in this case is relatively slow, it can handle a two-dimensional layout that cannot be represented with one layout rule.

In the above-described automatic optimization, although a plurality of layout rules are applied, the standard layout rule is gradually emphasized and thereby the normalized layout order is employed. The layout order includes a small number of essential "occupied blank areas."

Manner 4. In the case that a plurality of layout rules are used together in SA or GA:

As with the manner 3, with a plurality of layout rules, a plurality of layouts for each layout order are attempted. One of the layout rules is selected as a standard layout rule. Under the standard layout rule, the approximately reverse analyzing method is applied and a normalizing process for parameters of SA or genes of GA is performed. Although a plurality of layout rules are applied, the standard layout rule has higher precedence than the other layout rules. Logically, the manner 2 is superior to the manner 4.

Thus, it is considered that the manner 1 or manner 2 is more practical than the other manners. In particular, when the approximate reverse analyzing method is applied correspondingly to the individual layout rules, a property of approximation is not apparently observed. Parameters of SA or genes of GA that are a search space can be normalized at relatively high speed. Thus, the optimizing process can be performed at high speed.

As described above, according to the present invention, a method for compactly laying out many rectangular "objects" with various shapes and sizes and optimizing the layout under an appropriate evaluation standard and an apparatus thereof are provided.

As a basic method according to the present invention, a blank space is represented and managed in the format of "a set of inscribed rectangles." This format has the following theoretical features.

(a) Generality: The method according to the present invention can be generally applied for "any closed figure represented by vertical sides and horizontal sides." The figure may have a concaved portion. The figure may have a hole (obstacle). The figure may be separated into a plurality of closed sub-figures.

(b) Non-inclusion: Each of the members of a set of inscribed rectangles corresponding to one closed figure may overlap with each other, but not be included in another member.

(c) Uniqueness: A set of inscribed rectangles is unique against a given closed figure and does not depend on "a priority rule for layout positions."

(d) Necessity: When one rectangle A is laid out in a given closed figure S, if the orientation of the rectangle A is not changed, the rectangle A is included in at least one of the inscribed rectangles of the given closed figure S.

(e) Sufficiency: When one rectangle A is included in one inscribed rectangle Q of a given closed figure S, the rectangle A can be laid out in the given closed figure S.

Because of such features, it can be said that representing and managing a blank space with "a set of inscribed rectangles" have a substantial aptitude for solving a two-dimensional problem.

Management of a blank space with "a set of inscribed rectangles" is realized by a precise computer algorithm rather than an engineer's intuition. Since the layout and managing processes performed by the computer do not involve uncertain or probability factors, the processes can be precisely executed. Thus, the present invention provides an important basis on which the layout design work is performed by a computer instead of an experienced engineer.

In addition, according to the present invention, to determine a two-dimensional layout, after a "container" and "objects" are designated, "a priority rule for layout positions" and "a layout order" are used. In the case that "a priority rule for layout positions" has been designated, when "objects" to be laid out are successively received, they can be successively laid out. At this point, an "object" can be laid out in such a manner that it does not overlap with other "objects" that have been laid out, and without the need to move these "objects" and form unnecessary closed blank spaces.

This process can be automatically performed by a predetermined algorithm. Since the layout result depends on the order of received "objects," by repeating trial and error in computer simulations, the optimum layout order can be selected from among various layout orders. According to the present invention, such an automatic optimizing method is presented and a practical process thereof is accomplished.

It should be noted that the "priority rule for layout positions" is not limited to one type. Besides the method for designating the priority direction of a layout, a method for rotating the priority direction clockwise and laying out "objects" in the vicinity of the outer periphery of a "container" first, a method for laying out an "object" at a position near the outer periphery, and so forth, can be considered.

These designating methods have been considered so that "objects" are laid out as compactly as possible regardless of the order of the "objects." In reality, "objects" are smoothly laid out without need to perform, for example, a backtracking process and the layout result becomes compact in the examples described above.

According to the embodiment of the present invention, to automatically optimize a layout, conventional optimizing methods such as the simulated annealing method and the genetic algorithm are used as a basis. In these methods, by treating the layout order of "objects" as a search space, a two-dimensional layout can be very smoothly and flexibly optimized.

In addition, it is easy to lay out "objects" by varying the "orientation" of each of the "objects." The layout order as a search space has the number of candidates that are equal to the factorial of the number N of "objects." In addition, when the orientation of an "object" is represented with two values corresponding to vertical and horizontal directions, the orientation has $2^N$ combinations. Thus, it is necessary to substantially search a very large search space. However, the SA method and GA method allow such a searching process to be accomplished.

The flexibility of the optimizing process of a two-dimensional layout according to the present invention is notable for the following points.

(a) According to the embodiment, although rectangles are used as "objects," the shape and size thereof are not limited.

(b) The shape of a "container" is not limited to a simple rectangle. However, as long as the "container" is composed of vertical sides and horizontal sides, it may be a closed figure of any shape. The "container" may have a concaved portion. The "container may have a hole (obstacle). Alternatively, the "container" may be separated into a plurality of figures.

(c) Particular "objects" can be laid out at particular positions with priority.

(d) "Occupied blank areas" can be laid out around "objects" or at suitable positions.

(e) The "orientations" of "objects" can be varied so as to optimize the layout thereof.

(f) A layout rule for a two-dimensional layout can be selected from a variety of layout rules, not fixed.

(g) An evaluation standard for a two-dimensional layout can be designated correspondingly to an application.

For example, the present invention can be applied to the following fields.

(a) Layout problem for stock items in a warehouse (b) Layout problem for parts on a printed circuit board (c) Cell layout problem in designing a VLSI To practically apply the present invention to such industrial fields, individual evaluation standards should be designated for problems thereof. However, since the present invention can be applied to any two-dimensional layout problem, it is expected that a technology based on the present invention becomes important.

In addition, the technology of the present invention can be easily extended to object layout problems in a multi-dimensional space, not limited to two-dimensional layout problems. For example, in the case of a three-dimensional layout problem in which objects in a rectangular parallelepiped figure with any shape and size are successively laid out in a "container" represented by a three-dimensional closed figure, a priority rule for layout positions in the three-dimensional layout space is designated and objects are automatically laid out according to the priority rule.

According to the present invention, a layout problem for laying out many objects in a space can be accurately and effectively solved. Thus, a layout of objects in a warehouse, a layout of parts on a printed circuit board, a layout of cells in a VLSI, and so forth, can be effectively designed.

What is claimed is:

1. A space managing apparatus, comprising:

a space representing unit representing an area of a two-dimensional space composed of at least one closed figure surrounded by vertical sides and horizontal sides with a set of inscribed rectangles inside the closed figure, all sides of each of the inscribed rectangles partially congruent with corresponding sides of the closed figure, respectively; and a managing unit managing the closed figure by laying out a rectangular object in a designated position of the closed figure, generating a new closed figure in the closed figure by excluding from the closed figure a space of the rectangular object laid in the closed figure, and instructing said space representing unit to represent a space of the new closed figure area with a set of inscribed rectangles.

2. The space managing apparatus as set forth in claim 1, wherein said managing unit includes:

an adding unit adding a rectangle of an arbitrary size to an arbitrary position on a side of the closed figure; and a removing unit removing a rectangle of an arbitrary size from an arbitrary position of the closed figure.

3. The space managing apparatus as set forth in claim 1, wherein said managing unit includes:
- an adding unit adding to an arbitrary position on a side of the closed figure at least one closed figure surrounded by vertical sides and horizontal sides; and
- a removing unit removing from an arbitrary position of the closed figure of the two-dimensional space at least one closed figure.

4. A layout optimizing apparatus designing a layout of objects, comprising:
- a storing unit storing at least one placement rule including information of a direction designated by a vector in a coordinate system for a layout space and specifying at least one layout position in the layout space;
- a layout unit in communication with the storing unit and generating an object layout result representing the objects laid out in the layout space by successively receiving, as an object, information of each object from an input unit in communication with the layout unit and for each object received from the input unit determining a layout position in the layout space by repeatedly applying the placement rule according to a priority order based on the placement rule and by repeatedly selecting a farthest position in the designated direction among positions in the layout space;
- an evaluating unit evaluating the object layout result generated by said layout unit; and
- a searching unit searching for a layout order of objects while varying the layout order by a probability operation according to a simulated annealing method, and obtaining a layout result by the probability operation.

5. The layout optimizing apparatus as set forth in claim 4, wherein said searching unit further searches for a placement rule while varying the placement rule.

6. The layout optimizing apparatus as set forth in claim 4, wherein said searching unit further searches for an orientation of an object with respect to the layout space while varying the orientation corresponding to an obtained layout order.

7. The layout optimizing apparatus as set forth in claim 4, wherein said searching unit exchanges order positions of two successive objects that have been randomly designated to vary the layout order.

8. The layout optimizing apparatus as set forth in claim 4, wherein said searching unit substitutes order positions of two objects each of which has been randomly designated to vary the layout order.

9. A layout optimizing apparatus, comprising:
- storing means for storing at least one placement rule for layout positions;
- input means successively inputting information of objects;
- layout means for generating an object layout result representing the objects laid out in a layout space by successively receiving, as an object, information of each object from the input means and for each object received from the input means determining a layout position of each object in the layout space according to the placement rule for layout positions every time information of each object is input;
- evaluating means for evaluating a layout result generated by said layout means;
- searching means for searching a layout order of the objects while varying the layout order by a probability operation according to a simulated annealing method, and generating a layout result by the probability operation;
- analyzing means for analyzing a layout result obtained by said layout means, and obtaining a predetermined layout order of objects reproducing the layout result by laying out the objects according to a predetermined placement rule for layout positions, and
- wherein said searching means searches for the predetermined layout order of the objects using the predetermined placement rule for layout positions.

10. The layout optimizing apparatus as set forth in claim 9,
- wherein said analyzing means obtains a layout order which reproduces at least a part of the layout result obtained by said layout means according to the predetermined placement rule for layout positions, and
- wherein said searching means searches for the layout order which reproduces at least a part of the layout result.

* * * * *